US 10,916,089 B2

(12) United States Patent
Shigeta

(10) Patent No.: US 10,916,089 B2
(45) Date of Patent: Feb. 9, 2021

(54) INSPECTION SYSTEM AND MANAGEMENT SYSTEM

(71) Applicant: ANGEL PLAYING CARDS CO., LTD., Shiga (JP)

(72) Inventor: Yasushi Shigeta, Shiga (JP)

(73) Assignee: ANGEL PLAYING CARDS CO., LTD., Shiga (JP)

(*) Notice: Subject to any disclaimer, the term of this patent is extended or adjusted under 35 U.S.C. 154(b) by 0 days.

(21) Appl. No.: 16/743,457

(22) Filed: Jan. 15, 2020

(65) Prior Publication Data

US 2020/0258351 A1 Aug. 13, 2020

Related U.S. Application Data

(63) Continuation of application No. 16/322,598, filed as application No. PCT/JP2017/025796 on Jul. 14, 2017.

(30) Foreign Application Priority Data

Aug. 2, 2016 (WO) .................. PCT/JP2016/072673
Nov. 18, 2016 (JP) .................................. 2016-225540
Apr. 29, 2017 (JP) .................................. 2017-100318

(51) Int. Cl.
*G07F 17/32* (2006.01)
*A44C 21/00* (2006.01)
(Continued)

(52) U.S. Cl.
CPC .......... *G07F 17/3241* (2013.01); *A44C 21/00* (2013.01); *A63F 1/06* (2013.01);
(Continued)

(58) Field of Classification Search
CPC .... G07F 17/3241; G07F 17/32; G07F 17/322; G07F 17/3223; G07F 17/3232;
(Continued)

(56) References Cited

U.S. PATENT DOCUMENTS 4,814,589 A 3/1989 Starch et al.
5,282,679 A * 2/1994 Redelinghuys ...... A47B 46/005
312/316
(Continued)

FOREIGN PATENT DOCUMENTS

AU 2007231813 A1 11/2008
CN 1890005 A 1/2007
(Continued)

OTHER PUBLICATIONS

Korean Office Action dated Feb. 20, 2020 issued in corresponding / family KR Application 10-2017-7021786.
(Continued)

*Primary Examiner* — David L Lewis
*Assistant Examiner* — Matthew D Hoel
(74) *Attorney, Agent, or Firm* — Norton Rose Fulbright US LLP

(57) ABSTRACT

When an unfair gaming currency is delivered to a dealer from a player, the currency is detected as unfair. The inspection system for inspecting the gaming currency, in which an RF tag is built, comprises: a gaming currency tray for housing the gaming currencies of the dealer in a casino game; an RF reader for reading the RF tags of the plural gaming currencies housed in the gaming currency tray; plural photosensors for detecting at least the number of the plural gaming currencies housed in the gaming currency tray at a constant time interval or always in a method other than RFID; and an inspection/alarm part for generating alarms when the number of the gaming currencies whose RF tags are read by the RF reader is not equal to the number of the gaming currencies detected by the plural photosensors.

19 Claims, 89 Drawing Sheets

(51) Int. Cl.

| | | |
|---|---|---|
| *A63F 1/06* | (2006.01) | |
| *A63F 3/00* | (2006.01) | |
| *A63F 9/24* | (2006.01) | |
| *G01G 19/52* | (2006.01) | |
| *G01G 19/62* | (2006.01) | |
| *G06K 19/04* | (2006.01) | |
| *G06K 7/00* | (2006.01) | |
| *G06Q 20/00* | (2012.01) | |
| *G06Q 20/20* | (2012.01) | |
| *G07D 5/00* | (2006.01) | |
| *G07D 5/04* | (2006.01) | |
| *G07D 5/08* | (2006.01) | |
| *G07G 1/00* | (2006.01) | |
| *G06K 7/10* | (2006.01) | |

(52) U.S. Cl.
CPC ............ *A63F 3/00* (2013.01); *A63F 3/00157* (2013.01); *A63F 9/24* (2013.01); *G01G 19/52* (2013.01); *G01G 19/62* (2013.01); *G06K 7/10366* (2013.01); *G06K 7/10415* (2013.01); *G06K 19/047* (2013.01); *G06Q 20/00* (2013.01); *G06Q 20/208* (2013.01); *G07D 5/00* (2013.01); *G07D 5/04* (2013.01); *G07D 5/08* (2013.01); *G07F 17/32* (2013.01); *G07F 17/322* (2013.01); *G07F 17/3223* (2013.01); *G07F 17/3232* (2013.01); *G07F 17/3234* (2013.01); *G07F 17/3248* (2013.01); *G07F 17/3251* (2013.01); *G07G 1/00* (2013.01); *G07G 1/0072* (2013.01)

(58) Field of Classification Search
CPC ............ G07F 17/3234; G07F 17/3248; G07F 17/3251; A63F 1/06; A63F 3/00; A63F 3/00157; A63F 9/24
See application file for complete search history.

(56) References Cited

U.S. PATENT DOCUMENTS

| | | | |
|---|---|---|---|
| 5,735,742 A | 4/1998 | French | |
| 6,039,650 A | 3/2000 | Hill | |
| 6,273,817 B1 * | 8/2001 | Sultan | A63F 3/0665 273/138.1 |
| 6,335,685 B1 * | 1/2002 | Schrott | G06K 7/10079 340/572.1 |
| 6,527,191 B1 * | 3/2003 | Jannersten | A63F 1/02 235/462.01 |
| 6,600,418 B2 * | 7/2003 | Francis | G06Q 10/087 340/572.1 |
| 6,621,053 B1 * | 9/2003 | Wensink | A47J 37/0694 126/337 R |
| 6,629,894 B1 * | 10/2003 | Purton | A63F 1/06 273/149 R |
| 7,055,690 B1 * | 6/2006 | Valdez | A47F 3/14 206/215 |
| 7,108,606 B1 * | 9/2006 | Luciano | G07F 17/3216 361/679.57 |
| 7,357,321 B2 * | 4/2008 | Yoshida | G06K 7/10 235/454 |
| 7,448,485 B1 | 11/2008 | Rutler | |
| 7,762,889 B2 * | 7/2010 | Shigeta | A63F 1/18 463/29 |
| 7,967,672 B2 * | 6/2011 | Shigeta | A63F 1/18 463/13 |
| 8,033,548 B2 * | 10/2011 | Shigeta | A63F 1/14 273/293 |
| 8,192,278 B2 * | 6/2012 | Yoshizawa | G07F 17/3211 463/25 |
| 8,371,583 B2 * | 2/2013 | Shigeta | A63F 1/02 273/149 R |
| 8,387,983 B2 * | 3/2013 | Shigeta | A63F 11/00 273/149 R |
| 2002/0042298 A1 | 4/2002 | Soltys et al. | |
| 2002/0068635 A1 * | 6/2002 | Hill | G07F 17/3293 463/47 |
| 2002/0155869 A1 * | 10/2002 | Soltys | A63F 1/18 463/11 |
| 2003/0022708 A1 * | 1/2003 | Yano | A63F 1/00 463/11 |
| 2003/0064798 A1 | 4/2003 | Grauzer et al. | |
| 2003/0195025 A1 * | 10/2003 | Hill | A63F 1/18 463/11 |
| 2004/0026636 A1 * | 2/2004 | Shigeta | A63F 1/02 250/556 |
| 2004/0219982 A1 | 11/2004 | Khoo et al. | |
| 2005/0026683 A1 * | 2/2005 | Fujimoto | G07D 5/08 463/29 |
| 2005/0059479 A1 | 3/2005 | Soltys et al. | |
| 2005/0121852 A1 | 6/2005 | Soltys et al. | |
| 2005/0137005 A1 * | 6/2005 | Soltys | A63F 3/00157 463/13 |
| 2005/0255905 A1 * | 11/2005 | Duke | G07F 17/32 463/17 |
| 2005/0288083 A1 * | 12/2005 | Downs, III | G07F 17/3232 463/11 |
| 2006/0247036 A1 * | 11/2006 | Shigeta | A63F 1/18 463/29 |
| 2007/0024449 A1 * | 2/2007 | Bilyeu | G06K 17/00 340/573.1 |
| 2007/0060311 A1 | 3/2007 | Rowe et al. | |
| 2007/0077987 A1 | 4/2007 | Gururajan et al. | |
| 2007/0178955 A1 * | 8/2007 | Mills | G07F 17/32 463/13 |
| 2007/0184898 A1 | 8/2007 | Miller et al. | |
| 2008/0041932 A1 | 2/2008 | Christophersen et al. | |
| 2008/0105750 A1 * | 5/2008 | Shigeta | A63F 1/18 235/468 |
| 2008/0110996 A1 * | 5/2008 | Shigeta | G07F 17/32 235/491 |
| 2008/0113783 A1 | 5/2008 | Czyzewski et al. | |
| 2008/0174423 A1 * | 7/2008 | Breed | B60R 21/013 340/539.22 |
| 2008/0188292 A1 | 8/2008 | Walker et al. | |
| 2008/0277871 A1 * | 11/2008 | Saheki | G07F 17/329 273/269 |
| 2008/0303210 A1 * | 12/2008 | Grauzer | H05K 999/99 273/149 R |
| 2009/0075725 A1 | 3/2009 | Koyama | |
| 2009/0191933 A1 * | 7/2009 | French | A63F 1/10 463/12 |
| 2009/0233699 A1 | 9/2009 | Koyama | |
| 2009/0243213 A1 * | 10/2009 | Pececnik | B65H 83/025 273/149 R |
| 2010/0105486 A1 * | 4/2010 | Shigeta | G07F 17/3251 463/47 |
| 2010/0113118 A1 * | 5/2010 | Shigeta | G07F 17/3251 463/11 |
| 2010/0130288 A1 * | 5/2010 | Shigeta | G07F 17/3251 463/47 |
| 2010/0133754 A1 * | 6/2010 | Shigeta | A63F 1/14 273/293 |
| 2010/0240446 A1 | 9/2010 | Koyama | |
| 2010/0285869 A1 | 11/2010 | Walker et al. | |
| 2010/0314834 A1 * | 12/2010 | Shigeta | A63F 1/12 273/293 |
| 2010/0327525 A1 * | 12/2010 | Shigeta | A63F 1/02 273/149 R |
| 2011/0052049 A1 | 3/2011 | Rajaraman et al. | |
| 2011/0127722 A1 * | 6/2011 | Emori | G07F 17/322 273/274 |
| 2011/0130185 A1 * | 6/2011 | Walker | G07F 17/3202 463/13 |
| 2011/0210175 A1 * | 9/2011 | Shigeta | A63F 1/18 235/491 |
| 2012/0208622 A1 | 8/2012 | Delaney et al. | |
| 2012/0241344 A1 | 9/2012 | Gronau et al. | |
| 2012/0252564 A1 | 10/2012 | Moore et al. | |

(56) References Cited

U.S. PATENT DOCUMENTS

| | | | |
|---|---|---|---|
| 2013/0134673 A1* | 5/2013 | Shigeta | A63F 1/18 273/148 R |
| 2013/0161905 A1* | 6/2013 | Grauzer | A63F 1/14 273/149 R |
| 2013/0233923 A1 | 9/2013 | Hoyt et al. | |
| 2013/0292902 A1* | 11/2013 | Shigeta | A63F 1/10 273/148 R |
| 2013/0313776 A1 | 11/2013 | Gelinotte et al. | |
| 2013/0316797 A1 | 11/2013 | Gelinotte et al. | |
| 2014/0033660 A1* | 2/2014 | Shigeta | A63F 1/062 53/492 |
| 2014/0057703 A1 | 2/2014 | LeStrange et al. | |
| 2014/0291399 A1 | 10/2014 | Koyama | |
| 2014/0332595 A1 | 11/2014 | Moreno et al. | |
| 2015/0136562 A1* | 5/2015 | Fujita | G07D 11/16 194/206 |
| 2015/0141125 A1 | 5/2015 | LeStrange et al. | |
| 2015/0141126 A1 | 5/2015 | Hoyt et al. | |
| 2015/0312517 A1 | 10/2015 | Hoyt et al. | |
| 2015/0356825 A1 | 12/2015 | Okada et al. | |

FOREIGN PATENT DOCUMENTS

| | | |
|---|---|---|
| CN | 101662965 A | 3/2010 |
| CN | 101919110 A | 12/2010 |
| CN | 102123770 A | 7/2011 |
| CN | 103262100 A | 8/2013 |
| CN | 104620288 A | 5/2015 |
| EP | 1589502 A1 | 10/2005 |
| EP | 2545967 A2 | 1/2013 |
| JP | H06134140 A | 5/1994 |
| JP | 2003126535 A | 5/2003 |
| JP | 2004102953 A | 4/2004 |
| JP | 2005342175 A | 12/2005 |
| JP | 2008077140 A | 4/2008 |
| JP | 2008-246103 A | 10/2008 |
| JP | 2009-066172 A | 4/2009 |
| JP | 2009066 72 A | 4/2009 |
| JP | 2009153799 A | 7/2009 |
| JP | 2010128915 A | 6/2010 |
| JP | 2010213940 A | 9/2010 |
| JP | 2013117814 A | 6/2013 |
| JP | 2014095974 A | 5/2014 |
| KR | 1020090081140 A | 7/2009 |
| WO | 2007032954 A1 | 3/2007 |
| WO | 2007093038 A1 | 8/2007 |
| WO | 2008/045075 A2 | 4/2008 |
| WO | 2011103582 A1 | 8/2011 |
| WO | 2015/1079021 A1 | 7/2015 |
| WO | 2015107902 A1 | 7/2015 |
| WO | 2017150883 A1 | 9/2017 |

OTHER PUBLICATIONS

European Search Report dated Jul. 1, 2020 issued in corresponding / family EP Application 20164390.5.
Canadian Office Action dated Apr. 20, 2020 issued in corresponding / family CA Application 2984408.
U.S. Office Action dated May 15, 2020 issued in corresponding / family U.S. Appl. No. 15/812,099.
Chinese Office Action dated May 20, 2020 issued in corresponding / family CN Application 201711181850.6.
Singaporean Office Action dated Jun. 16, 2020 issued in corresponding / family SG Application 10201710384Y.
Chinese Office Action dated Jun. 23, 2020 issued in corresponding / family CN Application 201711183807.3.
International Search Report dated Oct. 3, 2017 issued in corresponding PCT Application PCT/JP2017/025796.
U.S. Office Action dated Dec. 12, 2019 issued in corresponding / family U.S. Appl. No. 15/792,195.
Japanese Office Action dated Jan. 28, 2020 issued in corresponding / family JP Application 2017-208980.
U.S. Office Action dated Oct. 7, 2019 issued in corresponding / family U.S. Appl. No. 15/812,099.
European Search Report dated Oct. 7, 2019 issued in corresponding / family EP Application 17206785.2.
Australian Examination Report No. 3 dated Oct. 22, 2019 issued in corresponding / family AU Application 2017224997.
Korean Office Action dated Nov. 22, 2019 issued in corresponding / family KR Application 10-2017-7031738.
Written Opinion dated Oct. 12, 2019 for corresponding / family SG application No. 11201709269Y.
Office Action dated Sep. 16, 2020 issued in corresponding/family CN Application 201680020454.2.
Notice of Allowance dated Aug. 11, 2020 issued in corresponding/family U.S. Appl. No. 16/322,598.
Office Action dated Sep. 10, 2020 issued in corresponding/family AU Application 2019253861.
Office Action dated Sep. 15, 2020 issued in corresponding/family JP Application 2019-021869.

* cited by examiner

Fig.36

| BAR CODE READER |
|---|
| Ca1 |

| RFID READER |
|---|
| bwg |
| dkg |
| amr |
| ⋮ |
| bbr |
| cjb |

| INFRARED CAMERA |
|---|
| 000011 |
| 000021 |
| 000031 |
| ⋮ |
| 000992 |
| 001002 |

| VISIBLE LIGHT CAMERA |
|---|
| RED |
| RED |
| RED |
| ⋮ |
| BLUE |
| BLUE |

INSPECTION SYSTEM AND MANAGEMENT SYSTEM

CROSS-REFERENCE TO RELATED APPLICATIONS

The present application is a continuation from U.S. application Ser. No. 16/322,598 filed Feb. 1, 2019, which is a national phase application under 35 USC § 371 of International Application No. PCT/JP2017/025796 filed Jul. 14, 2017, which claims the benefits of International Application No. PCT/JP2016/072673 filed Aug. 2, 2016, Japanese Patent Application No. 2016-225540 filed Nov. 18, 2016, and Japanese Patent Application No. 2017-100318 filed Apr. 29, 2017; each application is incorporated herein by reference.

TECHNICAL FIELD

The present invention relates to an inspection system for gaming currencies (gaming chips) in a gaming house.

In game houses such as casinos, there are various attempts for preventing fraud. A game house includes monitoring cameras used for monitoring fraud and prevents fraud by determining fraud of a game, fraud according to collection or repayment of gaming currency that is different from the result of win/loose, and the like based on an image acquired from the monitoring camera.

Meanwhile, in order to perceive the number or a total amount of bet gaming currency, it has been proposed to perceive the amount of gaming currency by attaching a radio IC (RFID) tag to each gaming currency.

In a card game monitoring system disclosed in WO 2015/107902 A, it is determined whether or not gaming currency placed on a game table is collected or re-payed according to a result of win/loose by performing an image analysis of the movement of gaming currency, whereby fraud is monitored.

SUMMARY OF INVENTION

An objection of the present invention is to detect unfairness when an unfair gaming currency or an unfair object is presented.

An inspection system in one embodiment of the present invention is an inspection system for inspecting a gaming currency in which an RF tag is built, comprising: a housing means for housing gaming currencies of a dealer in a casino game; an RF reading means for reading the RF tags of the plural gaming currencies housed in the housing means; a detection means for detecting at least the number of the plural gaming currencies housed in the housing means by a method other than an RFID at constant time intervals or always; and an alarm means for generating an alarm when the number of the gaming currencies whose RF tags are read by the RF reading means is not equal to the number of the gaming currencies detected by the detection means.

The inspection system in another embodiment of the present invention is an inspection system for inspecting a gaming currency used for a game played on a table, comprising a housing means installed on the table, the housing means housing plural gaming currencies, the number of the plural gaming currencies being increased or decreased for each game, and an inspection means for inspecting the gaming currencies, the number of the gaming currencies being increased or decreased for each game in the housing means.

The inspection system in further another embodiment of the present invention is an inspection system for inspecting a gaming currency in which an RF tag is built, comprising: a housing means capable of housing a predetermined number of gaming currencies; an RF reading means for reading RF tags of the plural gaming currencies housed in the housing means; and an alarm means for generating an alarm when the number of the gaming currencies whose RF tags are read by the RF reading means is not equal to the predetermined number.

The inspection system in further another embodiment of the present invention is not limited to an inspection system for inspecting gaming currencies, and can be applied as an inspection system for inspecting an arbitrary valuable in which the RF tag is built. In this case, a valuable inspection system comprises: a valuable to which a unique ID that is individually identifiable is attached; a table on which the valuable is used; a tray for holding the valuable on the table; a determination means for specifying the number of valuables held on the tray using each unique ID; a detection means for shooting the valuables on the table including at least the tray to create an image, and detecting at least the number of the valuables based on the image; a storage means for storing the number detected by the detection means; and an inspection means for inspecting a relationship between the number determined by the determination means and the number detected by the detection means.

An inspection system in further another embodiment of the present invention is an inspection system for inspecting an object in which an RF tag is built, comprising: an RF reading means for reading an RF tag of an object located at a predetermined place; a detection means for detecting at least the number of objects located at the predetermined place by a method other than an RFID; and an alarm means for generating an alarm when the number of the objects whose RF tags are read by the RF reading means is not equal to the number detected by the detection means.

A management system in one embodiment of the present invention is a valuable management system comprising: a valuable to which a unique ID that is individually identifiable is attached; a table on which the valuable is used; a tray for holding the valuable on the table; a determination device for specifying a kind and the number of valuables held on the tray using each unique ID; a management control device for determining abnormality of the valuable based on the ID; and a measuring device for measuring the number of the valuables on the table including at least the tray by using a camera, wherein the management control device has a function for specifying and storing the number of the valuables on the tray by using measuring results of the measuring device, and the management control device further has a function for inspecting a relationship between information of the ID obtained by the determination device and information read by the measuring device.

BRIEF DESCRIPTION OF DRAWINGS

FIG. 36 is a diagram showing an example of contents of information to be read out in the fourth embodiment.

DETAILED DESCRIPTION

Figure 1:
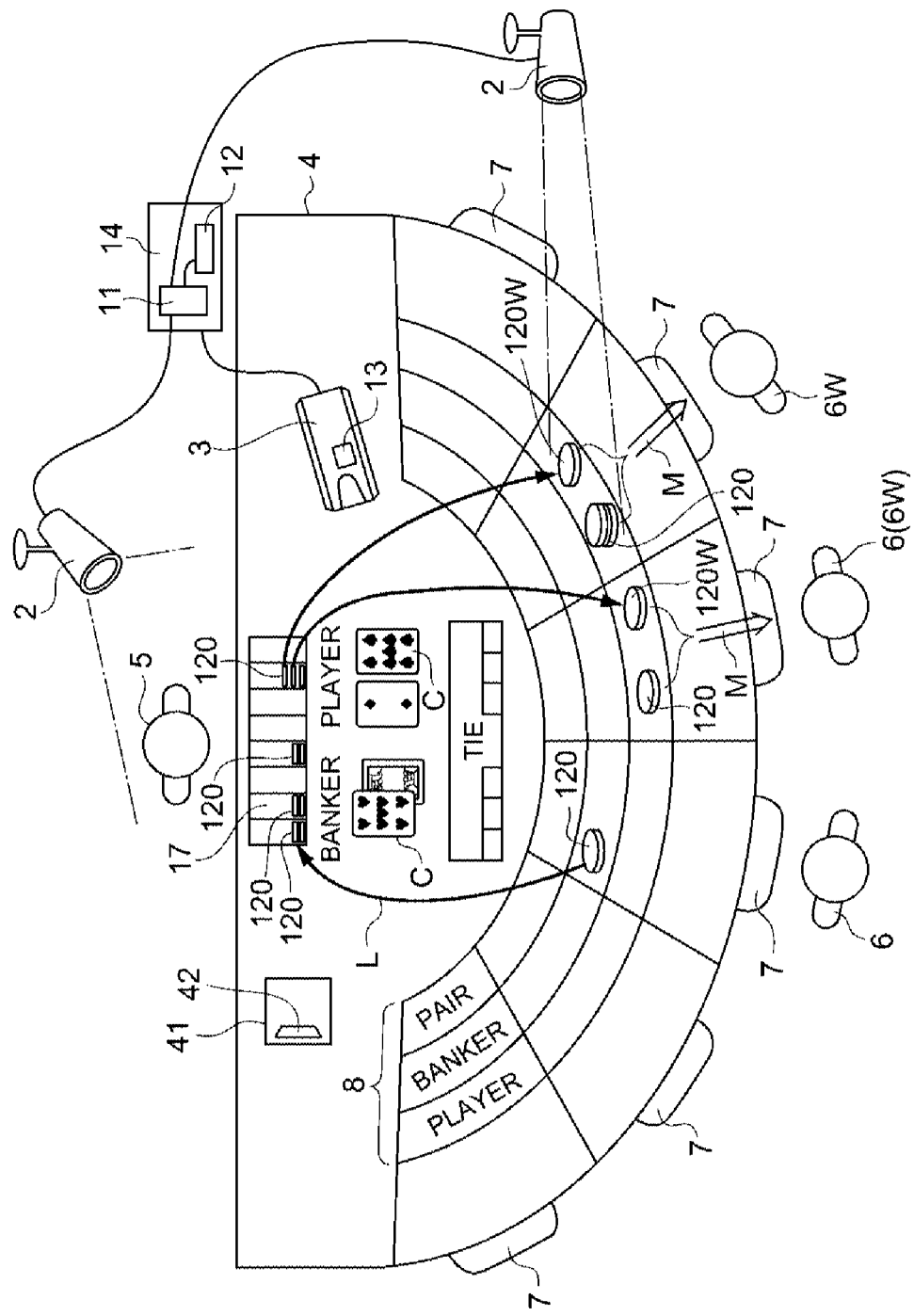
FIG. 1 is a diagram illustrating an overview of the whole fraud detecting system in a game house including a plurality of gaming tables according to a first embodiment of the present invention.

In game houses such as casinos, while gaming currency is piled to have a high volume and is placed on a game table, there is a problem in that a total amount cannot be correctly read by a reading device for IC tags disposed under the game table, and, when the sensitivity of the reading device is increased, gaming currency or gaming placed at a different position (winning/losing depends on the position) is added, and there is a problem in that a total amount of gaming currency at each position cannot be perceived. In addition, in imaging using a camera, there is a problem in that a blind area is generated according to the viewing angle of the camera, or gaming currency enters a shadow due to overlapping, and thus, there is a problem in that a total amount of gaming currency cannot be perceived.

In addition, according to player's squeeze (a behavior for seeing a card little by little by bending a card facing the back side while enjoying the rank of the card or the like) of a card, which is frequently performed in a Baccarat game, or the like, the card is bent, and there is a problem in that the rank and the suit of the card cannot be determined through an analysis of an image acquired from a camera.

Furthermore, fraud on a game table has been advanced, and there is a new problem in that fraud using an advanced betting method or the like that cannot be found in simple detection of a large winning amount on a game table or the like cannot be found by using a camera or tracking a winning amount. In addition, the prevention of fraud according to a conspiracy of a dealer and a player is not sufficient according to the conventional technology.

In order to solve the various problems described above, a fraud detecting system according to a first embodiment in a game house including a plurality of game tables is a fraud detecting system in a game house including a plurality of game tables and includes: a game recording device that records a state of progress of a game performed on each of the game table as a video including a dealer and a player through a camera; an image analyzing device that performs an image analysis of the recorded video of the state of progress of the game; a card distributing device that determines and displays a result of winning/losing of each game in the game table; and a control device that detects fraud performed in the game table by using a result of the image analysis performed by the image analyzing device and the result of winning/losing determined by the card distributing device.

In addition, in the fraud detecting system, the card distributing device has a structure capable of reading the rank of each distributed card, and the control device has a structure capable of determining match/mismatch by combining information of a rank acquired by the image analyzing device from a video of each card distributed in the game table and information of a rank of a card read by the card distributing device In addition, in the fraud detecting system, the image analyzing device or the control device has an artificial intelligence-utilizing or deep-learning structure capable of acquiring information of a rank of a card from a card that is distributed in the game table and is bent by the player or is contaminated.

Furthermore, in the fraud detecting system, the control device acquires the position, the kind, and the quantity of gaming currency that is bet by each player through the image analyzing device and determines whether or not collection of losing gaming currency that is bet by each player and repayment for the winning gaming currency are appropriately performed according to the result of winning/losing of the game by analyzing the video of the state of progress of the game through the image analyzing device.

In addition, in the fraud detecting system, the image analyzing device or the control device has an artificial intelligence-utilizing or deep-learning structure capable of acquiring information of the kind, the quantity, and the position of the bet gaming currency also in a state in which a plurality of gaming currency placed on a game table is in a state in which a part or the whole one is hidden according to a hidden area of the camera.

Furthermore, in the fraud detecting system, the control device has an artificial intelligence-utilizing or deep-learning structure capable of comparing/calculating whether or not the amount of gaming currency perceived in a dealer's tray for gaming currency in the game table is increased/decreased according to the collection of losing gaming currency that is bet by each player and a paid amount for winning gaming currency based on a result of winning/losing of the game after the game ends and a settlement.

In addition, in the fraud detecting system, the control device has an artificial intelligence-utilizing or deep-learning structure capable of acquiring the position and the amount of gaming currency that is bet at each play position of the game table and extracting an abnormal situation by comparing a winning/losing history and an acquired amount of gaming currency for each player that are acquired from a result of winning/losing of each game with statistical data of past game.

Furthermore, in the fraud detecting system, the control device has an artificial intelligence-utilizing or deep-learning structure capable of extracting an abnormal situation by comparing a state in which the amount of the bet gaming currency at the time of losing is smaller than the amount of the bet gaming currency at the time of losing at a play position of a game table with statistical data of past games.

In addition, in the fraud detecting system, the control device has a structure capable of specifying whether the abnormal situation is extracted through the image analyzing device or an individual player at a play position at which winning of a predetermined amount of more is acquired.

Furthermore, in the fraud detecting system, the control device has a warning function for giving a notification of the presence of a specific player at another game table when the specified player leaves the seat and arrives at the another game table.

In order to solve the various problems described above, according to the present invention, a fraud detecting system in a game house including a plurality of game tables includes: a game recording device that records a state of progress of a game performed on each of the game table as a video including a dealer and a player through a camera; a card distributing device that determines a result of winning/losing of each game in the game table; an image analyzing device that performs an image analysis of the recorded video of the state of processing of the game; and a control device that can detect bills and gaming currency in the game table by using a result of the image analysis performed by the image analyzing device, and the image analyzing device or the control device has an artificial intelligence-utilizing or deep-learning structure capable of detecting exchange of bills and gaming currency in the game table in a situation other than in the middle of dealing cards based on information acquired from the card distributing device or the dealer, recognizing a total amount of genuine bills verified using among the bills and capable of recognizing a total amount of gaming currency also in a state in which a plurality of gaming currency come out onto the game table as an exchange target is in a state in which a part or the whole one is hidden due to a blind area of the camera and comparing a total amount of bills come out from the player onto the game table and a total amount of gaming currency come out from the dealer with each other and determining whether or not the both quantities match.

In addition, in the fraud detecting system, the control device has an artificial intelligence-utilizing or deep-learning structure capable of comparing/calculating whether or not the amount of gaming currency perceived in a dealer's tray for gaming currency in the game table is increased/decreased according to a payed amount of gaming currency corresponding to exchanged bills after a settlement through exchange of bills and gaming currency.

Furthermore, in the fraud detecting system, the control device has an artificial intelligence-utilizing or deep-learning structure capable of comparing/calculating match/mismatch of an input amount of bills according to a dealer's input and a total amount of bills according to a result of the image analysis performed by the image analyzing device after the settlement through exchange of bills and gaming currency. In addition, the control device has an artificial intelligence-utilizing or deep-learning structure capable of comparing/calculating match/mismatch of a total input amount of bills according to a dealer's input in the game table for which the dealer is responsible and a total amount of bills according to a result of the image analysis performed by the image analyzing device.

According to a fraud detecting system according to this embodiment, also when a card is bent according to player's squeeze of the card that is frequently performed in a Baccarat game or the like, the rank and the suit of the card can be determined through an image analysis, and a total amount of gaming currency disposed in the blind area or overlapping gaming currency can be perceived together with the position. In addition, fraud at the time of exchange of bills and gaming currency can be detected as well.

Hereinafter, an overview of the whole fraud detecting system in a game house including a plurality of game tables according to a first embodiment of the present invention will be described in more detail.

FIG. 1 is a diagram illustrating an overview of the whole system, the fraud detecting system in a game house including a plurality of game tables 4 includes: a game recording device 11 that records the state of progress of a game performed in the game table 4 as a video including players 6 and a dealer 5 through a plurality of camera devices 2; an image analyzing device 12 that performs an image analysis of the recorded video of the state of process of the game; and a card distributing device 3 that determines and displays a result of winning/losing of each game in the game table 4. The card distributing device 3 is a so-called electronic shooter that has already been used by persons skilled in the art and has rules of a game programmed in advance and has a structure capable of determining winning/losing of a game by reading information of distributed cards C. For example, in a Baccarat game, winning of the baker, winning of a player, or tie (drawn) is determined basically based on the ranks of two to three cards, and a determination result (a result of winning/losing) is displayed in a result display lamp 13.

The fraud detecting system further includes a control device 14 that compares the rank of actual cards according to a result of the image analysis performed by the image analyzing device 12 and a result of winning/losing determined by the card distributing device 3 with each other and detects fraud (mismatch between a sum of ranks of distributed cards and a result of winning/losing) performed in the game table 4. The card distributing device 3 has a structure capable of reading ranks (A, 2 to 10, J, Q, K) and suits (hearts, spades, or the like) of cards C that are manually distributed by the dealer 5, and the control device 14 has a structure capable of determining match/mismatch by collating information of a rank and suites acquired by the image analyzing device 12 (using artificial intelligence) from a video (captured by using the camera device 2) of cards distributed in the game table 4 and information of cards and suits read by the card distributing device 3 with each other. The image analyzing device 12 and the control device 14 of the fraud detecting system have a structure integrally including a computer formed as one body or by a plurality of configurations, a program, and a memory.

Figure 3:
FIG. 3 is an enlarged diagram of a mark illustrating contamination of a card perceived according to the first embodiment of the present invention.

The image analyzing device 12 and the control device 14 have an artificial intelligence-utilizing or deep-learning structure capable of acquiring information of ranks of cards also for cards C that are distributed in the game table 4 and are bent or contaminated by the player 6. For a contaminated card C, as illustrated in FIG. 3, there is a situation in which it is difficult to determine clubs or spades. Also in such a case, the suite can be determined by an artificial intelligence-utilizing computer or control system, an analysis and a determination of an image using a deep learning (structure) technology. In addition, also in a case where a card is bent according to a player's squeeze of a card, which is frequently performed in a Baccarat game or the like, by using self-learning of examples of many deformations of images or the like, a suit and a rank of a card before deformation can be recognized according to an artificial intelligence-utilizing computer or control system and a deep learning (structure) technology. The artificial intelligence-utilizing computer or control system and the deep learning (structure) technology are known as a person skilled in the art and can be used, and thus, detailed description thereof will not be presented.

Figure 2A:
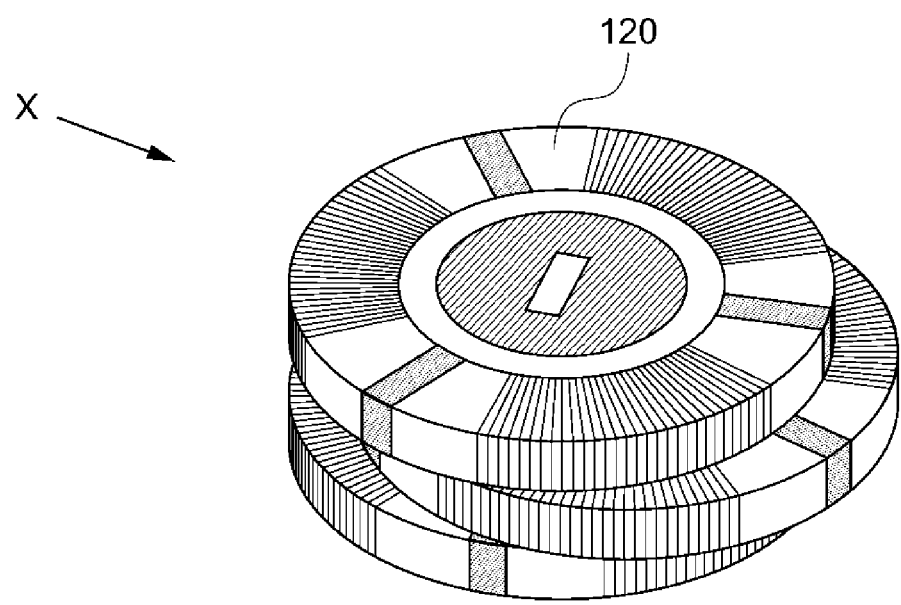
FIG. 2A is a perspective view of gaming currency illustrating an example of another overlapping state of gaming currency perceived according to the first embodiment of the present invention.
Figure 2B:
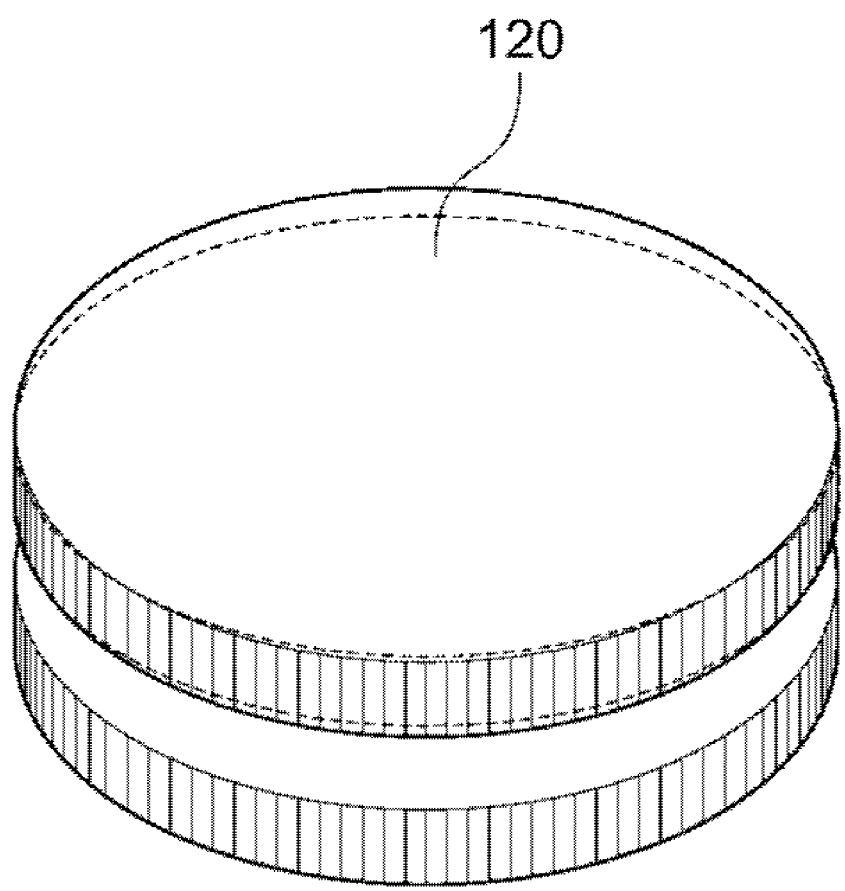
FIG. 2B is a perspective view of gaming currency illustrating an example of another overlapping state of gaming currency perceived according to the first embodiment of the present invention.

The control device 14 having an artificial intelligence-utilizing or deep learning structure can perceive a position (a player, a banker, or a pair) inside a bet area 8 on which each player 6 bets gaming currency 120, the type (a value of a different amount is assigned to gaming currency 120 for each color) of the bet gaming currency 120 through the camera device 2 and the image analyzing device 12. Not only there is a case where the gaming currency 120 is vertically arranged to be superimposed but also there is a case where the gaming currency is superimposed with deviations as illustrated in FIG. 2A. In such a case, in a case where the camera device 2 is positioned in the direction of an arrow X illustrated in FIG. 2A (or the direction of the gaming currency 120 is relatively in a blind area), as illustrated in FIG. 2B, it is assumed that the gaming currency 120 is not visible (enters a blind area). According to the artificial intelligence-utilizing computer or control system or the deep-learning technology, by using a self-learning function or the like, hidden gaming currency 120 due to a blind area or the like is recognized (there are case where a part of one unit of gaming currency is hidden or a case where the whole gaming currency is hidden), and the number of quantity and the like can be correctly perceived.

In this way, since a position (a player, a banker, or a pair) inside the bet area 8 on which the gaming currency 120 is bet and the type (a value of a different amount is assigned to gaming currency 120 for each color) and the quantity of the bet gaming currency 120 can be perceived, the control device 14 determines whether or not collection (denoted by an arrow L) of the losing gaming currency bet by each player 6 and payment (120W) for winning gaming currency to a player 6W who has won are properly performed according to a result of winning/losing of a game in accordance with a result of winning/losing of the game determined by the card distributing device 3 in each game by analyzing a video of the state of process of the game through the image analyzing device 12. In a case where a determination result acquired through an analysis using the image analyzing device 12 is different from a result (for example, a result of reading using an RFID) of reading using the other means, the intelligent-type control device 14 stores the analysis image and can verify the result later. As a result of the verification, in the case of an error in the intelligent-type control device 14, by using the analysis image as sample data of teacher leaning in the deep-learning technology, the accuracy of the intelligent-type control device 14 can be improved.

The control device 14 can analyze and acquire a total amount of the gaming currency 120 in the tray 17 for gaming currency for the dealer 5 in the game table 4 by using the image analyzing device 12 and can compare and calculate whether or not a total amount of the gaming currency 120 inside the tray 17 for the gaming currency 120 has been increased or decreased according to the amount of collection of the losing gaming currency 120 bet by each player 6 and the amount of the payment 120W for winning gaming currency to a player 6W who has won after the end of the game and the settlement based on a result of winning/losing of the game. A total amount of the gaming currency 120 in the tray 17 for gaming currency 120 may be constantly acquired using means such as an RFID, and the control device 14 determines whether or not the increased/decreased amount is correct by analyzing the video of the state of progress of the game through the image analyzing device 12.

For this, the artificial intelligence-type or deep-leaning structure is also used.

In this example, since fraud or a mistake is detected based on a result of winning/losing of a game, information of the type of bet gaming currency 120, the position (a player, a banker, or a pair) inside the bet area 8 on which the gaming currency 120 is bet, and the quantity of the gaming currency 120, and an increased/decreased amount of the gaming currency 120 in the tray 17 for gaming currency after the end of the collection of losing gaming currency and the repayment for the won gaming currency 120 without acquiring the movement of the gaming currency 120 after the end of the game, that is, whether the bet gaming currency 120 has been moved to the player side or the dealer side.

For example, in the case of Baccarat, a result of winning/losing of a game can be determined based on rules of Baccarat by reading ranks of cards C delivered in that game by the card distributing device 3. In addition, a result of winning/losing of a game can be determined also by imaging an area on the game table 4 by using the camera device 2, analyzing the image using the image analyzing device 12, and collating a result of the analysis with the rules of the game by using the control device 14. In such a case, a winning/losing result determining device is configured by the camera device 2, the image analyzing device 12, and the control device 14. The information of a player of each play position 7, the type of bet gaming currency 120, the position (a player, a banker, or a pair) inside the bet area 8 on which the gaming currency 120 is bet, and the quantity of the gaming currency 120 is acquired by imaging the gaming currency 120 placed on the bet area 8 by using the camera device 2 and analyzing the image for each play position 7 by using the image analyzing device 12.

In addition, an increased/decreased amount of gaming currency 120 in the tray 17 for gaming currency before and after the collection of losing gaming currency 120 and the repayment for winning gaming currency 120 can be calculated by comparing a total amount of the gaming currency 120 disposed inside the tray 17 for gaming currency before the collection of losing gaming currency 120 and the repayment for won gaming currency 120 with a total amount of the gaming currency 120 disposed inside the tray 17 for gaming currency after the collection of losing gaming currency 120 and the repayment for won gaming currency 120.

The total amount of the gaming currency 120 disposed inside the tray 17 for gaming currency before the collection of losing gaming currency 120 and the repayment for won gaming currency 120 and the total amount of the gaming currency 120 disposed inside the tray 17 for gaming currency after the collection of losing gaming currency 120 and the repayment for won gaming currency 120 can be detected by imaging the tray 17 for gaming currency housing the gaming currency 120 using the camera device 2 and analyzing the image using the image analyzing device 12. In addition, by embedding an RFID representing the amount inside gaming currency 120 and arranging an RFID reader in the tray 17 for gaming currency, a total amount of the gaming currency 120 housed in the tray 17 for gaming currency may be configured to be detected.

For example, it is assumed that the total amount of the gaming currency 120 disposed on the tray 17 for gaming currency before the start of a game is Bb, and the total amount of the gaming currency 120 disposed on the tray 17 for gaming currency after the game ends, and the collection of losing gaming currency 120 and the re-payment for winning gaming currency 120 is Ba. In addition, in this game, a total amount of all the play positions 7 of gaming currency 120 that is bet on the player area is bp, a total amount of all the play positions 7 of gaming currency 120 that is bet on the banker area is bb, and a total amount of all the play positions 7 of gaming currency 120 that is bet on a tie area is bt. For example, in a case where a result of winning/losing of a game is the winning of the banker, Ba−Bb=bp−bb+bt needs to be satisfied. Alternatively, the total amount Ba of the gaming currency 120 of the tray 17 for gaming currency after the end of the game needs to be (Bb+bp−bb+bt). Otherwise, it can be determined that there is fraud or a mistake in the collection or repayment of the gaming currency.

Figure 13A:
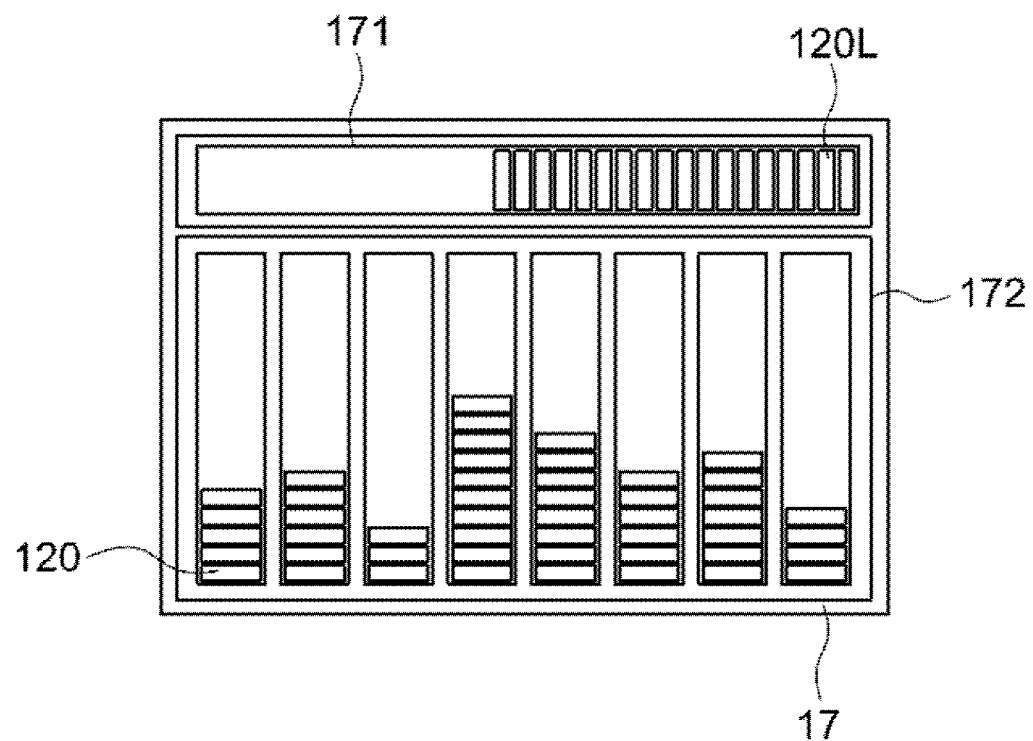
FIG. 13A is a diagram illustrating details of a tray for gaming currency according to the first embodiment of the present invention.
Figure 13B:
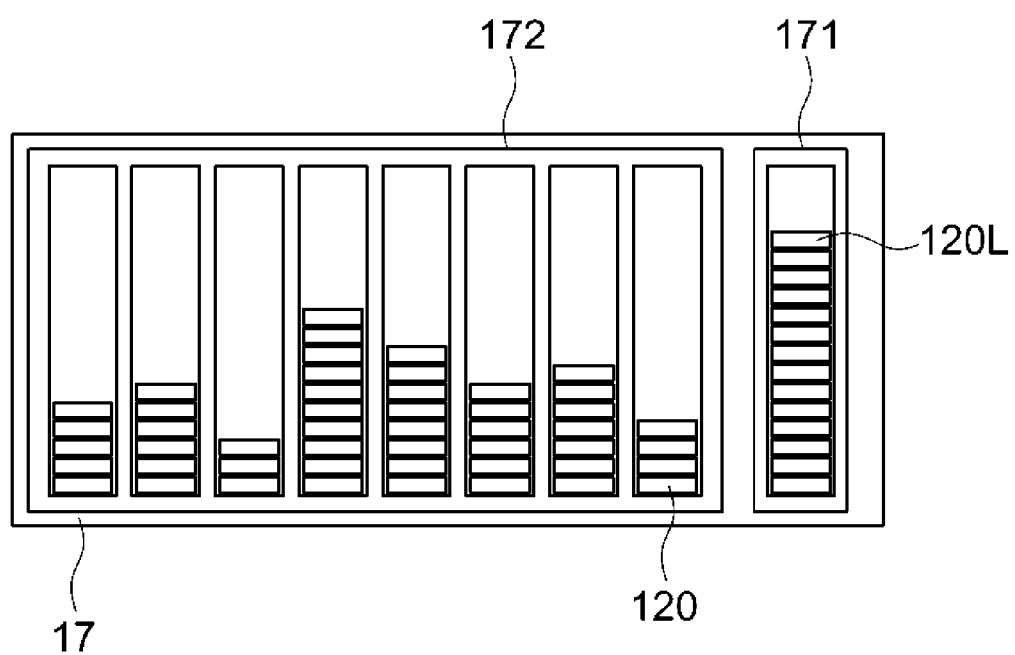
FIG. 13B is a diagram illustrating another example of a tray for gaming currency according to the first embodiment of the present invention.

FIG. 13A is a diagram illustrating details of a tray for gaming currency according to this embodiment, and FIG. 13B is a diagram illustrating another example of a tray for gaming currency. In the tray 17 for gaming currency, a collection tray 171 for gaming currency that is used for collecting and temporarily storing gaming currency 120L for gaming that is bet by a losing player 6L and a repayment tray 172 for gaming currency 120W for gaming that is used for storing gaming currency 120L for gaming to be re-payed are arranged. The image analyzing device 12 and the control device 14 acquire the position, the type, and the quantity of gaming currency 120L for gaming that is bet by the losing player 6L and calculates an increased amount (an amount of gaming currency 120 to be present in the collection tray 171 for gaming currency) of gaming currency 0L for gaming in the game. In addition, the image analyzing device 12 and the control device 14 acquires a real total amount of gaming currency 120 in the tray 171 for gaming currency after the collection and compare a total amount with the real total amount to determine whether or not there is a difference therebetween.

In addition, for the repayment of gaming currency 120W for gaming for a winning player 6W, by using gaming currency 120 that is present in the repayment tray 172 for gaming currency, a sufficient time can be secured for the image analyzing device 12 and the control device 14 to acquire a real total amount of gaming currency 120 in the collection tray 171 for gaming currency after collection.

As illustrated in FIG. 1, the game table 4 includes a disposal area 41 and/or a disposal slot 42 used for disposing cards C used in a game. When a game ends, the cards C used in the game are collected and are put into the disposal area 41 or the disposal slot 42 on the game table 4.

The game table 4 further includes a marker 43 representing winning/losing of a game.

Figure 4A:
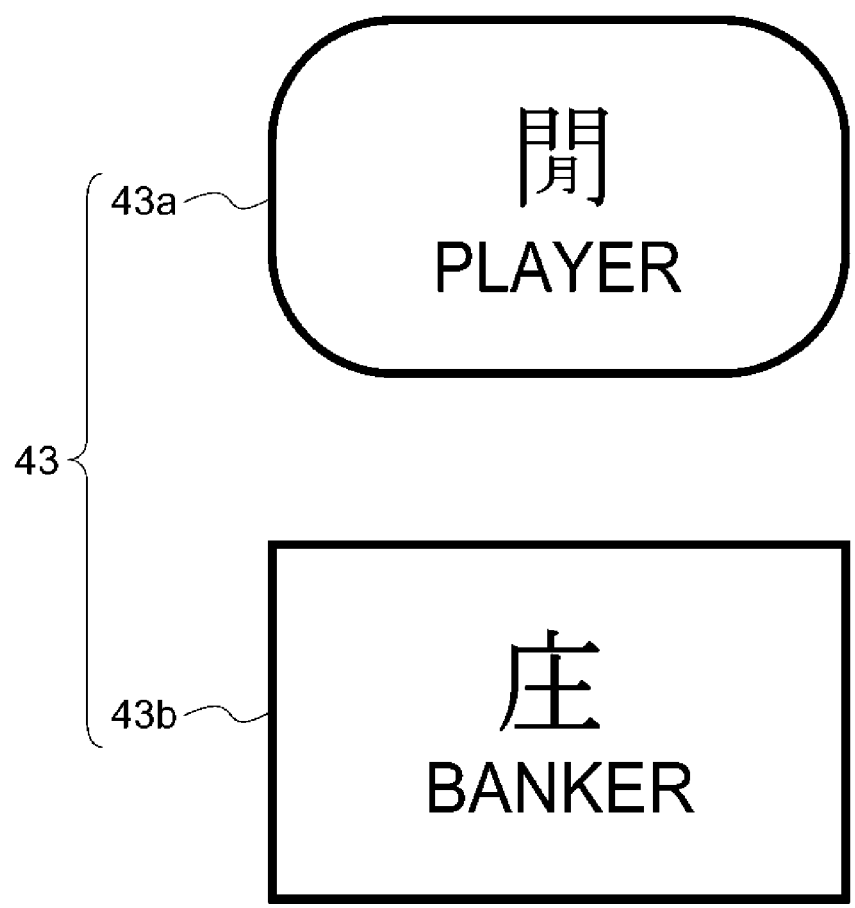
FIG. 4A is a plan view illustrating the front side of a marker.
Figure 4B:
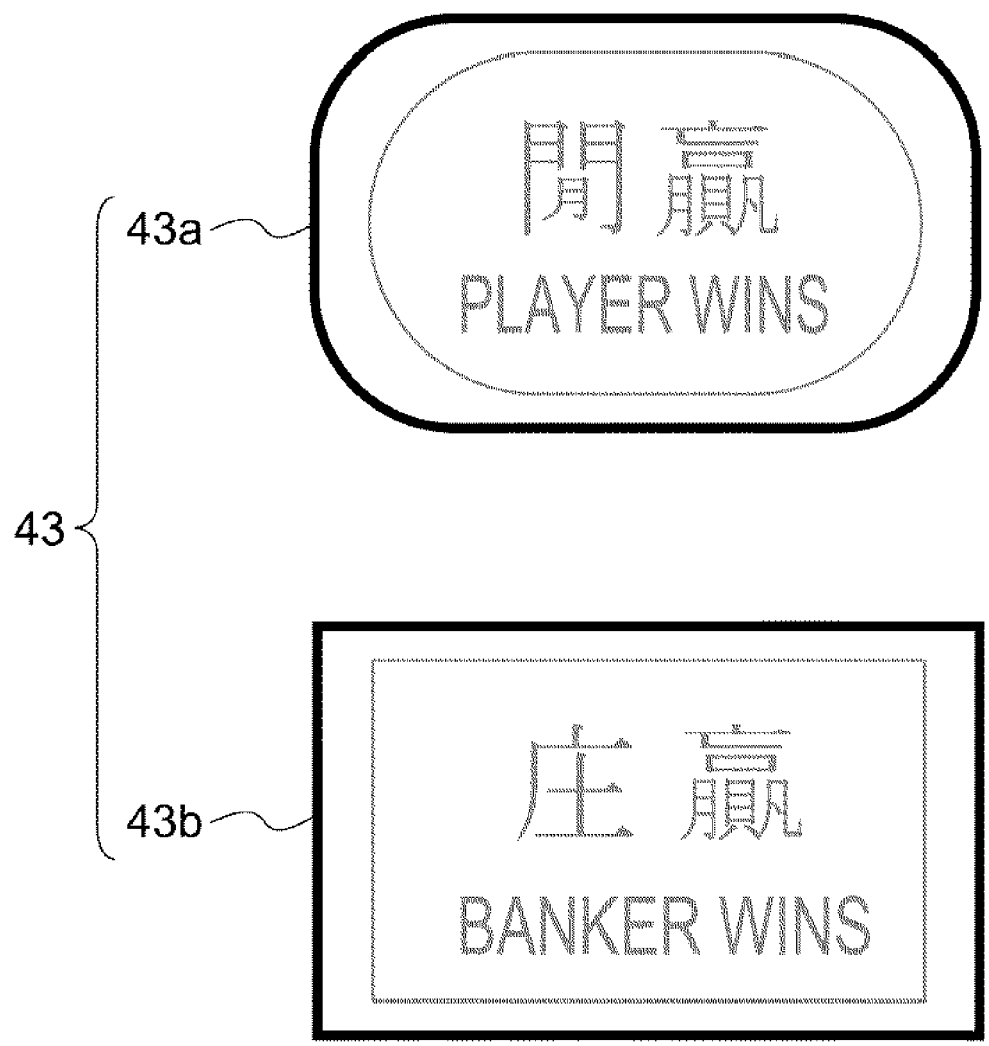
FIG. 4B is a plan view illustrating the back side of a marker.

FIG. 4A is a plan view illustrating the front side of a marker, and FIG. 4B is a plan view illustrating the back side of a marker. In a Baccarat game, two types of a marker 43a representing the winning of the player and a marker 43b representing the winning of the banker are used, and, when a result of a game comes out, the dealer 5 overturns the marker of the winning side out of the player or the banker. In this way, winning/losing of a game is represented on the table to be easily understood. The overturned marker is returned to the original state by the dealer 5 after the collection and the repayment of gaming currency 120. By returning the marker to the original state, it also represents a state in which a next game can be started.

As above, in this embodiment, the control device 14 calculates the amount of bet gaming currency on the game table 4 and a balance of gaming currency from a result of winning/losing of a game for each game and verifies an increased amount of the balance of gaming currency inside the tray 17 for gaming currency after the game. When a difference is detected in this verification, the control device 14 generates an alarm or adds recording of an indication thereof in the recording of a video captured by the camera device 2. A casino operator can peruse the reason for the difference by checking the video.

The fraud detecting system according to this embodiment adds/subtracts an increased/decreased amount of gaming currency in a game calculated based on the positions, the types, and the quantities of gaming currency 120 that is bet by all the players 6 in the game and a result of winning/losing of the game acquired by the winning/losing result determining device to/from a total amount of gaming currency 120 in the tray 17 for gaming currency before a settlement of each game, compares a total amount of gaming currency 120 to be present in the tray 17 for gaming currency after the settlement at the time of the end of the game with a real total amount of gaming currency 120 in the tray 17 for gaming currency at the time of end of the game that is acquired through the image analyzing device 12, and determines whether or not there is a difference between a total amount and a real total amount.

The control device 14 acquires the position, the type, and the quantity of gaming currency that is bet by each player through the image analyzing device 12, acquires a real total amount of gaming currency placed in the tray for gaming currency when all the collections of losing gaming currency bet by each player end, compares a total amount of gaming currency 120 to be present in the tray 17 for gaming currency, which is acquired by adding an increased amount in the tray 17 for gaming currency in the game based on the positions, the types, and the quantities of gaming currency bet by losing players to a total amount of gaming currency placed in the tray for gaming currency before a settlement of each game, with a real total amount of gaming currency 120 placed in the tray 17 for gaming currency, and determines whether or not there is a difference between the total amount and the real total amount.

In a case where the control device 14 compares a total amount of gaming currency 120 to be present in the tray 17 for gaming currency, which is acquired by adding an increased amount in the tray 17 for gaming currency in the game based on the positions, the types, and the quantities of gaming currency 120 bet by losing players to a total amount of gaming currency 120 placed in the tray 17 for gaming currency before a settlement of each game, with a real total amount of the gaming currency 120 placed in the tray 17 for gaming currency, and determines that there is no difference between the total amount and the real total amount, and compares a total amount to be present in the tray 17 for gaming currency after the settlement at the time of end of the game with a real total amount of gaming currency 120 placed in the tray 17 for gaming currency at the time of end of the game acquired through the image analyzing device 12, and determines that there is a difference between the total amount and the real total amount, the control device 14 determines a mistake in the payment and generates a payment error signal used for giving a notification of the mistake in the payment.

In the tray 17 for gaming currency, the collection tray 171 for gaming currency that collects and temporarily stores gaming currency 120 bet by losing players is arranged, and the image analyzing device 12 compares a total amount of gaming currency 120 to be present in the collection tray 171 for gaming currency, which is acquired by adding an increased amount of gaming currency 120 in the game that is calculated based on the positions, the types, and the quantities of the gaming currency 120L for gaming bet by losing players, with a real total amount of the gaming currency 120 placed in the tray 171 for gaming currency, and determines whether or not there is a difference between the total amount and the real total amount.

When the control device 14 determines a difference in the real total amount of the gaming currency 120 acquired from the tray 17 for gaming currency for the dealer 5 of the game table 4 not corresponding to the increased/decreased amount of the gaming currency calculated based on the amount of gaming currency bet by all the players and a result of winning/losing of the game, the game recording device 11 assigns an index or time to the acquired video or can reproduced with a collection scene or a payment scene of the gaming currency 120 specified such that the recording of the game in which the difference occurs can be analyzed by the game recording device 11.

In this way, the control device 14 acquires a total amount of gaming currency (chips) placed in the tray 17 for gaming currency after a settlement at the time of end of a game through the image analyzing device 12. In this case, the determination of "after the settlement" is when one of "1)" to 4)" described below occurs:

1) when repayment for won gaming currency 120 (won chips) ends;
2) when cards C used in the game are collected and are disposed in the disposal area or the disposal slot of the table;
3) when a predetermined button accompanying the winning/losing result determining device is pressed;
4) when the marker 43 representing winning/losing is returned to the original state.

In the management system of the table game, the management control device images the positions, the types, and the quantities of gaming currency that is placed by game participants in each game when any one of 1) to 3) described below is detected:

1) when the card distributing device detects that a first card is drawn;
2) before and after drawing;
3) after the management control device recognizes a dealer's bet end sign.

In addition, the control device 14 has an artificial intelligence-utilizing or deep-learning structure capable of acquiring the position (a position for betting on the player, the banker, or the fair) and the amount (the types and quantities) of bet gaming currency at each player position 7 of the game table 4, comparing a winning/losing history of each player 6 and the amount (won amount) of acquired gaming currency that can be acquired based on the result of winning/losing of each game with statistical data of many (big data) games in the past, and extracting an abnormal situation (set in the casino).

Typically, the control device 14 is included which has an artificial intelligence-utilizing or deep-learning structure capable of extracting an occurrence of a won amount of a certain amount (one million dollars) or more and an abnormal situation in which, in a play position 7 of a specific game table 4, a state in which the amount of bet gaming currency is small at the time of losing a game, and the amount of bet gaming currency is large at the time of winning a game is continued for several games and is determined as an abnormal situation based on a comparison with statistical data (big data or the like) of games in the past.

In addition, the control device 14 (integrated with the image analyzing device 12) of the fraud detecting system has a structure capable of extracting an abnormal situation or specifying an individual player 6 at the play position 7 at which winning of a predetermined amount of more is acquired. In such specifying of a player 6, the image of each face is specified with a profit and an identify number (an ID or the like) assigned thereto in the image analyzing device 12. Then, the control device 14 has a warning function for giving a notification of the presence of a specific player in another game table when the specified player 6 leaves a seat and arrives at the another game table. More specifically, a notice is given to a pit manager managing each game table 4 or each table staff (or a dealer), wherein further prevention of an abnormal phenomenon is achieved.

The control device 14 includes a database recording a history of exchange of bills K and gaming currency 120, refers to the database at the interval of a predetermined time or in units of one day and determines through a comparison whether or not the amount of gaming currency 120 acquired in the tray 17 for gaming currency for the dealer 5 of the game table 4 has been increased or decreased according to a payed amount of gaming currency 120 corresponding to exchanged bills K or a total amount of payment of bills K corresponding to exchanged gaming currency 120.

In addition, a winning/losing history of each play position 7 and the amount (won amount) of acquired gaming currency may be monitored without specifying an individual player 6.

In such a case, while, in a case where each player 6 leaves the seat, the player 6 cannot be tracked, an abnormal situation such as a case where, a state in which the amount of bet gaming currency is small at the time of losing a game at a specific play position 7 of one game table 4, and the amount of bet gaming currency at the time of winning a game is large is continued for several games or the like can be detected. Then, in a case where such a play position 7 is detected, there is a suspicion that there is fraud or a mistake at the play position 7. Then, by verifying a video in which the play position 7 is imaged, a fraud or a mistake can be found.

More specifically, the camera device 2 is mounted to image at least gaming currency 120 placed in the bet area 8 of the game table 4. The image analyzing device 12 analyzes images captured by the camera device 2 and detects a position among the positions of the player, the banker, and the tie of the bet area 8 at which gaming currency is placed for each user position 7 and the amount of the placed gaming currency. In addition, the card distributing device 3 also functions as a winning/losing result determining device and determines a result of winning/losing of a game. The control device 14, based on the position (the player, the banker, or the tie) inside the bet area 8 at which the gaming currency 120 is placed and the result of winning/losing of the game, records monitors) a winning/losing history for each play position 7 and the amount (an acquired amount of the gaming currency) of the gaming currency that has been acquired. Here, any one of the winning/losing history and the acquired amount of the gaming currency may be recorded. In a case where the winning/losing history/or the acquired amount of the gaming currency is in an abnormal situation (set in the casino) when compared with the statistical data of many (big data) games in the past, the control device 14 specifies this player position 7 as a play position at which a suspicion of fraud is present.

In a case where there is a suspicion of fraud for a specific player position 7, the fraud detecting system may be configured to generate an alarm (light, a sound, or a vibration) such that at least the dealer gets near at the time point. In this way, a game thereafter is stopped at least at the place or the like, and the continuation of fraud can be blocked. In addition, information representing a suspicion of fraud may be added to a video that is captured and recorded by the camera device 2. Accordingly, by checking the video, the cause of the suspicion of fraud can be investigated.

The fraud detecting system in a game house including a game table according to this embodiment further has a function of performing an inspection at the time of exchange of bills and gaming currency that is frequently performed in the game table 4. In a game house such as a casino, before a game, a player 6 exchanges bills (cash or the like) and gaming currency at a predetermined gaming currency clearing house. However, when all the gaming currency is used, the player 6 can continue the game by exchanging cash (bills) with gaming currency 120 on the game table (a Baccarat table or the like) without leaving the seat from the game table 4. However, here, there is a chance for fraud between the dealer 5 and the player. The exchange of cash (bills) for gaming currency 120 on a game table (for example, a Baccarat table or the like) needs to be performed when a game does not advance. In order to determine winning/losing of a game, the card distributing device 3 can detect the start of dealing of cards and the end of dealing (a time period for determining winning/losing). For this reason, the card distributing device 3 detects a situation other than the distribution (dealing) of cards, and the control device 14 detects exchange of bills and gaming currency 120 on the game table 4 in a situation other than the dealing of cards (illustrated in FIG. 5).

Being in the middle of the dealing (or any other situation) of cards can be detected based on information acquired from the operation of the card distributing device 3 or the dealer 5.

Figure 5:
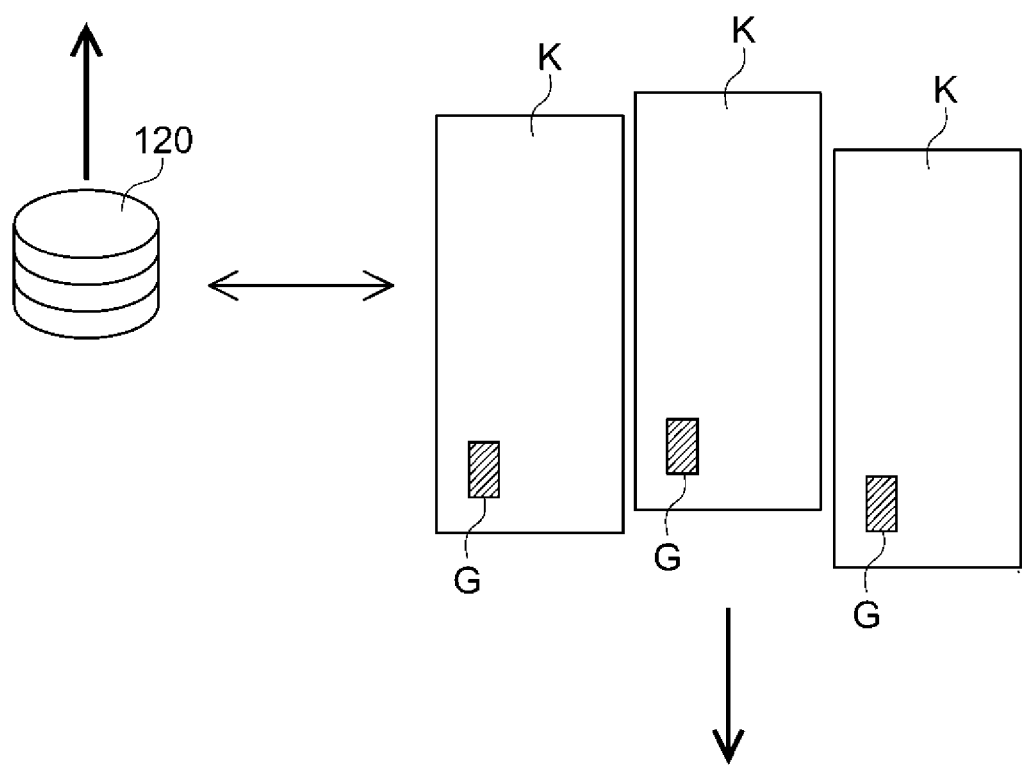
FIG. 5 is an explanatory diagram simplifying a video of the state of exchange of bills and gaming currency perceived according to the first embodiment of the present invention.

The control device 14 can recognize the quantity and the amount of bills by performing an image analysis of the surfaces of the bills K. In addition, in the game table 4, it is determined whether or not bills K to be exchanged for gaming currency 120 are genuine by detecting genuine marks G of the bills by emitting black light. As illustrated in FIG. 5, the control device 14 has an artificial intelligence-utilizing or deep-learning structure verifying the genuine marks G through an image analysis, recognizing a total amount of genuine bills, being capable of recognizing a total amount of gaming currency even in a state in which a plurality of gaming currency come out onto the game table as an exchange target is hidden due to a blind area of the camera device 2, comparing a total amount of the bills K come out onto the game table 4 from a player with a total amount of the gaming currency 120 come out from the dealer 5, and being capable of determining whether or not both the amounts match each other.

The control device 14 has an artificial intelligence-utilizing or deep-leaning structure capable of determining whether or not a total amount of gaming currency 120 placed in the tray 17 for gaming currency for the dealer 5 of the game table 4 has been increased/decreased according to a paid amount of gaming currency corresponding to the exchanged bills after a settlement through exchange of the bills and the gaming currency. A case may be considered as well in which the total amount of the gaming currency 120 placed in the tray 17 for gaming currency for the dealer 5 is constantly acquired in advance by using RFIDs of gaming currency 120 or the like. In addition, the total amount of the gaming currency 120 housed in the tray 17 for gaming currency can be detected by imaging the tray 17 for gaming currency housing the gaming currency 120 by using the camera device 2 and analyzing the image using the image analyzing device 12.

In addition, the control device 14 detects whether an increase/decrease in the amount of the gaming currency 120 present inside the tray 17 for gaming currency before and after the exchange of bills and the gaming currency matches an exchange amount of the gaming currency as a result of an image analysis on the game table 4. The amount of paid bills may be input by the dealer 5 to the control device 14 through key input or the like or may be specified by imaging an area disposed on the game table 4 in which bills are paid by using the camera device 2 and analyzing the image using the image analyzing device 12.

As described above, the control device 14 determines whether or not a decreased amount of the gaming currency

120 from the tray 17 for gaming currency according to the exchange of bills and the gaming currency matches the amount paid to the dealer 5 from players 6. In addition, the control device 14 is an intelligence-type control device capable of determining match/mismatch of an input amount (commonly, according to key input or the like) of bills input by the dealer 5 and a calculated amount of bills that is a result of an image analysis performed by the image analyzing device 12 after the settlement through the exchange of the bills and the gaming currency through a comparison and calculation and may have an artificial intelligence-utilizing or deep-learning structure.

Furthermore, the control device 14 has an artificial intelligence-utilizing or deep-learning structure capable of determining match/mismatch of a total amount of bills according to the input of a dealer in the game table 4 for which the dealer is responsible and a total amount of bills according to a result of an image analysis using the image analyzing device 12 through a comparison and calculation.

The control device 14 determines whether or not the amount of gaming currency 120 perceived in the tray 17 for gaming currency for the dealer 5 of the game table 4 has increased/decreased according to a paid amount of gaming currency 120 corresponding to exchanged bills after the exchange of the bills and the gaming currency 120 or a paid amount of bills corresponding to the exchanged gaming currency 120 through a comparison.

The control device 14 is a control device having an artificial intelligence-utilizing or deep-learning structure capable of acquiring information of the types and the quantities of the gaming currency 120 even in a state in which a part of or the whole one unit of gaming currency is hidden when the types and the quantities of the gaming currency 120 are determined.

A management system according to a second embodiment relates to a management system of table games in a game house.

In a game house such as a casino, there are various attempts preventing dealer's mistakes in handling gaming currency (gaming currency). A game house includes monitoring cameras used for monitoring dealer's mistakes in handling gaming currency, and such mistakes are prevented using a determination of mistakes and fraud according to collection and repayment of gaming currency that are different from a result of winning/losing based on images acquired using the monitoring cameras and the like.

Meanwhile, in order to acquire the quantity and a total amount of gaming currency, it has been proposed to acquire the amount of the gaming currency by attaching an IC tag to each gaming currency.

In a card game monitoring system disclosed in PCT Application Publication No. PCT/JP2015/000171, it is determined whether or not gaming currency place on a game table is collected or re-payed according to a result of winning/losing by performing an image analysis of movement of the gaming currency, and monitoring of dealer's mistakes in handling the gaming currency is performed.

Figure 7:
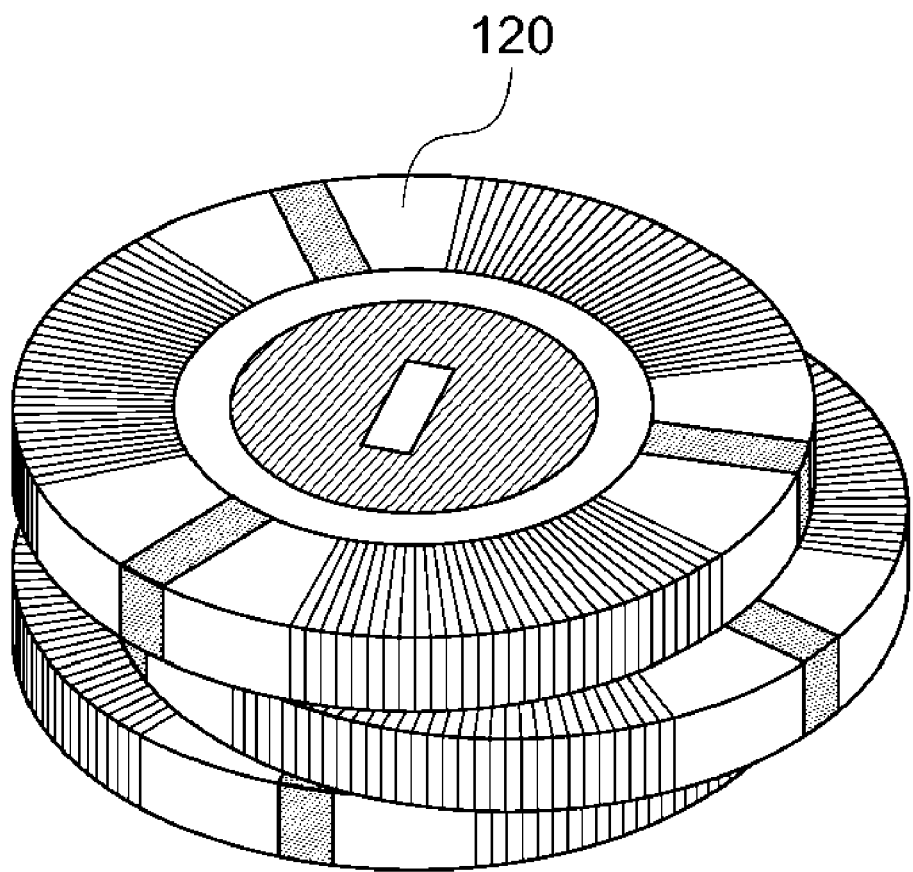
FIG. 7 is a perspective view of conventional gaming currency.

In game houses such as casinos, while gaming currency is piled to have a high volume and is placed on a game table, there is a problem in that a total amount cannot be correctly read by a reading device for IC tags disposed under the game table, and, when the sensitivity of the reading device is increased, gaming currency or gaming placed at a different position (winning/losing depends on the position) is added, and there is a problem in that a total amount of gaming currency at each position cannot be perceived. In addition, conventionally, as illustrated in FIG. 7, the pattern of gaming currency (gaming currency) 9 is complicated, and, when a plurality of gaming currency are piled, there is a problem in that the quantity of such a pile cannot be accurately acquired using a camera.

Furthermore, fraud on a game table has been advanced, and there is a new problem in that fraud using an advanced betting method or the like that cannot be found in simple detection of a large winning amount on a game table or the like cannot be found by using a camera.

In addition, it is necessary for a dealer to collect or re-paid gaming currency placed on a game table according to a result of winning/losing. In a case this is to be determined by performing an image analysis of the gaming currency, since the pattern of the gaming currency (gaming currency) is complicated, there is a problem in that it cannot be determined whether or not a dealer correctly performs re-payment when gaming currency corresponding to the bet gaming currency is re-payed by using a currently-existing practical image analyzing technology, and the prevention of mistakes is not sufficient.

In order to solve the various problems described above, a management system of table games according to this embodiment includes: a card distributing device that determines and displays a result of winning/losing of each game in a game table; a measurement device that measures the types and the quantities of gaming currency place on the game table by using a camera; and a management control device that specifies and stores the position, the types, and the quantity of gaming currency placed on the game table by a game participant by using a result of the measurement performed by the measurement device in each game. The gaming currency has a configuration in which a plurality of plastic layers of different colors are stacked, at least a coloring layer is included in the middle, and a stripe pattern in a stacking direction is formed on a side face by employing a multi-layer structure in which white layers or thin-color layers are stacked on both sides of the coloring layer disposed in the middle, and the type of the gaming currency can be specified by using the coloring layer. The management control device has calculation functions of determining a winner and a loser among participants in each game by using a result of winning/losing acquired from the card distributing device and a result of the measurement of the position, the types, and the quantities of the gaming currency placed by each game participant and calculating the balance of the casino side in the game table for each game.

In addition, in the management system, the management control device has a structure including a function of determining the quantity of the gaming currency by measuring the number of coloring layers, the white layers, or the thin-color layers of the gaming currency placed by each game participant.

In order to solve the various problems, gaming currency according to this embodiment has a configuration in which a plurality of plastic layers of different colors are stacked, at least a coloring layer is included in the middle, and a stripe pattern in a stacking direction is formed on a side face by stacking white layers or thin-color layers on both sides of the coloring layer, and the type of the gaming currency can be specified by using the coloring layer.

In addition, in the gaming currency, on the surface of the white layer or the thin-color layer, a print representing the type of the gaming currency is formed, transparent layers are disposed in outermost layers, and each interlayer is thermos-compressed to form a structure of at least five layers.

In addition, in the gaming currency, marks using UV ink or ink (carbon black ink) absorbing infrared rays are arranged on the surfaces of the white-color layers or the thin-color layers, or embossing processing is performed for the transparent layer of the outermost layer, or R processing is performed for the ends of the transparent layers of the outermost layers, or the coloring layer is formed by a plurality of layers, and RFIDs may be built in the coloring layers.

In order to solve the various problems described above, an inspection device inspecting gaming currency according to this embodiment includes: a passage including an inlet and an output through which the gaming currency can pass in a radial direction; a gaming currency type determining device that determines a color of the stripe in the staking direction of the side face by imaging the side face of the gaming currency passing through the passage; a mark reading device that reads a mark, which is formed using the UV ink or the ink (carbon black ink) absorbing infrared rays, arranged on the surface of the passing gaming currency; a print inspecting device that reads a print representing the type arranged on the surface of the gaming currency in a vertical direction with respect to the passage; and a control device of the whole device. The control device is configured to inspect whether or not the type of the gaming currency determined by the gaming currency type determining device matches a content of the print representing the type acquired by the print inspecting device.

According to the system of this embodiment, even in a case where many gaming currencies (gaming currency) are piled up, the quantity of the gaming currencies can be determined, and a total amount of relatively overlapping gaming currency can be acquired based on the position and the color.

Figure 6:
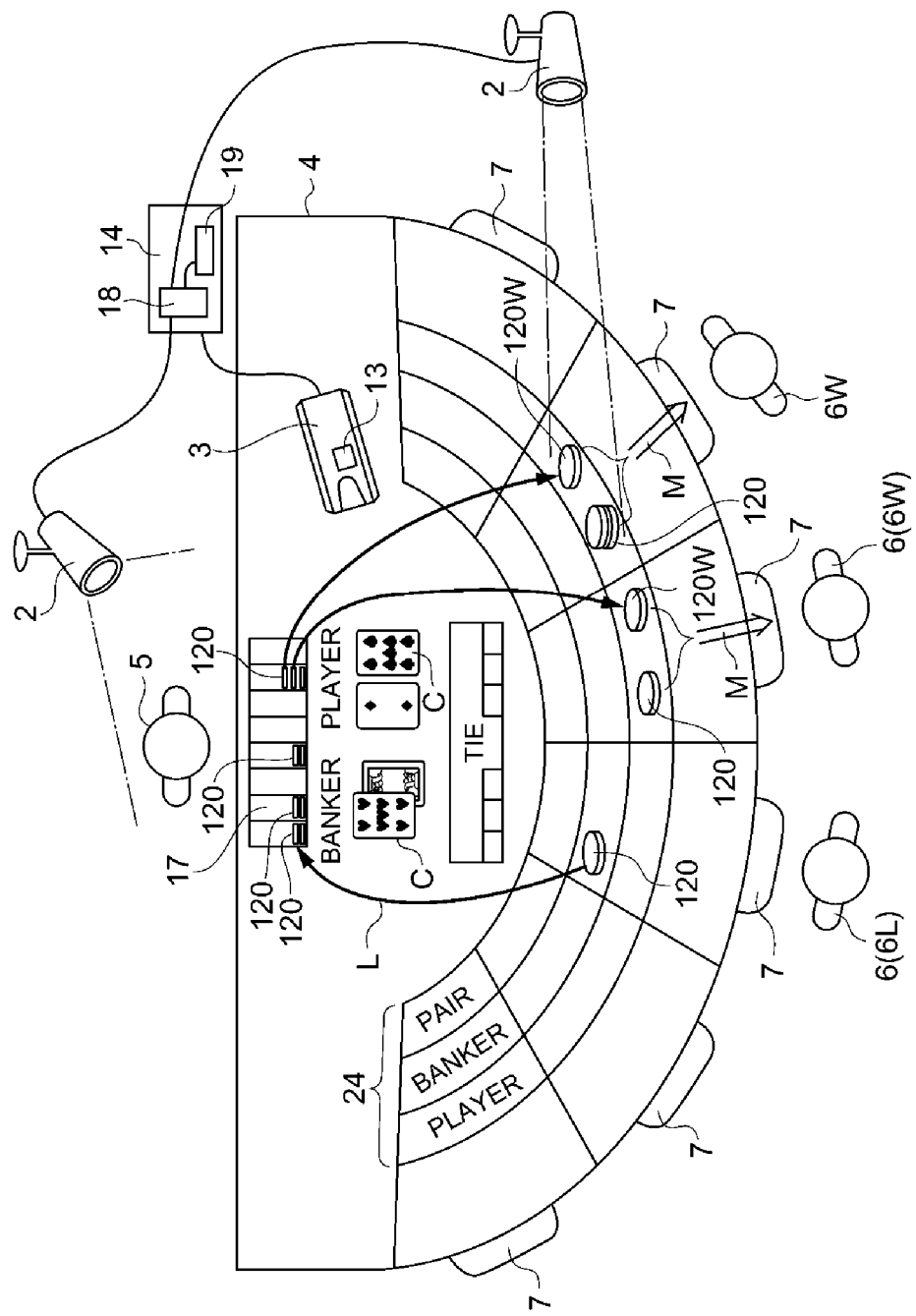
FIG. 6 is a plan view illustrating an overview of the whole management system for table games in a game house according to a second embodiment of the present invention.

Hereinafter, a management system of table games in a game house including a game table according to an embodiment of the present invention will be described. FIG. 6 is a diagram that illustrates an overview of the whole system. The management system of table games in a game house including a plurality of game tables 4 includes: a measurement device 19 including an image analyzing device 18 that records a state of process of a game played in the game table 4 as a video including game participants 6 and a dealer 5 through a plurality of camera devices 2 and performs an image analysis of the recorded video of the state of process of the game; and a card distributing device 3 that determines and displays a result of winning/losing of each game in the game table 4. The card distributing device 3 is a so-called electronic shooter that has already been used by persons skilled in the art and has rules of a game programmed in advance and has a structure capable of determining winning/losing of a game by reading information of distributed cards C. For example, in a Baccarat game, winning of the baker, winning of a player, or tie (drawn) is determined basically based on the ranks of two to three cards, and a determination result (a result of winning/losing) is displayed in a result display lamp 13.

The management control device 14 reads information (ranks and suits) of cards C acquired from the card distributing device 3 and determines a result of winning/losing of each game and determines a winner 6W and a loser 6L among the participants 6 in each game by using a result of measurement of the position, the types, and the quantities of gaming currency 120 placed by the game participants 6.

In addition, the management control device 14 has a calculation function of calculating a balance (an amount acquired by subtracting a total amount of gaming currency 120 that is re-paid to a winner 6W among the participants 6 from a total amount of gaming currency 120 bet by the loser 6L) of the casino side in the game table 1 for each game.

The image analyzing device 18, the measurement device 19, and the management control device 14 of this detection system have a structure integrally including a computer formed as one body or by a plurality of configurations, a program, and a memory.

Figure 8:
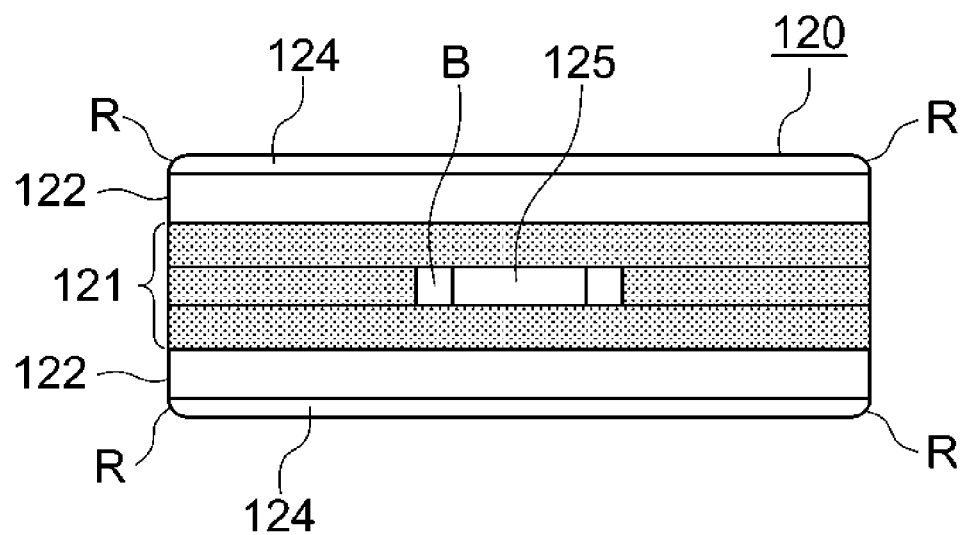
FIG. 8 is a side-face cross-sectional view of gaming currency according to the second embodiment of the present invention.

Next, details of gaming currency used in this detection system will be described. FIG. 8 is a front cross-sectional view of gaming currency 120 used in this detection system. The gaming currency 120 has a multi-layer structure in which a plurality of plastic layers having different colors are stacked, a coloring layer 121 is included at least in the middle, and white layers 122 or thin-color layers (while not illustrated in the drawing, the layers may be layers of a color that is thinner than that of the coloring layer 121) are stacked on both sides of the coloring layer 121 of the middle.

Figure 9A:
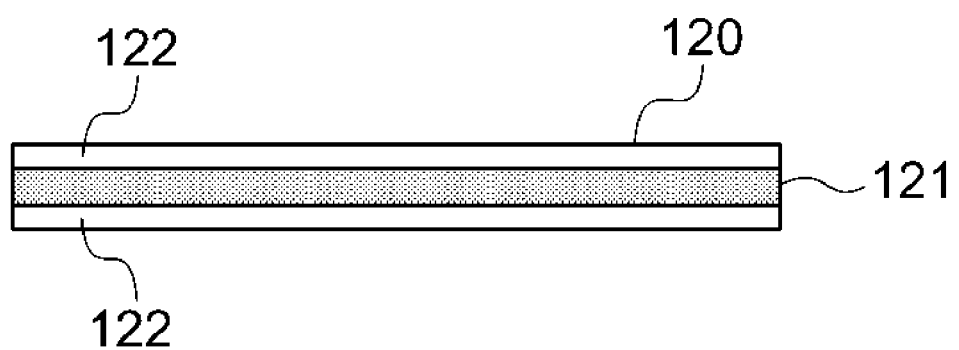
FIG. 9A is a side view of gaming currency according to the second embodiment of the present invention.

In this way, by employing a multi-layer structure in which the coloring layer 121 is included, and white layers 122 or thin-color layers (while not illustrated in the drawing, the layers may be layers of a color that is thinner than that of the coloring layer 121) are stacked on both sides of the coloring layer 121 of this middle, as illustrated in FIG. 9A, a stripe pattern is formed on the side face in the stacking direction, and the type of the gaming currency 120 can be specified by changing the color (red, green, yellow, blue, or the like) of the coloring layer 121 for each type (10 points, 20 points, 100 points, 1000 points, and the like) of the gaming currency 120.

Figure 10A:
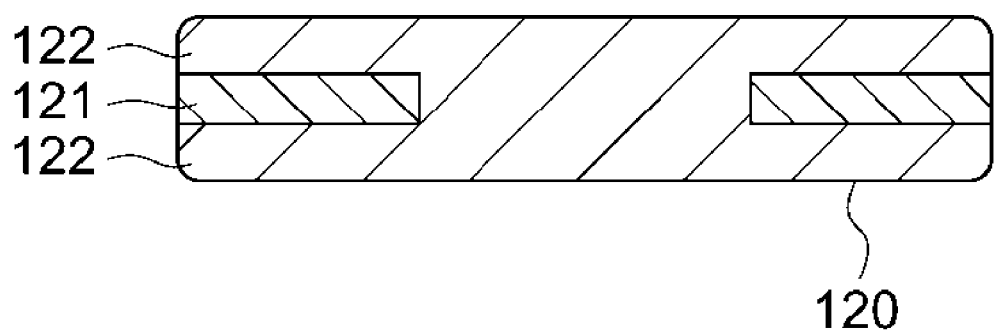
FIG. 10A is a diagram illustrating another example of gaming currency according to the second embodiment of the present invention.
Figure 10B:
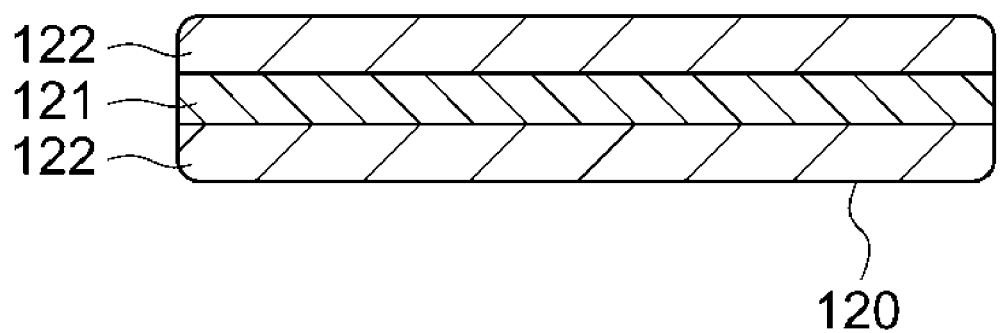
FIG. 10B is a diagram illustrating another example of gaming currency according to the second embodiment of the present invention.

The gaming currency 120 is configured as a structure body including the coloring layer 121 and the white layer 122 or the thin-color layer at least in the outer appearance to form a stripe pattern in the axial direction on the side face and has a configuration enabling the type of the gaming currency 120 to be specified using the coloring layer 121. While FIGS. 10A and 10B illustrate different examples, in the examples, the coloring layer 121 and the white layer 122 or the thin-color layer are formed through injection molding, and so-called two-color molding is used in which, first, the coloring layer 121 is molded inside a die for molding (not illustrated in the drawing), and thereafter, the white layer 122 or the thin-color layer is molded.

Figure 9B:
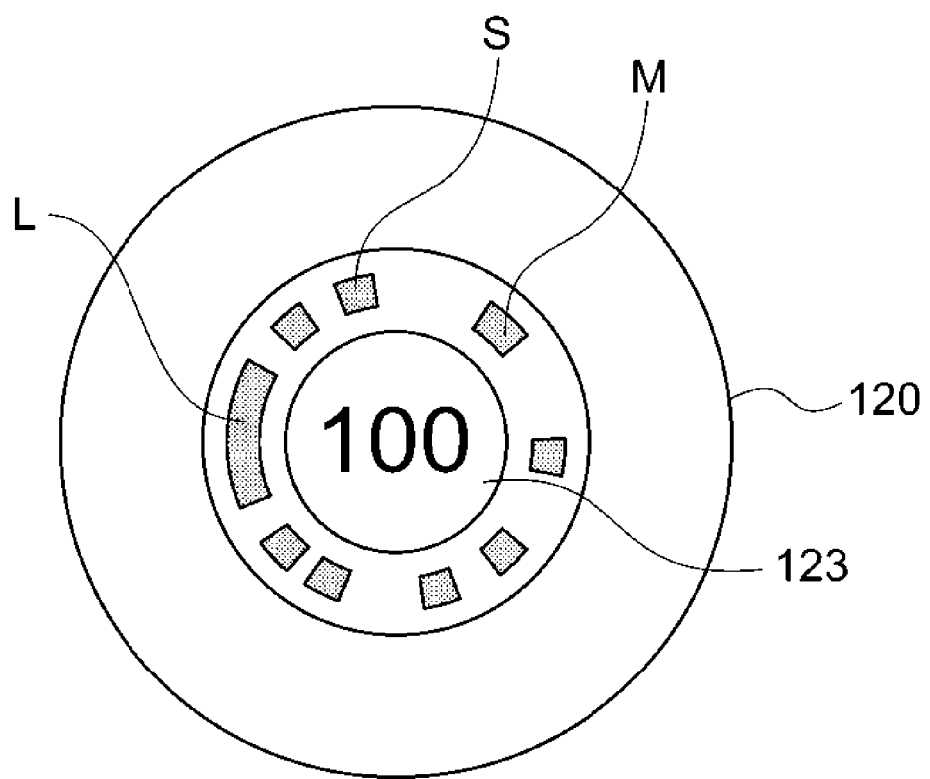
FIG. 9B is a side view of gaming currency according to the second embodiment of the present invention.

In addition, as illustrated in FIG. 9B, in the gaming currency 120, prints 123 (100 points or the like) representing the type of the gaming currency 120 are formed on the surfaces (the upper face and the lower face) of the white layer 122. As illustrated in FIG. 8, the transparent layers 124 are disposed in the outermost layers, and each interlayer is thermos-compressed, and a structure of at least five layers is formed. Such gaming currency 120 is formed by using a plastic material having a thin long shape, and layers (the coloring layer 121, the white layer 122, and the transparent layer 124) are thermo-compressed to form a closely adhering state (a structure of five layers or the like) in the state of a long length, and thereafter, holes having a circular shape, a rectangular shape, or the like are formed therein through press or the like.

When a hole is formed through the press, die of mold for punching, and the size of punching are designed, and R processing (round angle) is performed for the ends of the transparent layer 124 of the outermost layer.

That is, in order to manufacture the gaming currency 120, first, a plate-shaped coloring layer 121 formed using plastic and a plate shaped white layer 122 or a thin-color layer formed using plastic are stacked, and a stacked structure body configured by a plurality of plastic layers is formed. Then, drawing patterns are printed on the upper face and the lower face of this stacked structure body, and transparent layers 124 are formed thereon. Then, the layers of the stacked structure body and the transparent layers 124 are heated and pressed to be heated and welded, whereby a gaming currency original plate is generated. Then, punching processing is performed for the gaming currency original plate acquired in this way, whereby a plurality of gaming currencies 120 having a predetermined shape are acquired. When this punching processing is performed, R processing is performed for upper and lower angles of the gaming currency 120 using a mold.

Figure 11:
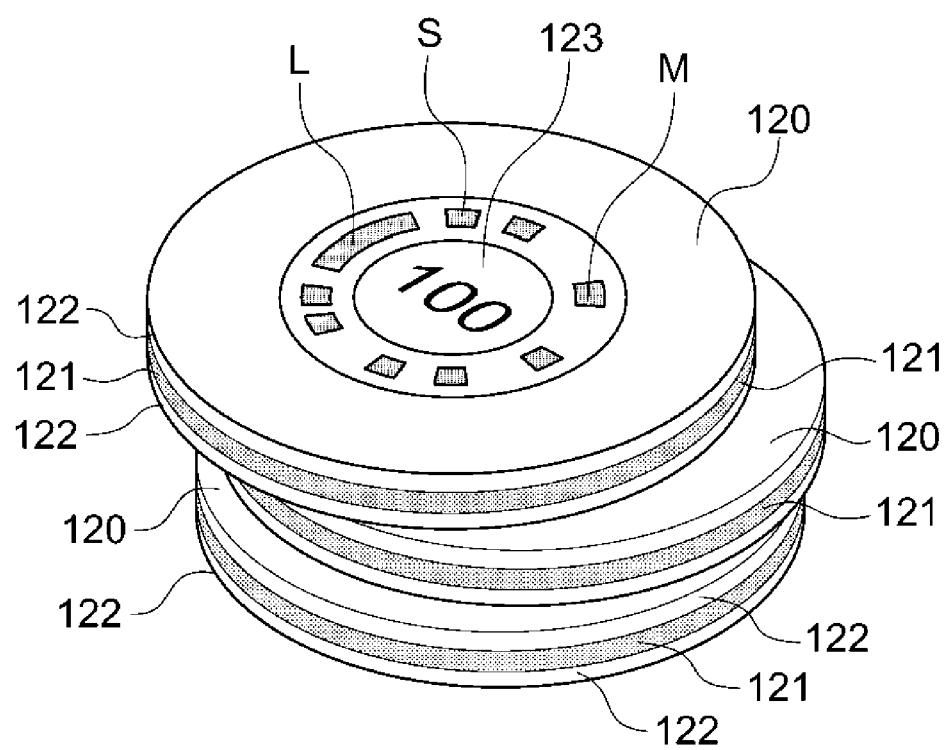
FIG. 11 is a perspective view of a state in which gaming currency is piled according to the second embodiment of the present invention.

In addition, in the gaming currency 120, face codes using the UV ink or ink (carbon black ink) absorbing an infrared rays are arranged on the surface of the white layer 122 (see FIG. 9B). This face codes represent the authenticity of the gaming currency 120, and, when ultraviolet rays (or infrared rays) are emitted thereto, a mark is visible to the eyes, and a combination of the form and the number of the marks represents the authenticity. FIG. 11 is a perspective view of a state in which the gaming currency 120 is stacked up, and a face code M is acquired by combining a long code L and a short code S. In the outermost layers, while transparent layers (print layers) 124 are thermally compressed or formed as coating layers to cover the print 123 and the face code, embossing processing is performed for these transparent layers 124, and the close adherence between the gaming currencies 120 is prevented. In addition, in this embodiment, while an example has been described in which face codes are printed on the surfaces of the white layers 122, instead of the face codes or together with the face codes, one or both of a security mark and an optically variable device (OVD) may be printed.

The R processing (R) is performed for the ends of the transparent layers (print layer) 124 of the outermost layer for which the print 123 (100 points or the like), and in the punching process of the gaming currency 120, the surfaces of the white layers 122 are prevented from being deformed to appear on the side face. In addition, it is prevented that a sharp end remains in the gaming currency 120 and damages the hands or the other gaming currency 120.

The coloring layer 121, as illustrated in FIG. 8, may be formed by a plurality of colored layers (three layers in the case illustrated in FIG. 8). Since the plurality of colored layers (three layers in the case illustrated in FIG. 8) are thermos-compressed, a state in which the three-layer structure can be visually observed, as illustrated in FIG. 8, is not formed. However, three layers are illustrated in FIG. 8 for description. In addition, in a middle layer among the three layers of the coloring layer 121, a partly hollowed portion B is arranged, and an RFID 125 is built therein.

In addition, without arranging the hollowed portion B in the coloring layer 121, the RFID 125 may be built in the gaming currency 120 by arranging the RFID 125 between the coloring layer 121 having a flat surface and the white layer 122 having a flat surface and performing thermos-compressing of the coloring layer 121 and the white layer 122 as it is. By configuring at least one of the coloring layer 121 and the white layer 122 using a material such as plastic that can be thermally deformed, out of the coloring layer 121 and the white layer 122 having the RFID 125 interposed therebetween through thermal compression, a plastic layer is thermally deformed, and accordingly, the RFID 125 is tightly fixed between such layers without arranging the hollowed portion B.

Figure 12:
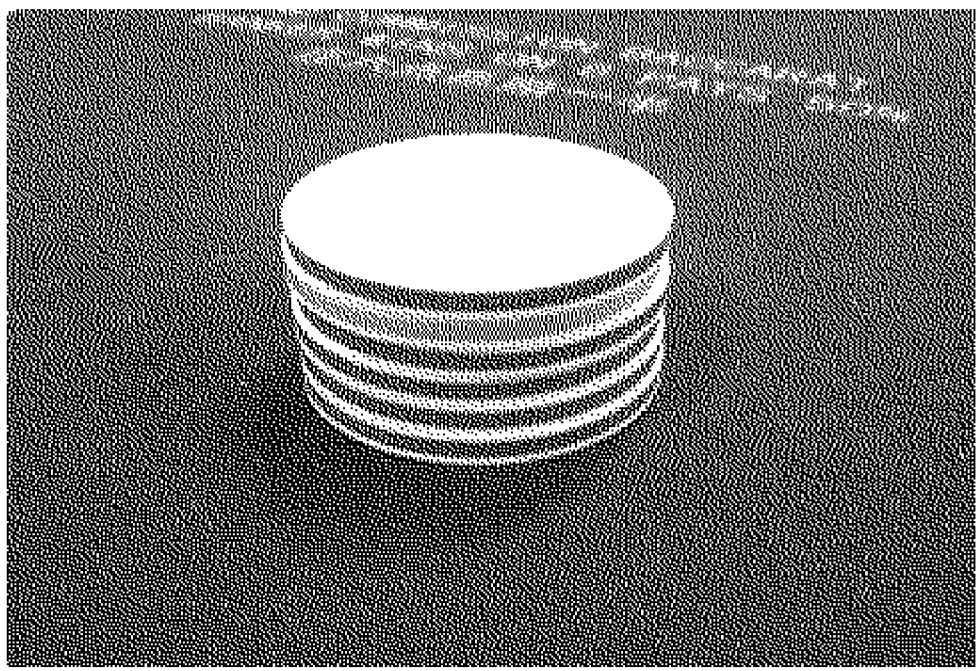
FIG. 12 is a perspective explanatory photographic diagram illustrating a state in which different kinds of gaming currency are piled.

FIG. 12 is a perspective explanatory photographic diagram that illustrates a state in which gaming currency of different types are piled up. The management control device 14 images gaming currency 120 placed on the game table 1 by the game participant 6 by using the camera device 2 and measures each area 8 (whether the bet is on the banker, the player, the pair, or the tie) in which the gaming currency 120 is placed by using the measurement device 19 including the image analyzing device 18, and the measurement device 19 (by using information acquired by the image analyzing device 18) analyzes and measures the number and the colors of coloring layers 121 (or the thin-color layers) or white layers 122 of the gaming currency 120 that is stacked in each area and determines the types and the quantities of the gaming currency 120. The management control device 14 performs control of the camera device 2 such that imaging using the camera device 2 is performed when the first card is drawn from the card distributing device, before and after the drawing, or after a dealer's sign representing the end of betting.

The management control device 14 may be a control device having an artificial intelligence-utilizing or deep learning structure. The management control device 14 can perceive the position 8 (a position betting on a player, a banker, or a pair), the types (a value of a different amount is assigned to the gaming currency 120 for each color), and the quantities of the gaming currency 120 that is bet by each participant 6 through the camera device 2 and the image analyzing device 18. The artificial intelligence-utilizing computer or control system can perceive the position 8 (a position betting on a player, a banker, or a pair), the types (a value of a different amount is assigned to the gaming currency for each color), and the quantities of the gaming currency 120 by using a self-learning function or the like in the deep-learning (structure) technology, and thus, according to a result of winning/losing of a game determined by the card distributing device 3 in each game, determines whether or not the collection (denoted using an arrow L) of gaming currency 120 bet by a losing participant 6L and the re-payment (payment (120W)) for winning gaming currency 120 for the winning game participant 6W are appropriately performed according to a result of winning/failure of the game in each game by analyzing a video of the state of progress of the game by using the management control device 14 through the image analyzing device 18.

In such a case, as illustrated in FIG. 11 (compared to conventional gaming currency illustrated in FIG. 7), a stacked multi-layer structure is formed, and a stripe pattern is formed on the side face in the stacking direction, and accordingly, the measurement device 19 including the image analyzing device 18 can accurately perform the measurement of the types and the quantities of gaming currency in an easy manner. In addition, by using an artificial intelligence-utilizing computer or control system and a deep-learning (structure) technology, the analysis and the determination of the image can be performed more accurately. The artificial intelligence-utilizing computer or control system and the deep-learning (structure) technology are known to persons skilled in the art and can be used, and thus, detailed description thereof will be abbreviated.

The management control device 14 can analyze and perceive a total amount of gaming currency 120 in the tray 17 for gaming currency for the dealer 5 of the game table 4 by using the image analyzing device 18 and can determine through a comparison and calculation whether or not a total amount of the gaming currency 120 placed inside the tray 17 for gaming currency has been increased/decreased according to the collection of the losing gaming currency 120 bet by each game participant 6 and the amount of the payment 120W for winning gaming currency to the winning game participant 6W after the game ends and is settled based on the result of winning/losing of the game. The total amount of the gaming currency 120 in the tray 17 for gaming currency may be constantly acquired by using means such as RFIDs, and it is determined whether or not the increased/ decreased amount is correct by the management control device 14 by analyzing a video of the state of progress of the game through the image analyzing device 18. For these, an artificial intelligence-utilizing or deep-learning structure may be utilized.

In addition, the management control device 14 may have an artificial intelligence-utilizing or deep-learning structure capable of acquiring the position (a position for betting on the player, the banker, or the fair) and the amount (the types and quantities) of bet gaming currency at each player position 7 of the game table 4, comparing a winning/losing history of each player 6 and the amount (won amount) of acquired gaming currency that can be acquired based on the result of winning/losing of each game with statistical data of many (big data) games in the past, and extracting an abnormal situation (set in the casino). Typically, the management control device 14 is included which has an artificial intelligence-utilizing or deep-learning structure capable of extracting an occurrence of a won amount of a certain amount (one million dollars) or more and an abnormal situation in which, in a play position 7 of a specific game table 4, a state in which the amount of bet gaming currency is small at the time of losing a game, and the amount of bet gaming currency is large at the time of winning a game is continued for several games and is determined as an abnormal situation based on a comparison with statistical data (big data or the like) of games in the past.

The total amount of the gaming currency 120 in the tray 17 for gaming currency for the dealer 5 of the game table 4 is settled for the gaming currency 120 bet by each participant 6 after each game, and the management control device 14 has a structure capable of determining through a comparison and calculation whether or not an increase/decrease in the gaming currency that corresponds to a settlement is correct after the settlement.

In the tray 17 for gaming currency used for storing the gaming currency 120 for the dealer 5 illustrated in FIG. 6, the types and the quantities of the gaming currency 120 can be determined by analyzing and measuring the numbers and the colors of the coloring layers 121 or the white layers 122 of the gaming currency 120 stacked in the horizontal direction by using the measurement device 19 (by using the information acquired by the image analyzing device 18). The total amount of the gaming currency 120 for the tray 17 for storing gaming currency is constantly (or at predetermined time intervals) acquired in this way. As the management control device 14 has a calculation function of calculating a settlement amount (calculation of a balance of the casino side in the game table 4 (an amount acquired by subtracting a total amount of the gaming currency 120 re-paid to the winner 6W among the participants 6 from a total amount of the gaming currency 120 bet by the loser 6L) of each game for each game (see description presented above), the total amount of the gaming currency 120 of the tray 17 for gaming currency is constantly (or at intervals of a predetermined time) is verified. That is, it is verified whether or not an increase/decrease in the gaming currency matches a result of an image analysis performed by the image analyzing device 18 and the settlement amount of each game performed by the dealer 5.

FIG. 13A is a diagram that illustrates details of a tray for gaming currency according to this embodiment, and FIG. 13B is a diagram that illustrates another example of the gaming currency. In the tray 17 for gaming currency, a collection tray 171 for gaming currency that is used for collecting and temporarily storing gaming currency 120L for gaming that is bet by a losing player 6L and a repayment tray 172 for gaming currency 120W for gaming that is used for storing gaming currency 120L for gaming to be re-payed are arranged. The image analyzing device 12 and the control device 14 acquire the position, the type, and the quantity of gaming currency 120L for gaming that is bet by the losing player 6L and calculates an increased amount (an amount of gaming currency 120L for gaming to be present in the collection tray 171 for gaming currency 120) of gaming currency 120L for gaming in the game. In addition, the image analyzing device 12 and the control device 14 acquire a real total amount of the gaming currency 120 in the tray 171 for gaming currency after the collection and determine whether or not there is a difference between the total amount and the real total amount through a comparison.

Figure 14A:
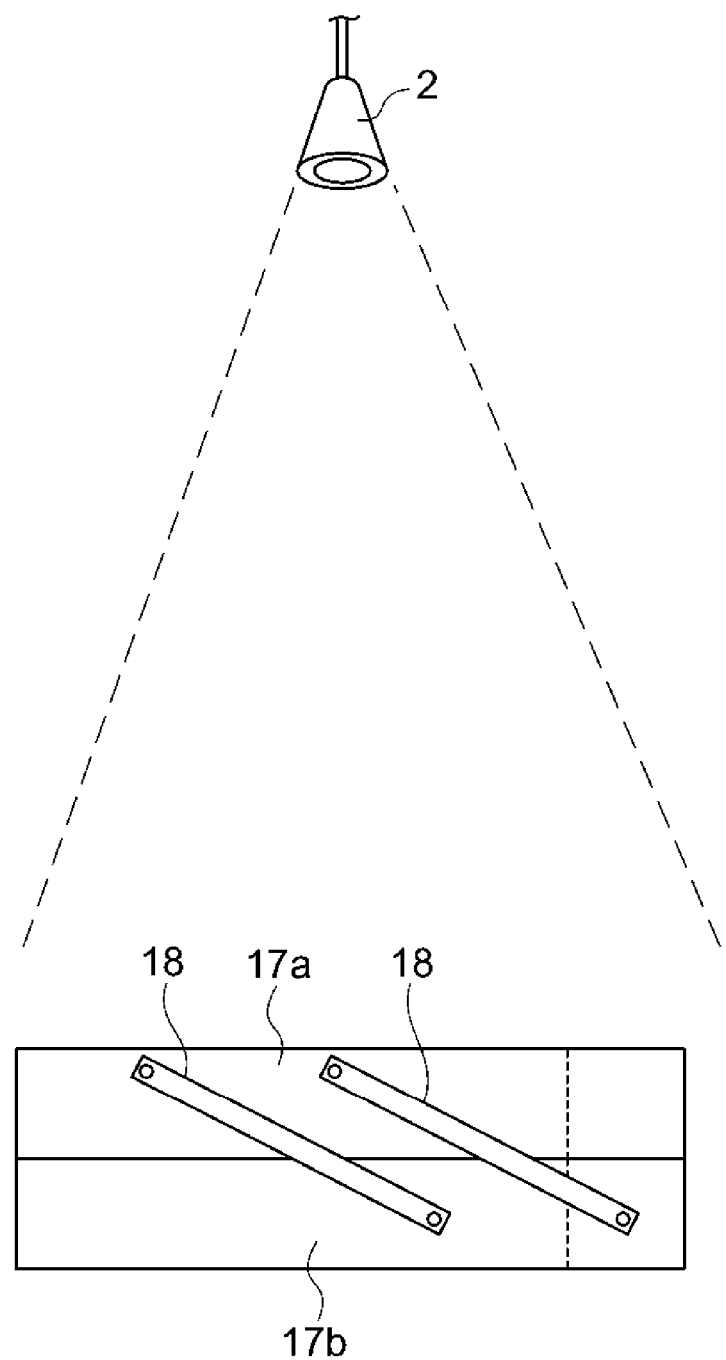
FIG. 14A is a diagram illustrating a relation between a tray for gaming currency having a two-stage structure and a camera device 2 and is a diagram illustrating a state in which two stages are overlapped.
Figure 14B:
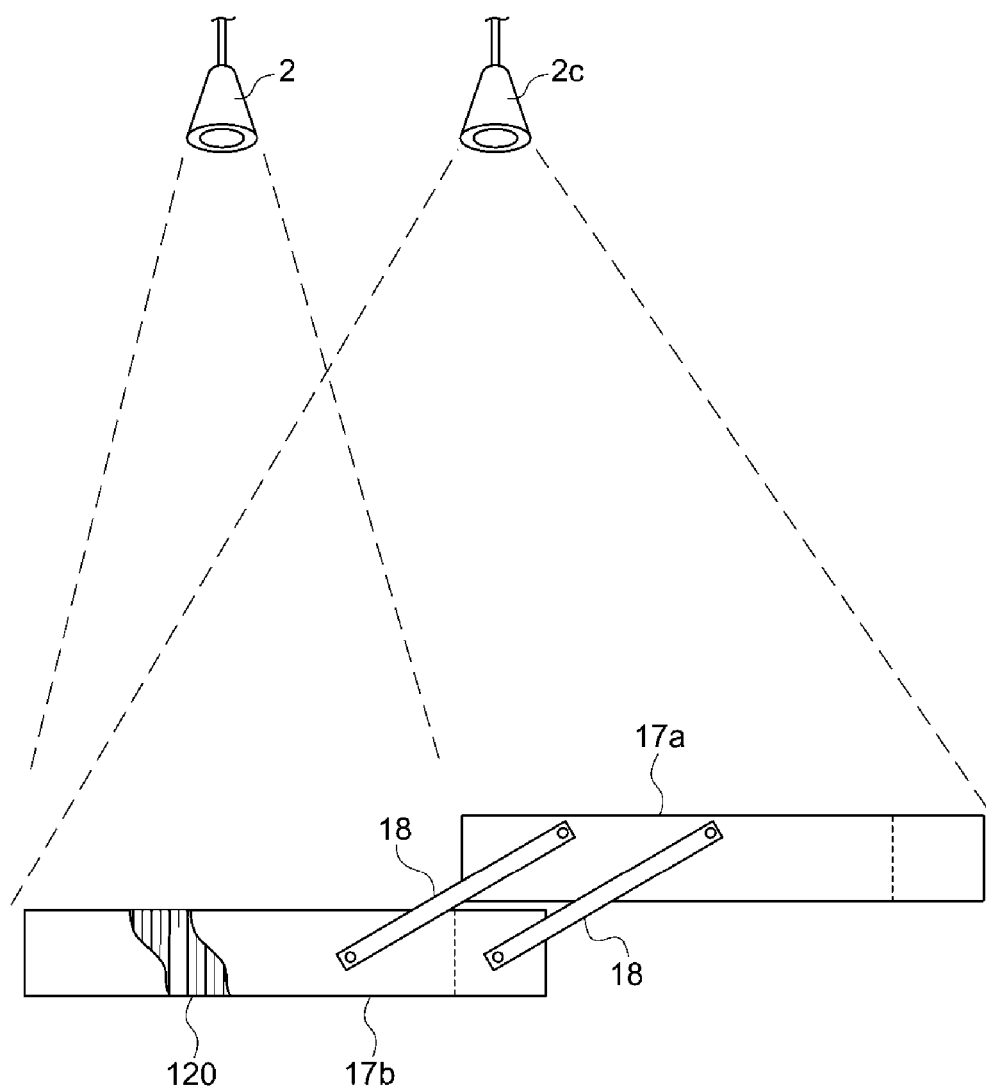
FIG. 14B is a diagram illustrating a relation between a tray for gaming currency having a two-stage structure and a camera device 2 and is a diagram illustrating a state in which two stages are shifted from each other.

Here, the tray 17 for gaming currency that is illustrated above has a two-stage structure formed by an upper stage tray 17a for gaming currency and a lower stage tray 17b for gaming currency. FIGS. 14A and 14B are diagrams that illustrate a relation between the tray 17 for gaming currency having a two-stage structure and a camera device 2, FIG. 14A illustrates a state in which two stages overlap each other, and FIG. 14B illustrates a state in which two stages are shifted from each other. In the lower stage of the upper stage tray 17a for gaming currency, the lower stage tray 17b for gaming currency is present, and the upper stage tray 17a for gaming currency and the lower stage tray 17b for gaming currency are connected through a hinge 17c. In a case where gaming currency 120 placed in the upper stage tray 17a for gaming currency 120 is insufficient, gaming currency 120 is supplemented from the lower stage tray 17b for gaming currency to the upper stage tray 17a for gaming currency. On the other hand, in a case where gaming currency 120 placed in the upper stage tray 17a for gaming currency is excessive, the gaming currency is moved to the lower stage tray 17b for gaming currency.

In order to take in the gaming currency 120 from the lower stage tray 17b for gaming currency, the upper stage tray 17a for gaming currency is moved using the hinge 17c to be in a state illustrated in FIG. 14B. In the state illustrated in FIG. 14A, the upper stage tray 17a for gaming currency is imaged by the camera device 2, and, in the state illustrated in FIG. 14B, the lower stage tray 17b for gaming currency can be imaged using the camera device 2. In the state illustrated in FIG. 14B, the upper stage tray 17a for gaming currency and the lower stage tray 17b for gaming currency can be imaged by the camera device 2c simultaneously and in a state in which the trays can be identified from each other. In addition, in the state illustrated in FIG. 14B, the upper stage tray 17a for gaming currency and the lower stage tray 17b for gaming currency may be separately imaged. The camera devices 2 and 2c may respectively include a visible light camera corresponding to printed ink of a side ID 126 and an infrared-ray camera or may be cameras switchable between a plurality of functions of a visible-light camera corresponding to printed ink and an infrared-ray camera.

Figure 15:
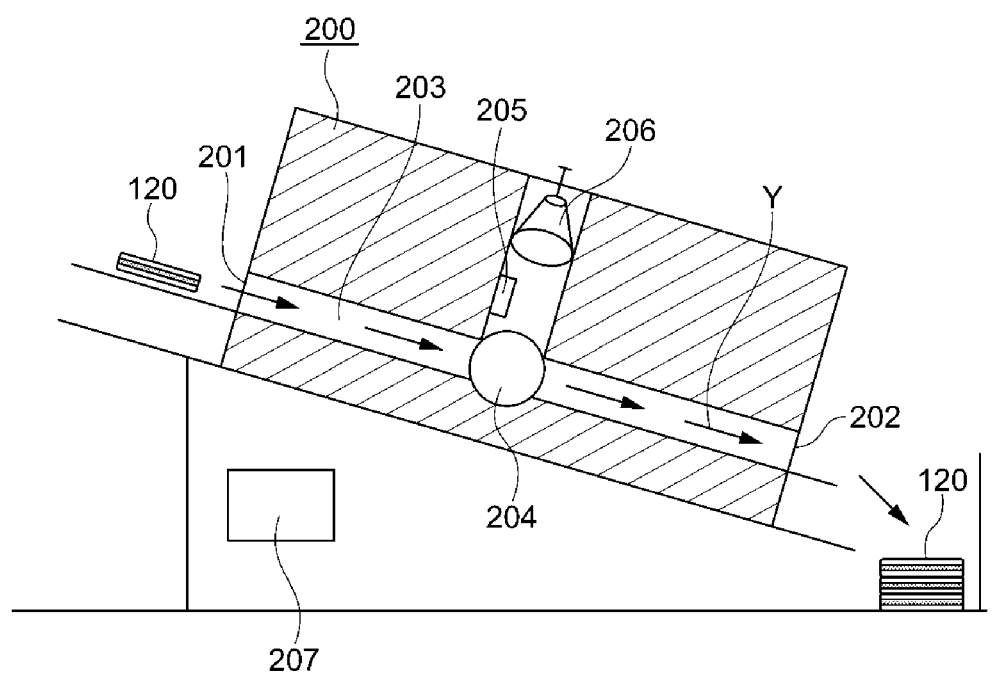
FIG. 15 is a diagram illustrating an inspection device inspecting gaming currency according to the second embodiment.

Next, an inspection device 200 inspecting the gaming currency 120 according to an embodiment of the present invention will be described with reference to FIG. 15. The inspection device 200 includes a passage 203 that includes an inlet 201 through which gaming currency 120 can pass in the radial direction (the direction of an arrow Y) and an outlet 202. The passage 203 inclines, and the gaming currency 120 passes in the direction of the arrow Y). In the passage 203, a gaming currency type determining device 204 that images the side face of the gaming currency 120 and determines the color of a stripe pattern of the side face in the stacking direction; a mark reading device 205 that reads a face code as a face code using UV ink or ink (carbon black ink) absorbing infrared rays arranged on the surface of the passing gaming currency 120; a print inspecting device 206 that reads the print 123 representing the type arranged on the surface of gaming currency in the vertical direction with respect to the passage 203; and a control device 207 for the whole device. The control device 207 is configured to inspect whether or not the type of the gaming currency determined by the gaming currency type determining device 204 matches a content of the print representing the type acquired from the print inspecting device 206.

By using this inspection device 200, it can be inspected whether or not the print 123 of the manufactured gaming currency 120 matches the type of the gaming currency according to the color of the stripe pattern of the gaming currency 120 and is correctly printed.

As above, the gaming currency 120 according to this embodiment has a stacked structure, in which the coloring layer 121 and the white layer 122 or thin-color layers having the coloring layer 121 interposed therebetween are stacked, formed by a plurality of plastic layers and thus, has a side face on which a stride pattern is formed in the stacking direction. The gaming currency 120 has a configuration enabling the type of the gaming currency 120 to be specified using the coloring layer 121 appearing on the side face. In addition, prints are performed for the upper face and the lower face of the gaming currency 120. More specifically, prints are performed for the surface of the white layer 122 of the thin-color layer, and the transparent layer 124 is included on the upper face thereof. The coloring layer 121 and the white layer 122 or the thin-color layer and the print layer 124 are thermos-compressed together to form a layered structure.

The white layers 122 or the thin-color layers having the coloring layer 121 interposed therebetween may be configured to have different depths in the vertical direction from each other.

In addition, in this embodiment, the R processing is performed for the outer edges of the upper face and the lower face of the gaming currency 120. Accordingly, it can be prevented that a player's hand handling the gaming currency 120 hurts, or the gaming currency 120 damages the other gaming currency 120.

In addition, in this embodiment, the RFID 125 is tightly fixed between plastic layers each forming one of the coloring layer 121 and the white layer 122 or the thin-color layer.

In addition, in this embodiment, on the upper face and/or the lower face of the gaming currency 120, face codes using UV emission ink, infrared absorption ink such as ink (carbon black ink) absorbing infrared rays are arranged. In addition, as a modified example of this embodiment, one or both of a security mark and an optical variable device (OVD) may be printed on the surfaces of the gaming currency 120 instead of the face codes or together with the face codes.

In addition, the gaming currency 120 according to this embodiment has a structure in which the side ID 126 is attached to the side face, the RFID 125 is built, and face codes using UV emission ink or infrared absorption ink are arranged on the upper face or the lower face (the print layer 124). Then, the information of a side ID 126 and the information of an RFID 125 are associated with each other, the information of a side ID 126 and information of a face code are associated with each other, or the information of a side ID 126, information of an RFID 125, and the information of a face code are associated with each other.

In addition, the inspection device 200 according to this embodiment includes: the measurement device 19 of the type of gaming currency 120 that images the side face of the gaming currency 120 and determines the color of the stripe pattern of the side face in the stacking direction; and the mark reading device 205 that reads the print of the gaming currency. In this way, a relation between the type of gaming currency and the content of a print can be inspected.

The management control device 14 according to this embodiment performs imaging for determining the position, the types, and the quantities of gaming currency placed by a game participant in each game when the first card is drawn from the card distributing device 3, before and after drawing, or after a dealer's sign representing the end of betting.

In addition, the gaming currency 120 according to this embodiment is manufactured as below. First, a stacked structure body including a plurality of plastic layers is formed by heating and pressing the coloring layer 121 and the white layers 122 or the thin-film layers. Then, a drawing pattern is printed at least on the upper face or the lower face of the stacked structure body, whereby a gaming currency original plate is generated. Then, punching processing is performed for the gaming currency original plate by using a mold, whereby a plurality of gaming currencies having a predetermined shape are acquired. Here, at the time of punching processing, R processing is performed for the outer edges of the upper and lower faces of the gaming currency 120 by using a mold.

In addition, in a case where gaming currency 120 having side IDs is to be manufactured, side IDs are printed on the side faces of the white layers 122 or the thin-color layers through inkjet printing. Furthermore, in a case where gaming currency 120 including an RFID is to be manufactured, an RFID is interposed between the layers of the stacked structure body, and the layers having the RFID interposed therebetween are heated and welded when the layers are thermos-compressed, whereby the periphery of the RFID is tightly fixed by the plastic layers.

In addition, the management system of table games according to this embodiment includes: the card distributing device 13 that determines and displays a result of winning/losing of each game in the game table 4; the camera device 2 that images gaming currency 120 placed on the game table 4; and the management control device 14 that specifies and stores the position, the types, and the quantities of gaming currency placed by the game participant 6 on the game table 4 by using a result of the imaging performed by the camera device 2. The gaming currency 120 is a stacked structure body in which the coloring layer 121 and the white layers 122 or the thin-color layers are stacked and has a stripe pattern on the side face in the stacking direction. The management control device 14 has a calculation function calculating a balance of the casino side in the game table 4 for each game based on a result of winning/losing acquired from the card distributing device 13 and the position, the types, and the quantities of the gaming currency 120 specified using the imaging result of the camera device 2.

The management control device 14 has a function of measuring the number of the coloring layers 121 or the white layers 122 or the thin-color layers of gaming currency 120 placed by each game participant 6, determines the types and the amounts of the gaming currency by using the colors of the coloring layer 121, and determining the quantities of the gaming currency 120.

A system according to this embodiment relates to a management system of gaming currency preventing the use of fake gaming currency in a game house in a casino or other game facilities using gaming currency.

Among many live table games played in a casino or a game facility, there are Baccarat and blackjack. In such games, a standard deck configured by 52 playing cards is used, and playing cards are distributed to a game table from a shooter including a plurality of decks (6 to 9 decks or 10 decks) shuffled in advance, and a game is played. In a casino or a game facility, gaming currency is used for such games.

The use of fake gaming currency should not occur in a casino. In order to prevent the use of fake gaming currency in a casino, there is a technology for preventing the use of fake gaming currency by attaching an RFID to gaming currency. The RFID-attached gaming currency is known and is disclosed in WO 2008/120749 A.

This embodiment provides a management system or gaming currency preventing the use of fakes of gaming currency used in a casino or a game facility, and the use and unjust exchange of fake gaming currency in a casino or a game facility can be prevented. In recent years, the technologies for manufacturing fake gaming currency evolve, and technologies advance up to a level of copying an authenticity determination mark or an RFID almost perfectly. As a result, a mark or an RFID that is the same as a genuine authenticity determination mark or a genuine RFID is attached to gaming currency, genuine and fake gaming currency cannot be discriminated from each other, and there is a problem in that it is almost impossible to perform an authenticity determination.

In order to solve the conventional problem described above, a management system of gaming currency according to this embodiment includes: gaming currency to which a side ID that can be individually identified is attached; an ID reading device that reads a side ID attached to the gaming currency; a storage in which the gaming currency is stored in a cashier of a game house; a game table gaming currency tray that stores the gaming currency; a gaming currency determining device that specifies types and quantities of the gaming currency stored in the game table gaming currency tray and the storage by using the ID reading device; and a management control device that manages the IDs associated with the gaming currency in a database. The management control device has functions of registering the IDs of the gaming currency to be used in the database in advance, managing the IDs of the gaming currency present at least in the game table gaming currency tray and the storage in the database together with presence information by using the database, specifying the gaming currency in the game table gaming currency tray and the storage at predetermined timing, searching the database, determining the following events through the database search 1) an ID not present in the database is newly present 2) two or more same IDs are present, and generating an error signal when a situation of 1) or 2) described above is present.

In addition, the management control device has functions capable of, when there is a change in the presence of the gaming currency at least in the game table gaming currency tray and the storage, recording time or a place at which there is the change in the database in association with the ID, searching the database, when there is a situation in which two or more same IDs are present, extracting the ID and information of time or a place recorded in association with the ID in the database from the database and storing extracted information, and specifying time when the gaming currency to which the ID is attached, which is detected first, enters/exits the game table gaming currency tray or the storage or a place of the game table gaming currency tray or the storage in which the gaming currency is stored.

Furthermore, the management system of gaming currency may further include: a bet area gaming currency determining device specifying the types and quantities of the gaming currency bet on a bet area of the game table by using the ID reading device and may have functions of determining the following events through a search of the database also for the ID of the gaming currency present in the bet area of the game table 1) an ID that has not been present in the database is newly present 2) presence of two or more same IDs and generating an error signal when there is a situation of 1) or 2) described above.

In addition, side IDs are attached to at least three positions on the side face of the gaming currency. The side IDs are attached through inkjet printing by using ink that is visible using visible light. Particularly, a configuration is advantageous in which the side ID is attached as presence/absence of marks of a plurality of rows and a plurality of columns. In addition, transparent coating layers or varnish is disposed on the upper and lower faces of the gaming currency.

In order to solve the conventional problems, gaming currency according to this embodiment forms a stripe pattern on the side face in the stacking direction by employing a multi-layer structure in which a plurality of plastic layers having different colors are stacked, a coloring layer is included at least in one layer, white layers or thin-color layers are stacked on a further outer side than the coloring layer and has a configuration enabling the type of the gaming currency to be specified by the coloring layer. In addition, side IDs are attached to at least three positions on the side faces of the white layers and the thin-color layers, and the type and the manufacturing information of gaming currency can be specified by reading the ID by using the ID reading device, and a configuration in which the ID can be managed in a database is included. Then, the side ID may be attached using ink (visible ink) that is visible for visible light through inkjet printing. The side ID may be attached using ink (ink absorbing infrared rays, UV ink, or the like) that is not visible for visible light through inkjet printing. In addition, the side ID may be printed using at least two or more of ink that is visible for visible light, ink absorbing infrared rays, and UV ink.

In order to solve the conventional problems described above, gaming currency according to this embodiment has a side ID that can be individually identified attached thereto, the side ID attached to the gaming currency is read by an ID reading device, the ID reading device can read the gaming currency stored in a storage maintained by a cashier of a game house and a gaming currency tray of a game table, in addition, the types and the quantities of the gaming currency stored in the gaming currency tray and the storage are specified by a gaming currency determining device through the ID reading device, the ID of the gaming currency present in the gaming currency tray of the game table and the storage is managed in the database together with the presence information thereof, it is inspected whether at least 1) an ID that has not been present in the database is newly present and 2) two or more same IDs are present, and the ID enabling the occurrence of the situation 1) or 2) described above to be determined is included.

Figure 16:
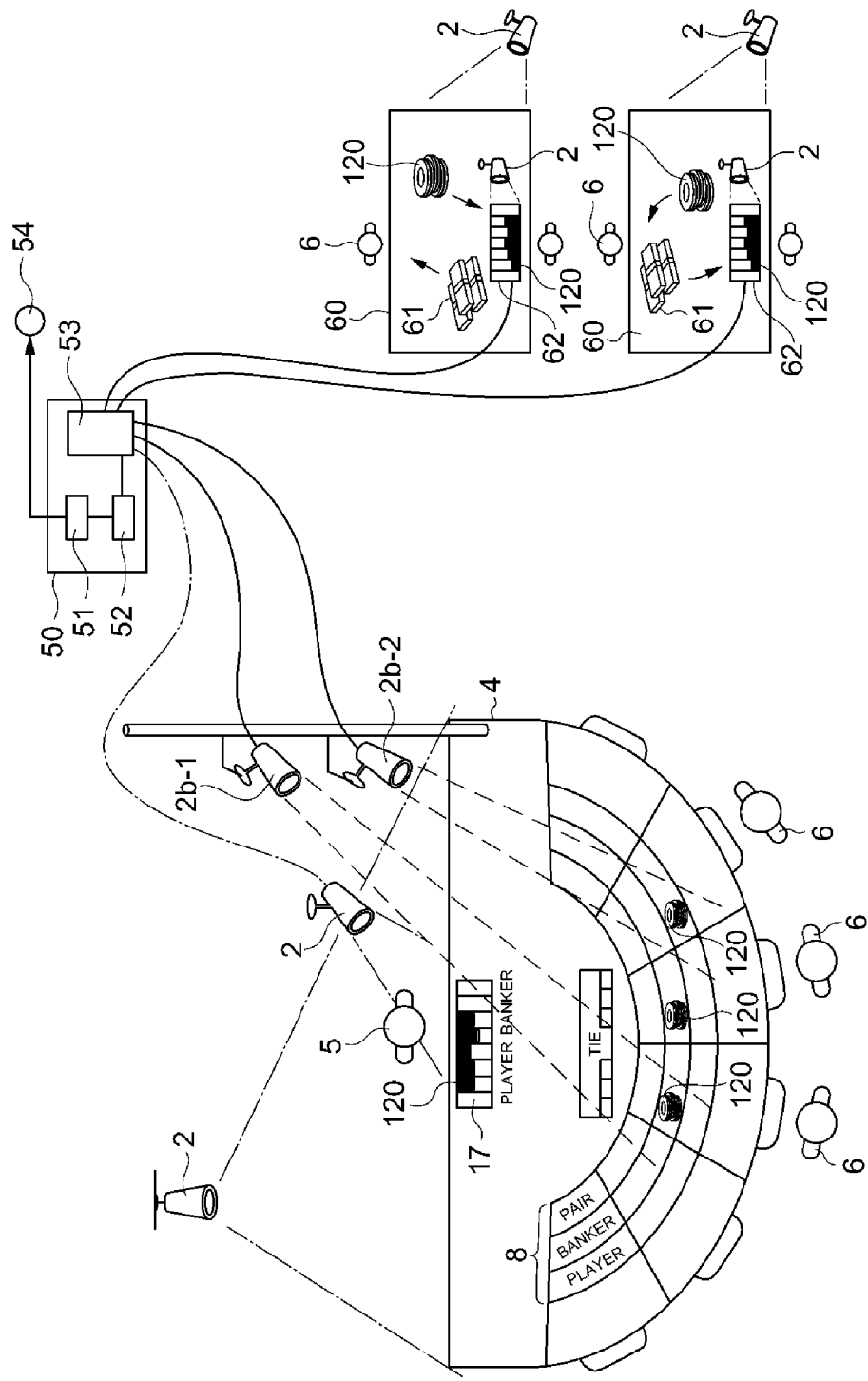
FIG. 16 is a diagram illustrating an overview of the whole management system for gaming currency according to a third embodiment of the present invention.

Hereinafter, a management system of gaming currency in a game house including a game table according to an embodiment of the present invention will be described with reference the drawings. FIG. 16 is a diagram that illustrates an overview of the whole system. The management system of gaming currency in a game house including a plurality of game tables 4 (only one game table is illustrated in FIG. 16) images the state of progress of a game played in the game table 4 including a game participant 6 and a dealer 5 through a plurality of camera devices 2 and stores and manages the state. Particularly, the management system of gaming currency specifies the types and the quantities of gaming currency 120 used in the game table 4 by analyzing image information acquired by the camera device 2. A side ID 126 is attached to the side face of the gaming currency 120, and the types and the quantities of the gaming currency 120 is acquired by determining the side ID 126 and reading the types and the quantities. In addition, in this specification, a description of "side ID" or "ID" is used not only in the meaning of an ID as a physical entity attached to the side face of the gaming currency 120 but also in the meaning of identification information represented thereby. An ID reading device 53 disposed inside a management control device 50 connected to the camera device 2 specifies a side ID 126 by analyzing image information acquired from the camera device 2. Particularly, the management control device 50 includes a gaming currency determining device 52 specifying the types and the quantities of the gaming currency 120 that is in a horizontally aligned state or in a piled state based on a result of the reading of the side ID 126 acquired by analyzing the image data imaged through the camera device 2 therein.

In addition, the management system according to this embodiment is configured to image gaming currency 120 disposed on a game table 4 by using a plurality of camera devices 2*b*-1 and 2*b*-2, which have different heights, arranged at predetermined positions in addition to the camera device 2 that images the gaming currency 120 and records an acquired image. The camera device 2*b*-1 can image gaming currency 120 disposed at a relatively far position on the game table 4, and the camera device 2*b*-2 is configured to image gaming currency 120 disposed relatively close on the game table 4. By performing imaging the two camera devices 2*b*-1 and 2*b*-2, gaming currency 120 disposed at a place that is in a blind area for one of the camera devices can be imaged as well.

In a plurality of cashiers 60 present in a game house, the gaming currency 120 is exchanged with cash 61 paid by a game participant 6, and, in each cashier 60, gaming currency 120 is stored in a storage 62 storing the gaming currency 120. In each cashier 60 of a game house, gaming currency 120 brought by a game participant 6 is refunded into cash 61. In the game table 4, gaming currency 120 is stored in a game table gaming currency tray 17, and a dealer 5 collects gaming currency 120 bet by a game participant 6 who has lost the game from the table 4 in each game, returns the collected gaming currency 120 to the game table gaming currency tray 17, and then re-pays the gaming currency 120 to a game participant 6 who has won each game. All such exchanges between a game participant 6 and a cashier 60 of a game table or a dealer 5 are imaged and recorded by all the camera devices 2. In the storage 62 or the game table gaming currency tray 17, when there is exchange of gaming currency 120 with a game participant 6, the gaming currency 120 stored in the storage 62 or the game table gaming currency tray 17 increases or decreases. The types and the quantities of the gaming currency 120 stored in the game table gaming currency tray 17 and the storage 62 are monitored at predetermined timing or constantly by the ID reading device 53 and the gaming currency determining device 52 through the camera device 2. The management control device 50 stores the side IDs 126 of all the gaming currency 120 assumed to be used in a game house in the database 51 in advance (the side IDs 126 of all the gaming currency 120 assumed to be used in the game house are registered).

In addition, also in this embodiment, the gaming currency tray 17, as illustrated in FIGS. 14A and 14B, may be configured by an upper gaming currency tray 17*a* and a lower gaming currency tray 17*b* of upper/lower two stages. In such a case, in the state illustrated in FIG. 14A, the upper gaming currency tray 17*a* can be imaged by the camera device 2, and, in the state illustrated in FIG. 14B, the lower gaming currency tray 17*b* can be imaged by the camera device 2. In the state illustrated in FIG. 14B, additionally, the upper gaming currency tray 17*a* and the lower gaming currency tray 17*b* can be imaged by the camera device 2*c* simultaneously and also in an individually-identifiable state. In addition, in the state illustrated in FIG. 14B, the upper gaming currency tray 17*a* and the lower gaming currency tray 17*b* may be separately imaged. Each of the camera devices 2 and 2*c* may include a single visible-light camera or a single infrared ray camera corresponding to ink printed for the side ID 126 or a camera capable of performing switching among a plurality of functions of a visible-light camera and an infrared-ray camera corresponding to the printed ink.

In this way, in the game house, by using the database 51, the management control device 50 managing the side IDs 126 associated with gaming currency 120 manages all the side IDs 126 of at least gaming currency 120 present in the game table gaming currency tray 17 and the storage 62 in the database 51 together with the presence information thereof (the storage 62, the game table gaming currency tray 17, in the middle of moving from a backyard (not illustrated in the drawing), held by a game participant 6, or the like). The management control device 50 specifies all the gaming currency 120 disposed in the game table gaming currency tray 17 and the storage 62 by using the side IDs 126 at predetermined timing or constantly, searches the database 51, and determines the following events through the search of the database 51:

1) A side ID 126 that has not been present (or not present) in the database 51 is determined to be newly present.
 2) Two or more same IDs are determined to be present.

The management control device 50 has a function of generating an error signal representing an abnormality and giving a notification to a management division or a security division 54 of the game house when the situation of 1) or 2) described above is present. The management control device 50 specifies all the gaming currency 120 disposed in the game table gaming currency tray 17 and the storage 62 at predetermined timing or constantly by using the side IDs 126 and stores all the gaming currency 120 in the database 51 and thus, can determine that 1) a side ID 126 that has not been present (or not present) in the database 51 is newly present and 2) two or more same IDs are present.

In addition, when there is a change in the presence of the gaming currency 120 at least in the game table gaming currency tray 17 and the storage 62, the management control device 50 records time or a place (the storage 62, the game table gaming currency tray 17, or the like) at which the change is present in the database 51 in association with the side ID 126 and, as a result of the search of the database 51, when there is a situation in which two or more same side IDs 126 are present, extracts the side ID 126 and information of time or a place recorded in the database 51 in association with the side ID 126 from the database 51 and stores the side ID and the information that have been extracted, and thus, time at which gaming currency 120 to which the side ID 126 is attached, which has been detected first (used first or cashed), enters/exits the game table gaming currency tray 17 or the storage 13 or a place of the game table gaming currency tray 17 or the storage 13 in which the gaming currency 120 is stored can be specified by using the database 51. When the time and the place can be specified, a suspicious person for the use of unjust gaming currency 120 or the like can be specified from the recorded video of the camera device 2.

In this management system of gaming currency, the management control device 50 can specify the types and the quantities of the gaming currency 120 bet on the bet area 8 of the game table 4 by using the ID reading device 53. The gaming currency 120 of the bet area 8 is imaged by the camera device 2b that particularly images the bet area 8 and, also for the side ID 126 of the gaming currency 120 present on the bet area 8 of the game table 4, determines the following events by searching the database 51:

1) A side ID 126 that has not been present in the database 51 is newly present in the bet area 16;
2) Two or more same IDs are present.

The management control device 50 has a function of generating an error signal when a situation of 1) or 2) described above is present.

The management control device 50 of this system, the ID reading device 53 disposed inside, and the gaming currency determining device 52 specifying the types and the quantities of gaming currency 120 have a structure integrally including a computer formed as one body or by a plurality of configurations, a program, and a memory.

Figure 17:
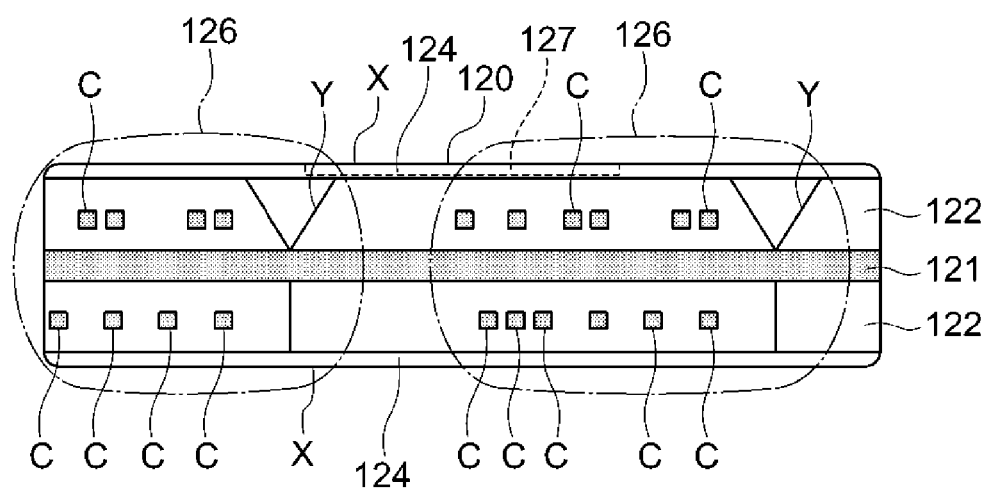
FIG. 17 is a side view of gaming currency according to the third embodiment of the present invention.

Next, details of gaming currency 120 (so-called gaming currency) used in this system will be described. FIG. 17 is a side view of gaming currency 120 used in this system, the gaming currency 120 is formed by stacking a plurality of plate-shaped plastic layers having different colors, forming the plastic layers to be integrated using a means of thermo-compressing or the like, and then, punching holes in the shapes of circles and quadrangles. The gaming currency 120 manufactured in this way has a multi-layer structure in which a coloring layer 121 is included at least in the middle, and white layers 122 or thin-color layers (may be layers of a color thinner than that of the coloring layer 121; not illustrated in the drawing) are stacked on both sides (in FIG. 17, the upper and lower sides) of the coloring layer 121 disposed in the middle. In this way, by employing the multi-layer structure in which the coloring layer 121 is included, and the white layers 122 or the thin-color layers (may be layers of a color thinner than that of the coloring layer 121; not illustrated in the drawing) are stacked on both sides of the coloring layer 121 disposed in the middle, as illustrated in FIG. 17, a stripe pattern (in the stacking direction) when seen from the side face is formed, and, by changing the color (red, green, yellow, blue, or the like) of the coloring layer 121 for each type (10 points, 20 points, 100 points, 1000 points, and the like) of the gaming currency 120, the type of the gaming currency 120 can be specified.

In addition, as illustrated in FIG. 17, in the gaming currency 120, a side ID 126 representing the type of gaming currency 120 is applied to the side faces of the white layers 122.

In the outermost layers, transparent layers 124 are arranged, and each interlayer is thermo-compressed to form a structure of at least five layers. Such gaming currency 120 is formed by using a plastic material having a thin long shape, and layers (at least the coloring layer 121 and the white layers 122) are thermo-compressed to form a closely adhering state (the structure of five layers or the like) in the state of a long length, and thereafter, holes having a circular shape, a rectangular shape, or the like are formed therein through press or the like. When a hole is formed through the press, die of mold for punching, and the size of punching are designed, and R processing (round angle) is performed for the ends of the transparent layer 124 of the outermost layer. The transparent layers 124 may be a coat layer of varnish. The side ID 126 is attached to at least three positions on the side face of the gaming currency 120. The side ID 126 is attached through inkjet printing using ink that is visible for visible light.

Figure 18:
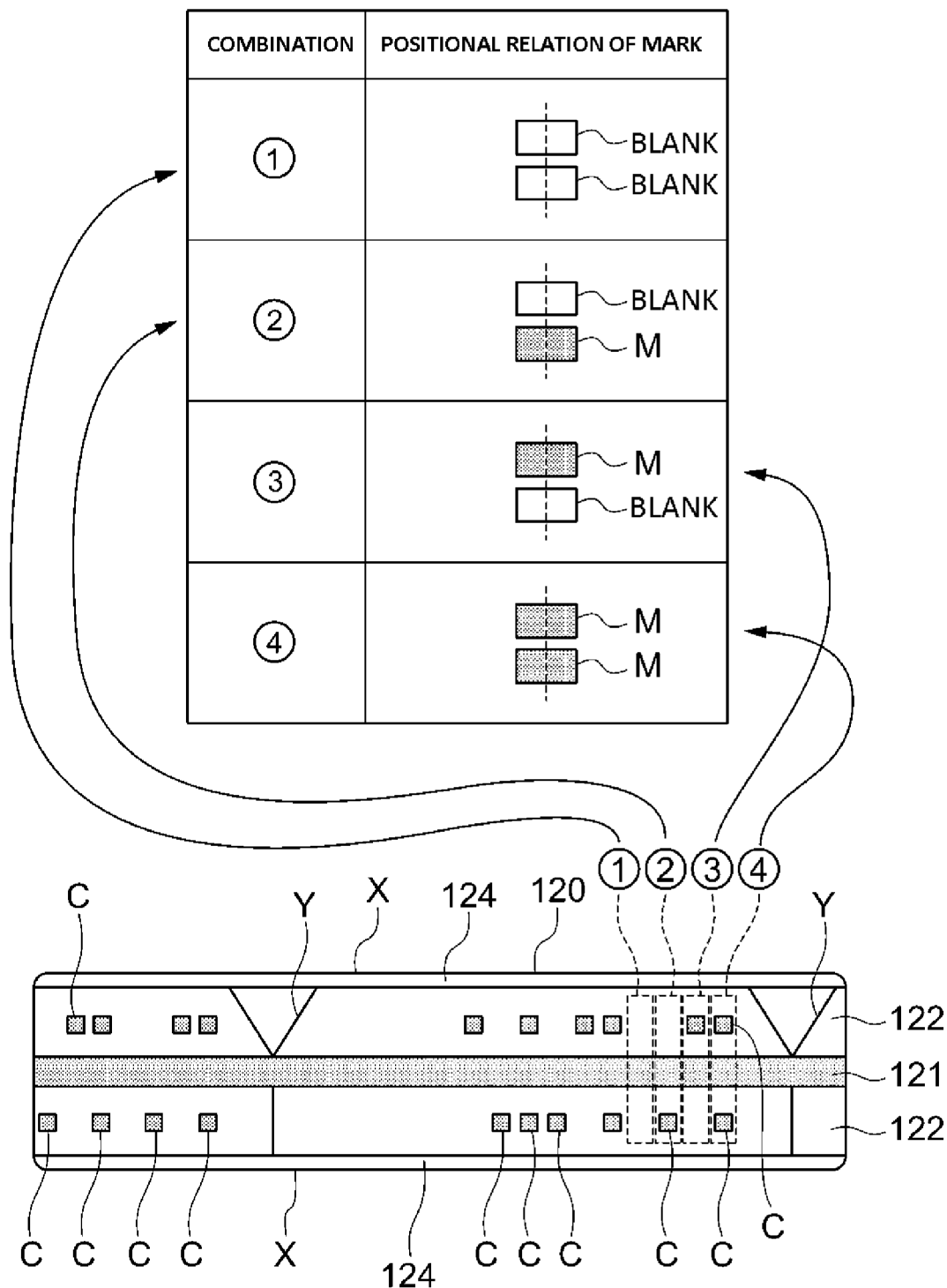
FIG. 18 is a diagram illustrating gaming currency configuring a code (four kinds) using upper and lower marks C as a pair.

Particularly, in this embodiment, the side ID 126 is configured to be attached as presence/absence of marks C of a plurality of rows and a plurality of columns. In the marks C of the plurality of rows and the plurality of columns, as illustrated in FIG. 17, upper and lower marks C are paired to configure a code, and a code of ten digits is formed in the case illustrated in FIG. 17. A configuration in which upper and lower marks C are paired to configure a code (four types) is illustrated in FIG. 18. A letter "Y" disposed to the side of marks C is an identification mark used for identifying upper and lower sides of a mark. A code configured by marks C is configured to specify a predetermined combination of marks C. As a result, in the example illustrated in FIG. 18, there are four types of combination of the marks C of upper and lower two columns, and, by printing these in ten columns, four to the power of 10 codes can be configured. Since there are four types of a 10-digit code, 4 to the power of 10 codes are acquired, and accordingly, the side IDs 126 of gaming currency 120 can be sufficiently assigned.

The gaming currency 120 forms a stripe pattern on the side face in the stacking direction by employing a multi-layer structure in which a plurality of plastic layers having different colors are stacked, the coloring layer 121 is included at least in one layer, the white layers 122 or the thin-color layers are stacked on a further outer side than the coloring layer 121 and has a configuration enabling the type of the gaming currency 120 to be specified using the coloring layer 121. The side IDs 126 are disposed at least three positions (preferably, six positions) on the side face of the white layer 122 or the thin-color layer, and, in this example, six side IDs are disposed at a predetermined interval of 60 degrees in the rotation direction (circumferential direction). The side IDs 126 individually identifiable (different for each one) are attached to gaming currency 120, and the side IDs 126 are disposed at a predetermined interval of 60 degrees in the rotation direction (circumferential direction) such that the side ID is necessarily seen from the lateral side. The side IDs 126 attached to the gaming currency 120 are read by the ID reading device 53 described above. The type, the manufacturing information, and the like of gaming currency 120 can be specified by reading the side ID 126 by using the ID reading device 53, and a configuration in which the side ID 126 can be managed in the database 51 is formed. In this embodiment, the side IDs 126 are attached using ink (visible ink) that is visible for visible light through inkjet printing. The side IDs 126 may be printed using at least one or a combination of ink (ink absorbing infrared rays) that is not visible for visible light and ink (including a side ID that is very small and is difficult to see) that is visible for at least visible light. In addition, the side IDs 126 may be printed by combining a plurality of such ink of a plurality of types. The ID reading device 53 includes at least a plurality of cameras (that is, a visible-light camera in a case where ink is visible ink, an infrared-ray camera in a case where ink is infrared reactive ink, and an ultraviolet camera in a case where ink is UV ink (UV radiator and a visible-light camera)) corresponding to the ink used for printing the side ID 126 or includes a camera capable of performing switching among a plurality of functions of cameras (a visible-light camera, an infrared ray camera, and an ultraviolet ray camera (an UV radiator and a visible-light camera or the like)) corresponding to the ink.

Figure 19:
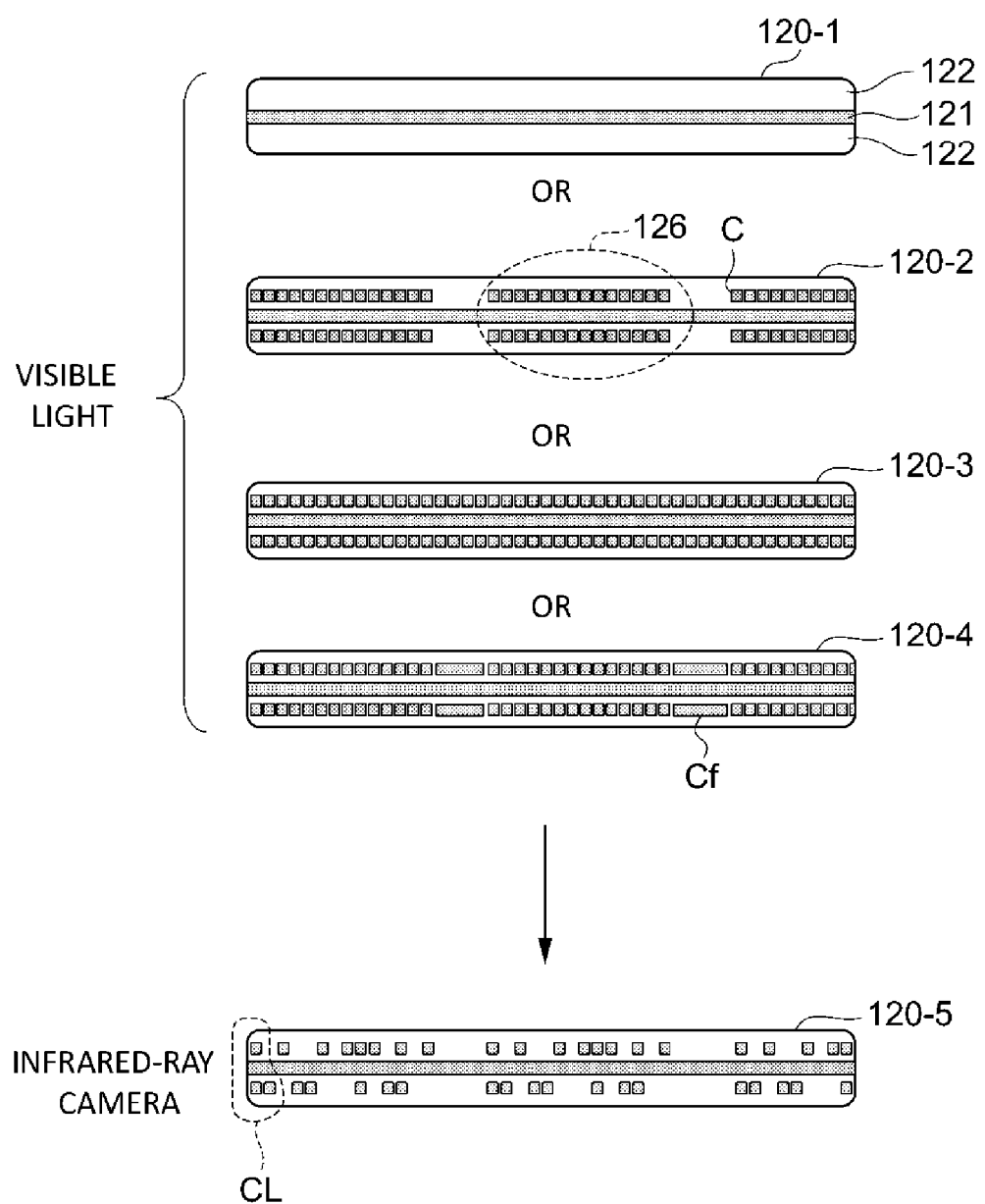
FIG. 19 is a diagram illustrating gaming currency in which side IDs are printed using ink (ink absorbing infrared rays) that is invisible for visible light.

In the case illustrated in FIG. 19, in gaming currency 120-1, side IDs 126 are printed using ink (ink absorbing infrared rays) that is not visible for visible light. In gaming currency 120-2, marks C of a plurality of rows and a plurality of columns are printed using ink that is seen dark for visible light. In gaming currency 120-3, additionally, marks C are printed using ink seen dark for visible light also between the side IDs 126, and the side IDs 126 are configured to dissolve in the design not to be visually distinguished. In gaming currency 120-4, a start point and an end point of the side ID 126 are represented by a mark Cf representing the end. When the gaming currencies 120-1 to 120-4 are seen using an infrared-ray camera, ink absorbing infrared rays absorbs infrared rays to be seen dark, and the gaming currencies 120-1 to 120-4 can be imaged in a state (represented as the gaming currency 120-5) in which the side ID 126 can be read. In addition, the upper and lower sides of the side ID 126 are illustrated using a mark CL representing the upper and lower sides. A relation between the upper and lower sides of the mark is as illustrated in FIG. 17. In addition, the side IDs 126 may be printed using a combination of ink that is visible for visible light and an infrared ray absorption ink.

Figure 20A:
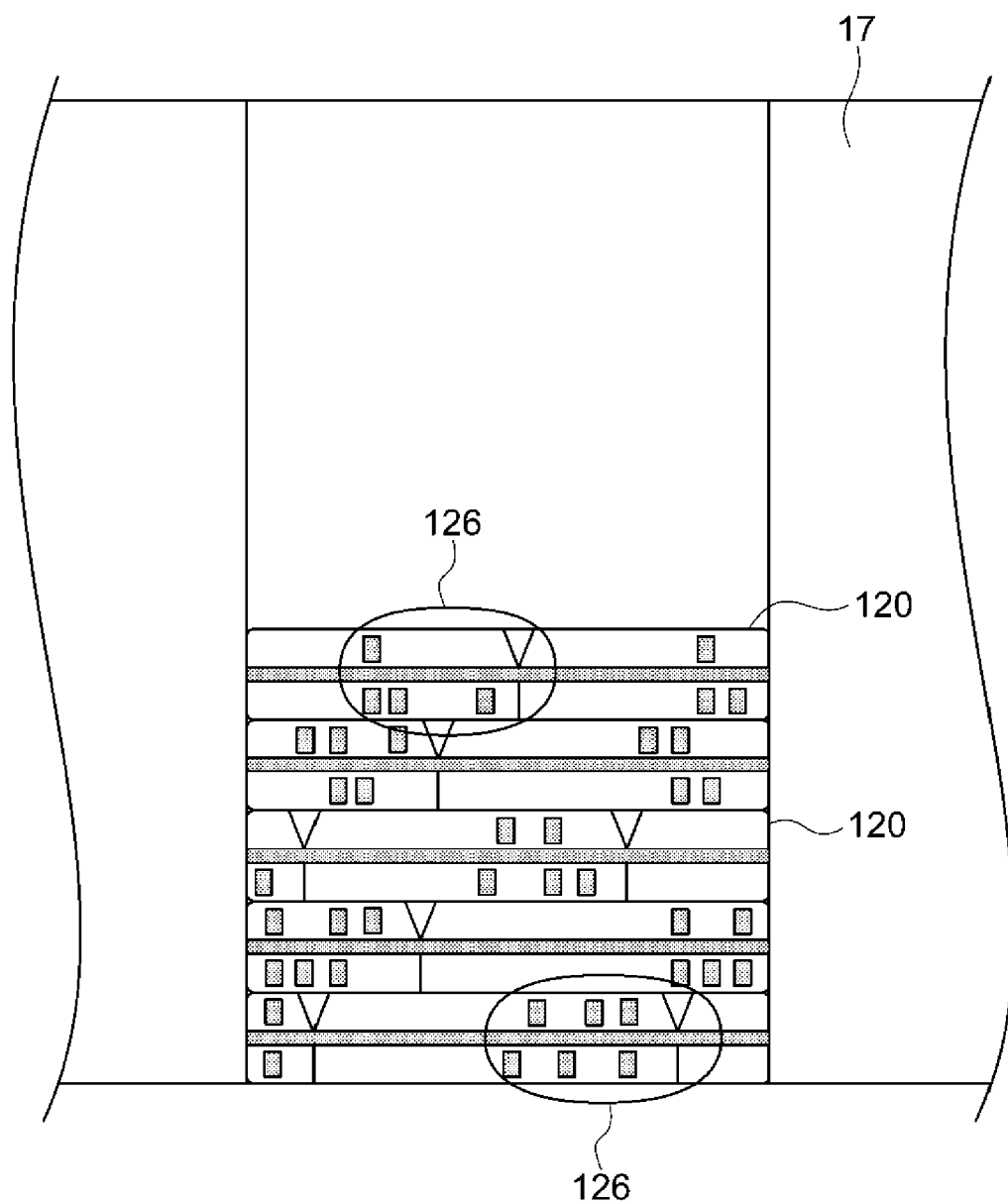
FIG. 20A is a plan view of a main part of a tray for gaming currency illustrating a state in which gaming currency according to the third embodiment is held in a tray for gaming currency of a casino table.
Figure 20B:
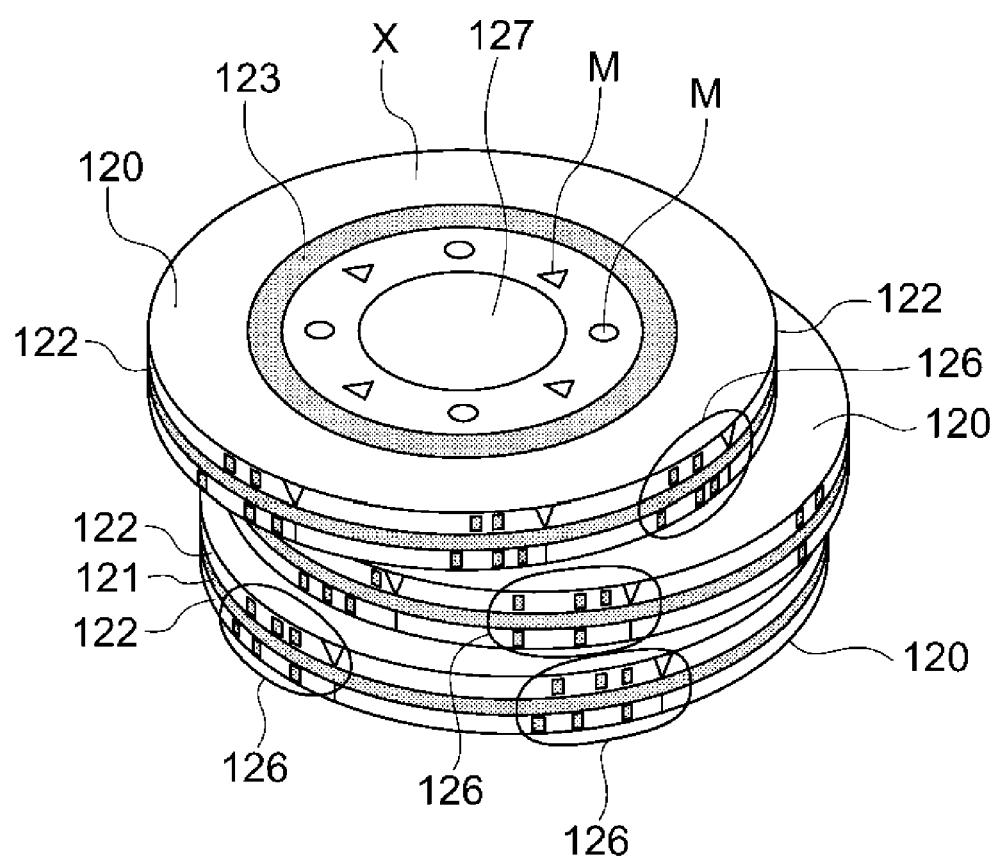
FIG. 20B is a perspective view of a state in which gaming currency is piled.

The side IDs 126 attached to the gaming currency 120 are read by the ID reading device 53 described above, and the ID reading device 53 can read the gaming currency 120 held in the storage 62 of a cashier of a game house and the game table gaming currency tray 17 of the game table, and actually, as illustrated in FIG. 20A, when the gaming currency 120 is stacked horizontally, the side IDs 126 can be read. In addition, the gaming currency 120 stacked in the bet area 8 or the like, as illustrated in FIG. 20B, can be also read.

Furthermore, in the gaming currency 120, a face code using UV ink or ink (carbon black ink) absorbing infrared rays is arranged on the surface (X) of the white layer 122 (see FIG. 9B). This face code represents authenticity of gaming currency 120, and, when ultraviolet rays (or infrared rays) hit the face code, the face code becomes visible to the eyes and represents authenticity based on a combination of the forms and a number. While the transparent layers (print layers) 124 are thermos-compressed or coated in the outermost layers to cover a print 123 (100 points or the like) used for specifying a game house and a face code disposed on the surface, embossing process or varnish processing is performed for the transparent layers 124, and the gaming currency 120 is prevented from adhering to each other and is caused to slide well. In the gaming currency 120, a circular recess 127 is arranged at the center of each of the upper and lower faces. According to the recesses 127, the gaming currency 120 is prevented from being adhere to each other, and, by increasing the diameter of the recesses 127, the gaming currency 120 can slide well.

The R processing (R) is performed for the ends of the transparent layers (print layers) 124 of the outermost layers for which a print 123 (100 points or the like) is performed, and, in the punching process of the gaming currency 100, the surfaces of the white layers 122 are prevented from being deformed to appear on the side face. In addition, it is prevented that a sharp end remains in the gaming currency 100 and damages the hands or the other gaming currency 120. The coloring layer 121 may be formed by colored one layer or a plurality of layers. In addition, metal or ceramic used for increasing the weight may be built in a layer included in the layer of the coloring layer 121. More specifically, in the material of the layer included in the layer of the coloring layer 121, for example, metal powders (for example, a metal oxide of one or a plurality of metal oxides of zinc oxide and titanium oxide) may be contained. In addition, a part of the coloring layer 121 is hollowed out, or a space is arranged between the coloring layer 121 and the white layer 122, and an RFID may be built therein. In such a case, as the side ID 126 of the gaming currency 120, a side ID 126 according to a code using the marks C and a side ID using the RFID are used together.

In the gaming currency 120 configured in this way, the types and the quantities of the gaming currency 120 that is held in the game table gaming currency tray 17 and the storage 62 are specified by the gaming currency determining device 52 through the camera device 2 and the ID reading device 53, and the side IDs 126 of the gaming currency 120 present on the game table gaming currency tray 17 and the storage 62 are managed in the database 51 together with the presence information thereof. In this way, at least, it is inspected whether 1) a side ID 126 that has not been present in the database 51 is newly present 2) two or more same side IDs 126 are present. By determining the occurrences of the situations of 1) and 2) described above by searching for all the side IDs 126, the inspection is realized.

As described above, while a game participant 6 can perform exchange of cash 61 for gaming currency in the cashier 60, exchange of cash 61 for gaming currency 120 can be performed also in the game table 4. The camera device 2 images bills placed on the game table 4 to exchange them for gaming currency 120. That is, a plurality of camera devices 2 imaging the gaming currency 120 disposed on the game table 4 are arranged at different positions to have different heights.

The management control device 50 specifies the types and the quantities of gaming currency 120 to be discharged from the gaming currency tray 17 in the exchange from bills by using a result of imaging of bills using the camera device 2. The management control device 50 compares real total amounts of the gaming currency 120 housed in the gaming currency tray 17 before and after the payment and determines whether or not this difference corresponds to the specified types and quantities of the gaming currency 120 to be discharged. That is, the management control device 50 determines through a comparison whether or not a total amount of the gaming currency 120 perceived in the gaming currency tray 17 corresponds to an increase/decrease according to a paid amount of the gaming currency 120 corresponding to exchanged bills after the exchange of the bills and the gaming currency 120. In addition, when collection and re-payment according to a result of winning/losing of a game are simultaneously performed, the management control device 50 determines through a comparison whether or not the total amount corresponds to an amount of the gaming currency 120 bet by all the players 6 and an increase/decrease in the gaming currency 120 calculated based on a result of the winning/losing of the game.

Here, the management control device 50 is a control device having an artificial intelligence-utilizing or deep-learning structure capable of acquiring information of the types and the quantities of the gaming currency 120 even in a state in which a part or whole one unit of the gaming currency 120 is hidden when the types and the quantities of the gaming currency 120 are measured and determined.

As described above, the side IDs 126 are attached to the white layers 122 or the thin-color layers of the side face of the gaming currency 120 at least at three or more positions spaced apart in a rotation direction (circumferential direction). The types and the manufacturing information of gaming currency 120 can be specified by reading the side IDs 126 by using the ID reading device 53. The specified information specified through measurement has a configuration that can be collated and managed with the database 51.

The management control device 50 may be a control device having an artificial intelligence-utilizing or deep learning structure. The management control device 50 can perceive the position 8 (a position betting on a player, a banker, or a pair), the types (a value of a different amount is assigned to the gaming currency for each color), and the quantities of the gaming currency 120 by using an artificial intelligence-utilizing type computer or control system, a deep-learning (structure) technology, a self-learning function, or the like.

Figure 21:
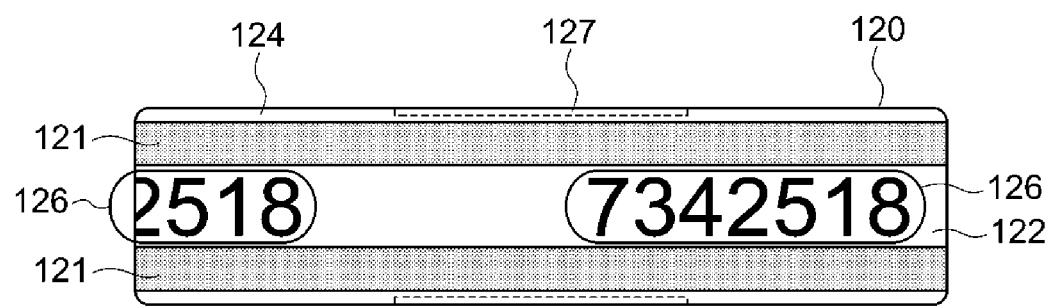
FIG. 21 is a diagram illustrating another example of gaming currency according to the third embodiment.

Hereinafter, a modified example of the gaming currency 120 will be described. In the modified example, on the side face of the gaming currency 120, a seven-digit number is printed as the side ID 126. In the example illustrated in FIG. 21, a white layer 122 is disposed in the middle, and, under the white layer, a coloring layer 121 is disposed. A number as a mark is printed on the white layer 122 disposed in the middle and configured a side ID 126. When 10 types of combinations of numbers are printed in seven digits, 10 to the power of 7 codes can be configured, and accordingly, the side IDs 126 of gaming currency 120 can be sufficiently assigned. In the camera device 2 and an image analysis thereof, there are cases where it is difficult to determine and read a number, a combination of marks C described in the previous embodiment is considered to be advantageous in the image analysis.

Figure 22:
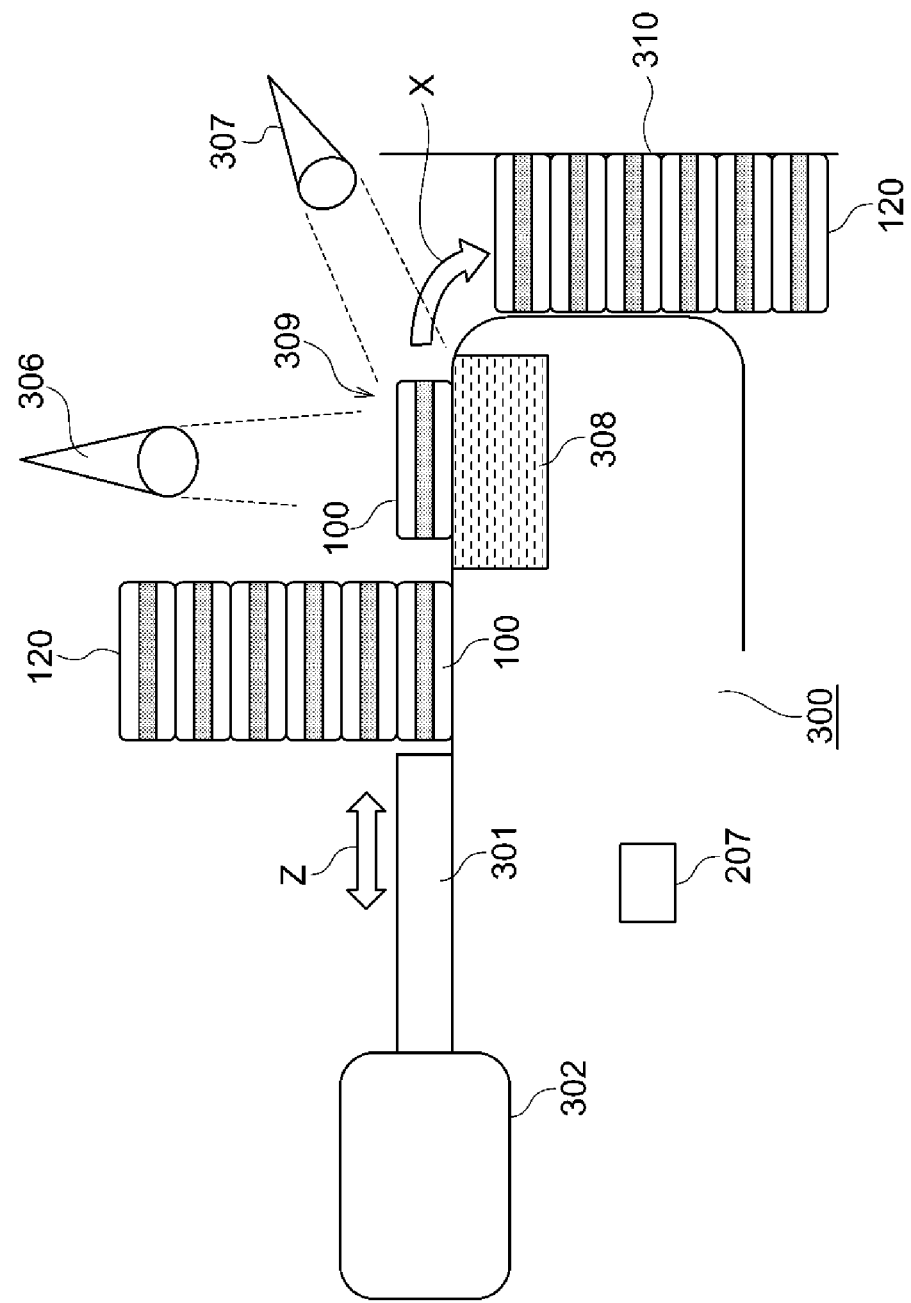
FIG. 22 is a diagram illustrating another example of an inspection device inspecting gaming currency.

Another inspection device 300 inspecting the gaming currency 120 will be described with reference to FIG. 22. The inspection device 300 includes: a face code reading device 306 that reads a face code M formed using UV emission ink or ink absorbing infrared rays disposed on the surface of the gaming currency 120; an ID reading device 307 that reads the side ID 126 of the side face; an RFID reading device 308 that reads information of an RFID (not illustrated in the drawing) of the gaming currency 120; and a control device 207. The control device 207 is configured to inspect a relation among the information of the side ID 126 acquired by the ID reading device 307, the information acquired from the face code reading device 306, and the information acquired from the RFID reading device 308. There is a correct database (not illustrated in the drawing), and the relation among the information is inspected by comparing a reading result with the database. This inspection is used for preventing the occurrence of a defect by detecting a print error in the face code M and the side ID 126 or for discrimination with a fake.

This example (FIG. 22) includes an extrusion device 302 that supplies gaming currency 120 one at each time to a reading stage 309 by using an extruder 301 that in moved in the direction of an arrow Z by the extrusion device 302, and the stacked gaming currency 120 is supplied from the extrusion device 302 to the reading stage 309. In this way, previous gaming currency 120 for which the inspection is completed is extruded and falls in the direction of an arrow X, and the gaming currency 120 that has fallen in the direction of the arrow X is held on a holding stage 310.

Figure 23:
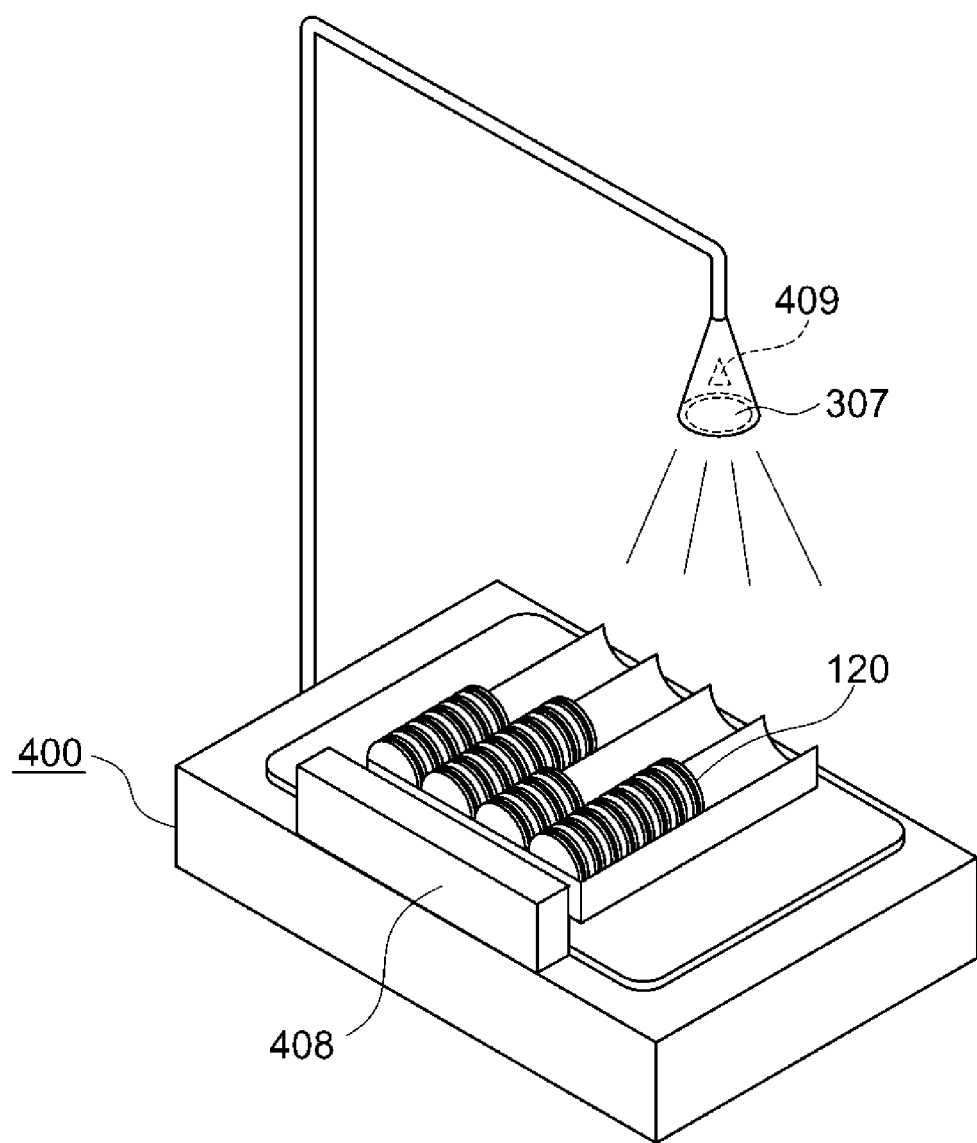
FIG. 23 is a diagram illustrating another example of an inspection device inspecting gaming currency.

Further another inspection device 400 that inspects gaming currency 120 will be described with reference to FIG. 23. The inspection device 400 includes: an RFID reading device 408 that reads information of an RFID (not illustrated in the drawing) of the gaming currency 120; an ID reading device 307 that reads the side ID 126 of the side face; and a control device 207 and is configured to inspect a relation between the information of the side ID 126 acquired by the ID reading device 307 and the information acquired from the RFID reading device 408. There is a correct database (not illustrated in the drawing), and the relation among the information is inspected by comparing a reading result with the database. This inspection is used for preventing the occurrence of a defect by detecting a print error in the face code M and the side ID 126 or for discrimination with a fake.

The ID reading device 307 includes a single visible-light camera or a single infrared-ray camera corresponding to ink used for print the side ID 126 and is configured to include a camera 409 capable of performing switching among a plurality of functions of a visible-light camera and an infrared-ray camera corresponding to the printed ink. The visible-light camera can read the number and the color of the gaming currency 120, and the infrared-ray camera can read the side ID 126 of the gaming currency 120.

Figure 24:
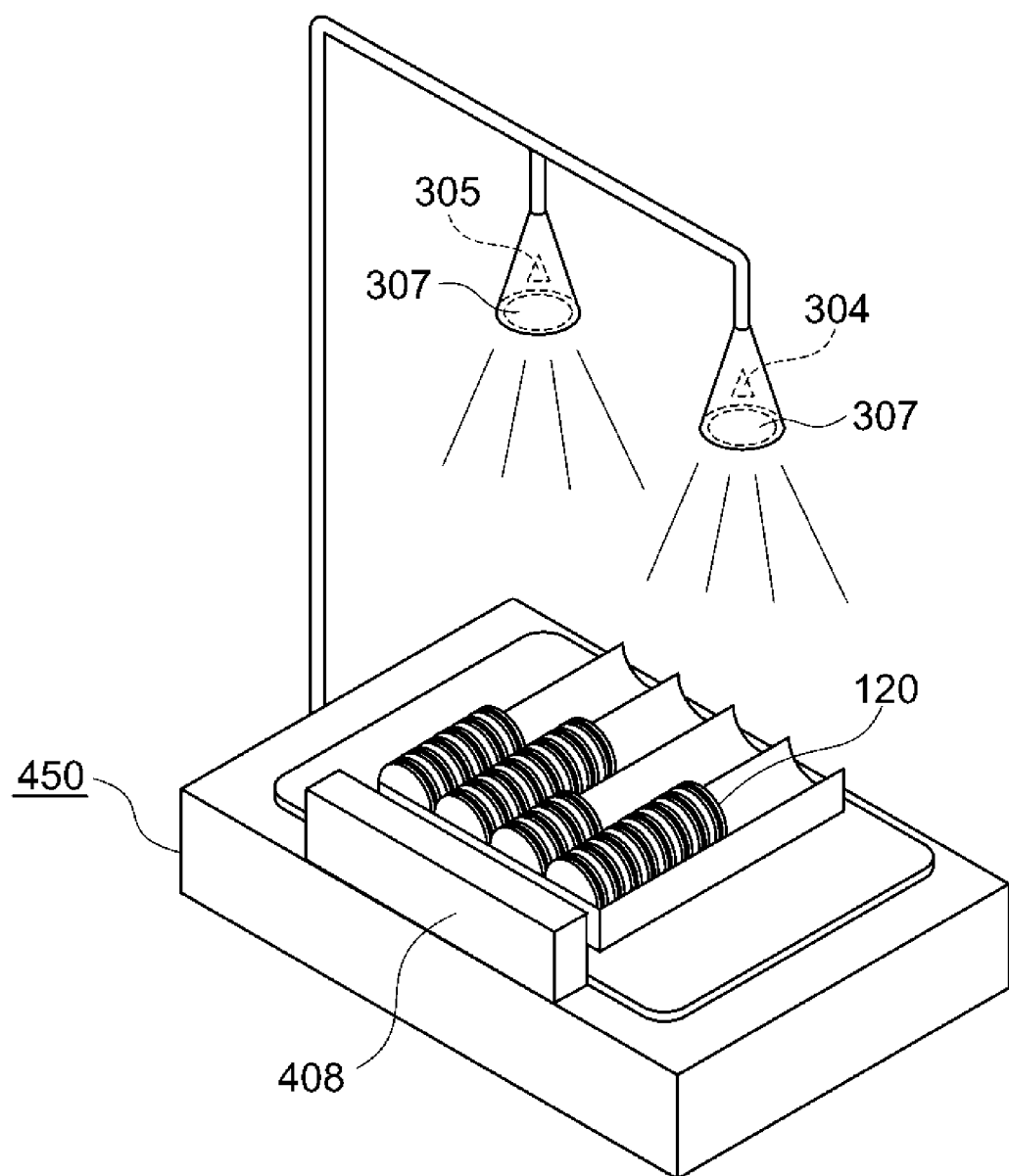
FIG. 24 is a diagram illustrating another example of an inspection device inspecting gaming currency.

Still another inspection device 450 inspecting gaming currency 120 will be described with reference to FIG. 24. A same reference numeral is assigned to a same component as that of the inspection device 400 (the description thereof will not be presented). An ID reading device 307 is configured to include a plurality of visible-light cameras 304 or infrared-ray cameras 305 corresponding to ink used for printing the side ID 126. The visible-light camera 304 can read the number and the color of the gaming currency 120, and the infrared-ray camera 305 can read the side ID 126 of the gaming currency 120.

A management control device 50 acquires a total amount of gaming currency (chips) placed in a gaming currency tray 17 after a settlement at the time of the end of a game through a gaming currency determining device 52. A determination of "after a settlement" is when any one of the following 1) to 4) occurs:

1) when re-payment for winning gaming currency 120 (winning chips) is completed;
2) when cards C used in this game are collected and are disposed in a disposal area or a disposal slot of the table;
3) when a predetermined button accompanying a card distributing device 3 functioning as a winning/losing result determining device is pressed;
4) when a marker 43 representing winning/losing is returned to the original state.

In addition, in this embodiment, an image analyzing device 18 according to the second embodiment that records a state of process of a game played in the game table 4 as a video including game participants 6 and a dealer 5 through a plurality of camera devices 2 and performs an image analysis of the recorded video of the state of process of the game to analyze and perceive a total amount of the gaming currency 120 in the gaming currency tray 17 of a dealer 5 of the game table 4 and a measurement device 19 that performs an analysis and measurement by using information acquired by the image analyzing device 18 and determines the types and the quantities of the gaming currency 120, and/or a mark reading device 205 that reads a face code formed using UV emission ink or ink absorbing infrared rays disposed on the surface of the gaming currency 120 are combined, and an RFID reading device 308 that reads information of an RFID 125 of the gaming currency 120 is combined as is necessary, whereby an inspection device as below including a management control device 50 can be configured.

That is, by combining the RFID reading device 308 reading the information of the RFID 125 of the gaming currency 120 with the configuration described above, an inspection device including the ID reading device 53 reading the side ID 126 of the side face and the management control device 50 can be configured. In this inspection device, the management control device 50 inspects a relation between the information of the side ID 126 read by the ID reading device 53 and the information of the RFID 125 read by the RFID reading device 308 is inspected.

In addition, by combining the mark reading device 205 of the second embodiment that reads a face code formed using UV emission ink or an infrared-ray absorption ink arranged on the upper face or the lower face of the gaming currency 120 with the configuration described above, an inspection device including the ID reading device 53 reading the side ID 126 of the side face and the management control device 50 can be configured. In this inspection device, the management control device 50 inspects a relation between the information of the side ID 126 read by the ID reading device 53 and the information of the face code read by the mark reading device 205.

In addition, by combining the mark reading device 205 of the second embodiment that reads a face code formed using UV emission ink or an infrared-ray absorption ink arranged on the surface of the gaming currency 120 and an RFID reading device 308 reading information of the RFID 125 of the gaming currency 120 with the configuration described above, an inspection device including the ID reading device 53 reading the side ID 126 of the side face and the management control device 50 can be configured. In this inspection device, the management control device 50 inspects a relation among the information of the side ID 126 read by the ID reading device 53, the information of the face code read by the mark reading device 205, and the information of the RFID 125 read by the RFID reading device 308.

As described above, in this embodiment, in the gaming currency 120, side IDs 126 used for identifying each individual is attached to the outer faces of the white layer 122 or the thin-color layer.

The side IDs 126 are attached to at least three or more positions spaced apart in a rotation direction (circumferential direction) of the gaming currency 120.

In addition, the side IDs 126 are printed using non-visible ink (for example, infrared-ray absorption ink or UV emission ink) that is not visible for visible light.

Furthermore, the side IDs 126 are disposed in a plurality of rows on the side faces of two layers of the white layers 122 or the thin-color layers.

In addition, at least one layer among the plurality of plastic layers configuring the coloring layer 121 and the white layers 122 is a layer containing metal powders (for example, a metal oxide of one or a plurality of metal oxides of zinc oxide and titanium oxide) used for increasing the weight in the layer.

In addition, the side IDs 126 may be printed using at least two or more types of ink among ink that is visible for visible light, an infrared-ray absorption ink, and UV ink. In such a case, the ID reading device 53 includes a plurality of cameras corresponding to each ink used for printing the side IDs 126 or includes a camera capable of performing switching among a plurality of imaging functions corresponding to each ink.

In addition, the gaming currency 120 is manufactured as below. First, a coloring layer 121 and white layers 122 or thin-color layers having the coloring layer 121 interposed therebetween are thermos-compressed, whereby a stacked structure body including a plurality of plastic layers is formed. Then, drawing patterns are printed on at least the upper face or the lower face of the stacked structure body, whereby a gaming currency original plate is generated. Then, punching processing is performed for the gaming currency original plate by using a mold, whereby a plurality of gaming currencies having a predetermined shape are acquired. Here, in at least one layer among the plurality of plastic layers, a layer containing metal powders or a metal oxide used for increasing the weight is used.

On side faces of the gaming currency 120 manufactured in this way, side IDs 126 used for identifying each individual are printed. At this time, the side IDs 126 may be printed through inkjet printing.

In addition, an RFID 125 is interposed between the layers of the stacked structure body, and the layers having the RFID 125 interposed therebetween are heated and welded when the layers are thermos-compressed, whereby the periphery of the RFID 125 is fixed to be adhering to the plastic layers.

In addition, the management system of table games according to this embodiment includes: a gaming currency tray 17 that is disposed on a game table 4 and holds gaming currency 120 for each type; a camera device 2 that images the gaming currency 120 held in the gaming currency tray 17; and a management control device 50 that specifies the types and the quantities of gaming currency 120 held in the gaming currency tray 17 and measures a total amount of the gaming currency 120 disposed on the gaming currency tray 17 by using a result of the imaging performed by the camera device 2.

The gaming currency 120 is a stacked structure body in which the coloring layer 121 and the white layers 122 or the thin-color layers are stacked and has a stripe pattern on the side face in the stacking direction. The management control device 50 has a function of measuring the number of the coloring layers 121 or the white layers 122 or the thin-color layers of the gaming currency placed by each game participant and determining the types and the amount of the gaming currency based on the colors of the coloring layers 121.

The management control device 50 determines whether or not a real total amount of the gaming currency 120 after the end of a game that is perceived on the gaming currency tray 17 corresponds to an increase/decrease amount of the gaming currency 120 calculated based on the amount of the gaming currency 120 bet by all the players 6 and a result of winning/losing of the game.

In the management control device 50, the acquisition of the total amount of the gaming currency 120 in the gaming currency tray 17 after a settlement at the time of end of a game may be performed at one of:
1) time when re-payment for winning gaming currency 120W ends;
2) time when cards used in the game are collected and are disposed in a disposal area of the table;
3) time when a predetermined button accompanying a card distributing device 3 functioning as a winning/losing result determining device is pressed; and
4) time when a marker representing winning/losing is returned to the original state.

The camera device 2 can also image bills place on the game table 4 for exchange of the gaming currency 120, and the management control device 50 specifies the types and the quantities of gaming currency 120 disposed on the gaming currency tray 17 to be decreased according to exchange of the gaming currency 120 disposed on the gaming currency tray 17 and bills by using a result of the imaging of the bills and performs a comparison with a real total amount of the gaming currency 120 disposed on the gaming currency tray 17.

The management control device 50 determines through a comparison whether a total amount of gaming currency 120 perceived in the gaming currency tray 17 corresponds to an increase/decrease according to a paid amount of gaming currency 120 corresponding to exchanged bills after the exchange of the bills and gaming currency 120 is performed and an increase/decrease in gaming currency 120 calculated based on the amount of gaming currency 120 bet by all the players 6 and a result of winning/losing of the game.

The management control device 50 is a control device having an artificial intelligence-utilizing or deep-learning structure capable of acquiring information of the types and the quantities of gaming currency 120 also in a state in which a part or one unit of the gaming currency 120 is hidden when the types and the quantities of the gaming currency 120 are measured and determined.

The side IDs 126 attached to the white layers 122 or the thin-color layers of the side face of the gaming currency 120 at least at three or more positions spaced apart in a rotation direction (circumferential direction), the types and manufacturing information of gaming currency 120 can be specified by reading the side ID 126 by using the ID reading device 53, and the specified information specified through measurement has a configuration that can be collated and managed with the database 51.

The side IDs 126 may be printed using two or more types of ink among ink (visible ink) that is visible for visible light, infrared-ray absorption ink, and UV emission ink. In such a case, the ID reading device 53 includes a plurality of types of cameras (a plurality of types of a visible-light camera, an infrared-ray camera, and an ultraviolet camera (a UV radiator and a visible-light camera, and the like) corresponding to ink used for printing the side IDs 126.

Alternatively, a camera capable of performing switching among a plurality of imaging functions (a visible-light camera, an infrared-ray camera, and an ultraviolet camera (a UV radiator and a visible-light camera, and the like) corresponding to each ink may be included.

In addition, a configuration may be employed in which gaming currency 120 disposed on the game table 4 is imaged by using a plurality of camera devices 2b-1 and 2b-2 that are arranged at predetermined positions and have different heights.

In the embodiments described above, while the image analyzing device 12 and the control device 14 are devices having an artificial intelligence-utilizing or deep learning structure, more specifically, the image analyzing device 12 and the control device 14 may perform an image analysis and various control processes described above by using a scale-invariant feature transform (SIFT) algorithm, a convolutional neural network (CNN), deep learning, machine learning, or the like. Such technologies are technologies for recognizing a target included in an image by performing image recognition for a captured image, and particularly, in recent years, a target is recognized with high accuracy by using a deep learning technology having multi-layered neural network. In this deep learning technology, generally, in an intermediate layer between an input layer and an output layer of a neural network, layers overlap each other over a plurality of stages, and accordingly, a target is recognized with high accuracy. In these deep learning technologies, particularly, a convolutional neural network has attracted attention owing to high performance according to recognition of a target based on conventional image features.

In the convolutional neural network, a recognition target image to which labels are assigned is learned, and main target included in the recognition target image is recognized. In a case where a plurality of main targets are present in a learning image, a designation is made using an area rectangular, and learning is performed with a label assigned to an image corresponding to the designated area. In addition, in the convolutional neural network, a main target in an image and the position of the target can be determined.

The convolutional neural network will be further described. In a target recognition process, by performing an edge extracting process and the like for a recognition target image, candidate areas are extracted based on local features, and, after feature vectors are extracted by inputting the candidate areas to the convolutional neural network, classification is performed, and a candidate area having a classified highest certainty factor is acquired as a result of the recognition. Here, the certainty factor is an amount representing a relative degree of highness of the similarity of a subject of an image learned together with an image area and a label relative to the similarity of the other classes.

In addition, devices having artificial intelligence-utilizing or deep-learning structures are disclosed in U.S. Pat. No. 9,361,577, US 2016-171336 A, US 2015-036920 A, JP 2016-110232 A, and the like, the content of which is incorporated herein by reference.

Although the first to third embodiments have been described above, of course, the embodiments described above can be modified by a person skilled in the art, and according to the necessity in an applied game, the device of the present embodiment may be properly modified.

The following invention is disclosed according to the first to third embodiments.

Gaming currency according to an aspect of the first to third embodiments is gaming currency in which a stacked structure body formed by a plurality of plastic layers is configured by stacking at least a coloring layer and a white layer or a thin-color layer, a stripe pattern is formed on a side face in a stacking direction, a configuration enabling a type of gaming currency to be specified by the coloring layer is included, a print layer representing a type of the gaming currency is applied to a further upper and lower faces of the stacked structure body, and a layer structure is formed by thermo-compressing each interlayer.

In the gaming currency described above, a side ID that can be individually identified may be attached to an outer face of the white layer or the thin-color layer.

In the gaming currency described above, the side IDs may be attached to at least three or more positions spaced apart in a rotation direction of the side face of the gaming currency.

In the gaming currency described above, the side ID may be printed using ink that is not visible for visible light.

In the gaming currency described above, the side ID may be printed using ink absorbing infrared rays.

In the gaming currency described above, the side ID may be disposed in a plurality of rows on each of outer faces of two layers of the white layers or the thin-color layers.

In the gaming currency described above, R processing may be performed for outer angles of upper and lower faces of the print layer.

In the gaming currency described above, at least one layer of the plurality of plastic layers may be a heavy layer containing metal powder used for increasing the weight.

In the gaming currency described above, the metal powder used for increasing the weight may be a metal oxide and may be one or a plurality of metal oxides, particularly, among a zinc oxide and a titanium oxide.

In the gaming currency described above, white layers or thin-color layers may be disposed on both sides with the coloring layer interposed therebetween, and thicknesses of upper and lower layers of the white layers or the thin-color layers having the coloring layer interposed therebetween may be configured to be different from each other.

In the gaming currency described above, an RFID may be tightly fixed between plastic layers each forming any one of the coloring layer and the white layer or the thin-color layer.

In the gaming currency described above, a face code formed using UV emission ink or ink absorbing infrared rays may be disposed on the print layer.

In the gaming currency described above, a structure in which side IDs are attached to a side face, and an RFID is built may be formed, a face code formed using UV emission ink or ink absorbing infrared rays is disposed on the print layer, and information of the sides ID attached to the side face and information of the RFID may be associated with each other, the information of the side ID and information of the face code may be associated with each other, or the information of the side ID, the information of the RFID, and the information of the face code may be associated with each other.

An inspection device according to an aspect of the first to third embodiments is an inspection device inspecting the gaming currency and includes: an RFID reading device that reads information of the RFID of the gaming currency; an ID reading device that reads the side ID disposed on the side face; and a control device. A relation between information of the side ID acquired by the ID reading device and information acquired by the RFID reading device is configured to be inspected.

An inspection device according to another aspect of the first to third embodiments is an inspection device inspecting the gaming currency and includes: a face code reading device that reads the face code formed using UV emission ink or ink absorbing infrared rays disposed on the surface of the gaming currency; an ID reading device that reads the side ID disposed on the side face; and a control device. The control device is configured to inspect a relation between information of the side ID acquired by the ID reading device and information acquired by the face code reading device.

An inspection device according to further another aspect of the first to third embodiments is an inspection device inspecting the gaming currency and includes: a face code reading device that reads the face code formed using UV emission ink or ink absorbing infrared rays disposed on the surface of the gaming currency; an ID reading device that reads the side ID disposed on the side face; an RFID reading device that reads information of the RFID of the gaming currency; and a control device. A relation among information of the side ID acquired by the ID reading device, information acquired by the face code reading device, and information acquired by the RFID reading device is configured to be inspected.

In the inspection device described above, the side ID may be printed using at least one or a combination of ink that is visible for visible light and ink absorbing infrared rays, and the ID reading device may include one or a plurality of visible-light cameras or infrared-ray cameras corresponding to the ink used for printing the side ID or a camera capable of performing switching among a plurality of functions of a visible-light camera and an infrared-ray camera corresponding to the ink.

In the inspection device described above, a determination device of a type of the gaming currency that images the side face of the gaming currency and determines a color of a stripe pattern of the side face in a stacking direction or a print inspecting device that reads a print of a print layer arranged in the gaming currency may be further included, and a relation between the type of the gaming currency and a print content of the print layer may be inspected.

A method of manufacturing gaming currency according to an aspect of the first to third embodiments includes: forming a stacked structure body formed by a plurality of plastic layers by stacking at least a coloring layer and a white layer or a thin-color layer; arranging a print layer in which a drawing pattern is printed on at least an upper face or a lower face of the stacked structure body of the plurality of plastic layers; generating a gaming gaming currency original plate by heating and welding the layers by performing thermo-pressing of the layers of the stacked structure body and the print layer; and acquiring a plurality of gaming currencies having a predetermined shape by performing punching processing of the gaming gaming currency original plate using a mold and performing R processing of upper and lower angles of outer sides of the gaming currency using a mold at the time of performing the punching processing.

A method of manufacturing gaming currency according to another aspect of the first to third embodiments includes: forming a stacked structure body formed by a plurality of plastic layers by including a coloring layer at least in the middle and stacking a white layer or a thin-color layer on upper and lower sides of the coloring layer disposed in the middle; using a layer containing metal powder or a metal oxide used for increasing the weight inside the layer as at least one layer of the plurality of plastic layers; arranging a print layer in which a drawing pattern is printed on at least an upper face or a lower face of the stacked structure body; generating a gaming gaming currency original plate by heating and welding the layers by performing thermo-pressing of the layers of the stacked structure body and the print layer; and acquiring a plurality of gaming currencies having a predetermined shape by performing punching processing of the gaming gaming currency original plate using a mold.

In the method of manufacturing gaming currency described above, a side ID may be attached through inkjet printing.

In the method of manufacturing gaming currency described above, an RFID may be interposed between the layers of the stacked structure body, and the layers having the RFID interposed therebetween may be heated and welded when the layers are thermos-compressed, and a periphery of the RFID may be tightly fixed by the plastic layers.

In the method of manufacturing gaming currency described above, one or a plurality of face codes, security marks, optical variable devices (OVD) may be printed in the print layer.

A management system of a table game according to an aspect of the first to third embodiments includes: a card distributing device that determines and displays a result of winning/losing of each game in a game table; a camera device that images and records gaming currency placed on the game table by using a camera; a management control device that specifies and stores a position, types, and quantities of the gaming currency placed on the game table by a game participant by using a result of the imaging performed by the camera device in each game. The gaming currency is formed as a structure body including a coloring layer and a white layer or a thin-color layer at least in an outer appearance to form a stripe pattern on a side face in an axial direction and has a configuration enabling the type of the gaming currency to be specified using the coloring layer, and the management control device has a calculation function of calculating a balance of a casino side on the game table for each game by using the result of winning/losing acquired from the card distributing device and the result of the imaging of the position, the types, and the quantities of the gaming currency placed by a game participant.

In the management system of a table game described above, the management control device may have a function of determining the types and an amount of the gaming currency by using colors of coloring layers by measuring the numbers of the coloring layers or white layers or thin-color layers of the gaming currency placed by each game participant.

In the management system of a table game described above, while the management control device images the position, the types, and the quantities of the gaming currency placed by each game participant in each game, it is performed when the card distributing device detects drawing of a first card, before and after the drawing, or after recognition of a dealer's signal representing an end of betting in the management control device.

A management system of a table game according to another aspect of the first to third embodiments includes: a gaming currency tray that is disposed on a game table and holds gaming currency for each type; a camera device that images the gaming currency placed in the gaming currency tray by using a camera; and a management control device that specifies and stores types and quantities of gaming currency disposed on the gaming currency tray by using a result of the imaging performed by the camera device. The gaming currency is formed as a structure body including a coloring layer and a white layer or a thin-color layer at least in an outer appearance to form a stripe pattern on a side face in an axial direction and has a configuration enabling the type of the gaming currency to be specified using the coloring layer, and the management control device is configured to be able to measure a total amount of the gaming currency disposed on the gaming currency tray by using a result of the imaging of the types and the quantities of the gaming currency disposed on the gaming currency tray.

In the management system of a table game described above, the management control device may have a function of determining the types and an amount of the gaming currency by using colors of coloring layers by measuring the numbers of the coloring layers or white layers or thin-color layers of gaming currency placed by each game participant.

In the management system of a table game described above, the management control device may be configured to be able to determine a difference of a real total amount of gaming currency after end of a game that is perceived in the gaming currency tray of a dealer of the game table that does not correspond to an increased/decreased amount of gaming currency calculated based on an amount of gaming currency bet by all the players and a result of winning/losing of the game.

In the management system of a table game described above, the acquisition of the total amount of the gaming currency in the gaming currency tray through the management device after a settlement at the time of end of a game may be performed at one of:
1) time when re-payment for winning gaming currency ends;
2) time when cards used in the game are collected and are disposed in a disposal area of the table;
3) time when a predetermined button accompanying a winning/losing result determining device is pressed; and
4) time when a marker representing winning/losing is returned to the original state.

In the management system of a table game described above, the camera device may also be able to image bills used for exchange of the gaming currency, and the management control device may be configured to specify types and quantities of gaming currency disposed on the gaming currency tray to be decreased according to exchange of the gaming currency disposed on the gaming currency tray and bills by using a result of the imaging of the bills and be able to perform a comparison/measurement with a real total amount of the gaming currency disposed on the gaming currency tray.

In the management system of a table game described above, the management control device may determine through a comparison whether a total amount of gaming currency perceived in the gaming currency tray of a dealer of a game table corresponds to an increase/decrease according to a paid amount of gaming currency corresponding to exchanged bills after the exchange of the bills and gaming currency is performed and an increase/decrease in gaming currency calculated based on an amount of gaming currency bet by all the players and a result of winning/losing of the game.

In the management system of a table game described above, the management control device may have an artificial intelligence-utilizing or deep-learning structure capable of acquiring information of types and quantities of gaming currency also in a state in which a part or one unit of the gaming currency is hidden due to a blind area of the camera when the types and the quantities of the gaming currency are measured and determined.

In the management system of a table game described above, a side ID may be attached to the white layers or the thin-color layers of the side face of the gaming currency at least at three or more positions spaced apart in a rotation direction, types and manufacturing information of gaming currency may be able to be specified by reading the side ID by using the ID reading device, and the specified information specified through measurement may have a configuration that can be collated and managed with a predetermined database.

In the management system of a table game described above, the side ID may be printed using at least one of or both ink that is visible for visible light and ink absorbing infrared rays, and the ID reading device may include one or a plurality of visible-light cameras or infrared-ray cameras corresponding to the ink used for printing the side ID or a camera capable of performing switching among a plurality of functions of a visible-light camera and an infrared-ray camera corresponding to the ink.

In the management system of a table game described above, the camera device imaging and recording gaming currency disposed on the game table may be configured to image the gaming currency by using one or a plurality of cameras having different heights arranged at predetermined positions.

According to a system of the first to third embodiments, fraud in collecting and repaying gaming currency according to a result of win/loose of a game can be detected.

In addition, according to a system of the first to third embodiments, even when a card is bent according to player's squeeze of the card that is frequently performed in a Baccarat game or the like, the rank and the suit of the card can be determined through an image analysis, and a total amount of gaming currency that is in a blind area or overlaps each other can be perceived together with the position. In addition, fraud at the time of exchange of bills and gaming currency can be detected as well.

The fourth embodiment relates to an inspection system and an inspection device for inspecting a gaming currency, and more specifically, to an inspection system and an inspection device for inspecting plural gaming currencies housed in a case.

Gaming currencies used in a gaming house such as a casino are manufactured in a factory, are carried to the gaming house to be stored in a repository, and moved from the repository to a cashier or a game table in the house, it is necessary to prevent the gaming currencies from being stolen or replaced with a fake during carrying, storing, and moving. Therefore, the case housing the gaming currencies is used. Since the case is stamped after housing the plural gaming currencies, it is possible to discover a situation in which the gaming currencies are extracted from the case after stamping.

As the gaming currency, it is known the one in which a radio tag storing identification information or information on kinds is built and a optically readable code information indicating the identification information or the information on kinds is given on a side surface (for example, Japanese Patent Laid-Open No. 2009-66172).

In Japanese Patent Laid-Open No. 2009-66172, a system using a gaming currency is disclosed. The system calculates, for the gaming currencies placed on a betting board on a game table, the number of the gaming currencies based on the identification information stored in the radio tag, calculates the number of the gaming currencies based on the identification information given to the side surface, and compares them. Thereby, if unfair gaming currencies are used on the game table, it can be detected.

However, since the system disclosed in Japanese Patent Laid-Open No. 2009-66172 detects injustice by calculating the number of the gaming currencies betted (placed on the betting board), even with this system, it is impossible to detect unfair gaming currencies by inspecting the plural gaming currencies housed in the case while being housed in the case.

Then, the purpose of the fourth embodiment is to provide an inspection system and an inspection device capable of inspecting plural gaming currencies housed in a case while being housed in the case.

An inspection system according to a first aspect of the fourth embodiment is an inspection system for inspecting a gaming currency having at least first currency information and second currency information, the second currency information being provided on a side surface of the gaming currency in a form which can be optically read, including: a case which stacks and houses plural gaming currencies; and an inspection device which inspects the gaming currencies housed in the case, in which the inspection device includes: a first reading device which obtains the first currency information of the gaming currencies housed in the case; a second reading device which optically reads the side surfaces of the gaming currencies housed in the case and obtains the second currency information; and a determination part which determines authenticity/damage or a number for each value of all gaming currencies existing in the case to determine pass or fail of the plural gaming currencies housed in the case by using the first currency information obtained by the first reading device and the second currency information obtained by the second reading device.

According to this configuration, since a first reading part and a second reading part obtain the first currency information and the second currency information from the gaming currencies housed in the case respectively, it is possible to perform inspection with respect to the gaming currencies while being housed in the case. Also, since the inspection is performed by obtaining two pieces of information, the first currency information and the second currency information from the gaming currencies, it is possible to certainly perform the determination of the pass or fail.

In an inspection system according to a second aspect of the fourth embodiment, in the inspection system according to the first aspect, the first currency information and the second currency information on the common gaming currencies include common information, and if a common information part of the plural pieces of the first currency information obtained by the first reading device is not equal to that of the plural pieces of the second currency information obtained by the second reading device, the determination part determines the plural gaming currencies housed in the case are as fail.

According to this configuration, when unfair gaming currencies in which the common information part of the first currency information is not equal to that of the second currency information exist, the determination part can reject the gaming currencies housed in the case.

For example, if common identification information is recorded on the radio tag and the side surface, it is rejected, if plural pieces of identification information read out from the plural radio tags are not perfectly equal to plural pieces of identification information read out from the plural side surface.

In an inspection system according to a third aspect of the fourth embodiment, in the inspection system of the first aspect, both or either one of the first currency information or the second currency information includes individual identification information for individually identifying the gaming currencies.

In an inspection system according to a fourth aspect of the fourth embodiment, in the inspection system of the first aspect, the second currency information includes information expressed by a specific color representing a value of the gaming currency, and is information indicating the value of the gaming currency with the specific color.

In an inspection system according to a fifth aspect of the fourth embodiment, in the inspection system of the third aspect, both of the first currency information and the second currency information include individual identification information, and if the individual identification information of the plural pieces of the first currency information obtained by the first reading device is not equal to that of the plural pieces of the second currency information obtained by the second reading device, the inspection system determines the plural gaming currencies housed in the case as rejection.

According to this configuration, when unfair gaming currencies in which the individual identification information of the first currency information is not equal to that of the second currency information exist, the determination part can reject the gaming currencies housed in the case.

An inspection system according to a sixth aspect of the fourth embodiment, the inspection system of the first embodiment, further includes a storage part which stores the individual identification information of at least the first currency information or the second currency information of the plural gaming currencies which should be housed in the case, and the determination part determines the plural gaming currencies housed in the case as rejection, if the individual identification information of the plural pieces of the first currency information obtained by the first reading device or the individual identification information of the plural pieces of the second currency information obtained by the second reading device are not equal to the individual identification information of the first currency information or the second currency information stored in the storage part.

According to this configuration, when unfair gaming currencies in which the first currency information and the second currency information are incorrect exist in the case, the determination part can reject the gaming currencies housed in the case.

For example, if individual identification information expressed by characters is recorded in the radio tag and individual identification information expressed by numbers is recorded on the side surface, also in the storage part, for each case, plural pieces of individual identification information expressed by characters for the radio tag are stored, and plural pieces of individual identification information expressed by numbers for the side surface is stored. If the plural pieces of the individual identification information read out from the plural radio tags are not equal to the plural pieces of the individual identification information stored in the storage part for the radio tags of the case, or if the plural pieces of the individual identification information read out from the plural side surfaces are not equal to the plural pieces of the individual identification information for the side surfaces of the case, it is possible to reject them.

An inspection system according to a seventh aspect of the forth embodiment, the inspection system of the first aspect, further includes a storage part which stores a correspondence relationship between the first currency information and the second currency information, and the determination part, if the plural pieces of the first currency information obtained by the first reading device and the plural pieces of the second currency information obtained by the second reading device are not equal to the correspondence relationship stored in the storage part, determines that the plural gaming currencies housed in the case as rejection.

According to this configuration, when the gaming currencies with the incorrect correspondence relationship between the first currency information and the second currency information exist in the case, it is possible to reject them.

For example, if the identification information is recorded in the radio tag and the value is recorded on the side surface, the storage part stores each identification information to which any value is assigned. For the plural pieces of the identification information read out from the plural radio tags, the number of values is obtained by referring to the storage part, and if the number of values read out from the side surfaces is not equal to that, it is rejected. On the contrary, it is also the same as a case when the value is recorded in the radio tag and the identification information is recorded on the side surface. In these cases, it is unnecessary that the storage part stores in which case the gaming currencies of which identification information are included.

In an inspection system according to an eighth aspect of the fourth embodiment, in the inspection system of any one of the first to the seventh aspects, the determination part, if the number of pieces of the first currency information obtained by the first reading device and the second currency information obtained by the second reading device is not a predetermined number, determines the plural gaming currencies housed in the case as rejection.

According to this configuration, when the gaming currencies are extracted from the case or the gaming currencies are added to the case, the determination part can reject the gaming currencies housed in the case.

For example, if the number of housing in the case is 100, when either one of the first currency information read out from the radio tag or the second currency information read out from the side surface is not 100 pieces, they are rejected.

In an inspection system according to a ninth aspect of the fourth embodiment, in the inspection system of any one of the first to the eighth aspects, the gaming currency includes color information for indicating a value of the gaming currency in the second currency information and includes value information for identifying the value of the gaming currency in the first currency information, and the determination part, if the color information is not equal to the value information of the first currency information, determines the plural gaming currencies housed in the case as rejection.

In an inspection system according to a tenth aspect of the fourth embodiment, in the inspection of the ninth aspect, the second currency information further includes value information of the gaming currency in addition to the color information, and the determination part, if the value of the gaming currency according to the color information in the second currency information is not equal to both or either one of the value information of the second currency information or the value information of the first currency information, determines the plural gaming currencies housed in the case as rejection.

In an inspection system of an eleventh aspect of the fourth embodiment, in the inspection system of any one of the first to the tenth aspects, the gaming currency has the radio tag including the first currency information.

In an inspection system of a twelfth aspect of the fourth embodiment, in the inspection system of any one of the first to the eleventh aspects, at least one or both of the first currency information and the second currency information includes group information indicating a group to which the gaming currency belongs, and the group is classified according to the value, manufacturing time, manufacturer, and/or usage gaming house of the gaming currency.

In an inspection system of a thirteenth aspect of the fourth embodiment, in the inspection system of the tenth aspect, the determination part, if the color information is not equal to at least one of the value information, the common information, or the individual identification information of the first currency information and the second currency information, determines the plural gaming currencies housed in the case as rejection.

In an inspection system of a fourteenth aspect of the fourth embodiment, in the inspection of the tenth aspect, the determination part determines the number for each value of the plural gaming currencies housed in the case or the total value of all gaming currencies, based on the color information or the value information of the first currency information or the second currency information.

In an inspection system of a fifteenth aspect of the fourth embodiment, in the inspection system of the first aspect, the second currency information includes information expressed by the specific color representing the value of the gaming currency on the side surface of the gaming currency and is the information indicating the value of the gaming currency with the specific color, and the second reading device includes a camera for shooting the side surfaces of the plural gaming currencies housed in the case, and an identification part which analyses an image shot by the camera to specify each specific color of the plural gaming currencies, and specifies the values of the plural gaming currencies according to the specified specific color.

According to this configuration, the determination part can determines pass or fail using the information on the value of the gaming currency.

An inspection system of a sixteenth aspect of the fourth embodiment, in the inspection system of the fifteenth aspect, the specific color expressing the second currency information, on the side surface of the gaming currency, is sandwiched between common colors commonly given on the gaming currencies having different values in a thickness direction of the gaming currency.

According to this configuration, even if the plural gaming currencies are stacked in the case, by extracting the specific color sandwiched by the common colors from the image of the side surface, the identification part can specify the kinds of the plural gaming currencies in the case.

In an inspection system according to a seventeenth aspect of the fourth embodiment, in the inspection system of the first aspect, the second currency information is indication information indicated on the side surface so as to be optically readable, and the second reading device includes a camera for shooting the side surfaces of the plural gaming currencies stacked and housed in the case, and an identification part which analyses an image shot by the camera to specify indication information of each of the plural gaming currencies, and specifies the second currency information of each of the plural gaming currencies according to the specified indication information.

According to this configuration, the determination part can determine the pass or fail using the indication information of the gaming currency.

In an inspection system of an eighteenth aspect of the fourth embodiment, in the inspection system of the seventeenth aspect, the indication information is indicated with an infrared-ray responsive ink that emits light in response to infrared rays or an infrared-ray absorbing ink that absorbs the infrared rays, and the camera is an infrared-ray camera.

According to this configuration, the identification information given on the side surface can be prevented from being visually recognized under natural light.

In an inspection system according to a nineteenth aspect of the fourth embodiment, in the inspection system of the seventeenth aspect, the indication information is indicated with an ink that emits light in response to an ultraviolet rays, and the inspection device is further includes an ultraviolet-ray irradiation part that irradiates the ultraviolet rays to the side surfaces of the gaming currencies housed in the case.

Also according to this configuration, the identification information given on the side surface can be prevented from being visually recognized under natural light.

In an inspection system according to a twentieth aspect of the forth embodiment, in the inspection system of the first aspect, the stamp which is broken if it is opened so as to take out the gaming currencies housed is made on the case, the inspection device further includes a detection part for detecting the unbroken stamp, and the determination part, if the unbroken stamp is not detected by the detection part, determines the plural gaming currencies housed in the case as rejection.

According to this configuration, when the stamp is broken, the determination part can reject the gaming currencies housed in the case.

In an inspection system of a twenty-first aspect of the forth embodiment, in the inspection system of the first aspect, the case has a light transmission part, and the second reading device optically reads the side surfaces of the gaming currencies housed in the case through the light transmission part.

According to this configuration, it is possible to read the second currency information while the case is closed.

In an inspection system of a twenty-second aspect of the forth embodiment, in the inspection system of the twenty-first aspect, the light transmission part is configured of a transparent member.

According to this configuration, a sealed structure including the light transmission part is formed in the case.

In an inspection system of a twenty-third aspect of the fourth embodiment, in the inspection system of the first embodiment, the inspection device includes a case receiving part for receiving the case.

According to this configuration, by disposing the case in the case receiving part, the first currency information and the second currency information can be read.

In an inspection system of a twenty-fourth aspect of the fourth embodiment, in the inspection system of the twenty-first aspect, the case is portable.

According to this configuration, it is possible to inspect the gaming currencies in the case at any point in a moving process from the factory to the table or the cashier.

In an inspection system of a twenty-fifth aspect of the forth embodiment, in the inspection system of the first aspect, the case is a two-stage chip float or chip tray for holding the gaming currencies on a game table.

An inspection system according to a twenty-sixth aspect of the forth embodiment is an inspection system for inspecting a gaming currency given a specific color representing a value thereof and indication information indicated so as to be optically readable on a side surface, the inspection system including: a case which stacks and houses plural gaming currencies; and an inspection device inspecting the gaming currencies housed in the case, the inspection device having a configuration including a camera for shooting the side surfaces of the gaming currencies housed in the case; an identification part which analyses an image shot by the camera to specify the specific color and the indication information of each of the plural gaming currencies; and a determination part which determines pass or fail of the gaming currencies for each case, based on the specific color and the indication information specified by the identification part.

According to this configuration, since the identification part specifies the specific color and the indication information about the gaming currencies housed in the case, it is possible to perform inspection with respect to the gaming currencies while being housed in the case. Also, since two pieces of information, the specific color and the indication information are specified from the side surface of the gaming currency to perform the inspection, it is possible to certainly perform the determination of pass or fail.

An inspection system according to a twenty-seventh aspect of the fourth embodiment is an inspection system for inspecting a gaming currency in which a radio tag storing currency information is built and a specific color representing a value is given to a side surface, the inspection system including: a case which stacks and houses plural gaming currencies; and an inspection device for inspecting the gaming currencies housed in the case, the inspection device having a configuration including a reading part which reads the radio tags of the gaming currencies housed in the case to obtain the currency information; a camera for shooting the side surfaces of the gaming currencies housed in the case; an identification part which analyzes an image shot by the camera to specify the specific color of each of the plural gaming currencies; and a determination part which determines pass or fail of the gaming currencies for each case, based of the currency information obtained by the reading part and the specific color specified by the identification part.

According to this configuration, since the reading part obtains the currency information from the gaming currencies housed in the case and the identification part specifies the specific color for the gaming currencies housed in the case, it is possible to perform inspection with respect to the gaming currencies while being housed in the case. Also, since two pieces of information, the currency information and the specific color are specified from the side surface of the gaming currency to perform the inspection, it is possible to certainly perform the determination of pass or fail.

An inspection device according to a twenty-eighth aspect of the forth embodiment is an inspection device for inspecting plural gaming currencies in which radio tags storing first currency information are built and optically readable second currency information is given to side surfaces, and which are stacked and stored in the case, the inspection device including a configuration including a first reading device which reads the radio tags of the plural gaming currencies housed in the case to obtain the first currency information; a second reading device which optically reads the side surfaces of the plural gaming currencies housed in the case to obtain the second currency information; and a determination part which determines pass or fail of the gaming currencies for each case, based on the first currency information obtained by the first reading device and the second currency information obtained by the second reading device.

According to this configuration, since a first reading part and a second reading part obtain the first currency information and the second currency information from the gaming currencies housed in the case respectively, it is possible to perform inspection with respect to the gaming currencies while being housed in the case. Also, since the inspection is performed by obtaining two pieces of information, the first currency information and the second currency information from the gaming currencies, it is possible to certainly perform the determination of the pass or fail.

An inspection device of a twenty-ninth aspect of the forth embodiment is an inspection device for inspecting plural gaming currencies in which a specific color representing values and an optically readable indication information are given to side surfaces, and which are stacked and housed in a case, the inspection device including a configuration including a camera for shooting the side surfaces of the plural gaming currencies housed in the case; an identification part which analyzes an image shot by the camera to specify the specific color and the indication information of each of the plural gaming currencies; and a determination part which determines pass or fail of the gaming currencies for each case, based on the specific color and the indication information specified by the identification part.

An inspection device of a thirtieth aspect of the fourth embodiment is an inspection device for inspecting plural gaming currencies in which radio tags storing currency information are built and a specific color representing values is given to side surfaces, and which are stacked and housed in the case, the inspection device including a configuration including a reading part which reads the radio tags of the plural gaming currencies housed in the case to obtain the currency information; a camera for shooting the side surfaces of the plural gaming currencies housed in the case; an identification part which analyzes an image shot by the camera to specify the specific color of each of the plural gaming currencies; and a determination part which determines pass or fail of the gaming currencies for each case, based on the currency information obtained by the reading part and the specific color specified by the identification part.

An inspection system of a thirty-first aspect of the fourth embodiment is an inspection system for inspecting a gaming currency in which a radio tag storing currency information is built, the inspection system including a case which stacks and houses plural gaming currencies; and an inspection device which inspects the gaming currencies housed in the case, the inspection device including a reading part which reads the radio tags of the gaming currencies housed in the case to obtain the currency information; a determination part which determines pass or fail of the gaming currencies for each case, based on the currency information obtained by the reading part; and a storage part which stores the currency information of the plural gaming currencies that should be housed in the case, the determination part, if the plural pieces of the currency information obtained by the reading part are not equal to the currency information stored in the storage part, determining the plural gaming currencies housed in the case as rejection.

An inspection device according to a thirty-second aspect of the fourth embodiment is an inspection device for inspecting plural gaming currencies stacked and housed in a case, the inspection device including a configuration including a reading part which reads the radio tags of the plural gaming currencies housed in the case to obtain the currency information; and a determination part which determines pass or fail of the gaming currencies for each case, based on the currency information obtained by the reading part.

According to the forth embodiment, since the first reading part and the second reading part obtain the first currency information and the second currency information from the gaming currencies housed in the case respectively, it is possible to perform inspection with respect to the gaming currencies while being housed in the case. Also, since the inspection is performed by obtaining two pieces of information, the first currency information and the second currency information from the gaming currencies, it is possible to certainly perform the determination of the pass or fail.

Hereinafter, referring to the drawings, the fourth embodiment will be described.

Figure 25:
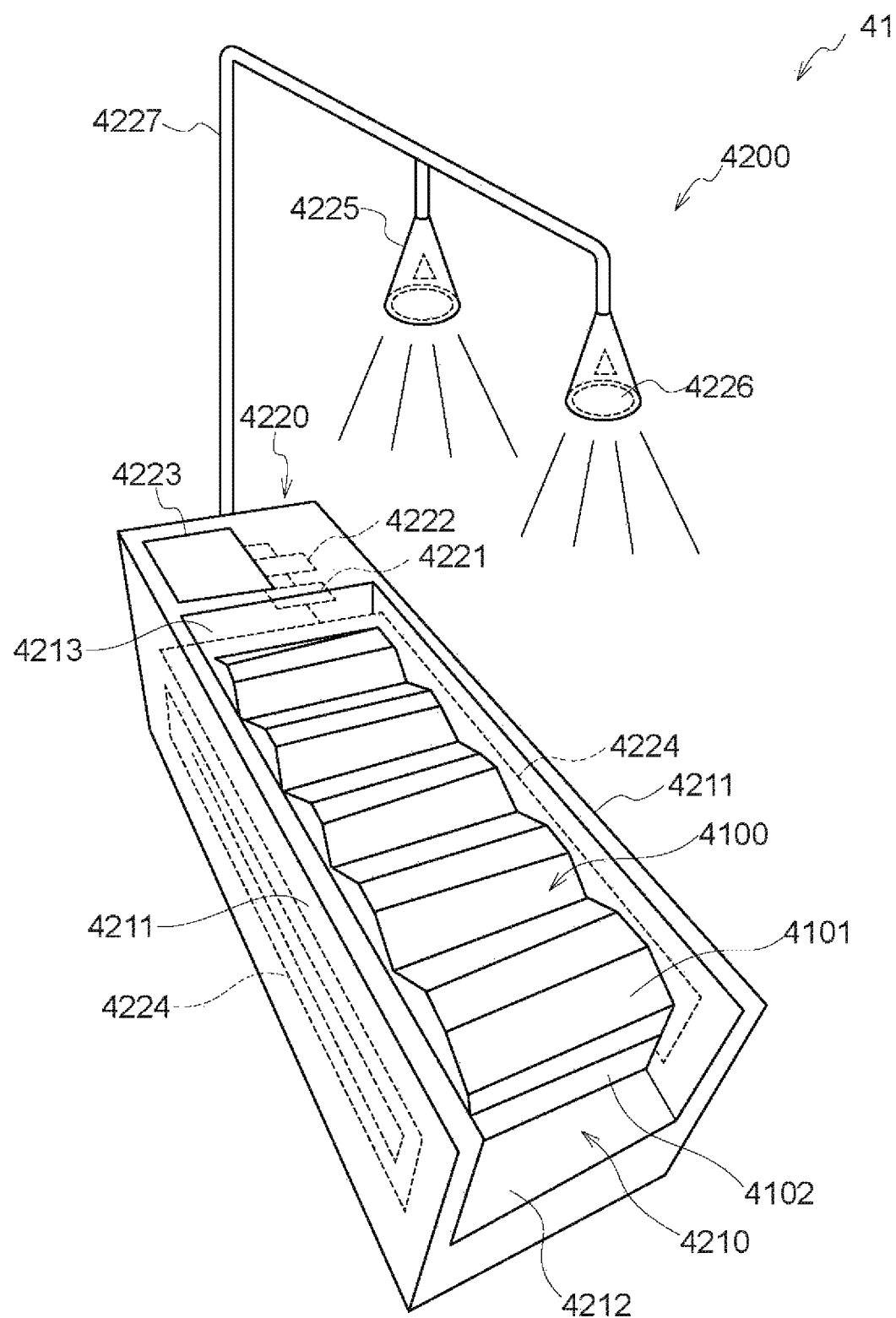
FIG. 25 is a diagram showing a configuration of an inspection system in a fourth embodiment.

FIG. 25 is a diagram showing a configuration of an inspection system in the fourth embodiment. An inspection system 41 is composed of a case 4100 for housing gaming currencies in stacked state, and an inspection device 4200 which inspects the plural gaming currencies stacked and housed in the case 4100 while being housed in the case 4100.

The case 4100 has a generally rectangular parallelepiped shape, and is made of a transparent resin. In the case 4100, disc-shaped gaming currencies C are housed while being stacked. In the case 4100, five columns, each for housing 20 gaming currencies C, are formed, and 100 gaming currencies C in total can be housed. The case 4100 can be carried (portable) while housing the gaming currencies C. The case 4100 is composed of a top part 4101 and a lower part 4102 which are separable, and by separating the top part 4101 and the lower part 4102, it becomes possible to house the gaming currencies C in the case 4100 and take out the gaming currencies C from the case 4100.

An inspection device 4200 is composed of a receiving part 4210 and a main body part 4220. The inspection device 4200 can receive the case 4100 with the receiving part 4210. The receiving part 4210 has a rectangular parallelepiped shape where an approximate top surface and a front surface are opened as a whole, is formed of right and left side walls 4211, a bottom part 4212, and a deep wall 4213, and has a width, a height, and a depth in which the case 4100 is just fitted.

The main body part 4220 is provided on a back side of the deep wall 4213 of the receiving part 4210, and comprises an RFID reader 4221, a computer 4222, and a display part 4223. The main body part 4220 is further provided with an infrared-ray camera 4225 and a visible-light camera 4226. The infrared-ray camera 4225 and the visible-light camera 4226 are attached to a tip of an arm 4227 so as to shoot side surfaces of the gaming currencies C housed in the case 4100 from a top surface side of the case 4100 housed in the receiving part 4210.

To the computer 4222, the RFID reader 4221, the display part 4223, the infrared-ray camera 4225, and the visible-light camera 4226 are connected. To the RFID reader 4221, an RFID antenna 4224 is connected. The RFID antenna 4224 extends from the RFID reader 4221, and spirally extends in the right and left side walls 4211. That is, in the inside of each of the right and left side walls 4211, the spiral RFID antenna 4224 is laid, and each RFID antenna 4224 is connected to the RFID reader 4221.

The display part 4223 is configured by a liquid crystal panel. Note that the liquid crystal panel may be provided with a touch sensor, and the display part 4223 may be configured as a touch panel.

Figure 26:
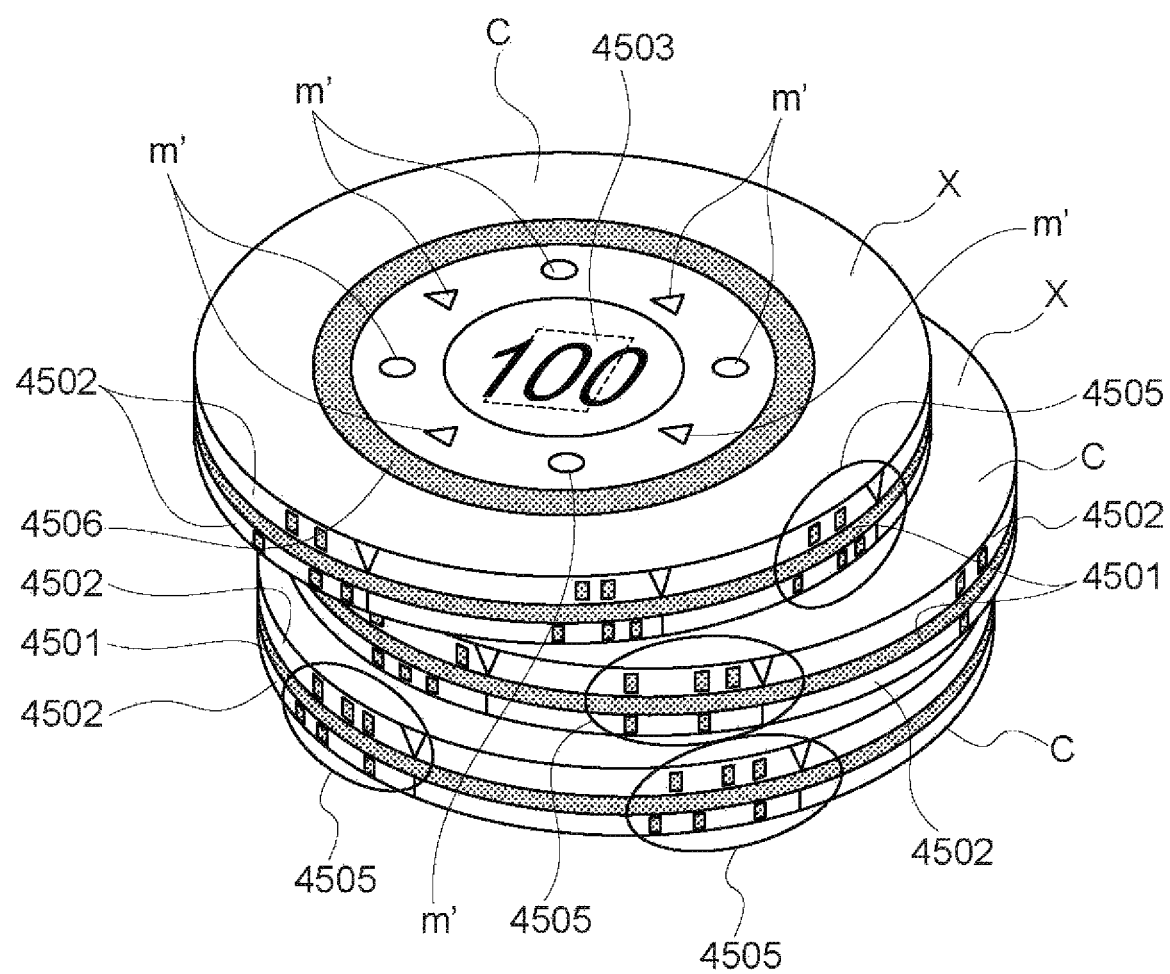
FIG. 26 is a perspective view of a gaming currency in the fourth embodiment.
Figure 27:
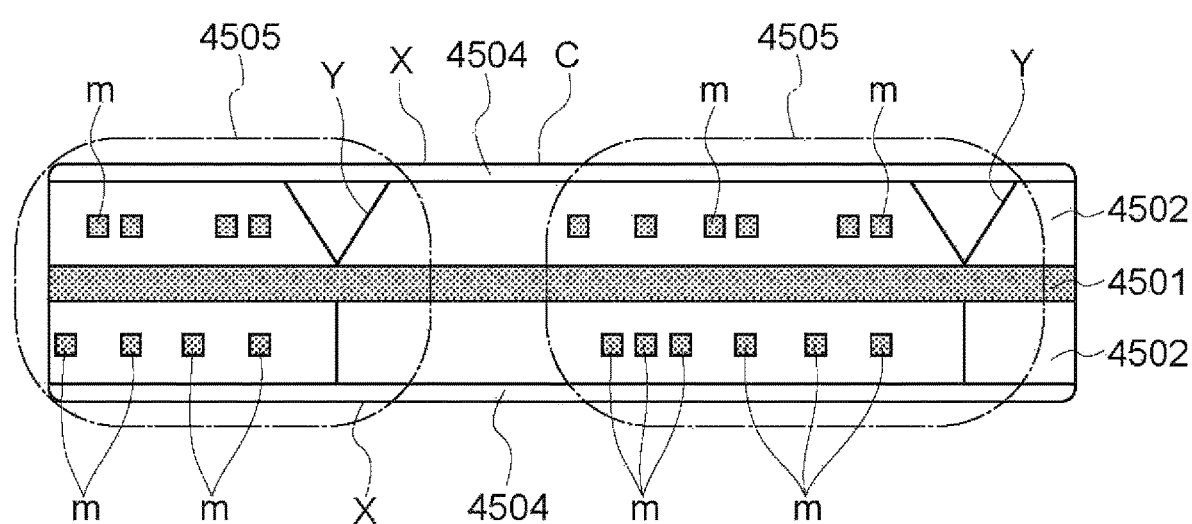
FIG. 27 is a side view of the gaming currency in the fourth embodiment.

FIG. 26 is a perspective view of the gaming currency C in the fourth embodiment, and FIG. 27 is a side view of the gaming currency C in the fourth embodiment. The gaming currency C includes a specific coloring layer 4501 characterized by a specific color at a middle part. On both side (upper and lower sides in FIG. 27) in a thickness direction of the middle specific coloring layer 4501, common coloring layers 4502 characterized by a common color are included, thereby forming a striped pattern (in the thickness direction) on the side surface.

Between the specific coloring layer 4501 and the one common coloring layer 4502 of the gaming currency C, the RFID tag 4503 is inserted as a radio tag. The RFID tag 4503 stores, for example, individual identification information for individually identifying (uniquely specifying) the gaming currency C and information on values (kinds), as currency information of the gaming currency C. A transparent layer 4504 is provided at the most outer layer of the gaming currency C. That is, the gaming currency C has the specific coloring layer 4501 that is the middle layer, the common coloring layers 4502 sandwiching the specific coloring layer 4501 from both surfaces, and transparent layers 4504 which are the most outer layers of both sides.

The gaming currency C is formed by long and thin elongated five layers (in the order of the transparent layer 4504, the common coloring layer 4502, the specific coloring layer 4501, the common coloring layer 4502, and the transparent layer 4504) of plastic material, disposing the RFID tags 4503 at predetermined intervals between the specific coloring layer 4501 and the one common coloring layer 4502 at that time, thermocompression bonding the five layers of the plastic material, and then punching that in a circular or rectangular shape by pressing and the like so that one gaming currency C includes one RFID tag 4503. When punching by pressing, R machining (a rounded corner) is applied at an edge of the most outer transparent layer 4504 by designing the dimensions of die and punch for a mold for punching.

Three layers composed of the specific coloring layer 4501 and two layers of the common coloring layers 4502 are thermocompression bonded, then varnish is applied on surfaces, and thus the transparent layers 4504 may be formed. Also, the specific coloring layer 4501 and the two common coloring layers 4502 need not be separate members, and after being integrally formed, the specific color (and the common color) may be applied on the side surface by inkjet printing and the like, thereby forming the specific coloring layer 4501 and the common coloring layers 4502.

The specific coloring layer 4501 expresses values (kinds) of the gaming currencies C with a color (the specific color). That is, since the color of the specific coloring layer 4501 is made to be different colors (red, green, yellow, blue, etc.) for the respective values of the gaming currencies C, by checking the color of a specific coloring layer 501 that can be optically read from the side surface of the gaming currency C, the value (such as 10 points, 20 points, 100 points, 1000 points, etc.) of the gaming currency C can be specified. On the common coloring layers 4502, the common color (common color) is applied on the gaming currencies C having different values. The common color is preferably lighter than any specific color, and it is white in the present embodiment.

On the side surface of the gaming currency C, furthermore, on the side surface (specifically, on the common coloring layers 4502 of the side surface), code information 4505 representing the currency information of the gaming currency C is indicated. The code information 4505 expresses the information according to the layout of plural labels (they may be referred to as marks and are square labels in the present embodiment). The specific coloring layer 4501 represents the information (the value of the gaming currency C) with the color, whereas, the code information 4505 expresses the information with the label indicated on the side surface, so that it may be referred to as indication information. Other examples of the indication information include plural character strings, number strings, bar codes, and the like.

The code information 4505 of the present embodiment is repeatedly indicated at a cycle of 60 degrees in a circumferential direction of the gaming currency C. Thereby, when the side surface of the gaming currency C is observed in the circumferential direction from any direction, the complete code information 4505 is included in a range of 120 degrees in the circumferential direction. Note that the repeating cycle of the gaming currency C is not limited to 60 degrees, and the code information 4505 may be repeatedly indicated at equal intervals in the circumferential direction at least three times.

The code information 4505 is indicated by invisible ink. In the present embodiment, by using the infrared-ray absorbing ink for absorbing infrared rays (specifically, carbon black) as the invisible ink, the code information 4505 is printed by inkjet printing. Since only the printed part of the code information 4505 does not reflect infrared rays, by shooting the side surface of the gaming currency C with the infrared-ray camera 4225, the code information 4505 will emerge. Note that in order to make the printed part clearly emerge, the infrared-ray camera 4225 may include an infrared-ray lamp and irradiates infrared rays to the side surface of the gaming currency C to be shot.

Note that the invisible ink is not limited to the infrared-ray absorbing ink, but may be an infrared-ray responsive ink that fluoresces in response to infrared rays or a UV ink that fluoresces in response to ultraviolet rays. In the case of using the UV ink, an ultraviolet-ray camera is used instead of the infrared-ray camera 4225, and in order to cause the UV ink to fluoresce, a black light irradiating ultraviolet rays to the side surface of the gaming currency C is used.

Furthermore, the gaming currency C is provided with a label (mark) m' by the UV ink or the carbon black ink on a surface X of the common coloring layer 4502. The label m' represents the authenticity of the gaming currency C, and upon irradiation with ultraviolet rays (or infrared rays), the label m' becomes visible and represents a genuine one by the combination of its shapes or numbers. In order to cover printing 4506 (100 points and the like) for specifying a gaming house or the label m' on the surface, although the transparent layer 4504 is thermocompression bonded or coated (applied) on the outermost layer, embossing or varnishing is performed on the transparent layer 4504, thereby preventing the gaming currencies from adhering to each other and improving slippage.

R machining (R) is performed on an edge of the transparent layer 4504 of the outermost layer which has been subjected to the printing 4506 (100 points and the like), thereby preventing the surface of the common coloring layer 4502 from deforming and appearing on the side surface, in a punching process of the gaming currency C. Also, a sharp edge of the gaming currency C is prevented from damaging a remaining hand or other gaming currencies C. The specific coloring layer 4501 may be formed by one or more colored layers. Furthermore, metals and ceramics for increasing weight may be interiorized in the layer in the specific coloring layer 4501. Also, the RFID tag 4503 may be built by hollowing out a part of the specific coloring layer 4501, or in a space provided between the specific coloring layer 4501 and the common coloring layer 4502.

Figure 28:
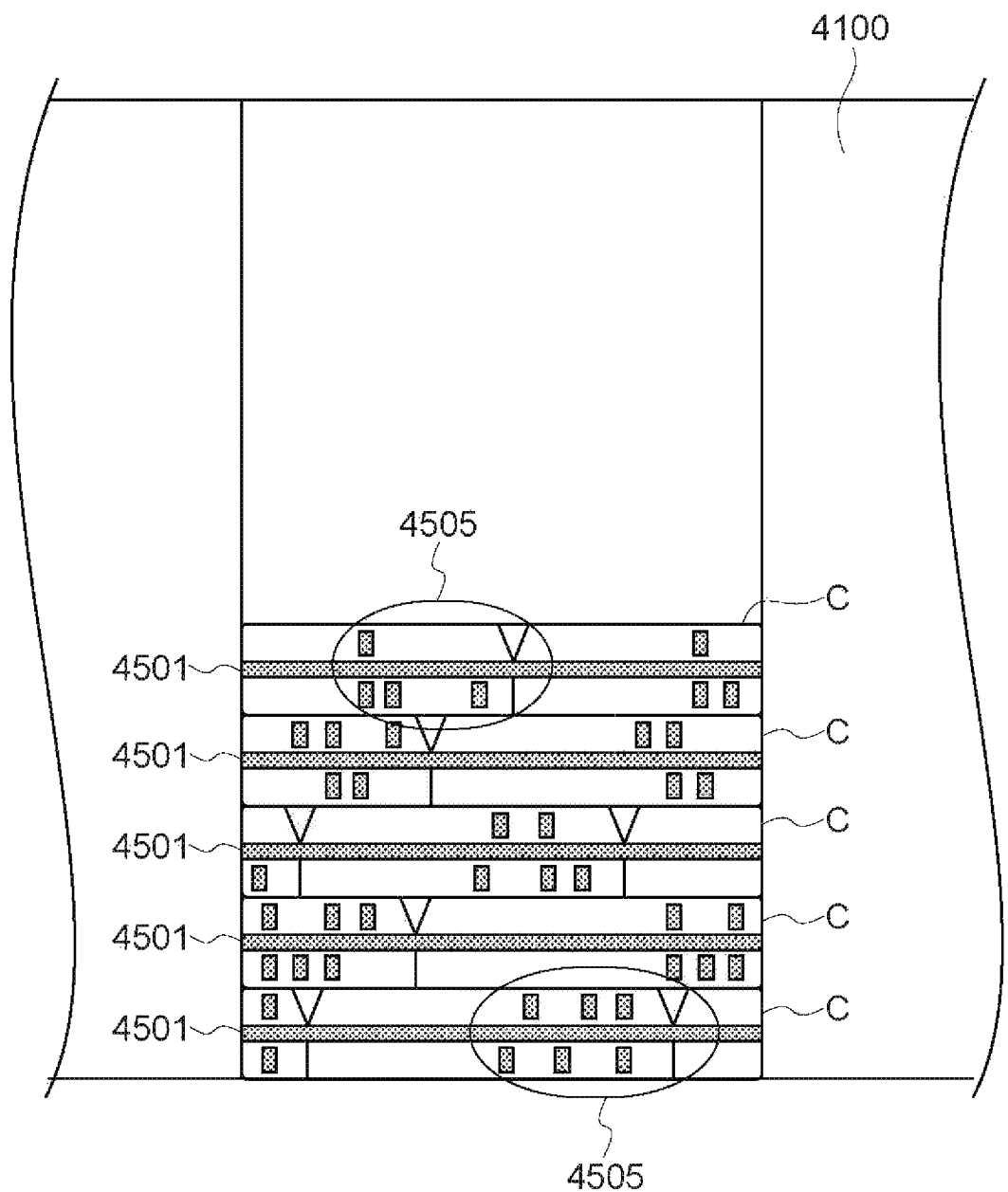
FIG. 28 is a diagram showing an example of an image obtained by shooting the plural gaming currencies in the fourth embodiment.

FIG. 28 is a diagram showing an example of an image obtained by shooting the plural gaming currencies C housed in the case 4100 with the infrared-ray camera 4225 and the visible-light camera 4226. The case 4100 in this case may be a two-stage chip float (especially a movable upper tray part in a two-stage chip tray) or a chip tray for holding the gaming currencies C on a game table. Even if the gaming currencies C are vertically stacked in the case 4100 as shown in FIG. 28, the infrared-ray camera 4225 and the visible-light camera 4226 can shoot the code information 4505. Also, by vertically counting the specific coloring layers 4501, it is possible to count the number of the gaming currencies C. Even in a two-stage system, by developing each stage, it is possible to shoot the side surfaces of all gaming currencies C housed in the case 4100 with the infrared-ray camera 4225 and the visible-light camera 4226.

Figure 29:
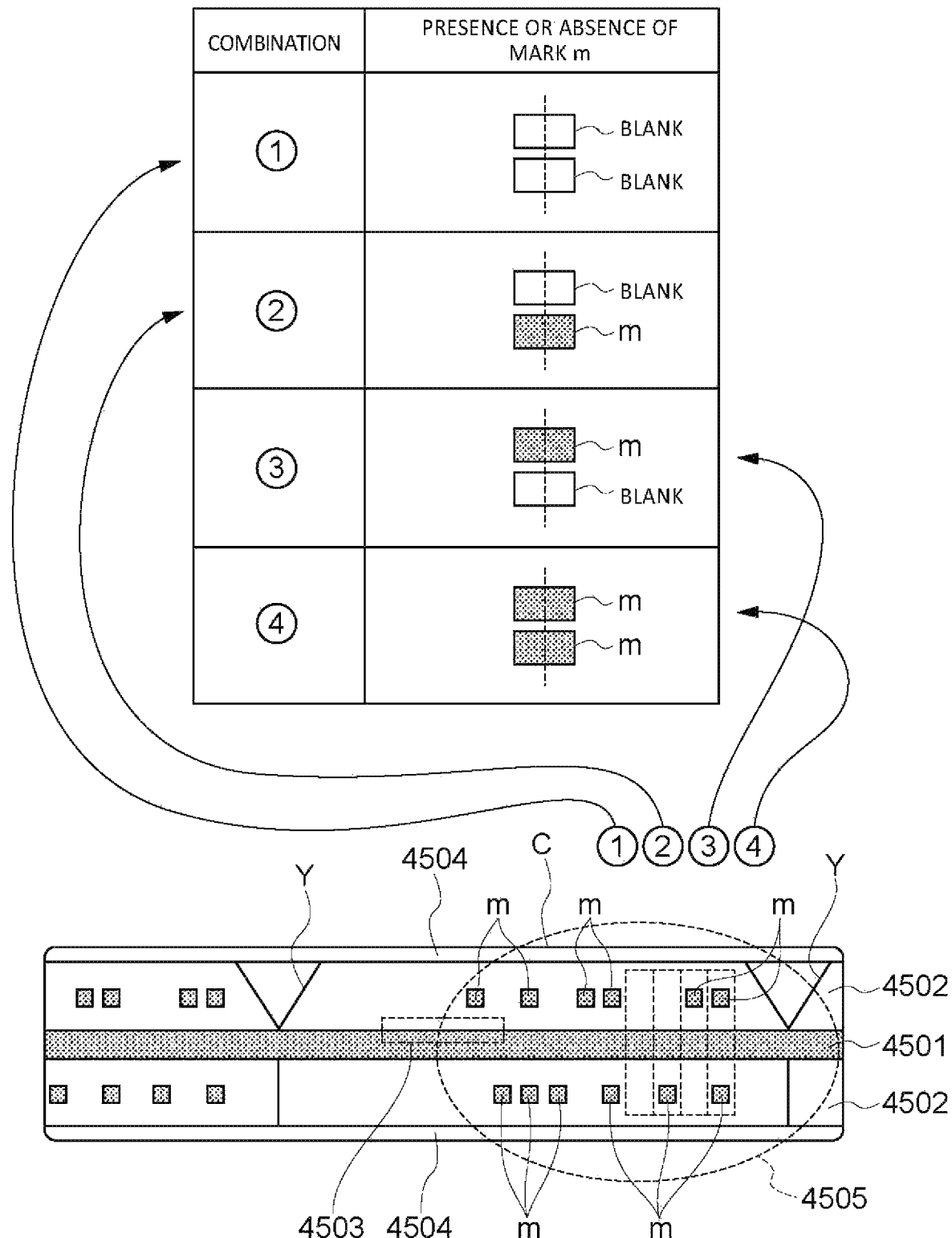
FIG. 29 is a diagram for explaining a configuration of code information in the fourth embodiment.

In the present embodiment, the code information 4505 is expressed by the layout of the labels m with multiple rows and multiple columns. FIG. 29 is a diagram for explaining a configuration of the code information 4505. As shown in FIG. 29, the upper and lower labels m make a pair to form one code element. In the example of FIG. 29, one piece of the code information 4505 is composed of ten-digit code elements. As shown in FIG. 29, there are four patterns in the one code element formed by the upper and lower labels m making the pair, and one code element can express four types of information, so that the code information 4505 composed of the ten-digit code element can express 4 to the tenth power kinds of information. A letter Y next to the ten-digit code element is an orientation discrimination mark Y for discriminating the orientation of the code information 4505.

Figure 30:
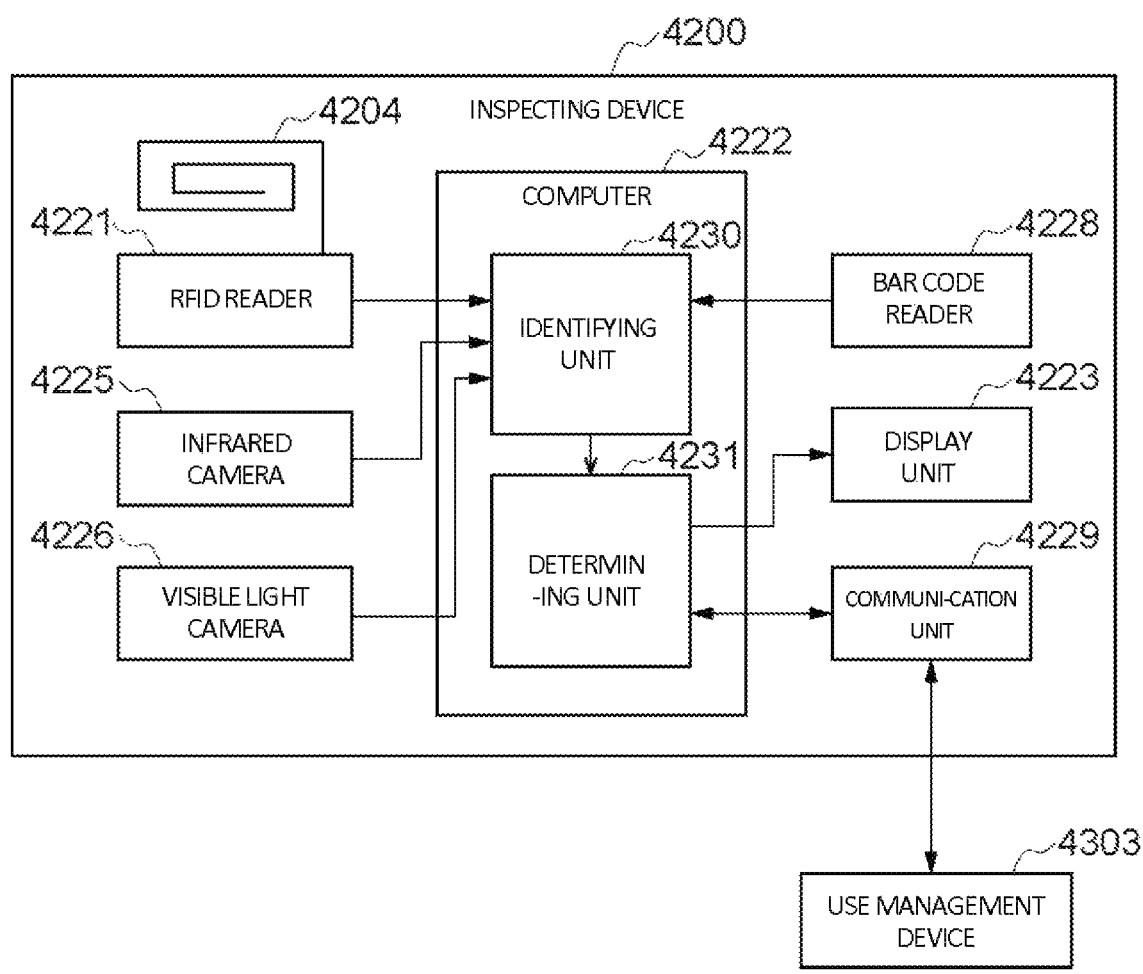
FIG. 30 is a block diagram showing a configuration of the inspection device in the fourth embodiment.

FIG. 30 is a block diagram showing a configuration of the inspection device 4200.

The inspection device 4200 includes a barcode reader 4228 and a communication part 4229, in addition to the RFID reader 4221, the computer 4222, the display part 4223, the RFID antenna 4224, the infrared-ray camera 4225, and the visible-light camera 4226 which are shown in FIG. 25. Also, the computer 4222 is composed of a processor, a memory, and the like which are not shown, and the processor executes an inspection program to configure an identification part 4230 and the determination part 4231.

An RFID system is composed of the RFID reader 4221, the RFID antenna 4224, and the RFID tag 4503 embedded in the gaming currency C. The currency information of the gaming currency C stored in the RFID tag 4503 embedded in the gaming currency C is read out by the RFID reader 4221 without contacting, and used for processing in the computer 4222.

The infrared-ray camera 4225 includes an infrared-ray transmission filter transmitting infrared rays only, and picks up an infrared-ray image. The infrared-ray image produced by the shooting of the infrared-ray camera 4225 is sent to the computer 4222, and is subjected to the processing of the identification part 4230. The visible-light camera 4226 picks up an image of light in a visible area. Also, the visible-light image produced by the visible-light camera 4226 is sent to the computer 4222, and is subjected to the processing of the identification part 4230. As shown in FIG. 25, the infrared-ray camera 4225 and the visible-light camera 4226 are oriented to the case 4100 from an upper part of the case 4100, and shoot the side surfaces of the plural gaming currencies C in the case 4100 over the top part 4101 of the case 4100.

The barcode reader 4228 reads a barcode BC attached to the case 4100 to obtain case identification information described below. The display part 4223 displays a determination result of the determination part 4231 of the computer 4222. The communication part 4229 performs data communication with a manufacture management device 4302 installed in a factory F or a use management device 4303 installed in a gaming house P.

Figure 31:
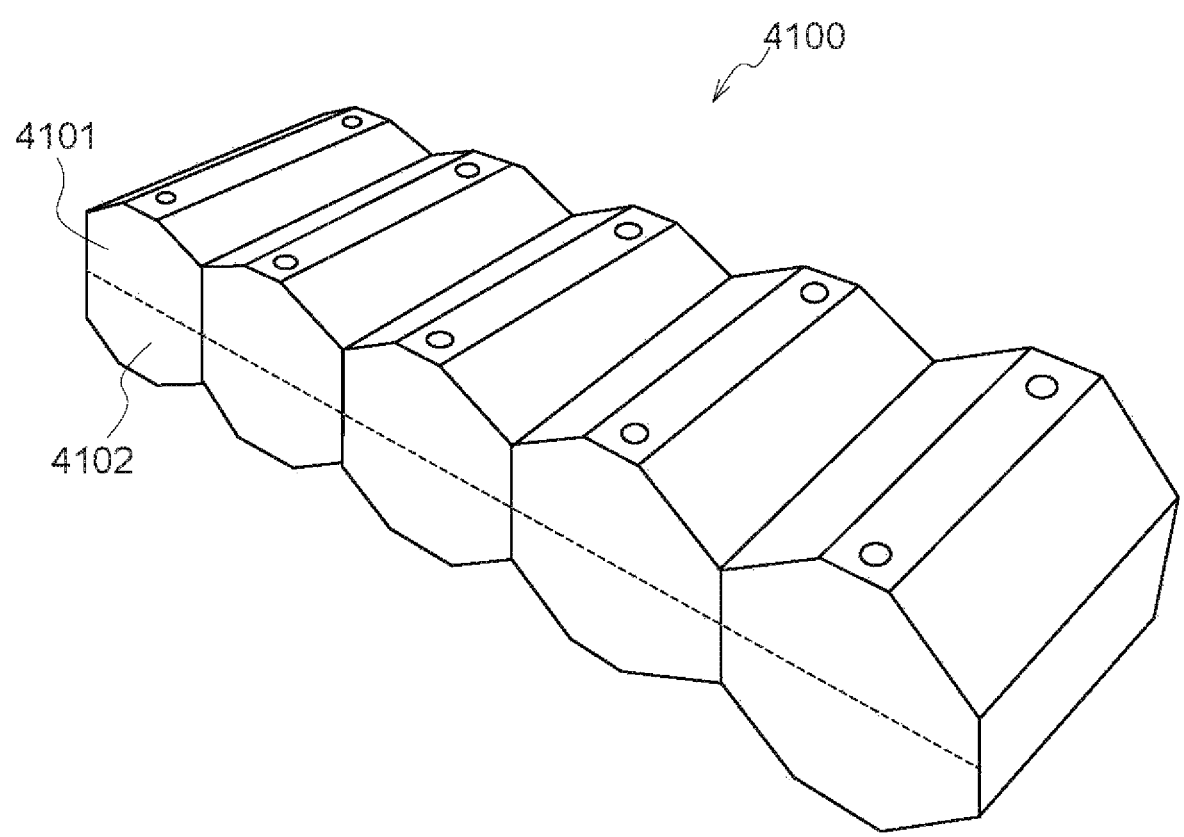
FIG. 31 is a perspective view of a case in the fourth embodiment.

FIG. 31 is a perspective view of the case 4100. The case 4100 is formed by joining the top part 4101 and the lower part 4102. In the present embodiment, the top part 4101 and the lower part 4102 are made of a transparent resin. As described above, in inspection device 4200 of the present embodiment, since the infrared-ray camera 4225 and the visible-light camera 4226 (hereinafter, simply referred to as a camera) are installed above the receiving part 210, it is necessary that at least the upper surface of the case 4100 transmits light. That is, in the case 4100, it is necessary that a part positioned between the case 4100 and the camera when being received in the receiving part 4210 of the inspection device 4200 is a light transmission part which transmits light. Note that in the present embodiment, although the case 4100 is a sealed structure composed of the top part 4101 and the lower part 4102, the light transmission part may be in a perforated state.

The case 4100, as described above, has a shape formed with five columns in which respective 20 gaming currencies C are stacked and housed, in parallel, and in an example of FIG. 31, a cross section of each column is polygon (octagon) so that the top part 4101 and the lower part 4102 generally conform the shape of the gaming currencies C to be housed.

Figure 32:
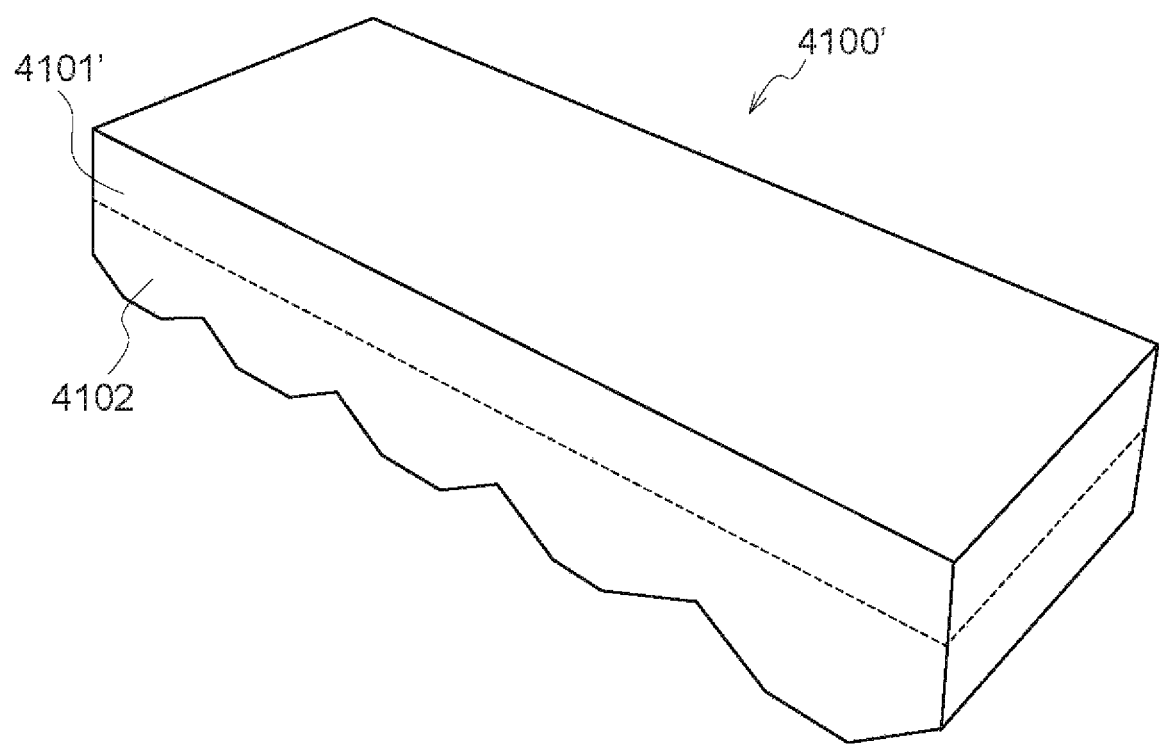
FIG. 32 is a perspective view of a case in a modification example in the fourth embodiment.
Figure 33:
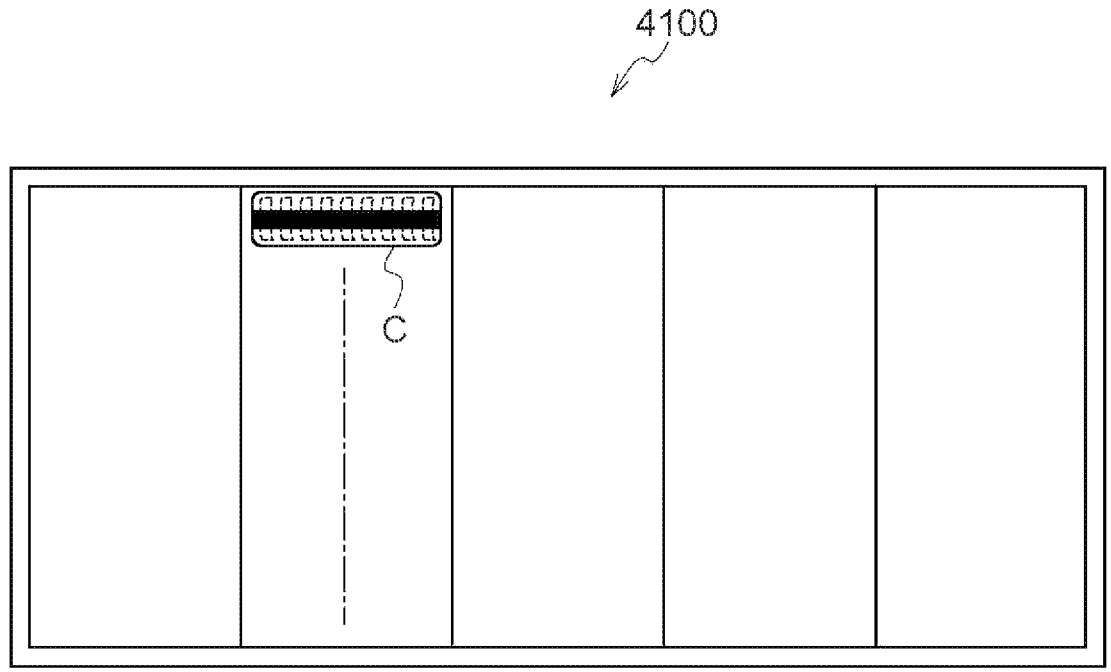
FIG. 33 is a plan view of the case in the modification example in the fourth embodiment.

FIG. 32 is a perspective view of the case 4100' of a modification, and FIG. 33 is a plan view of the case 4100'. Also, the case 4100' is composed of a top part 4101' and a lower part 4102 which are made of a transparent resin. In the present modification, an upper surface of the top part 4101' facing the camera is formed by a plane. Thus, by making the surface facing the camera plane, as shown in FIG. 33, linear shadows due to corners of the polygonal cross section of the case 4100' do not appear on the camera, and information of the side surface of the gaming currency C can be accurately identified, in an image analysis with respect to a shooting image of the camera.

Figure 34:
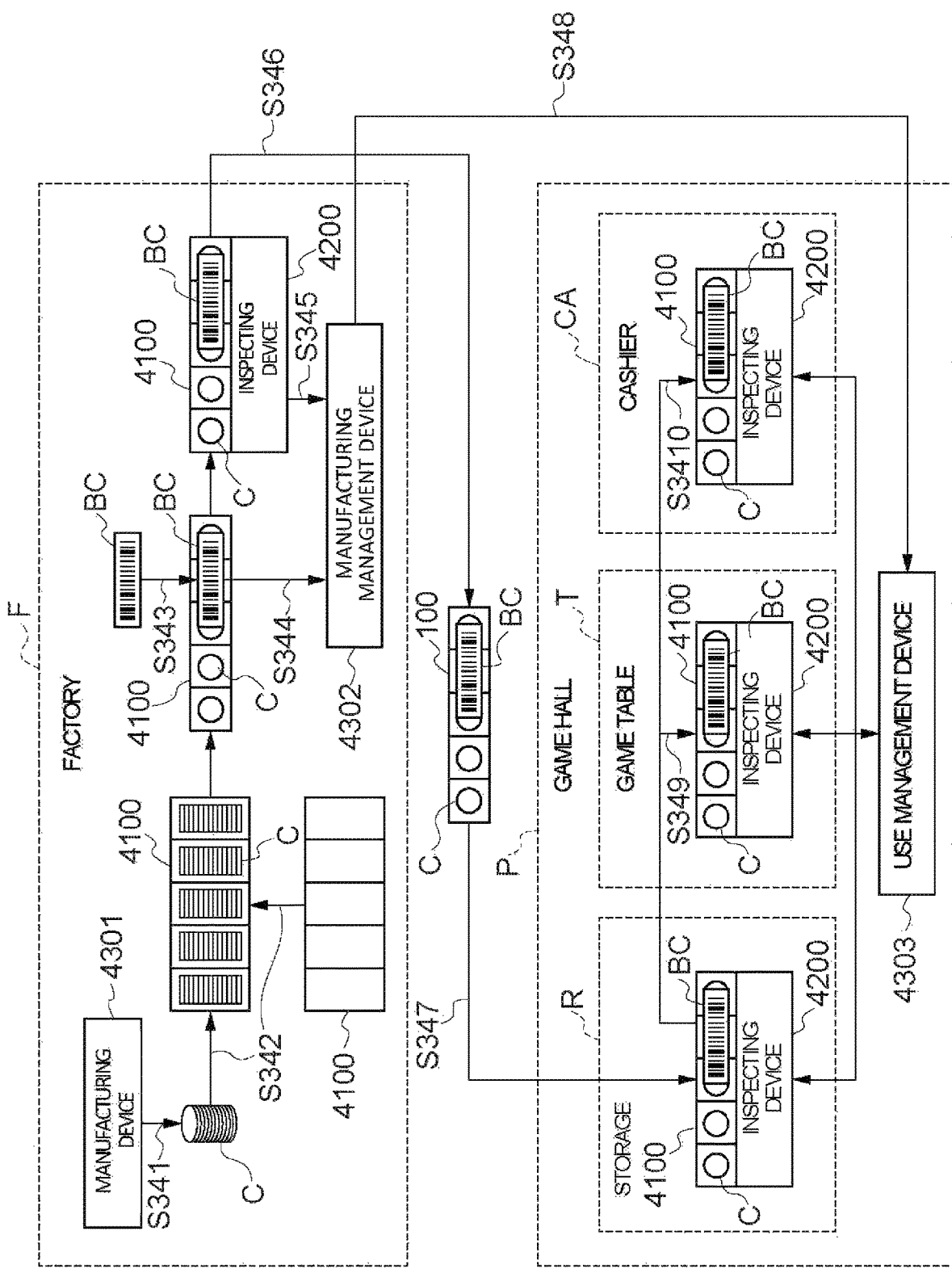
FIG. 34 is a diagram for explaining an example of a usage aspect of an inspection system together with distribution of gaming currencies in the fourth embodiment.

FIG. 34 is a diagram for explaining an example of a usage aspect of the inspection system 41 together with the distribution of the gaming currencies C. The gaming currencies C are manufactured by a manufacturing device 4301 in the factory F (s1), and respective 100 currencies are housed in the case 4100 (s2). The case 4100 is stamped with a stamp seal in the factory F after housing the gaming currencies C. Also, in the case 4100, the barcode BC indicating the case identification information for uniquely specifying the case 4100 is affixed to the side surface (s3).

At that time, in the manufacture management device 4302 in the factory F, the case identification information of the barcode BC affixed to the case 4100 is input (s4). Also, the case 4100 housing the gaming currencies C is subjected to the inspection device 4200 to read currency information (the details will be described below) given to the gaming currencies C, and the inspection of pass or fail is performed. Then, the currency information read from the gaming currencies C housed in the case 4100 is sent to the manufacture management device 4302 (s5), and are associated with the case identification information by the manufacture management device 4302. Note that the manufacture management device 4302 may be a personal computer.

The case 4100 which has been passed in the inspection device 4200 in the Factory F is transported from the factory F to the gaming house P (s6). The case 4100 is firstly stored in a repository R in the gaming house P (s7). The inspection device 4200 is installed in the repository R, and the case 4100 delivered from the factory F is inspected by the inspection device 4200.

On the other hand, from the manufacture management device 4302 in the factory F, the case identification information and the currency information associated with that are sent to the use management device 4303 in the gaming house P. The use management device 4303 includes a storage part which obtains the case identification information and the currency information associated with that from the manufacture management device 4302, for each of the plural cases 4100 housing the gaming currencies C, and stores them for each case 4100. Note that the use management device 4303 may be a personal computer.

In inspection by the inspection device 4200 in the repository R, the inspection is performed by using the information stored in the use management device 4303. The case 4100 which has been passed in the inspection in the repository R is carried to a game table T (s9), or is carried to a cashier CA (s10). The game table T and the cashier CA respectively comprise the inspection devices 4200, and the case 4100 housing the gaming currencies C is inspected by the inspection devices 4200 while being stamped. In the game table T and the cashier CA, the inspection of the case 4100 housing the gaming currencies C which have been used is also performed, and the inspection devices 4200 are used for the inspection. In inspection in the three inspection devices 4200 in the gaming house P, the case identification information and the currency information associated with that sent from the manufacture management device 4302 and stored in the use management device 4303 are referred to.

Figure 35:
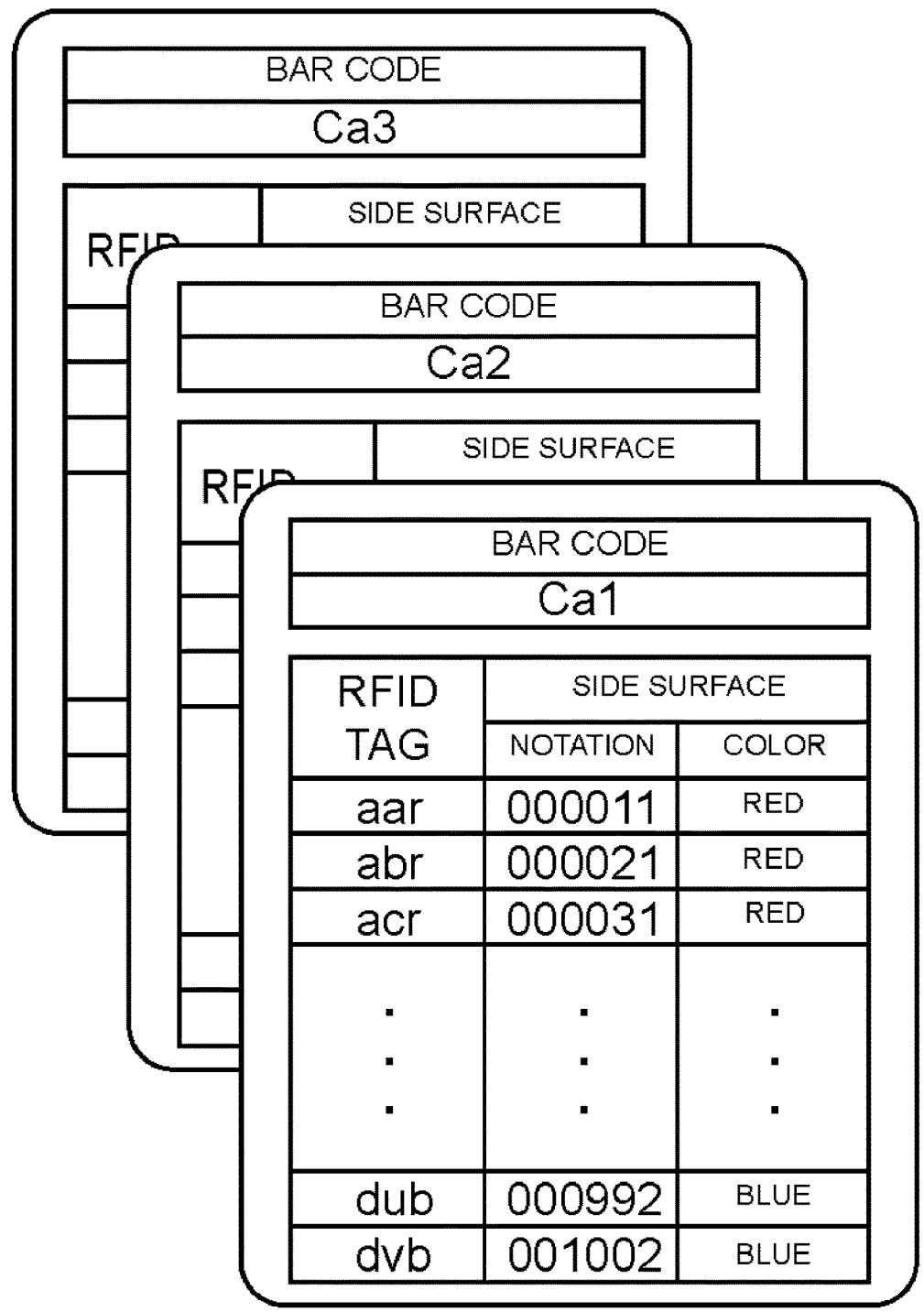
FIG. 35 is a diagram showing an example of contents of information stored in a use management device in the fourth embodiment.

FIG. 35 is a diagram showing an example of content of information which is generated by the manufacture management device 4302, is sent to the use management device 4303, and is stored in the use management device 4303. The information is generated for each case 4100, and with each of the case identification information (Ca1, Ca2, Ca3 . . . ), the currency information of the plural (100 in the present embodiment) gaming currencies C housed in the case 4100 is associated.

As the currency information, the RFID tag 4503 stores information made from the combination of individual identification information (aa, ab, ac, . . . , du, and dv) which uniquely specifies the gaming currency C and information (r, r, r, . . . , b, and b) which specifies the value (kind) of the gaming currency C. Indication information on the side surface stores information made from the combination of individual identification information (00001, 00002, 00003, . . . , 00099, and 00100) which uniquely specifies the gaming currency C and information (1, 1, 1, . . . , 2, and 2) which specifies the value (kind) of the gaming currency C. Color information of the side surface stores information (red, red, red, . . . , blue, and blue) which specifies the value (kind) of the gaming currency C.

The information stored in the RFID tag 4503 is information that is electromagnetically readable by the RFID reader 4221, and the indication information and the color information corresponding to the first currency information of the present embodiment and given to the side surface are optically readable information and correspond to the second currency information of the present embodiment.

FIG. 36 is a diagram showing an example of contents of information respectively obtained from one case 4100 by the barcode reader 4228, the RFID reader 4221, the infrared-ray camera 4225, and the visible-light camera 4226, in the inspection device 4200. From the RFID reader 4221, English character strings stored in the RFID tags 4503 built in the plural gaming currencies C are read out. From the infrared-ray camera 4225, number stings which are indication information indicated on the side surfaces are read out. Also, from the visible-light camera 4226, colors of the side surfaces are read out. The identification part 4230 analyzes (an image of) the number strings that are read out from the infrared-ray camera 4225 to identify numbers and specify information made from the number strings, and specifies a specific color from an image of the side surfaces read out from the visible-light camera 4226.

Here, although the indication information and the information of the specific color of the side surfaces of the plural gaming currencies C can be obtained according to the aligning order of the gaming currencies C in the case 4100, the information obtained from the plural RFID tags 4503 cannot be obtained according to the aligning order of the gaming currencies C. That is, it is impossible to specify from which gaming currency C the information of the RFID tag 4503 is obtained.

Next, a method of determining pass or fail in the computer 4222 of the inspection device 4200 will be described. As described above, the identification part 4230 specifies the currency information stored in the RFID tags 4503 of the plural gaming currencies C housed in the case 4100, based on the reading result of the RFID reader 4221, analyzes the infrared-ray image obtained by the infrared-ray camera 4225 to specify the currency information indicated by the indication information, and analyzes the visible-light image obtained by the visible-light camera 4226 to specify the color of the specific coloring layer 4501. The determination part 4231, based on the information, determines authenticity/damage or a number for each value of all of the gaming currencies existing in the case 4100 to determine the pass or fail of the case 4100. In the following description, the currency information stored in the RFID tag 4503 is referred to as the first currency information, and the indication information and the information of the color of the specific coloring layer 4501 given to the side surface of the gaming currency C is referred to as the second currency information.

Figure 37:
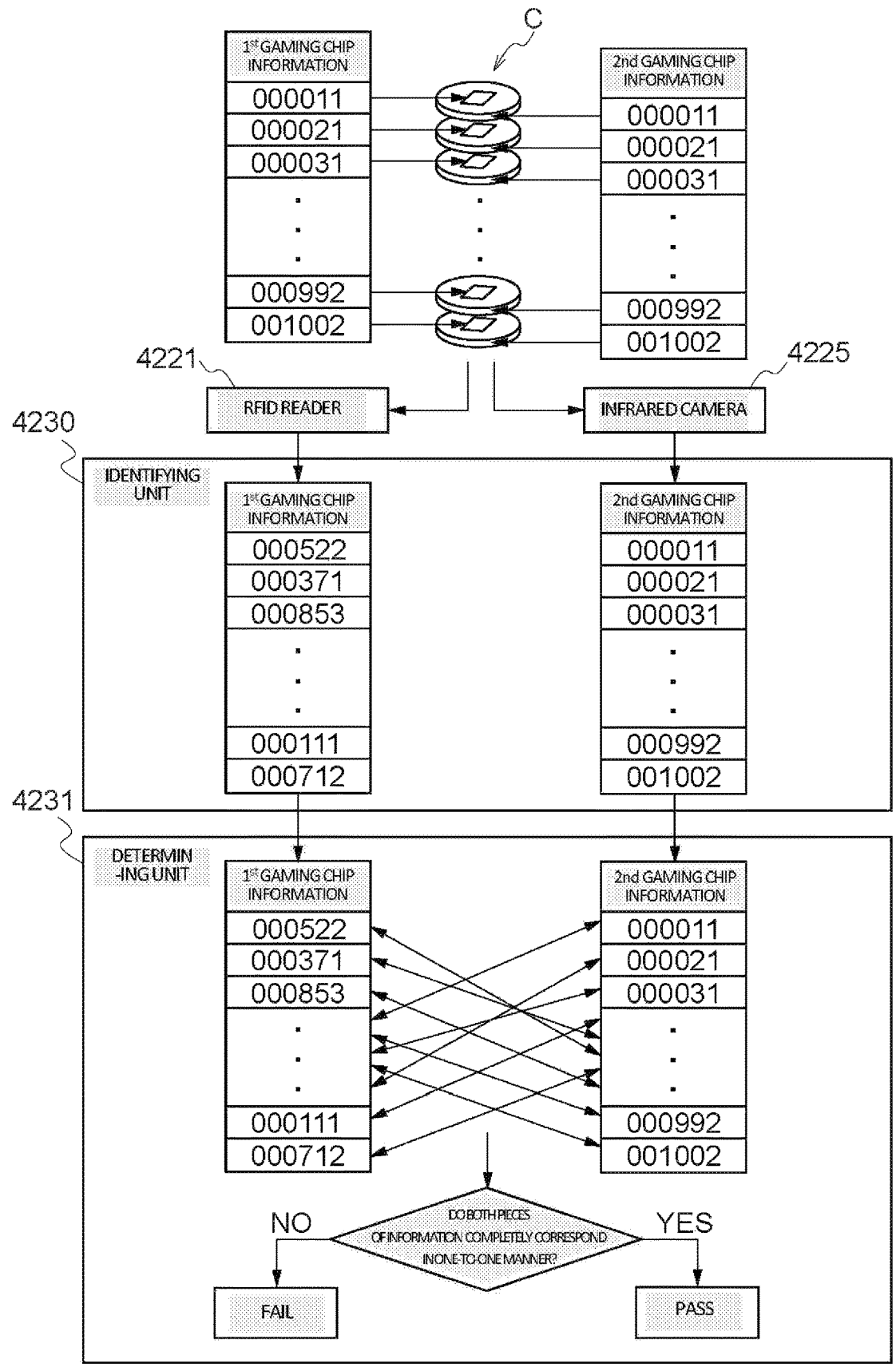
FIG. 37 is a diagram for explaining a first method of determining pass or fail in the fourth embodiment.

In a first method of determining pass or fail, as shown in FIG. 37, the first currency information and the second currency information in the same gaming currency C are made to be the same information. In an example of FIG. 37, the first currency information is information made from the individual identification information and the value information of each gaming currency C, and the same content as this is indicated on the side surface in a form of the indication information as the second currency information.

The RFID reader 4221 reads out the first currency information from the RFID tag 4503 of the gaming currency C to output that to the identification part 4230, the infrared-ray camera 4225 shoots the side surface of the gaming currency C, and the identification part 4230 specifies the second currency information. In this case, in the identification part 4230, the correspondence relationship between the plural pieces of the first currency information and the plural pieces of the second currency information is unknown.

The determination part 4231 compares the plural pieces of the first currency information and the plural pieces of the second currency information obtained by the identification part 4230, and if they correspond one by one completely, namely, if all of the first currency information are equal to any one of the second currency information without overlapping, determines the plural gaming currencies C housed in the case as passed. The determination part 4231, if the plural piece of the first currency information and the plural pieces of the second currency information obtained by the identification part 4230 are not completely equal to each other, determines the plural gaming currencies C housed in the case 4100 as failed.

As a case that the plural piece of the first currency information and the plural pieces of the second currency information obtained by the identification part 4230 are not completely equal to each other, it is considerable that any one of the gaming currencies C housed in the case 4100 is forged or that the RFID tag 4503 or the side surface of any one of the gaming currencies C is damaged. That is, the determination part 4231 determines the authenticity/damage of all of the gaming currencies C existing in the case 4100, thereby determining the pass or fail of the plural gaming currencies C housed in the case 4100.

(Second Method of Determining Pass or Fail)

Figure 38:
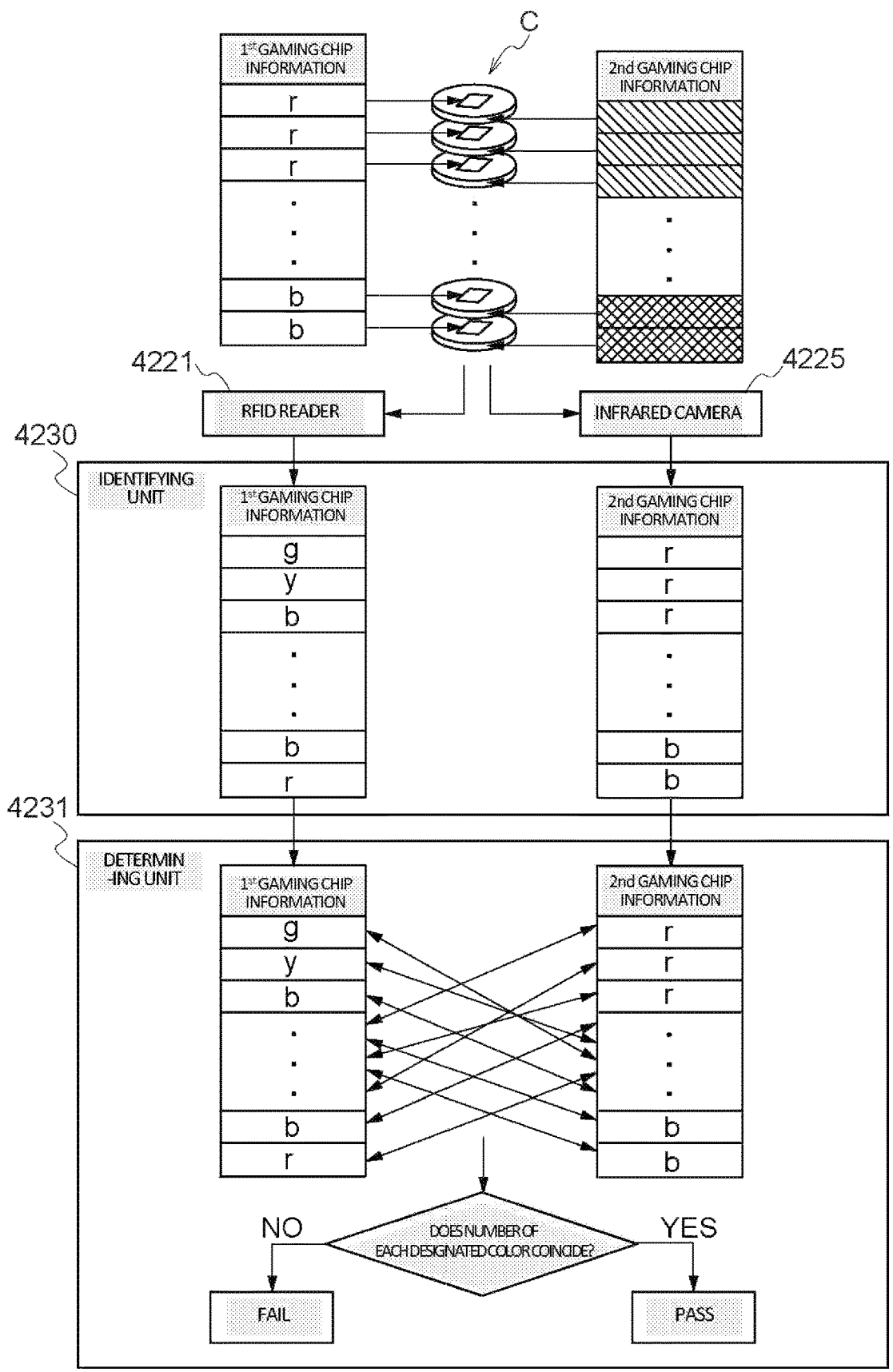
FIG. 38 is a diagram for explaining a second method of determining pass or fail in the fourth embodiment.

Also, in a second method of determining pass or fail, as shown in FIG. 38, the first currency information and the second currency information in the same gaming currency C are the same information. In an example of FIG. 38, the first currency information is the value information of each gaming currency C, and to each gaming currency C, the specific color is given as the second currency information to the specific coloring layer 4501 on the side surface.

The RFID reader 4221 reads out the first currency information from the RFID tag 4503 of the gaming currency C to output that to the identification part 4230, the visible-light camera 4226 shoots the side surface of the gaming currency C, and the identification part 4230 analyzes the image to specify the second currency information (the color of the specific coloring layer 4501).

In this case, in the identification part 4230, the correspondence relationship between the plural pieces of the first currency information and the plural pieces of the second currency information is unknown. Some of the plural pieces of the first currency information overlap each other, and some of the plural pieces of the second currency information overlap each other. Also, in the first currency information and the second currency information of FIG. 38, "r" represents red, "b" represents blue, "y" represents yellow, and "g" represents green, respectively.

The determination part 4231 determines the gaming currencies C as passed if the number of the respective specific colors (red, blue, yellow, and green) in the plural pieces of the first currency information obtained by the identification part 4230 is equal to the number of the respective specific colors (red, blue, yellow, and green) in the plural pieces of the second currency information, and determines that as failed if the numbers are not equal to each other.

As a case that the number of the respective specific colors in the first currency information is not equal to the number of the respective specific colors in the plural pieces of the second currency information, it is considerable that any one of the gaming currencies C housed in the case 4100 is forged or that the side surface of any one of the gaming currencies C is damaged. That is, the determination part 4231 determines a number for each value of all of the gaming currencies C existing in the case 4100, thereby determining the pass or fail of the plural gaming currencies C housed in the case 4100.

(Third Method of Determining Pass or Fail)

Figure 39:
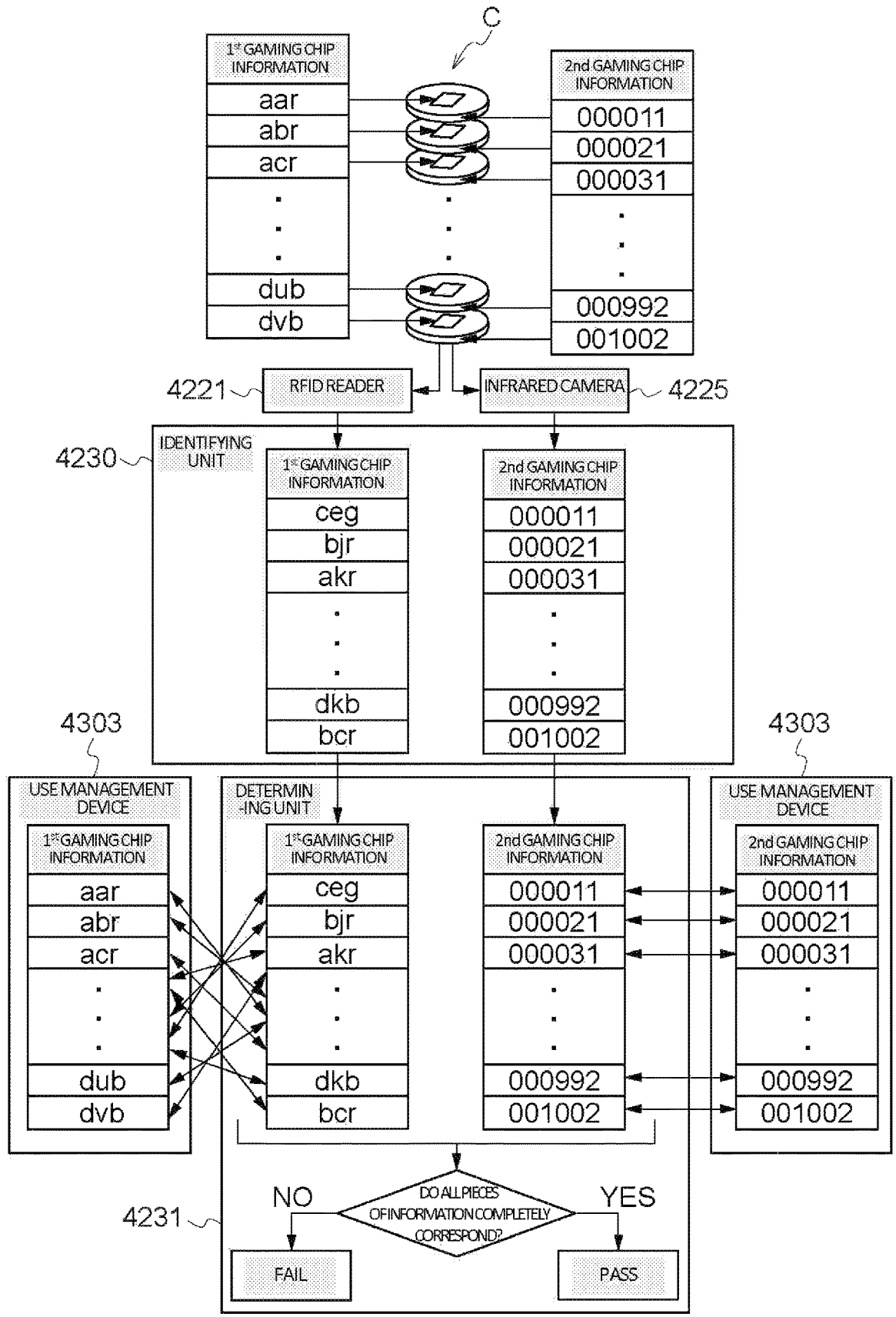
FIG. 39 is a diagram for explaining a third method of determining pass or fail in the fourth embodiment.

In the third method of determining pass or fail, as shown in FIG. 39, the first currency information and the second currency information in the same gaming currency C are different information. In an example of FIG. 39, in the RFID tag 4503 of the gaming currency C, information of English character strings is stored as the first currency information, and on the side surface of the gaming currency C, the indication information of number strings is indicated as the second currency information.

The RFID reader 4221 reads out the first currency information from the RFID tag 4503 of the gaming currency C to output that to the identification part 4230, the infrared-ray camera 4225 shoots the side surface of the gaming currency C, and the identification part 4230 specifies the second currency information. In this case, in the identification part 4230, the correspondence relationship between the plural pieces of the first currency information and the plural pieces of the second currency information is unknown.

In the use management device 4303, the first currency information and the second currency information are stored in association with the case identification information of the case 4100. The determination part 4231 compares the plural pieces of the first currency information obtained by the identification part 4230 to the plural pieces of the first currency information associated with the case identification information of the case 4100 stored in the use management device 4303, and judges whether or not they correspond one by one completely. Also, the determination part 4231 compares the plural pieces of the second currency information obtained by the identification part 4230 to the plural pieces of the second currency information associated with the case identification information of the case 4100 stored in the use management device 4303, and judges whether or not they correspond one by one completely.

The determination part 4231 determines the plural gaming currencies C housed in the case 4100 as passed if the plural pieces of the first currency information obtained by the identification part 4230 correspond to the plural pieces of the first currency information associated with the case identification information of the case 4100 stored in the use management device 4303 one by one completely, namely the plural pieces of the first currency information obtained by the identification part 4230 is equal to any one of the plural pieces of the first currency information associated with the case identification information of the case 4100 stored in the use management device 4303 without overlapping, and if the plural pieces of the second currency information obtained by the identification part 4230 correspond to the plural pieces of the second currency information associated with the case identification information of the case 4100 stored in the use management device 4303 one by one completely, namely, the plural pieces of the second currency information obtained by the identification part 4230 is equal to any one of the plural pieces of the currency information associated with the case identification information of the case 4100 stored in the use management device 4303 without overlapping, and determines the plural gaming currencies C housed in the case 4100 as failed if any one of the plural pieces of the first currency information is not equal to the information stored, or any one of the plural pieces of the second currency information is not equal to the information stored.

As a case that any one of the plural pieces of the first currency information is not equal to the information stored, or any one of the plural pieces of the second currency information is not equal to the information stored, it is considerable that any one of the gaming currencies C housed in the case 4100 is forged or that the RFID tag 4503 or the side surface of any one of the gaming currencies C is damaged. That is, the determination part 4231 determines the authenticity/damage of all of the gaming currencies C existing in the case 4100, thereby determining the pass or fail of the plural gaming currencies C housed in the case 4100.

(Fourth Method of Determining Pass or Fail)

Figure 40:
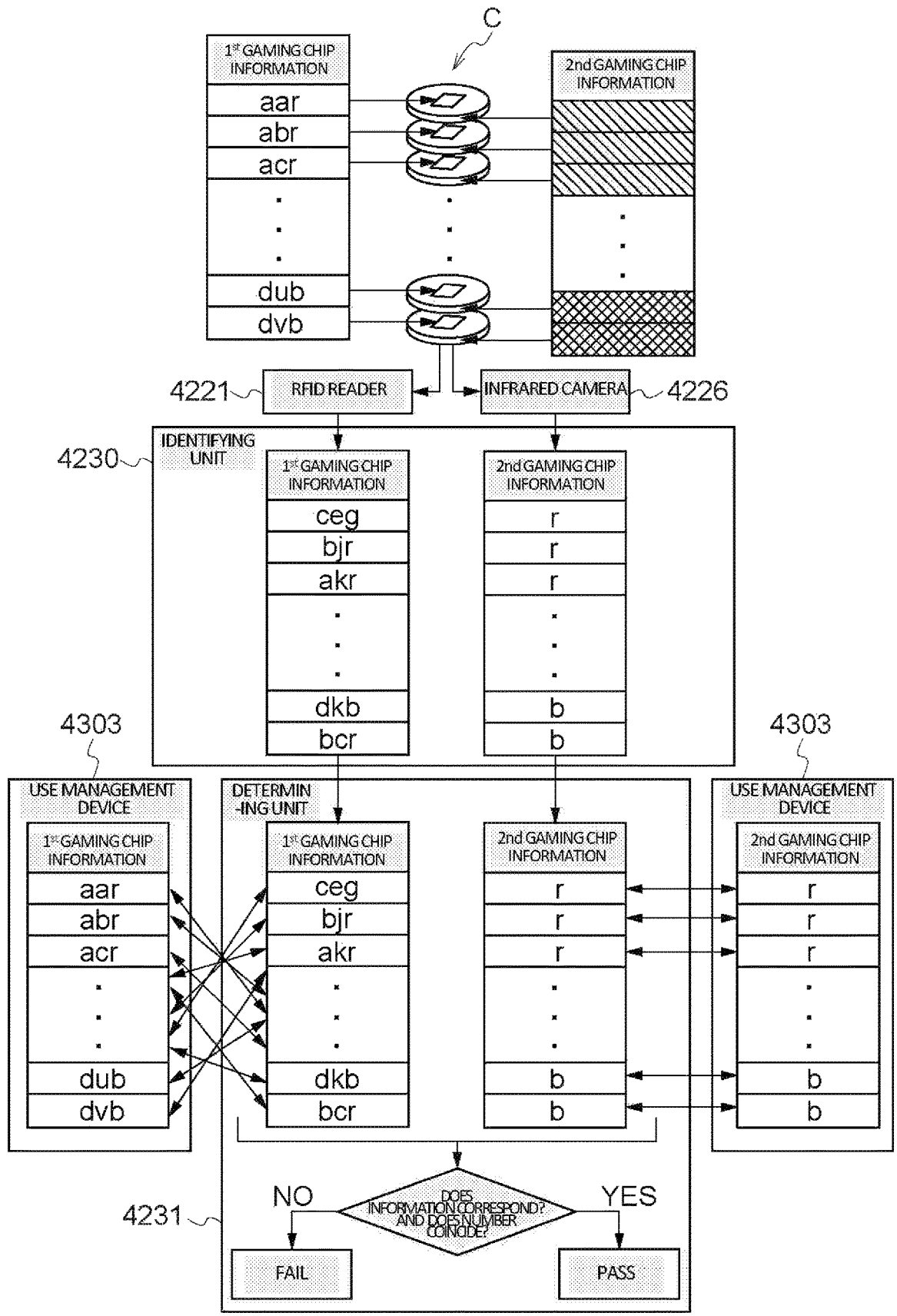
FIG. 40 is a diagram for explaining a fourth method of determining pass or fail in the fourth embodiment.

In the fourth method of determining pass or fail, as shown in FIG. 40, the first currency information and the second currency information in the same gaming currency C are different information. In an example of FIG. 40, in the RFID tag 4503 of the gaming currency C, information of English character strings is stored as the first currency information, and the specific coloring layer 4501 on the side surface of the gaming currency C is colored in the specific color corresponding to the value as the second currency information.

The RFID reader 4221 reads out the first currency information from the RFID tag 4503 of the gaming currency C to output that to the identification part 4230, the visible-light camera 4226 shoots the side surface of the gaming currency C to output that to the identification part 4230, and the identification part 4230 analyzes the shot image to specify the specific color that is the second currency information. In this case, in the identification part 4230, the correspondence relationship between the plural pieces of the first currency information and the plural pieces of the second currency information is unknown.

In the use management device 4303, the first currency information and the second currency information are stored in association with the case identification information of the case 4100. The determination part 4231 compares the plural pieces of the first currency information obtained by the identification part 4230 to the plural pieces of the first currency information associated with the case identification information of the case 4100 stored in the use management device 4303, and judges whether or not they correspond one by one completely. Also, the determination part 4231 compares the number of the respective specific colors in the plural pieces of the second currency information obtained by the identification part 4230 to the number of the respective specific colors in the plural pieces of the second currency information associated with the case identification information of the case 4100 stored in the use management device 4303, and judges whether or not the numbers of the respective specific colors are equal to each other.

The determination part 4231 determines the case 4100 as passed, if the plural pieces of the first currency information obtained by the identification part 4230 corresponds to the plural pieces of the first currency information associated with the case identification information of the case 4100 stored in the use management device 4303 one by one completely, and if the number of the respective specific colors in the plural pieces of the second currency information obtained by the identification part 4230 is equal to the number of the respective specific colors in the plural pieces of the second currency information associated with the case identification information of the case 4100 stored in the use management device 4303, and determines the plural gaming currencies C housed in the case 4100 as failed if any one of the plural pieces of the first currency information is not equal to the information stored or the number of any one of the respective specific colors in the plural pieces of the second currency information is not equal to the information stored.

As a case that any one of the plural pieces of the first currency information is not equal to the information stored, or the number of any one of the respective specific colors in the second currency information is not equal to the information stored, it is considerable that any one of the gaming currencies C housed in the case 4100 is forged or that the RFID tag 4503 or the side surface of any one of the gaming currencies C is damaged. That is, the determination part 4231 determines the authenticity/damage and a number for each value of all of the gaming currencies C existing in the case 4100, thereby determining the pass or fail of the plural gaming currencies C housed in the case 4100.

(Fifth Method of Determining Pass or Fail)

Figure 41:
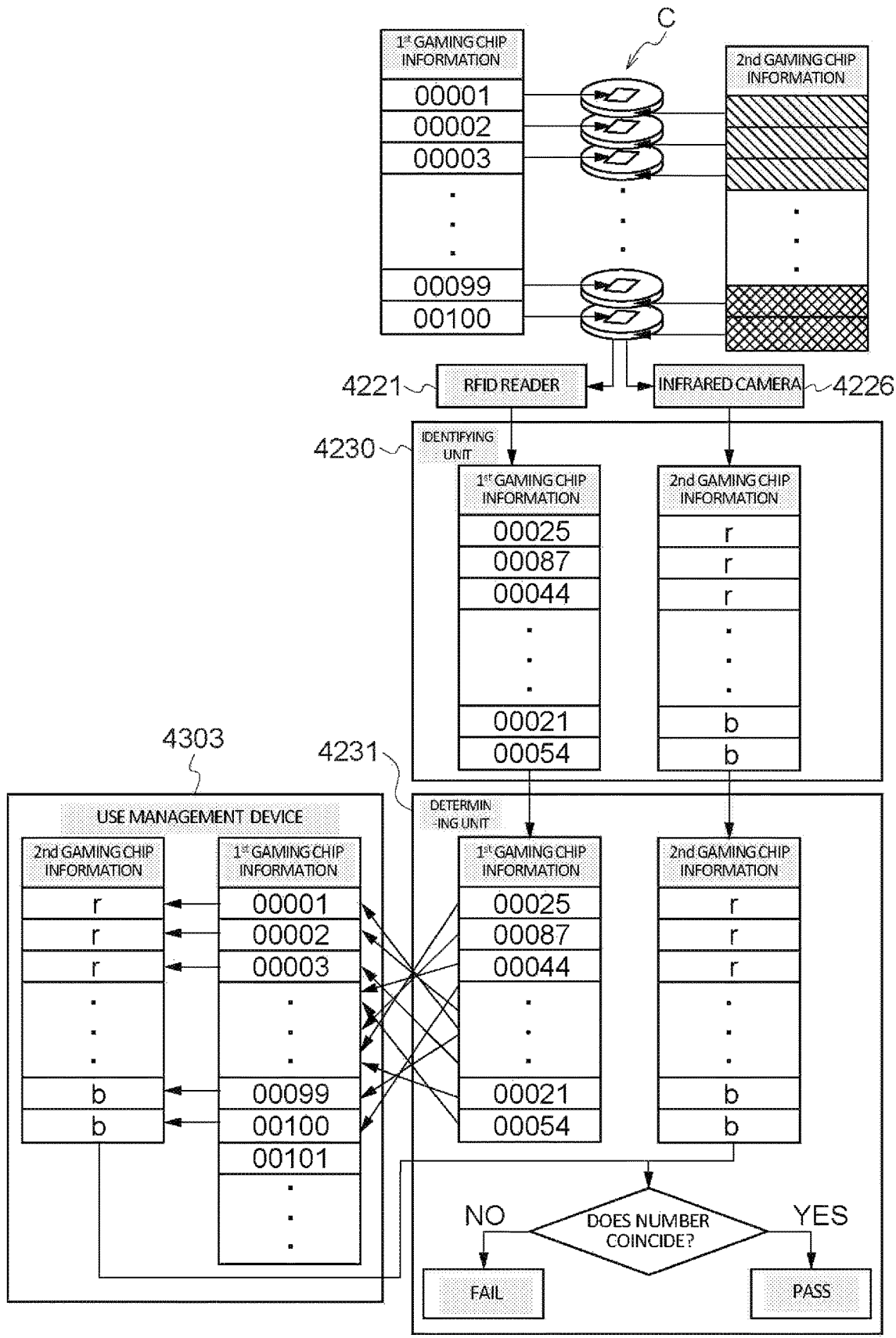
FIG. 41 is a diagram for explaining a fifth method of determining pass or fail in the fourth embodiment.

In the fifth method of determining pass or fail, as shown in FIG. 41, the first currency information and the second currency information in the same gaming currency C are different information. In an example of FIG. 41, in the RFID tag 4503 of the gaming currency C, individual identification information made from number strings is stored as the first currency information, and to the side surface of the gaming currency C, the value information of the gaming currency C is given in a form of the specific color of the specific coloring layer 4501.

The RFID reader 4221 reads out the first currency information from the RFID tag 4503 of the gaming currency C to output that to the identification part 4230, the visible-light camera 4226 shoots the side surface of the gaming currency C to output that to the identification part 4230, and the identification part 4230 analyzes the shot image to specify the specific color that is the second currency information. In this case, in the identification part 4230, the correspondence relationship between the plural pieces of the first currency information and the plural pieces of the second currency information is unknown.

In the use management device 4303, the correspondence relationship between the first currency information and the second currency information is stored. In an example of FIG. 41, the individual identification information which uniquely specifies the gaming currency C and the specific color of the specific coloring layer 4501 on the side surface, namely the value information of the gaming currency C are associated with each other, and when specifying the individual identification information, the value of the gaming currency C can be known. Note that, in this example, the use management device 4303 is not necessary to store the combination of the first currency information and the second currency information for each of case identification information. In other words, in this example, the inspection of the gaming currencies C housed in the case 4100 can be performed without using the case identification information.

The determination part 4231 specifies the first currency information corresponding to the first currency information which the identification part 4230 identifies from the first currency information stored in the use management device 4303, and specifies the second currency information associated with the first currency information, namely the value. The determination part 4231 performs this on all of the first currency information identified by the identification part 4230, thereby obtaining the number of the respective values in the plural pieces of the second currency information extracted from the use management device 4303 about one case.

The determination part 4231 compares the number of the respective values thus obtained to the number of the respective values in the second currency information identified from the identification part 4230 about the case 4100. The determination part 4231, if all of the number of the respective values are equal to the information stored, determines the plural gaming currencies C housed in the case 4100 as passed, and if the number of any of the values is not equal to the information stored, determines the plural gaming currencies C housed in the case 4100 as failed.

As a case that the number of the respective values in the plural pieces of the second currency information extracted from the use management device 4303 is not equal to the number of the respective values in the second currency information identified from the identification part 4230 about the case 4100, it is considerable that any one of the gaming currencies C housed in the case 4100 is forged or that the RFID tag 4503 or the side surface of any one of the gaming currencies C is damaged. That is, the determination part 4231 determines the authenticity/damage and a number for each value of all of the gaming currencies C existing in the case 4100, thereby determining the pass or fail of the plural gaming currencies C housed in the case 4100.

Also, although an illustration is omitted, if the value of the gaming currency is stored as the first currency information and the individual identification information of the gaming currency C is stored as the second currency information, it is possible to determine pass or fail in the same way as above.

Although the first to fifth methods of determining pass or fail have been described above, the determination part 4231 may be adopted by combining the above methods of determining pass or fail. Also, the determination part 4231, in addition to the methods of determining pass or fail mentioned above, if the number of both of the first currency information and the second currency information read out from the plural gaming currencies C housed in the case 4100 are not a predetermined number (100 in the present embodiment), may determine the plural gaming currencies C housed in the case 4100 as failed.

The first and second methods of determining pass or fail mentioned above are methods of determining pass or fail which can be executed without using information stored in the use management device 4303 installed in the gaming house P, and are suitable for being executed by the inspection device 4200 in the factory F. Although the third to fifth methods of determining pass or fail are methods of determining pass or fail which use information stored in the use management device 4303 installed in the gaming house P, and are suitable for being executed by the inspection device 4200 in the gaming house P, the inspection device 4200 in the gaming house P may adopt the first or second method of determining pass or fail. If all of the inspection devices 4200 in the gaming house P adopt a method of determining pass or fail which does not use information stored in the use management device 4303 like as the first or second methods of determining pass or fail, the use management device 4303 can be omitted.

Although the inspection device 4200 in the gaming house P also performs the inspection of the case 4100 housing the gaming currencies C which have been used, in that case, it is possible to adopt the first, second, or fifth method of determining pass or fail in which it is unnecessary to store the information of the gaming currencies that should be housed in the case.

Also, in the embodiment described above, the gaming currency C has the individual identification information and/or the value information as the first currency information and/or the second currency information. Here, the individual identification information is information which uniquely specifies each gaming currency C, whereas the value information is information which can overlap with each other in the plural gaming currencies C and can be also said as information (group information) indicating a group to which each gaming currency belongs. The present embodiment, as the group information for the group to which each gaming currency belongs, instead of the value, or in addition to the value, may adopt, for example, information on manufacturing time, manufacturer, and/or usage gaming house of the gaming currency.

That is, both of the first currency information and the second currency information may include individual identification information which identifies the gaming currency, both of the first currency information and the second currency information may include group information indicating a group to which the gaming currency belongs, the first currency information may include the individual identification information which identifies the gaming currency and the second currency information may include the group information of the group to which the gaming currency belongs, or the first currency information may include the group information of the group to which the gaming currency belongs and the second currency information may include the individual identification information which identifies the gaming currency.

Figure 42:
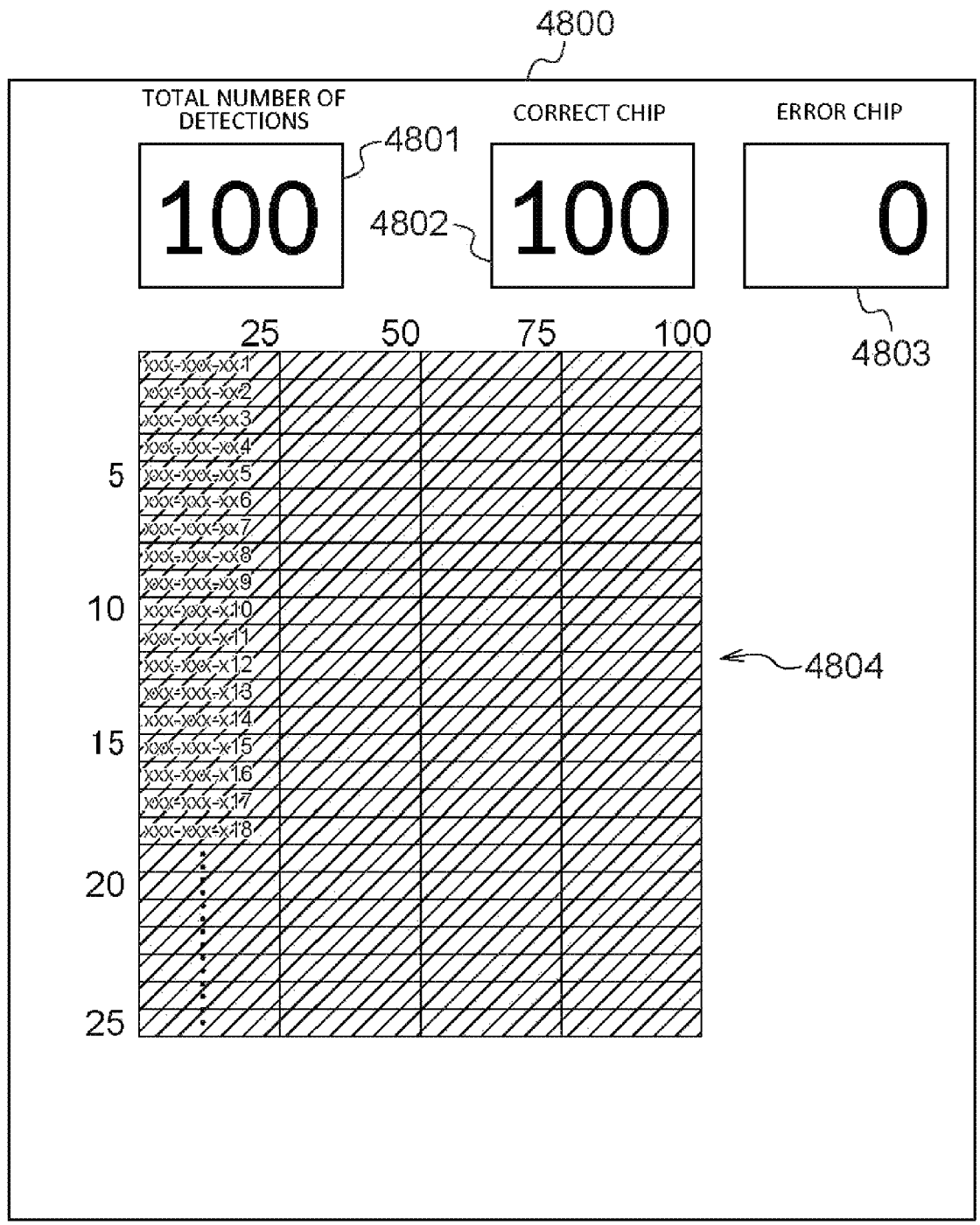
FIG. 42 is a diagram indicating an example of a good/bad results display screen for displaying pass/fail results (pass results) in the fourth embodiment.
Figure 43:
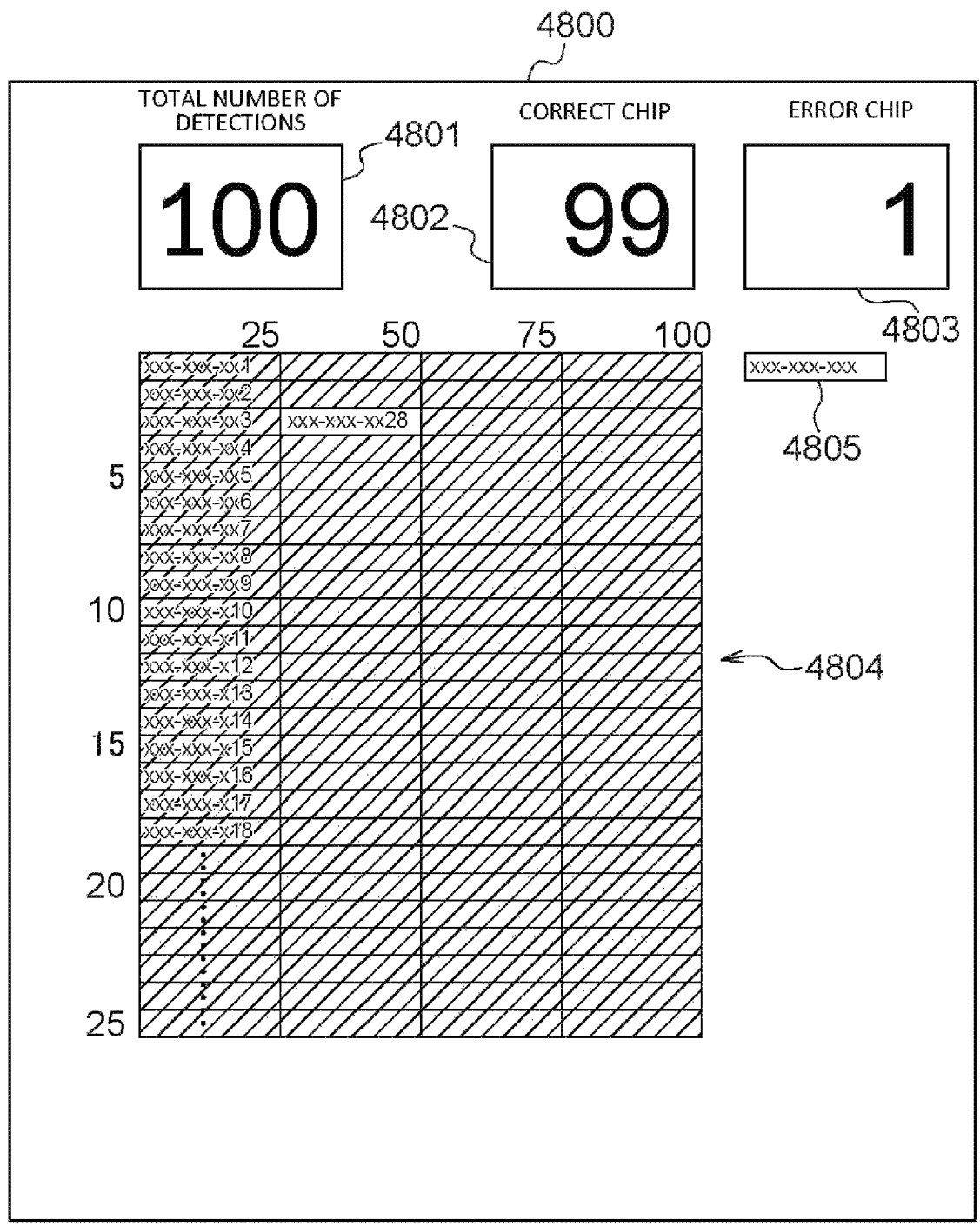
FIG. 43 is a diagram indicating an example of a good/bad results display screen for displaying pass/fail results (fail results) in the fourth embodiment.

FIG. 42 and FIG. 43 are diagrams showing examples of pass or fail result display screens displaying the result of the pass or fail determination in the determination part 4231. These pass or fail result display screens are generated by the computer 4222 based on the result of the pass or fail determination in the determination part 4231, and are displayed by the display part 4223. FIG. 42 shows an example of the display screen in case of pass, and FIG. 43 displays an example of the display screen in case of fail.

As shown in FIG. 42 and FIG. 43, a good/bad results display screen 4800 includes a total detection number 4801 which is the number of the combination of the first currency information and the second currency information which the identification part 4230 reads out from the gaming currencies C, the number of correct gaming currencies C 4802, and the number of unfair gaming currencies C 4803.

The computer 4222 sets the larger one of the numbers of pieces of the first currency information and the second currency information as the total detection number 4801. For example, although 100 of the gaming currencies are housed in the case 4100, if the RFID tag 4503 is not built in one of them, the identification part 4230 specifies 100 pieces of the second currency information from the plural gaming currencies C, but can obtain only 99 pieces of the first currency information. In this case, the computer 4222 sets 100 which is the larger one of pieces of the first currency information and the second currency information as the total detection number 4801.

The computer 4222, in the case of the first or second method of determining pass or fail, sets the number of the combination of the first currency information and the second currency information that are determined as equal to each other as the number of the correct gaming currencies C 4802, and sets a number obtained by subtracting the number of the correct gaming currencies C from the total detection number 4801 as the number of the unfair gaming currencies C 4803.

The computer 4222, in the case of the third or fourth method of determining pass or fail, sets the smaller one of the numbers of pieces of the first currency information for which the correspondence relationship with the first currency information stored in the use management device 4303 is confirmed, and of the second currency information for which the correspondence relationship with the second currency information stored in the use management device 4304 is confirmed, as the number of the correct gaming currencies C 4802, and sets the number obtained by subtracting the number of the correct gaming currencies C from the total detection number 4801 as the number of the unfair gaming currencies C 4803.

The computer 4222, in the case of the fifth method of determining pass or fail, sets the number of pieces of the second currency information for which the correspondence relationship with the second currency information stored in the use management device 4303 as the number of the correct gaming currencies C 4802, and sets the number obtained by subtracting the number of the correct gaming currencies C from the total detection number 4801 as the number of the unfair gaming currencies C 4803.

The good/bad results display screen 4800 includes the currency information display part 4804 displaying the currency information which the identification part 4230 reads out from the gaming currencies C. In the currency information display part 4804, if the currency information stored in the use management device 4303 is read out, or if the first currency information is equal to the second currency information, the currency information is displayed in color, and the currency information which is stored in the use management device 4303 but is not read out is displayed in white (refer to FIG. 43).

Also, in the good/bad results display screen 4800, if the currency information which is not stored in the use management device 4303 is read out, or if the first currency information is not equal to the second currency information, the currency information is displayed outside the currency information display part 4804 as unfair currency information 4805.

Figure 44:
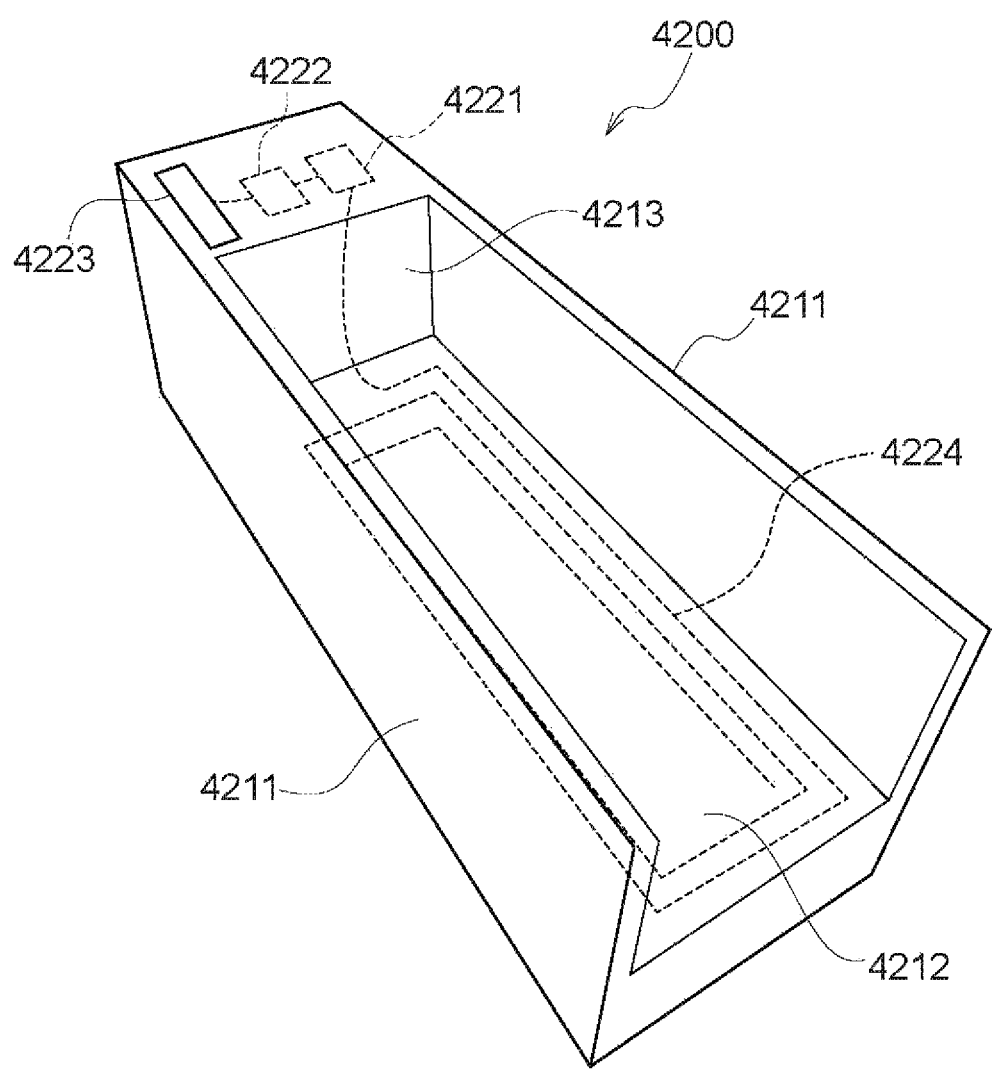
FIG. 44 is a diagram indicating a modification example of an RFID antenna of an inspection device in the fourth embodiment.

FIG. 44 is a diagram indicating a modification of an RFID antenna 4224 of an inspection device 4200. Note that illustrations of an arm 4227, infrared-ray camera 4225, and a visible-light camera 4226 are omitted. In the above embodiments, although the RFID antenna 4224 is built in right and left side walls 4211, the RFID antenna 4224 may be built in a bottom part 4213. Also in this case, the RFID antenna 4224 is placed inside the bottom part 4213 in a spiral manner.

Figure 45:
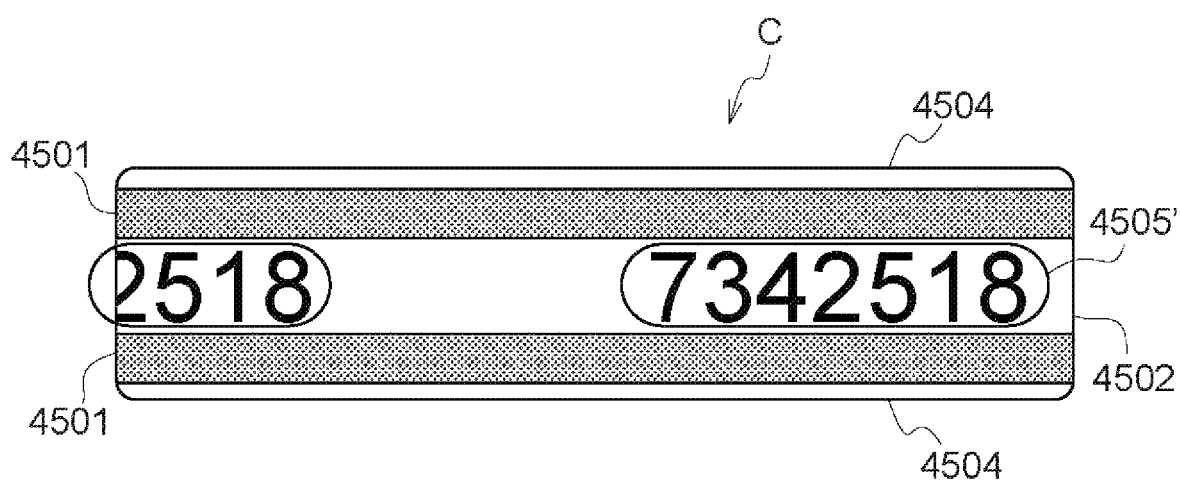
FIG. 45 is a side view of a gaming currency in a modification example in the fourth embodiment.

FIG. 45 is a side view showing a gaming currency C' in a modification. Although in the gaming currency C in the above embodiments, the specific coloring layer 4501 is sandwiched by the common coloring layers 4502, in an example of FIG. 45, the gaming currency C' is comprised of the common coloring layers 4502 at the center and the specific coloring layers 4501 at both sides thereof (upper and lower). In an example of FIG. 45, individual identification information represented by seven-digits number strings is written (printed) as code information 4505' at the side surface of the gaming currency C'. In an example of FIG. 45, the code information 4505' being written information is written in a central common coloring layer 502. The code information 4505' in this case can represent seven kinds of article information among ten kinds of article information.

Further, both of the code information 4505 represented by whether there is indication m that is described for the currency for gaming currency C in the above embodiment, and the code information 4505' in the number strings that is illustrated in FIG. 45 may be written at the side surface of the gaming currency C. In this case, the code information 4505 with the indication m and the code information 4505' in the number strings may be printed with different inks. For example, the code information 4505 with the indication m may be printed with infrared-ray responsive inks, and the code information 4505' in the number strings may be printed with ultraviolet-ray responsive inks. In this case, the infrared-ray camera and the ultraviolet-ray camera are prepared in order to shoot the side surface of the gaming currency C, the code information 4505 with the indication m may be read using the infrared-ray camera, and the code information 4505' in the number strings may be read using the ultraviolet-ray camera.

Figure 46:
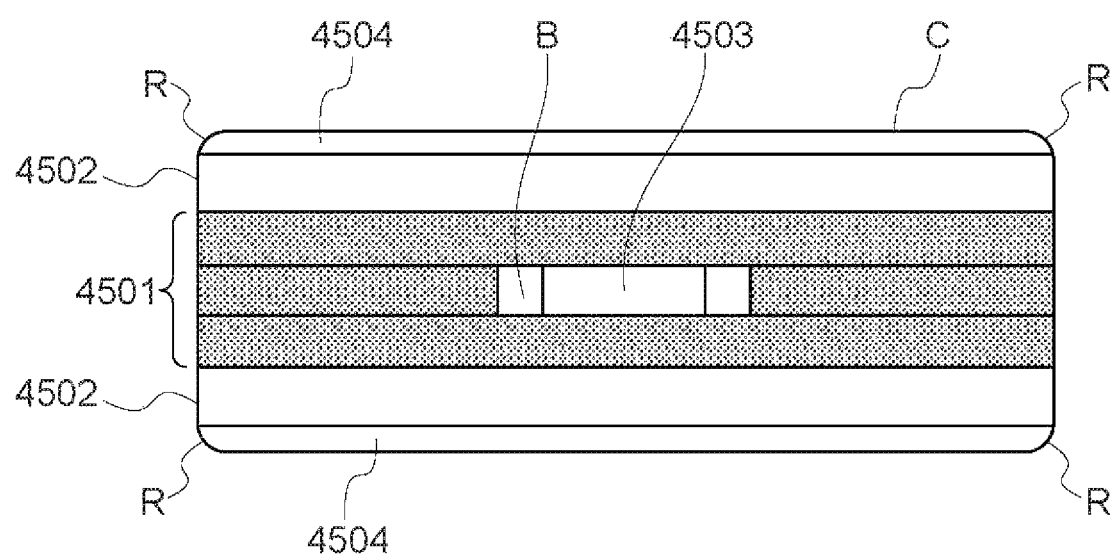
FIG. 46 is a side sectional view of a gaming currency in a modification example in the fourth embodiment.

FIG. 46 is a side sectional view of the gaming currency C" in another modification. The gaming currency C" comprises a multi-layer structure where different plastic layers with plural colors are stacked, at least specific coloring layer (colored layer) 4501 is provided at the middle, and common coloring layers (white color or lighter-color layers) 4502 are stacked at both sides of the middle specific coloring layer 4501. Note that it is preferable for colors of the common coloring layers 4502 to be thinner than color of the specific coloring layer 4501. As such, in the gaming currency C", the multi-layer structure where the specific coloring layer 4501 is provided at the middle, and the common coloring layers 4502 are stacked at both sides of the middle specific coloring layer 4501 can identify a kind of the gaming currency C" (10 points, 20 points, 100 points, 1000 points, and the like) by forming a striped pattern in a stacking direction at the side surface, and changing the color of the specific coloring layer 4501 (red, green, yellow, blue and the like).

Figure 47:
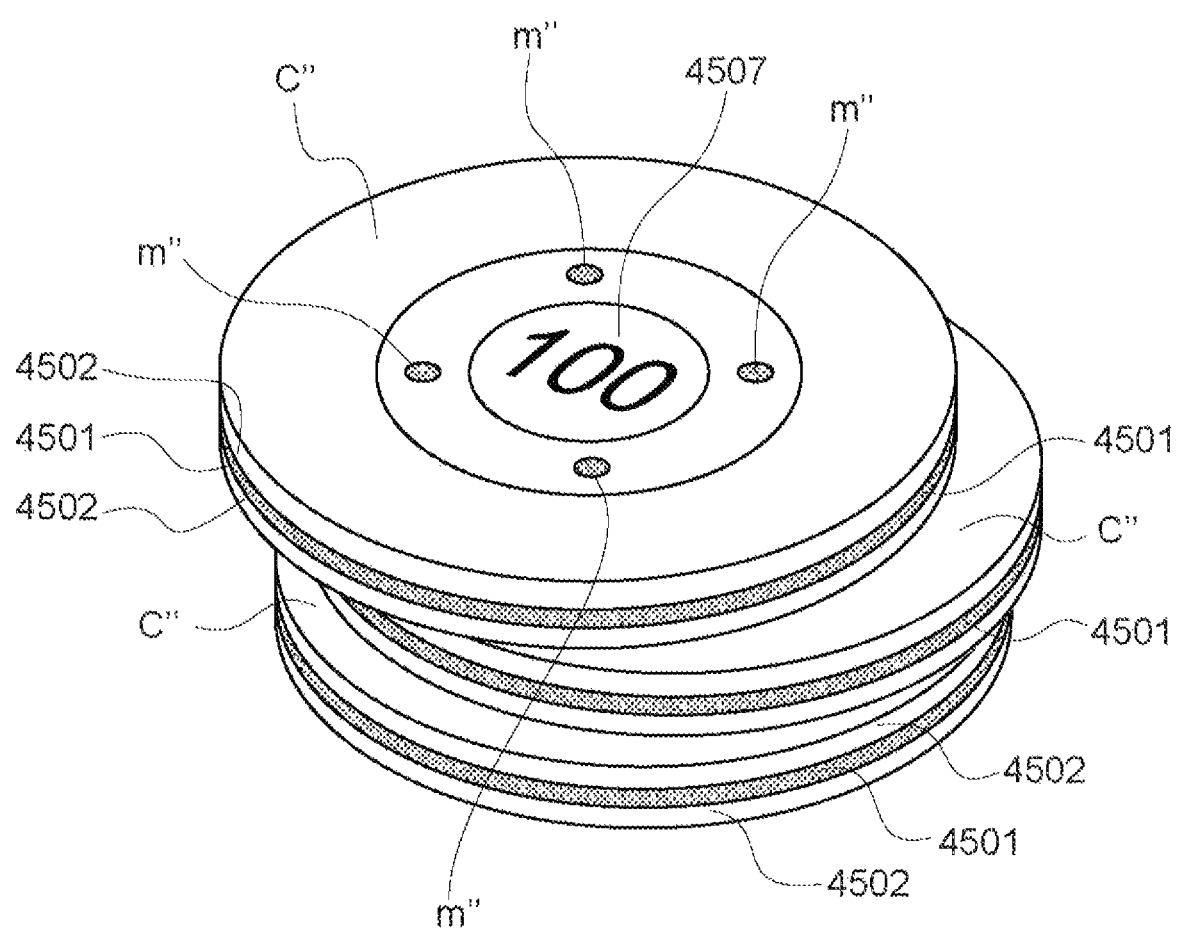
FIG. 47 is a perspective view of a gaming currency in the modification example in the fourth embodiment.
Figure 48:
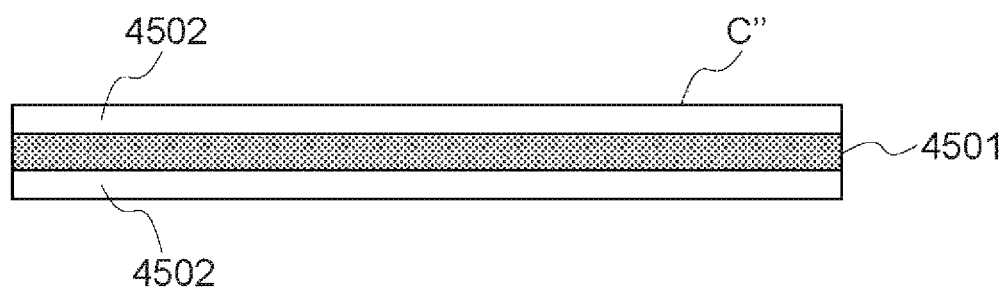
FIG. 48 is a side view of a gaming currency in the modification example in the fourth embodiment.
Figure 49:
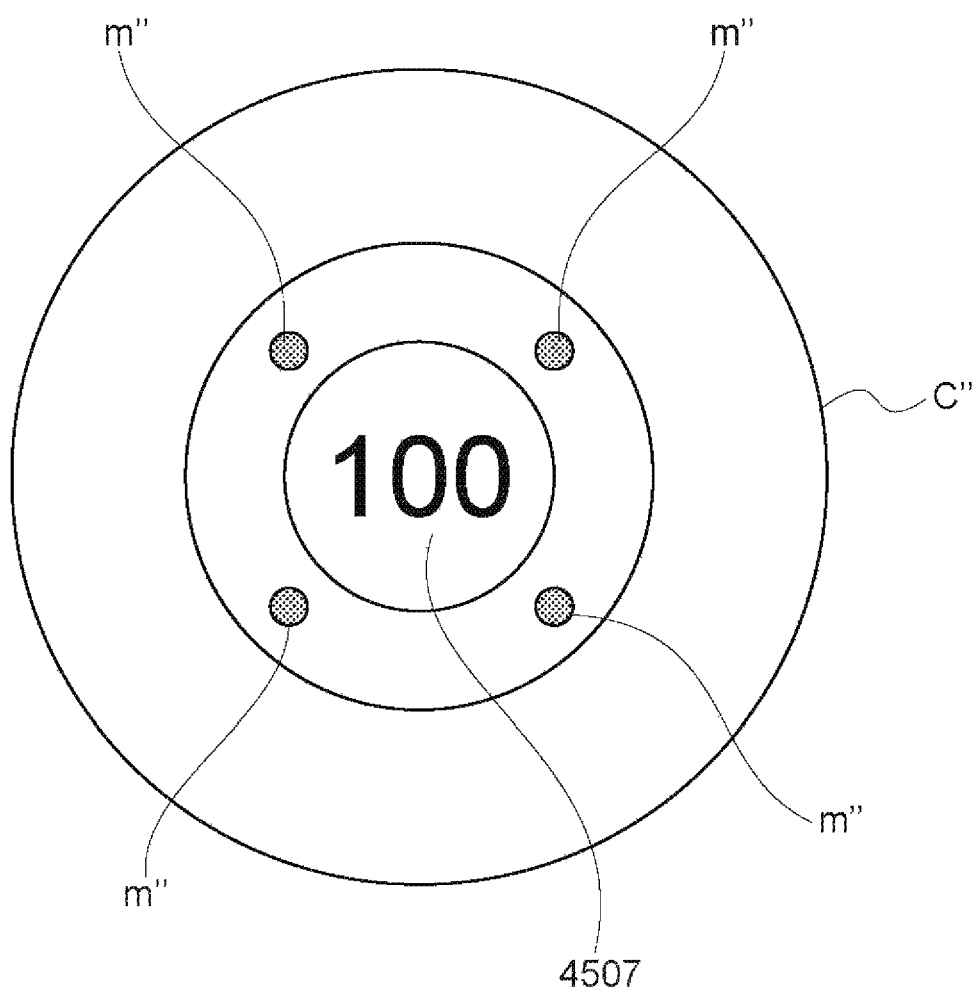
FIG. 49 is a plan view of a gaming currency in the modification example in the fourth embodiment.

FIG. 47 is a perspective view of the stacked gaming currencies C", FIG. 48 is a side view of the gaming currency C", and FIG. 49 is a plan view of the gaming currency C". As shown in FIG. 47, in the gaming currencies C", a printing 4507 (e.g. 100 points) representing a kind (value) of the gaming currency C" is made at surfaces of the common coloring layers 4502 (top surface and lower surface), a transparent layer 4504 is provided at the most outer layer, and at least five-layer structure is made with thermal compression between layers. These gaming currencies C" is formed by using long and thin elongated plastic materials, forming a state (e.g. five-layer structure) thermal compressed and attached between the layers (specific coloring layer 4501, common coloring layer 4502, and transparent layer 4504), and then punching them into a circular form, rectangular form, or the like with press etc. When punching by pressing, R machining (a rounded corner) is applied at an edge of the most outer transparent layer 4504 by designing the dimensions of die and punch for a mold for punching.

Further, in the gaming currency C", the indication m" is provided with UV inks or carbon black inks at the surface of the common coloring layer 4502. The indication m" represents the authenticity of the gaming currency C", becomes visible by radiation of ultraviolet-ray light (or infrared-ray light), and represents correct one with the combination of the shape and number. Although the most outer layer is thermal compressed or coated (applied) with the transparent layer 4504 to cover the printing 4507 and indication m', embossing is made on the transparent layer 4504 to avoid adhesion of the gaming currencies C" each other.

The R machining (R) is performed at the edge of the most outer transparent layer 4504 where the printing 4507 (e.g. 100 points) is made to avoid that the surface of the common coloring layers 4502 is deform to appear in the side surface in the punching process. Also, a sharp edge of the gaming currency C" is prevented from damaging a remaining hand and other gaming currencies C".

The specific coloring layer 4501 may be formed with plural layers (three layers in FIG. 46) colored by a specific color as shown in FIG. 46. Since the plural layers colored by the specific color are thermal compressed each other, the three-layer structure is not visible as shown in FIG. 46, and FIG. 26 represents three layers of the specific coloring layers 4501 for description. Further, the hollowing B is partially provided in the middle layer of the three layers of the specific coloring layers 4501, and the RFID tag 4503 is built therein.

Figure 50:
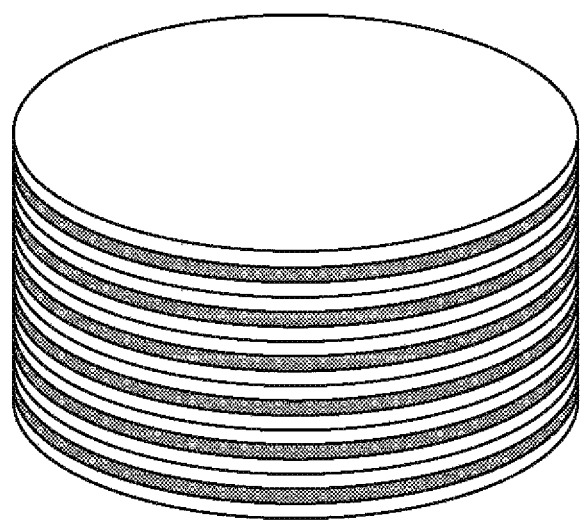
FIG. 50 is a diagram indicating an example of an image obtained by shooting the stacked gaming currencies in the fourth embodiment.

As shown in FIG. 26, FIG. 45, and FIG. 46, the gaming currencies C, C' and C" include a stacked multi-layer structure, form clear striped pattern at the side surface in the stacking direction, and allow easy and accurate measurement of colors (kind of the gaming currency) and numbers with image analysis, comparing to the conventional chip. FIG. 50 is a diagram indicating an example of an image obtained by shooting the stacked gaming currencies. As shown in FIG. 50, the specific coloring layer 4501 can be clearly identified by shooting the side surface of the gaming currency C with the visible-light camera 4226. Further, the images can be analyzed and determined more accurately by using a computer or controlling system utilizing an artificial intelligent technique, and a deep learning (structure) technique in the image analysis. Since the computer or controlling system utilizing the artificial intelligent technique, and the deep learning (structure) technique are known and available for one skilled in the art, the detailed description is omitted.

(Detection of Stamp)

As stated above, the case 4100 is stamped with a stamp after housing a predetermined number of the gaming currencies C. The stamp is broken if it is opened so as to take out the gaming currencies housed. The detection device 4200 may comprise a detection part for detecting the unbroken stamp attached to the case 4100. The detection part may detect the stamp optically or magnetically. In this case, the determination part 4231 determines that the plural gaming currencies C housed in the case 4100 are failed if the unbroken stamp is not detected by the detection part.

(Arrangement of Components of Inspection Device)

In the above embodiment, as shown in FIG. 30, all components of the inspection device 4200 are arranged in one device, they may be arranged in a distribution manner. For example, some or all of the computer 4222, the display part 4223, and the communication part 4224 may be implemented by a personal computer connected to the inspection device 4200. The components arranged in the distribution manner may be communicatively connected with wired or wireless manner, and may be connected via a network such as the Internet.

Figure 51:
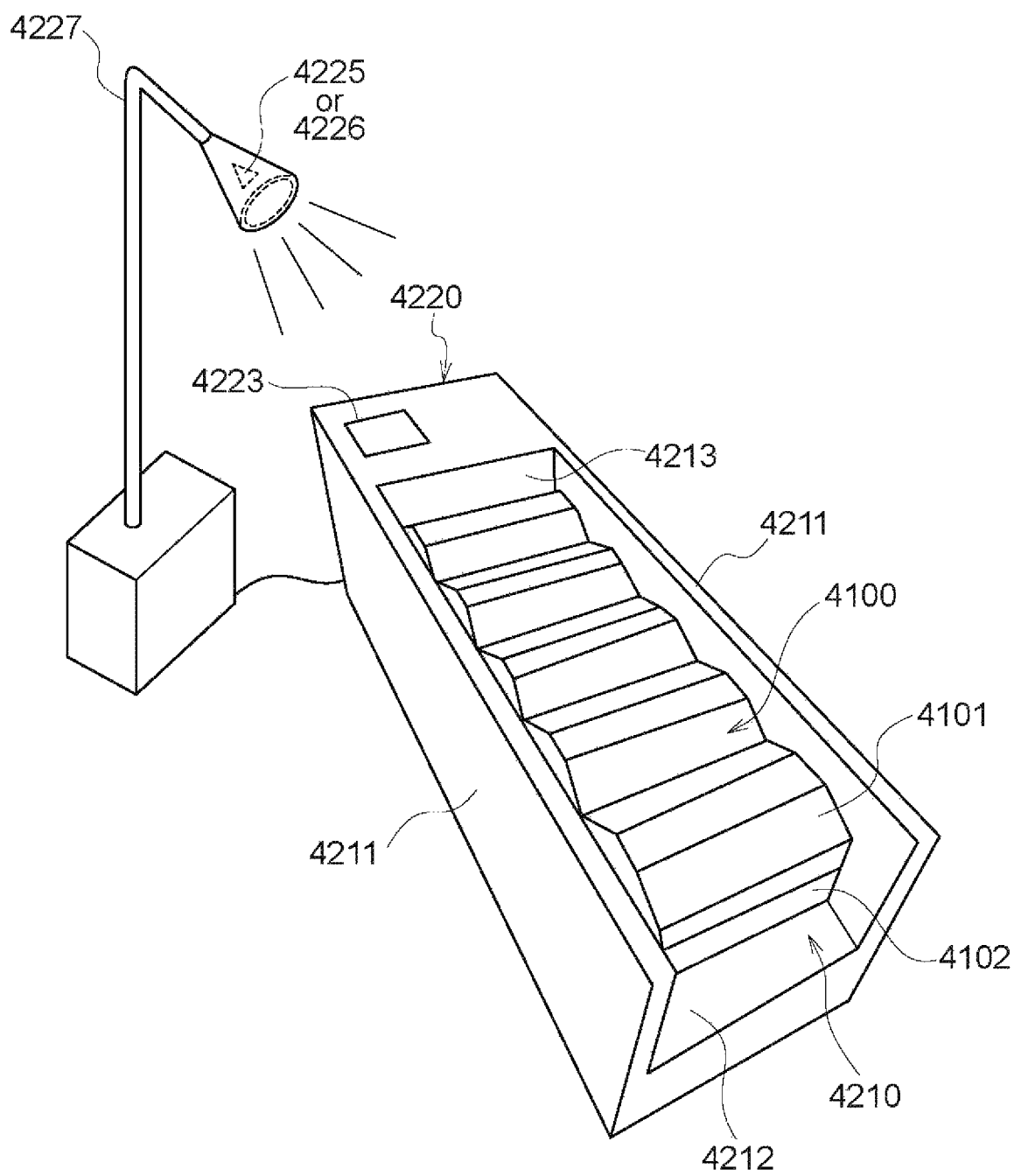
FIG. 51 is a diagram indicating a configuration of an inspection system in the modification example in the fourth embodiment.
Figure 52:
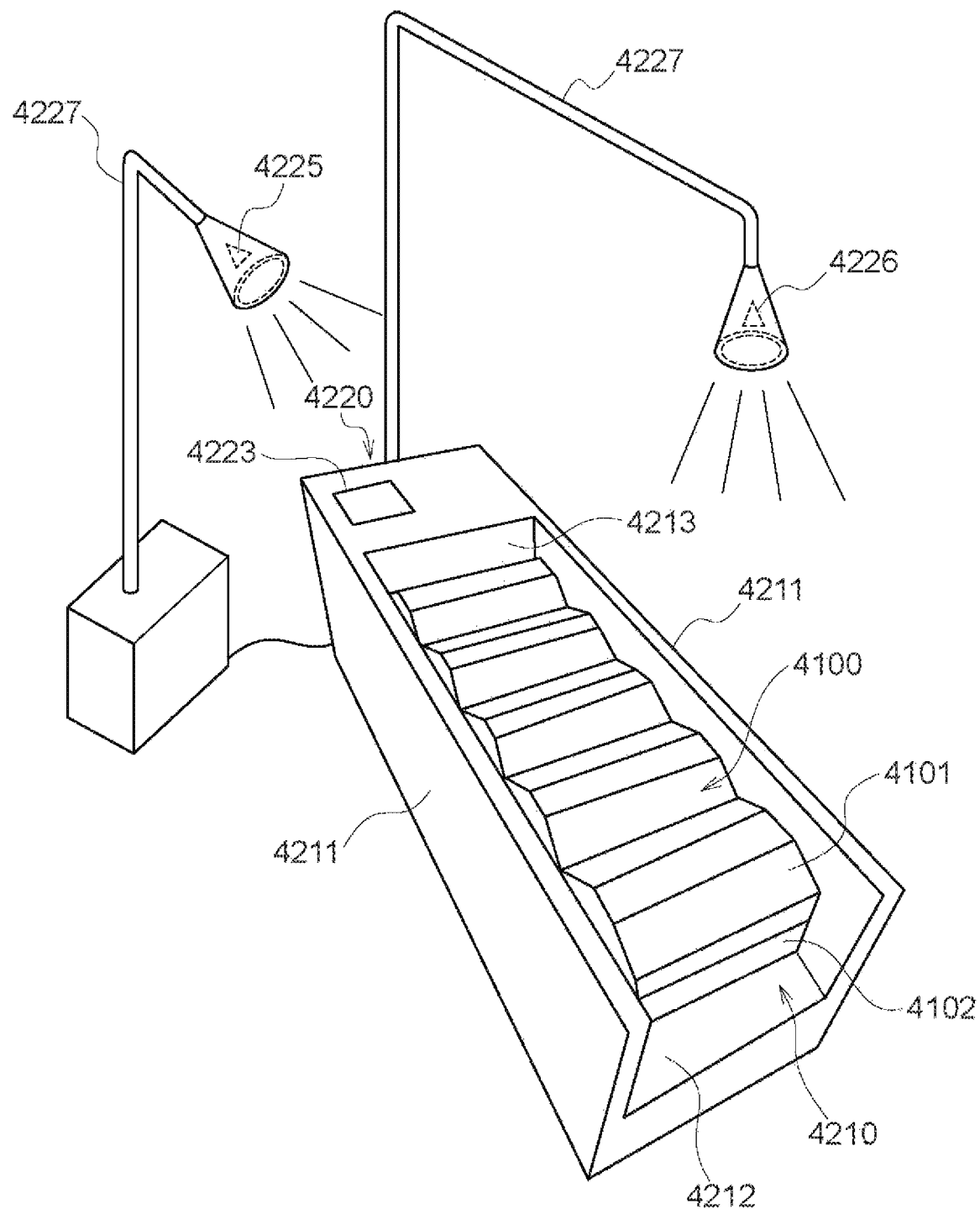
FIG. 52 is a diagram indicating a configuration of an inspection system in the modification example in the fourth embodiment.

Further, as shown in FIG. 51 and FIG. 52, the infrared-ray camera 4225 and/or visible-light camera 4226, and the arm 4227 may be connected to the computer 4222 separately from the inspection device 4200. FIG. 51 shows an example in which either of the infrared-ray camera 4225 or the visible-light camera 4226 is provided separately from the inspection device 4200, and FIG. 52 shows an example in which the infrared-ray camera 4225 is provided separately from the inspection device 4200 and the visible-light camera 4225 is provided integrally with the inspection device 4200. Note that an ultraviolet-ray camera may be provided as a third camera with an ultraviolet-ray lamp in addition to the infrared-ray camera 4225 and the visible-light camera 4226, and any cameras in FIG. 51 and FIG. 52 may be the ultraviolet-ray camera with the ultraviolet-ray lamp.

(Currency Information)

In the above embodiment, the gaming currency C includes the currency information stored in the RFID tag 4503, and the code information 4505 as currency information written at the side surface. Also, although the specific color of the specific coloring layers 4501 at the side surface are considered as the currency information indicating values of the gaming currency C, and one gaming currency C has these three types of the currency information, the present embodiment is not limited to the above, and the gaming currency C may have only two types of the currency information among them. As long as the gaming currency C has two types of the currency information, the first to fifth pass or fail determination methods can be performed.

Also, although the first to fifth pass or fail determination methods use two types of the currency information, the determination part 4231 may perform the pass or fail determination using the three types of the currency information if the gaming currency C has the three types of the currency information.

(Display Part)

Although the above embodiment describes an example in which the display part 4223 is configured with the liquid crystal panel, the display part 4223 may be a lamp indicating the pass or fail only, or a lamp displaying digitally the total detection number 4801, the number of correct gaming currencies C 4802, and the number of unfair gaming currencies C 4803 only.

(Calculation of Total Amount of Values)

The determination part 4231 in the above embodiment can identify the number of respective values of the plural gaming currencies C housed in the case 4100. Here, the determination part 4231 further may calculate the total amount of values of the plural gaming currencies C housed in the case 4100 based on the number of the respective values. The calculated total amount may be displayed on a good/bad results display screen (reference to FIG. 42 and FIG. 43) displayed in the display part 4233.

Fifth Embodiment

A fifth embodiment relates to an inspection system and an inspection device for inspecting a gaming currency, more specifically, relates to the inspection system and the inspection device for inspecting the gaming currency including a built-in radio tag or counting the number of the gaming currencies.

The gaming currency including the built-in radio tag for storing identification information and kind information is known (e.g. Japanese Patent Laid-Open No. 2008-246103).

Japanese Patent Laid-Open No. 2008-246103 discloses the gaming currency having a configuration for avoiding the radio tag from being brought out easily. This implements a configuration in which fault in the radio tag hardly occurs.

However, in the case of reading the number of the gaming currencies with the radio tag disclosed in Japanese Patent Laid-Open No. 2008-246103, the number of the gaming currencies is calculated based on the read radio tag information, and if the radio tag built in the gaming currency is broken or the radio tag is not built in the gaming currency, there is a problem in which the currency information cannot be obtained, and the actual number of the gaming currencies and the number of the gaming currencies calculated by reading the radio tag are different.

The present embodiment has the objective for providing an inspection system and an inspection device for allowing to inform that the radio tag is destroyed.

The inspection system in a first aspect of the fifth embodiment is an inspection system for inspecting gaming currencies including a built-in radio tag for storing currency information and having colors or representations representing values at an outer surface, the gaming currencies being housed in a case at a condition on which the maximum housing number is limited, wherein the gaming currencies are housed in the case capable of housing the gaming currencies stacked in a thickness direction and in a column, the inspection system comprising: a reading device for reading the radio tag of the gaming currency in the case and obtaining the currency information of the gaming currency; and a determination part for comparing the currency information obtained by the reading device to a maximum housing number of the case itself, and determining the gaming currency in the case as abnormal when the number of the gaming currencies obtained from the currency information that is obtained by the reading device is different from the maximum housing number.

The determination part has functions of comparing a physical feature of the case itself or physical information of the gaming currencies obtained by a physical measurement means other than the reading device to the number of pieces of the physical information of the gaming currency obtained from the currency information that is obtained by the reading device, and determining and outputting, if they are not matched, that there is any abnormal gaming currency of the gaming currencies housed in the case.

Further, the physical information is an optically-obtained number or height, or a measured and obtained weight.

Further, the inspection system has further an information database of the radio tag that information of the radio tag built in the gaming currency can be referred, and the determination part may have a configuration of checking the currency information of the gaming currency read by the reading device with the information database of the radio tag and capable of detecting the gaming currency to be inspected as abnormal.

Further, the determination part may have functions of, if determining that there is any abnormal gaming currency of the gaming currencies in the case, comparing the information of the radio tags of all gaming currencies in the case to the pre-recorded information database of the radio tag, and identifying that there is the abnormal radio tag not present in the information database of the radio tag.

Further, the determination part may have functions of, if determining that there is any abnormal gaming currency of the gaming currencies in the case, identifying that in any gaming currencies in the case, there is the abnormal gaming currency for which the information cannot be obtained from the radio tag.

Further, the determination part may have functions of analyzing the information of the radio tag obtained by the reading device, and sending a signal when there are in the case two or more gaming currencies for which the information obtained from the radio tags is the same.

Further, the information database of the radio tag is an information database of the radio tag of gaming currencies stored and used in a gaming house, and the determination part may have functions of analyzing the information of the radio tag obtained by the reading device and sending a signal when the information obtained from the radio tag is the same as the information of the radio tag for the gaming currency that is present in other places in the gaming house.

The inspection device in a second aspect of the fifth embodiment is an inspection device for inspecting gaming currencies including a built-in radio tag for storing currency information and having colors or representations representing values at an outer surface, the inspection device comprising: an inspection table on which the gaming currencies stacked in a thickness direction and in a column can be inspected at a condition on which the maximum stacking number is limited; a reading device for reading the radio tags of the gaming currencies in the column and obtaining the currency information of the gaming currencies in the column; and a determination part for comparing the currency information obtained by the reading device to a maximum stacking number of the inspection table itself and determining an abnormal gaming currency present on the inspection table when the number of the gaming currencies obtained from the currency information that is obtained by the reading device is different from the maximum stacking number.

Further, the determination part may have functions of determining and outputting that there is any abnormal gaming currency of the gaming currencies present on the inspection table when the currency information of the gaming currency obtained by the reading device is different from the physical information of the gaming currency.

Further, the physical information may be an optically-obtained number or height, or a measured and obtained weight.

Further, the inspection device further includes an information database of the radio tag that information of the radio tag built in the gaming currency can be referred, and the determination part may have a configuration of capable of checking the currency information of the gaming currency read by the reading device with the information database of the radio tag and detecting the gaming currency to be inspected on the inspection table as abnormal.

Further, the determination part may have functions of, if determining that there is any abnormal gaming currency of the gaming currencies on the inspection table, comparing the information of the radio tags of all gaming currencies on the inspection table to the pre-recorded information database of the radio tag, and identifying that there is the abnormal gaming currency not present in the information database of the radio tag.

Further, the determination part may have functions of, if determining that there is any abnormal gaming currency of the gaming currencies in the case, identifying that in any gaming currencies in the case, there is the abnormal gaming currency for which the information cannot be obtained from the radio tag.

Further, the determination part may have functions of analyzing the information of the radio tag obtained by the reading device and sending a signal when there are in the case two or more gaming currencies for which the information obtained from the radio tags is the same.

Further, the information database of the radio tag is an information database of the radio tag of gaming currencies stored and used in a gaming house, and the determination part may have functions of analyzing the information of the radio tag obtained by the reading device and sending a signal when the information obtained from the radio tag is the same as the information of the radio tag for the gaming currency that is present in other places in the gaming house.

According to the present embodiment, the determination of the number of the gaming currencies housed in one with the fixed housing number is made, allowing the inspection as to inform that the radio tag is destroyed.

Hereinafter, referring to the drawings, the fifth embodiment is described.

Figure 53:
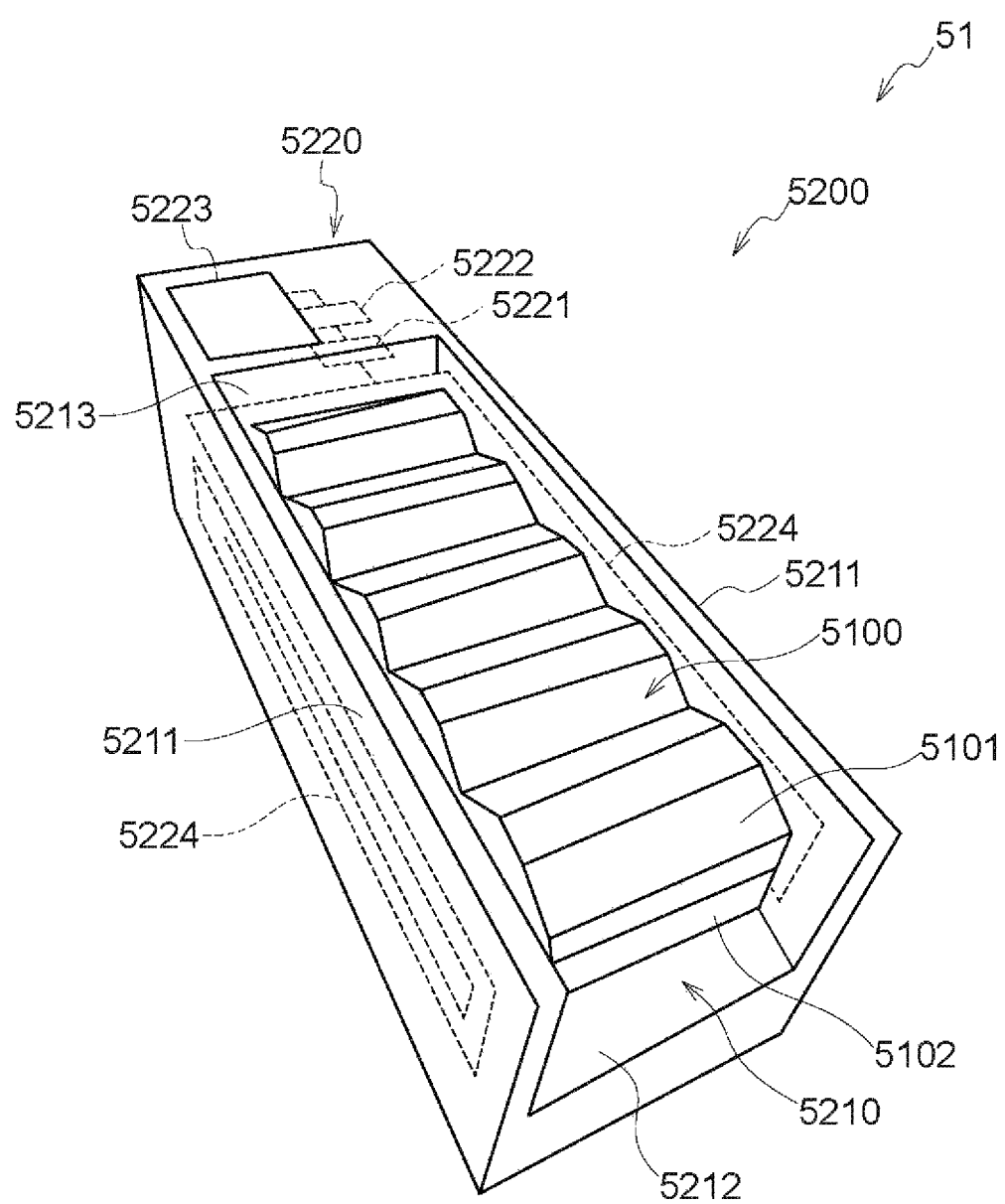
FIG. 53 is a diagram indicating a configuration of an inspection system in a fifth embodiment.

FIG. 53 is a diagram indicating a configuration of the inspection system in the fifth embodiment. The inspection system 51 is comprised of a case 5100 for housing stacked gaming currencies and an inspection device 200 for inspecting the plural gaming currencies stacked and housed in the case 5100 at a condition of being housed in the case 5100.

The case 5100 has a generally rectangular parallelepiped shape and is made of a transparent resin. In the case 5100, disc-shaped gaming currencies are housed while being stacked. In the case 5100, five columns 5100C, each for housing twenty numbers of gaming currencies C, are formed and 100 gaming currencies C in total can be housed. The case 5100 can be carried (portable) while housing the gaming currencies C. The case 5100 is composed of a top part 5101 and a lower part 5102 which are separable, and by separating the top part 5101 and the lower part 5102, it becomes possible to house the gaming currencies C in the case 5100 and take out the gaming currencies C from the case 5100.

The inspection device 5200 is composed of a receiving part 5210 and a main body part 5220. The inspection device 5200 can receive the case 5100 with the receiving part 5210. The receiving part 5210 has a rectangular shape where an approximate top surface and a front surface are opened as a whole, is formed of right and left side walls 5211, a bottom part 5212 and a deep wall 5213, and has a width, a height and a depth in which the case 5100 is just fitted.

The main body part 5220 is provided at a back side of the deep wall 5213 of the receiving part 5210, and comprises the reading device 5221, the determination part 5222 and the display part 5223.

The reading device 5221 and the display part 5223 are connected to the determination part 5222. A radio tag antenna 5224 is connected to the reading device 5221. The radio tag antenna 5224 extends from the reading device 5221 and spirally extends in the right and left side walls 5211. That is, in the inside of each of the right and left side walls 5211, the spiral radio tag antenna 5224 is laid, and each radio tag antenna 5224 is connected to the reading device 5221.

The display part 5223 is configured by a liquid crystal panel. Note that the liquid crystal panel may be provided with a touch sensor, and the display part 5223 may be configured as a touch panel.

Figure 54:
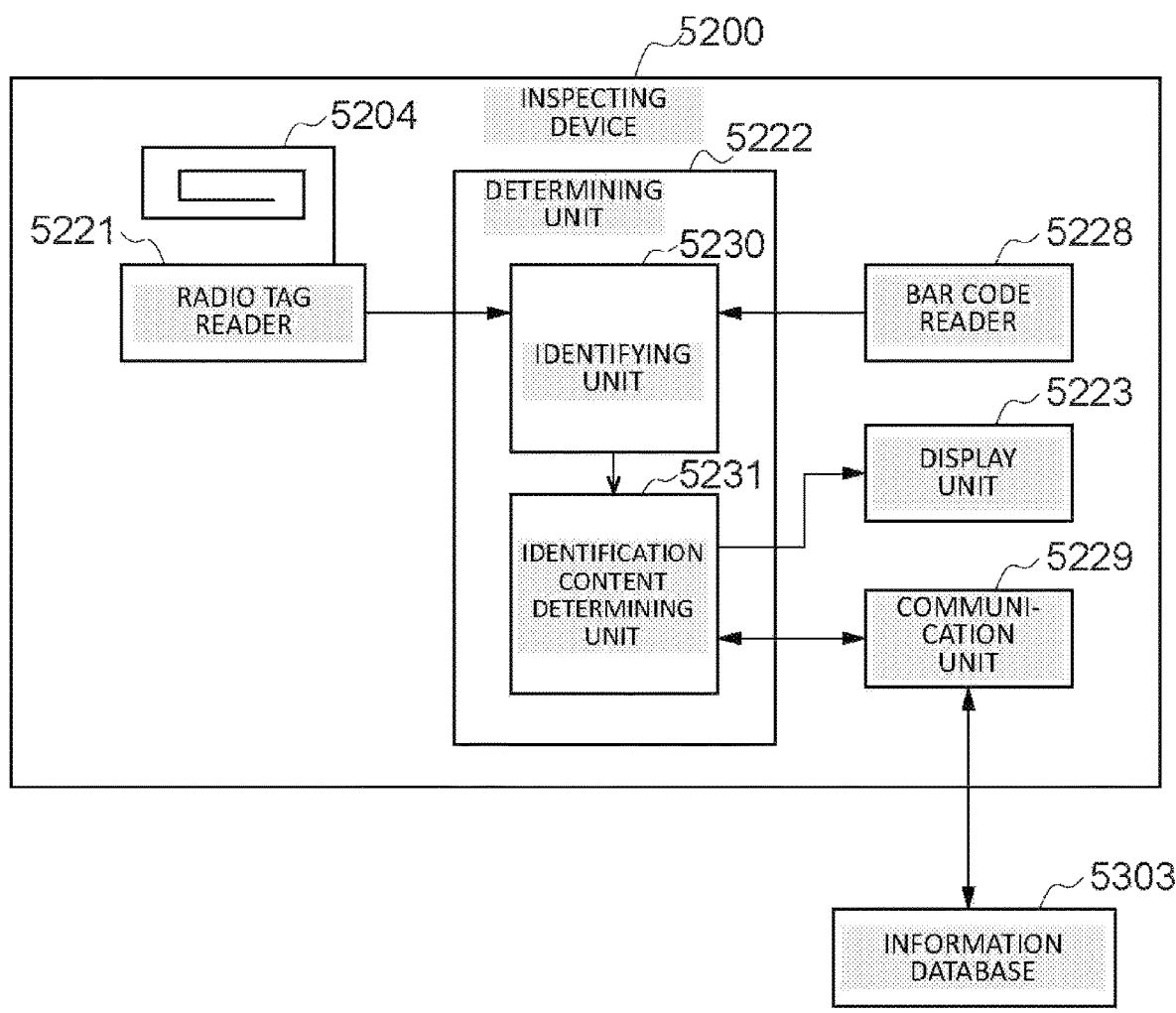
FIG. 54 is a block diagram indicating a configuration of an inspection device in the fifth embodiment.

FIG. 54 is a block diagram indicating a configuration of the inspection device 5200. The inspection device 5200 comprises the reading device 5221, the determination part 5222, the display part 5223, and the radio tag antenna 5224 shown in FIG. 53, as well as a barcode reader 5228 and a communication part 5229. Also, the determination part 5222 is configured with a processor, a memory, and the like which are not shown, and the processor executes an inspection program to configure an identification part 5230 and an identification contents determination part 5231.

A radio tag system is configured with the reading device 5221, the radio tag antenna 5224, and the radio tag 5503 embedded in the gaming currency C. The currency information of the gaming currency C stored in the radio tag 5503 that is embedded in the gaming currency C is read by the reading device 5221 without contacting, and used for processing in the determination part 5222.

The barcode reader 5228 reads the barcode BC added to the case 5100 to obtain case identification information. The display part 5223 displays the determined result of the identification contents determination part 5231 in the determination part 222. The communication part 5229 communicates data between a manufacture management device 5302 installed in a factory F and an information database 5303 installed in a gaming house P.

Figure 55:
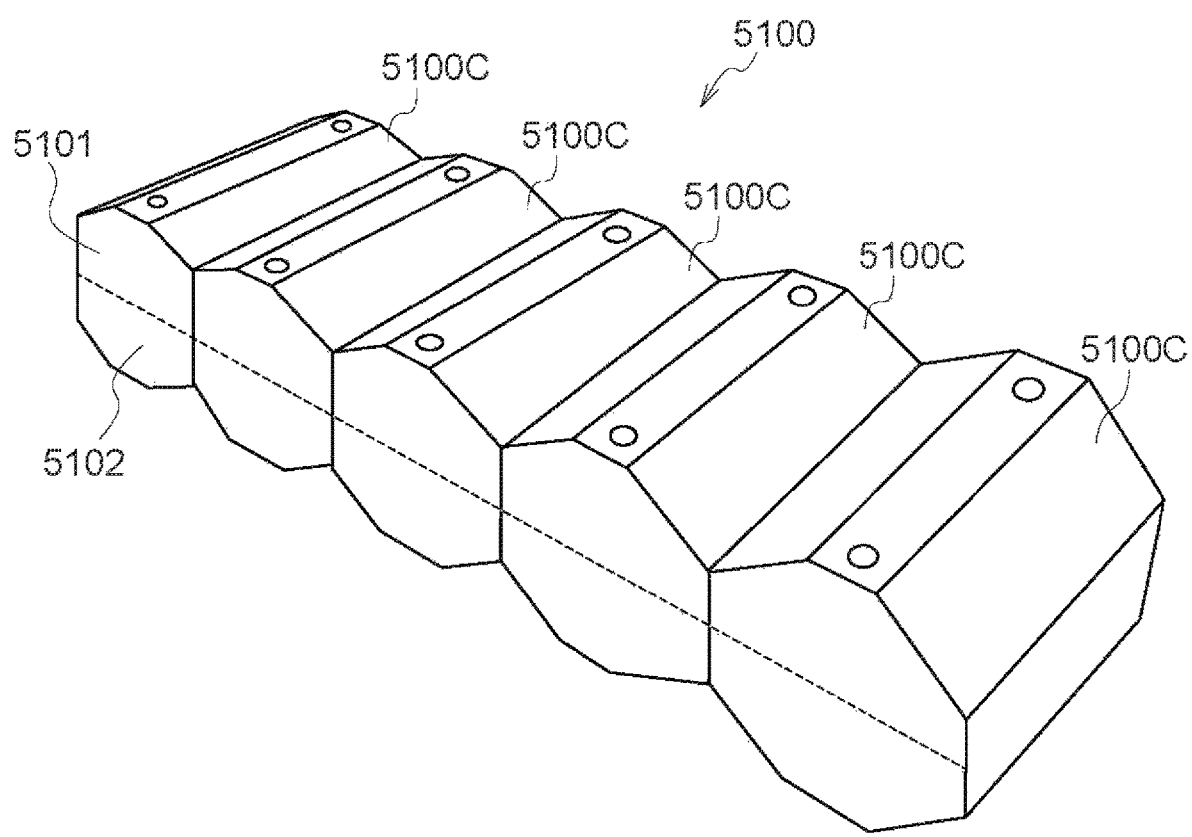
FIG. 55 is a perspective view of a case in the fifth embodiment.

FIG. 55 is a perspective view of the case 5100. The case 5100 is formed by joining the top part 5101 and the lower part 5102. In the present embodiment, the top part 5101 and the lower part 5102 are made of a transparent resin. Note that in the present embodiment, the case 5100 has a sealed structure composed of the top part 5101 and the lower part 5102, a light transmission part may be in a perforated state.

Figure 59:
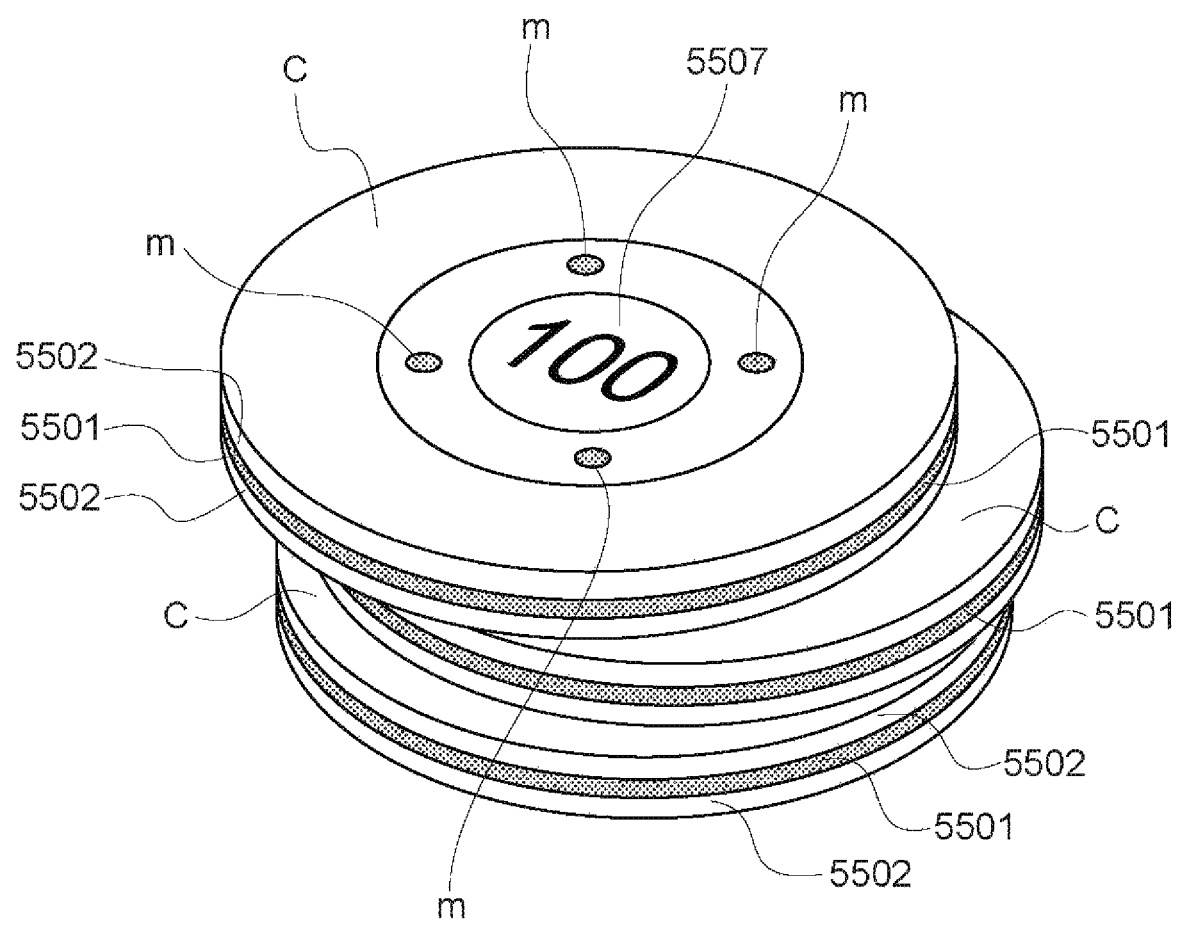
FIG. 59 is a diagram indicating an example of an image obtained by shooting the stacked gaming currencies in the fifth embodiment.

The case 5100 has a shape where five columns 5100C are formed parallelly, each housing twenty numbers of stacked gaming currencies C, as stated above, and a cross section of each column has polygon shape (octagon shape) so that the top part 5101 and the lower part 5102 approximately conform the shape of the housed gaming currencies C in an example of FIG. 59. Each column 5100C has a shape where twenty or more numbers of gaming currencies C cannot be housed.

Figure 56:
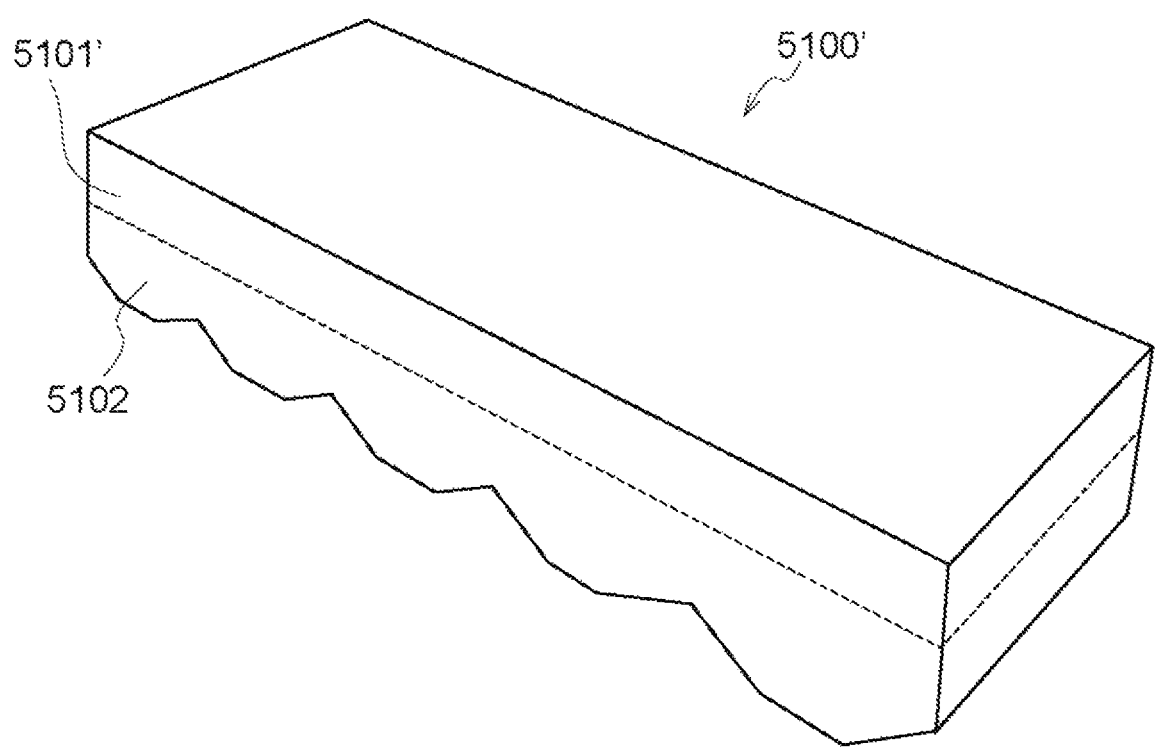
FIG. 56 is a perspective view of the case in the modification example in the fifth embodiment.
Figure 57:
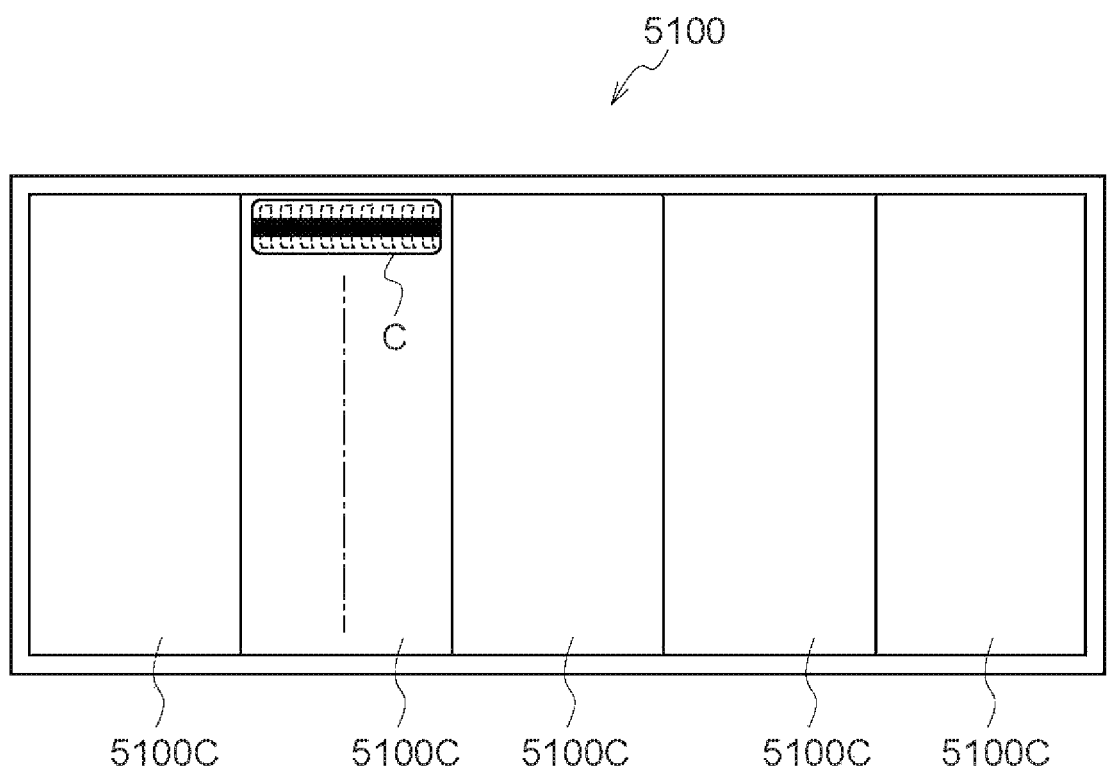
FIG. 57 is a plan view of the case in the modification example in the fifth embodiment.

FIG. 56 is a perspective view of a case 5100' of a modification, and FIG. 57 is a plan view of the case 5100'. The case 5100' is also comprised of a top part 5101' and a lower part 5102 which are made of a transparent resin. In the present modification, an upper surface of the top part 5101' facing the camera is formed by a plane. Thus, by making the surface facing the camera plane, linear shadows due to corners of the polygonal cross section of the case 5100' does not appear on the camera, and information of the side surface of the gaming currency C can be accurately identified, in an image analysis with respect to a shooting image of the camera.

Figure 58:
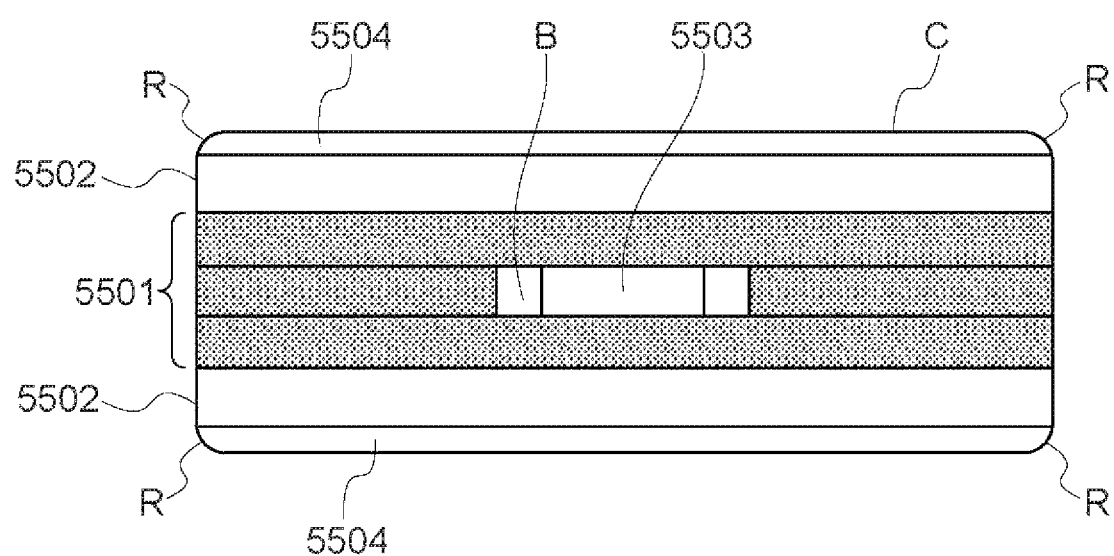
FIG. 58 is a side sectional view of a gaming currency in the fifth embodiment.

FIG. 58 is a side sectional view of the gaming currency C in the present embodiment. The gaming currency C includes a multi-layer structure where different plastic layers with plural colors are stacked, at least specific coloring layer (colored layer) 5501 is provided at the middle, and common coloring layers (white color or lighter-color layers) 5502 are stacked at both sides of the middle specific coloring layer 5501.

The specific coloring layer 5501 may be formed with plural layers (three layers in FIG. 58) colored with a specific color as shown in FIG. 58. Since the plural layers (three layers in FIG. 58) colored with the specific color are thermal compressed each other, the three-layer structure is not visible as shown in FIG. 58, and FIG. 58 shows three layers of the specific coloring layer 5501 for description. Further, the hollowing B is partially provided in the middle layer of the three layers of the specific coloring layers 5501, and the radio tag 5503 is built therein.

The inspection system 51 includes the built-in radio tag 5503 for storing the currency information, and inspects the gaming currencies C having colors 5501 or representations 5507 representing values at the outer surfaces at a condition of being housed in the case 5100 on which the maximum housing number is limited. The gaming currencies are housed in the case 5100 capable of housing the gaming currencies stacked in a thickness direction and in a column, and the inspection system 51 comprises a reading device for reading the radio tag 5503 of the gaming currency C in the case 5100 and obtaining the currency information of the gaming currency C, and a determination part 222 for comparing the currency information obtained by the reading device 5221 to the maximum housing number of the case 5100 itself (set up to one hundred numbers in the present example) and determining the gaming currency C in the case 5100 as abnormal when the number of the gaming currencies C obtained from the currency information that is obtained by the reading device 5221 is different from the maximum housing number (one hundred numbers).

The inspection system 51 has further an information database 5303 of the radio tag 5503 that information of the radio tag 5503 built in the gaming currency C can be referred, and the determination part 5222 has a configuration of checking the currency information of the gaming currency C read by the reading device 5221 with the information database 5303 of the radio tag 5503 and capable of detecting the gaming currency C to be inspected as abnormal. The information database 5303 pre-stores the information of all radio tags 5503 of the gaming currencies used in a gaming house.

The determination part 5222 has functions of, if determining there is any abnormal gaming currency C of the gaming currencies C in the case 5100, comparing the information of the radio tag 5503 of all gaming currencies C in the case 5100 to the pre-recorded information database 5303 of the radio tag 5503, and identifying the abnormal radio tag 5503 not present in the information database of the radio tag 5503.

The determination part 5222 have functions of, if determining there is any abnormal gaming currency C of the gaming currencies C in the case 5100, identifying that in any gaming currencies C in the case 5100, there is the abnormal gaming currency C for which the information cannot be obtained from the radio tag 5503.

The display part 5223 displays the abnormality if it is determined that there is the abnormal gaming currency C as stated above.

Figure 60:
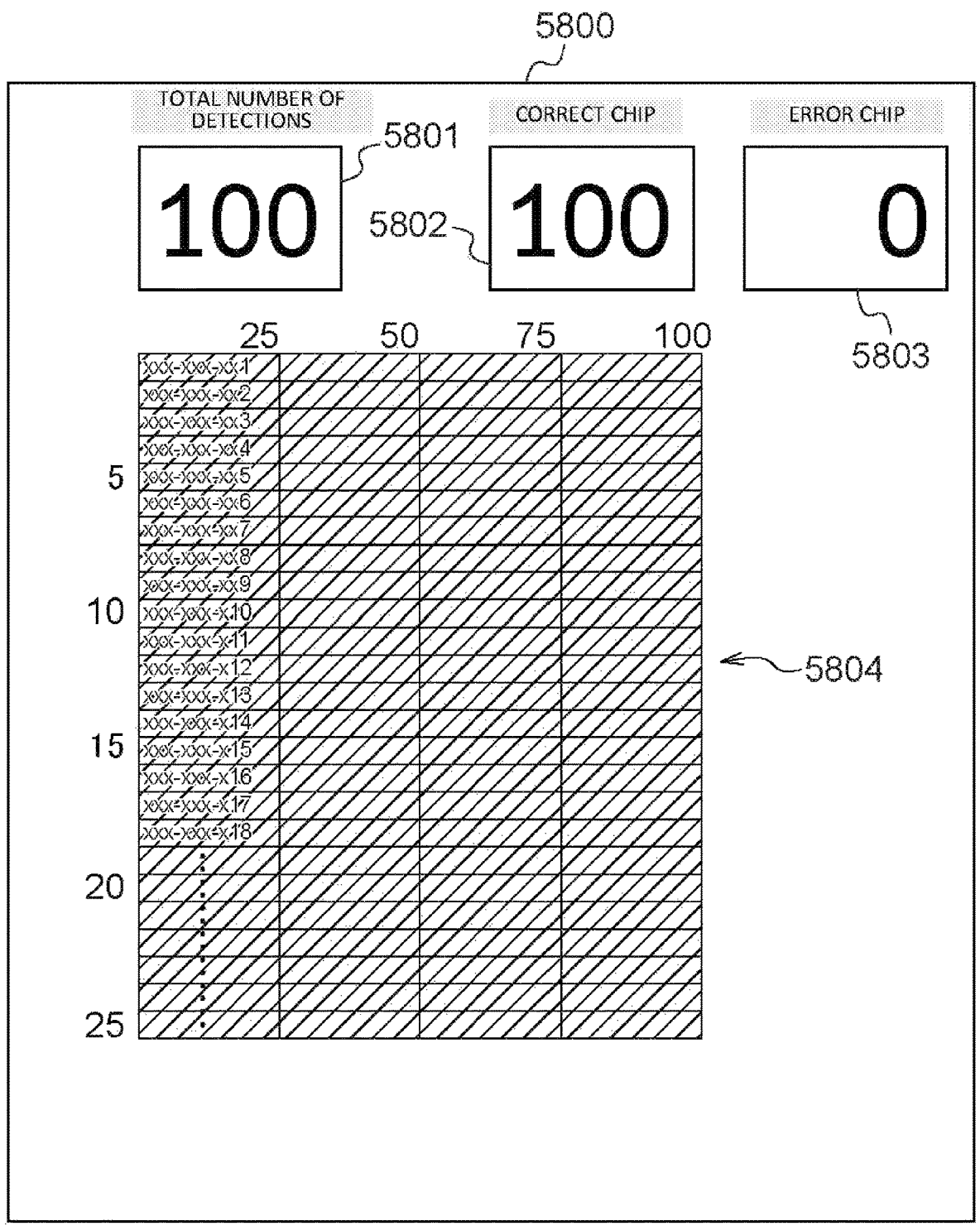
FIG. 60 is a diagram indicating an example of a good/bad results display screen for displaying pass/fail results (pass results) in the fifth embodiment.
Figure 61:
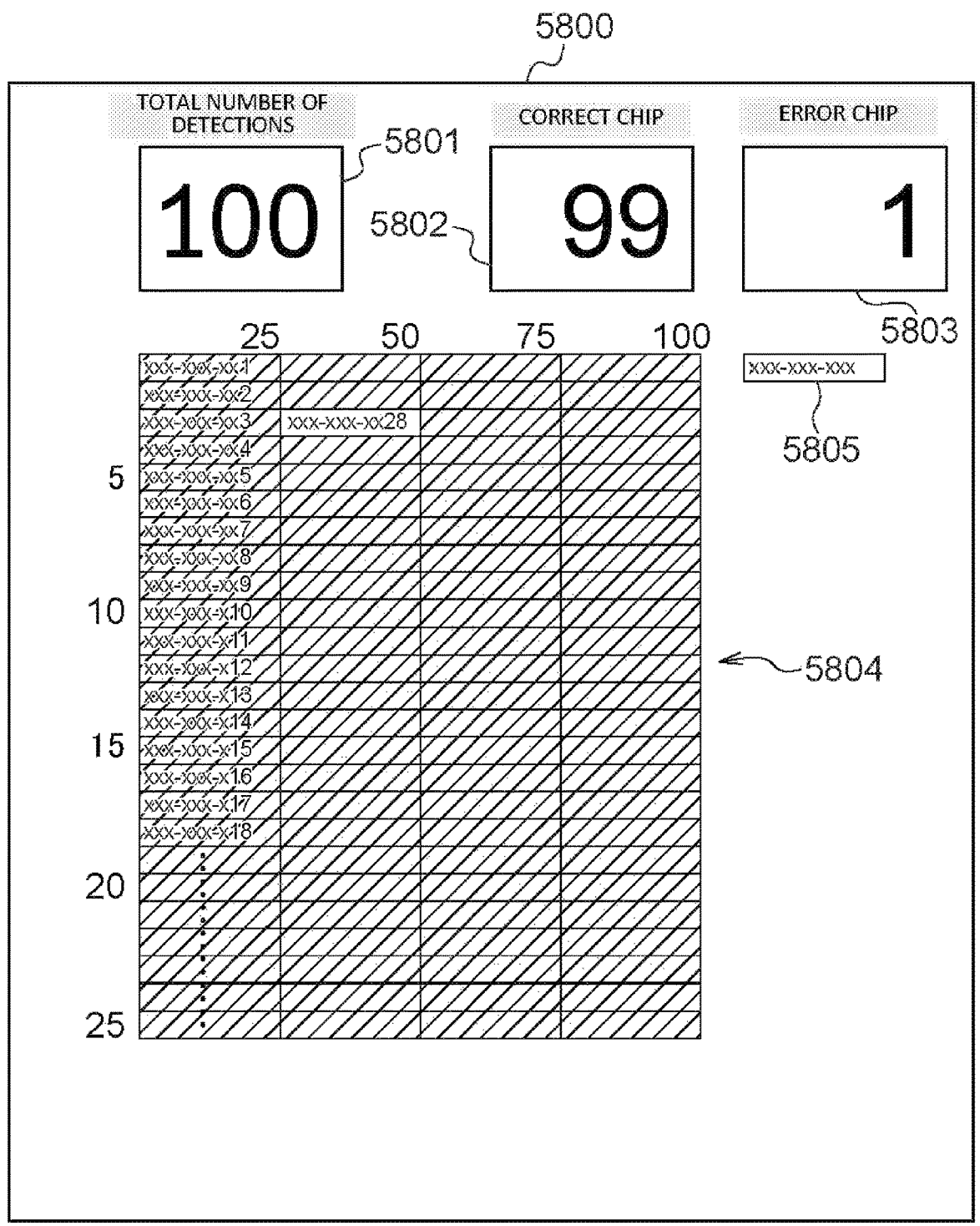
FIG. 61 a diagram indicating an example of a good/bad results display screen for displaying pass/fail results (fail results) in the fifth embodiment.

As shown in FIG. 60 and FIG. 61, a good/bad results display screen 5800 include a total detection number 5801 and a number 5803 of unfair gaming currencies C, the total detection number 5801 is the number of pieces of the information of the radio tags 5503 read by the identification part 5230 from the gaming currencies C.

FIG. 60 and FIG. 61 is a view showing an example of the good/bad results display screen indicating the abnormal determination result of the gaming currencies in the identification contents determination part 5231. The good/bad results display screen is generated by the determination part 5222 based on the abnormal determination result of the gaming currencies in the identification contents determination part 5231, and displayed on the display part 5223. FIG. 60 shows an example of the display screen in the case of being passed, and FIG. 61 shows an example of the display screen in the case of being failed.

Figure 62:
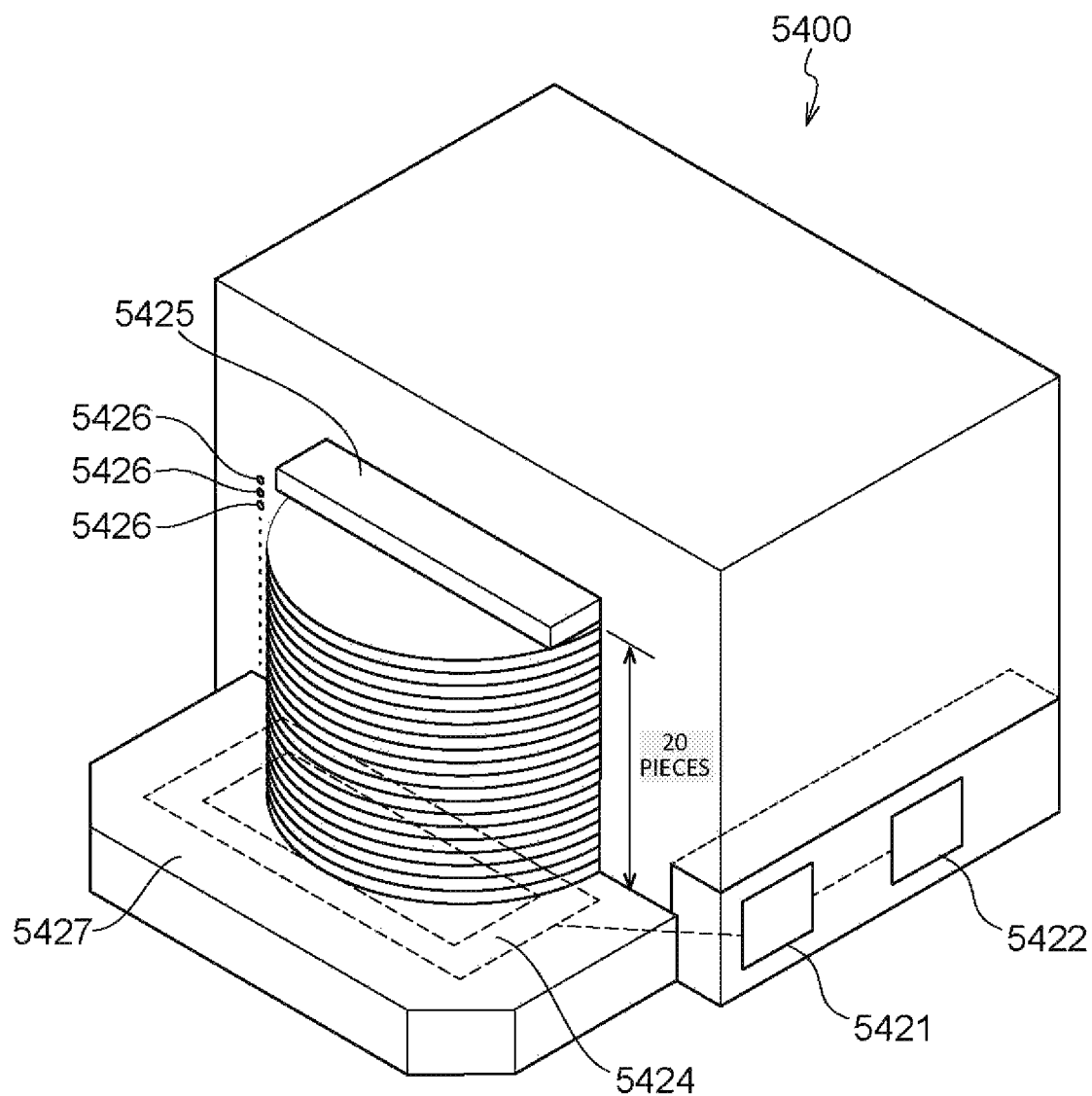
FIG. 62 is a diagram for explaining an example of a usage aspect of an inspection system together with distribution of the gaming currencies in the fifth embodiment.

FIG. 62 is a diagram showing the inspection device 5400 in another modification. The inspection device 5400 inspects the gaming currencies C including the built-in radio tag 5503 for storing the currency information, and having colors 5501 or representations 5507 representing values at the outer surfaces. The inspection device 5400 comprises an inspection table 5427 that can inspect the gaming currencies C stacked in a thickness direction and in a column at a condition on which a maximum stacking number is limited, a reading device 5421 for reading the radio tags 5531 of the gaming currencies C in the column and obtaining the currency information of the gaming currencies C in the column, and a determination part 5422 for comparing the currency information obtained by the reading device 5421 to the maximum stacking number (set up to twenty numbers in the present example) of the inspection table 5427 itself and determining an abnormal gaming currency C present on the inspection table 5427 when the number of the gaming currencies C obtained from the currency information that is obtained by the reading device 5421 is different from the maximum stacking number (twenty numbers).

The inspection device 5400 comprises a number control plate 5425 for limiting the maximum stacking number of the gaming currencies C in the column.

The inspection device 5400 has an optical sensor 5426, and determines the physical number of individual gaming currencies C. The determination part 5422 has functions of determining and outputting that there is any abnormal gaming currency C of the gaming currencies C present on the inspection table 5427 when the currency information of the gaming currency obtained by the reading device 5421 does not match with the physical information of the gaming currency C.

Figure 63:
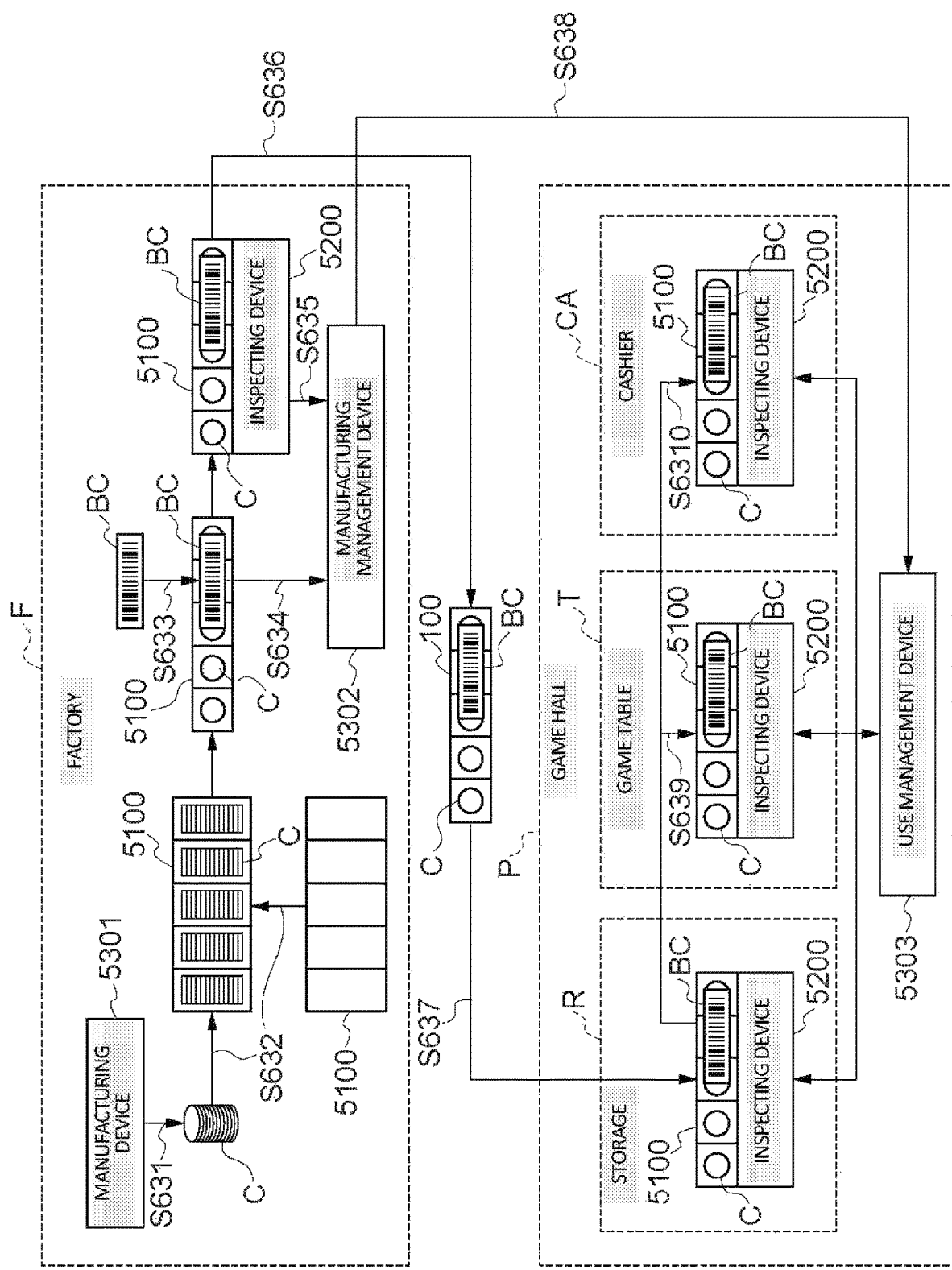
FIG. 63 is a diagram indicating a configuration of an inspection device in another embodiment in the fifth embodiment.

FIG. 63 is a diagram for explaining an example of a usage aspect of the inspection system 1 together with the distribution of the gaming currencies C. The gaming currencies C are manufactured by a manufacturing device 5301 in a factory F (s1), and respective 100 currencies are housed in the case 5100 (s2). The case 5100 is stamped with a stamp seal in the factory F after housing the gaming currencies C. Also, in the case 5100, the barcode BC indicating the case identification information for uniquely specifying the case 5100 is affixed to the side surface (s3).

At that time, in the manufacture management device 5302 in the factory F, the case identification information of the barcode BC affixed to the case 5100 is input (s4). Also, the case 5100 housing the gaming currencies C is subjected to the inspection device 5200 to read currency information (the details will be described below) given to the gaming currencies C, and the inspection of pass or fail is performed. Then, the currency information read from the gaming currencies C housed in the case 5100 is sent to the manufacture management device 5302 (s5), and associated with the case identification information by the manufacture management device 5302. Note that the manufacture management device 5302 may be a personal computer.

The case 5100 which has been passed in the inspection device 5200 in the Factory F is transported from the factory F to the gaming house P (s6). The case 5100 is firstly stored in a repository R in the gaming house P (s7). The inspection device 5200 is installed in the repository R, and the case 5100 delivered from the factory F is inspected by the inspection device 5200.

On the other hand, the case identification information and the currency information associated therewith are sent from the manufacture management device 5302 in the factory F to the information database 5303 in the gaming house P. The information database 5303 comprises a storage part which obtains the case identification information and the currency information associated with that from the manufacture management device 5302, for each of the plural cases 5100 housing the gaming currencies C, and stores them for each case 5100. Note that the information database 5303 may be a personal computer.

In the inspection by the inspection device 5200 in the repository R, the inspection is performed using the information stored in the information database 5303. The case 5100 which has been passed in the inspection in the repository R is carried to a game table T (s9), or is carried to a cashier CA (s10). The game table T and the cashier CA also comprise the inspection device 5200 respectively, and the case 5100 housing the gaming currencies C is inspected by the inspection device 5200 while being stamped. In the game table T and the cashier CA, the inspection of the case 5100 housing the gaming currencies C which have been used is also performed, and the inspection devices 5200 are used for the inspection. In the inspection by three inspection devices 5200 in the gaming house P, the case identification information and the currency information associated therewith sent from the manufacture management device 5302 and stored in the information database 5303 are referred to.

Also, in the above embodiment, the gaming currency C has the identification information and/or the value information as radio tag information. Here, the identification information is information which uniquely specifies each gaming currency C, whereas the value information is information which can overlap with each other in the plural gaming currencies C, and can be also said as information (group information) indicating a group to which each gaming currency belongs. The present embodiment, as the group information for the group to which each gaming currency belongs, instead of the value, or in addition to the value, may adopt, for example, information on manufacturing time, manufacturer, and/or usage gaming house of the gaming currency.

That is, the radio tag information may include the identification information for identifying the gaming currency, and the group information indicating the group to which each gaming currency belongs.

As stated above, the case 5100 is stamped with the stamp seal after housing a predetermined number of the gaming currencies C. The stamp is broken if it is opened so as to take out the gaming currencies housed. The detection device 5200 may comprise a detection part for detecting the unbroken stamp attached to the case 5100. The detection part may detect the stamp optically or magnetically. In this case, the identification contents determination part 5231 determines that the plural gaming currencies C housed in the case 5100 are failed if the unbroken stamp is not detected by the detection part.

In the above embodiment, as shown in FIG. 542, all components of the inspection device 5200 are arranged in one device, they may be arranged in a distribution manner. For example, some or all of the determination part 5222, the display part 5223, and the communication part 5224 may be implemented by a personal computer connected to the inspection device 5200. The components arranged in the distribution manner may be communicatively connected with wired or wireless manner, and may be connected via a network such as the Internet.

In the above-mentioned embodiment, such an example is explained that the display part 5223 is constituted by a liquid display panel. The display part 5223 may be a lamp for simply displaying only pass/fail results, and may be a lamp for digitally displaying only the total detection number 5801, the number 5802 of correct gaming currencies C, and the number 5803 of unfair gaming currencies C.

The identification contents determination part 5231 in the above-mentioned embodiment can specify the number of the respective values of the plural gaming currencies C housed in the case 5100, as described above. Furthermore, the identification contents determination part 5231 may calculate a total amount of the values of the plural gaming currencies C housed in the case 5100 based on the number of the respective values. The calculated total amount may be displayed on a pass/fail results display screen displayed at the display part 5233 (see FIGS. 60 and 61).

As described above, conventionally, an inspection system for inspecting authenticity of the gaming currency by embedding an RF tag (radio tag) inside the gaming currency is known. Such an inspection system is configured to record detection in a recording device, or issue alarms by an alarm device, when the gaming currency (typically, a forged gaming currency, or a gaming currency whose RF tag is broken, hereinafter referred to as "unfair gaming currency") whose RF tag cannot be read, or whose information read from the RF tag is not predetermined information, is detected.

However, the gaming currencies are circulated between dealers (casino) and players. It is inconvenient that it is unknown when and from which player the unfair gaming currency is delivered to the casino, when the casino inspects the holding gaming currencies and finds the unfair gaming currency.

Therefore, in this embodiment, an inspection system that can detect the unfair currency, immediately when or as soonest as the unfair currency is delivered from the player to the dealer, is provided.

Thus, an inspection system according to one aspect of the present embodiment is an inspection system for inspecting a gaming currency in which an RF tag is built, comprising: a housing means for housing gaming currencies of a dealer in a casino game; an RF reading means for reading the RF tags of the plural gaming currencies housed in the housing means; a detection means for detecting at least the number of the plural gaming currencies housed in the housing means by a method other than an RFID at constant time intervals or always; and an alarm means for generating an alarm when the number of the gaming currencies whose RF tags are read by the RF reading means is not equal to the number of the gaming currencies detected by the detection means.

By this configuration, the RF reading means detects the number of the gaming currencies housed in the housing means, and the detection means detects the number of the gaming currencies housed in the housing means by a method other than the RFID at constant time intervals or always. When the numbers are not equal to each other, the alarm means generates the alarms. Therefore, immediately when the unfair gaming currencies are housed in the housing means, or within a constant time from when the unfair gaming currencies are housed in the housing means, the alarm means can generate the alarms. Also, the RF reading means may read the RF tag at constant time intervals or always.

The detection means may detect whether or not the number of the gaming currencies housed in the housing means is changed. The alarm means may compare the number of the gaming currencies detected by the detection means to the number of the gaming currencies whose RF tags are read by the RF reading means, and determine whether the numbers are equal to each other, when the change of the number of the gaming currencies is detected by the detection means.

When the dealer collects the gaming currencies from players in a casino game, the housing means may be used to house the collected gaming currencies. By this configuration, when the dealer collects the gaming currencies from the players, the unfair currencies can be detected.

The detection means may detect existence of each of the plural gaming currencies housed in the housing means by a method other than the RFID.

The housing means may be configured to stack and house the plural gaming currencies in a predetermined stacking direction, and the detection means may have plural photosensors arranged in the stacking direction to detect each of the plural gaming currencies stacked and housed in the housing means.

The housing means may have a groove extending in the stacking direction, the plural photosensors may be arranged in plural lines along the stacking direction, and the gaming currencies may be detected by the photosensors arranged in different lines in an order of stacking.

The housing means may have plural lines of grooves extending in the stacking direction, and the RF reading means may read the RF tags for one or plural lines of the grooves.

The detection means may include plural photosensors for detecting each of the plural gaming currencies housed in the housing means.

The detection means may detect the number of the plural gaming currencies housed in the housing means by optically reading the plural gaming currencies housed in the housing means. Such detection means may be, for example, an optical scanner for scanning the stacked gaming currencies in a stacking direction.

The housing means may house the plural gaming currencies such that the plural gaming currencies are stacked from a predetermined reference position, and the detection means may detect the number of the plural gaming currencies housed in the housing means by measuring a distance from a predetermined monitoring position to a gaming currency of the gaming currencies, the gaming currency being furthest away from the predetermined reference position.

By this configuration, the number of the plural gaming currencies stacked in the housing means may be detected according to the height (length) in the stacking direction of the plural gaming currencies stacked in the housing means. Such detection means may be, for example, a distance sensor that is installed at a tip in the stacking direction, and measures a distance from a reference position to the furthest away gaming currency.

The RF reading means may read RF tags at a first time interval, such that the RF tags of plural gaming currencies are read within the first time interval from when other gaming currencies are housed in the housing means, the plural gaming currencies including the other gaming currencies, and the detection means may detect the number of the plural gaming currencies housed in the housing means at a second time interval, such that the number of the plural gaming currencies are detected within the second time interval from when the other gaming currencies are housed in the housing means, the plural gaming currencies including the other gaming currencies.

By this configuration, when new gaming currencies are added to the housing means, the RF tags are read within the first time interval and the number is detected within the second time interval. So, from when the new gaming currencies are added to the housing means at least until any longer one of the first time interval and the second time interval, the reading of the RF tags and the detection of the number by the means other than the RFID are completed, and alarms can be generated when needed. Therefore, the dealer houses the gaming currencies collected from the players according to the results of a game in the housing means, and can inspect the gaming currencies immediately after the gaming currencies are collected from the players.

The inspection system according to another aspect of the present embodiment is an inspection system for inspecting a gaming currency used for a game played on a table, comprising a housing means installed on the table, the housing means housing plural gaming currencies, the number of the plural gaming currencies being increased or decreased for each game, and an inspection means for inspecting the gaming currencies, the number of the gaming currencies being increased or decreased for each game in the housing means.

The inspection system according to further another aspect of the present embodiment is an inspection system for inspecting a gaming currency in which an RF tag is built, comprising: a housing means capable of housing a predetermined number of gaming currencies; an RF reading means for reading RF tags of the plural gaming currencies housed in the housing means; and an alarm means for generating an alarm when the number of the gaming currencies whose RF tags are read by the RF reading means is not equal to the predetermined number.

By this configuration, while the number of the gaming currencies that can be housed in the housing means are housed, the RF tags are read by the RF reading means and the number of the tags is compared to the number that can be housed, so that the gaming currencies whose RF tags cannot be read are detected and the alarms can be generated.

The inspection system may further comprise a dummy currency in which the RF tag is built, the dummy currency being to be housed in the housing means together with the gaming currencies, such that the predetermined number is reached in total with the gaming currencies, when the number of the gaming currencies is below the predetermined number.

By this configuration, when the gaming currencies of the number that does not reach the number that can be housed by the housing means (housable number) are inspected, dummy currencies of the shortage number are housed in the housing means, so that the alarms can be generated when an ideal value of the number of the RF tags to be read by the RF reading means is not equal to the housable number.

The inspection system in the present embodiment is not limited to an inspection system for inspecting gaming currencies, and can be applied as an inspection system for inspecting an arbitrary valuable, in which an RF tag is built. In this case, an inspection system for a valuable comprises: a valuable to which a unique ID that is individually identifiable is attached; a table on which the valuable is used; a tray for holding the valuable on the table; a determination means for specifying the number of valuables held on the tray using each unique ID; a detection means for shooting the valuables on the table including at least the tray to create an image, and detecting at least the number of the valuables based on the image; a storage means for storing the number detected by the detection means; and an inspection means for inspecting a relationship between the number determined by the determination means and the number detected by the detection means.

The inspection system in the present embodiment is not limited to an inspection system for inspecting gaming currencies, and can be applied as an inspection system for inspecting an arbitrary object, in which an RF tag is built. In this case, the inspection system comprises: an RF reading means for reading the RF tag of the object located at a predetermined place; a detection means for detecting at least the number of the objects located at the predetermined place in a method other than an RFID; and an alarm means for generating alarms when the number of the objects whose RF tag is read by the RF reading means is not equal to the number detected by the detection means.

Hereinafter, with reference to the drawings, specific embodiments will be explained. The following explanation is merely exemplified, and the present embodiments are not limited to the following examples. An RF tag for storing information (tag information) such as its kind and identification information is built in a gaming currency used in the inspection system in the present embodiment. Any of the gaming currencies C that are explained in the first to fifth embodiments can be adopted as a gaming currency used in the present embodiment. By reading the RF tag built in the gaming currency with a below-described RF reader, the tag information stored in the RF tag can be read.

Figure 64:
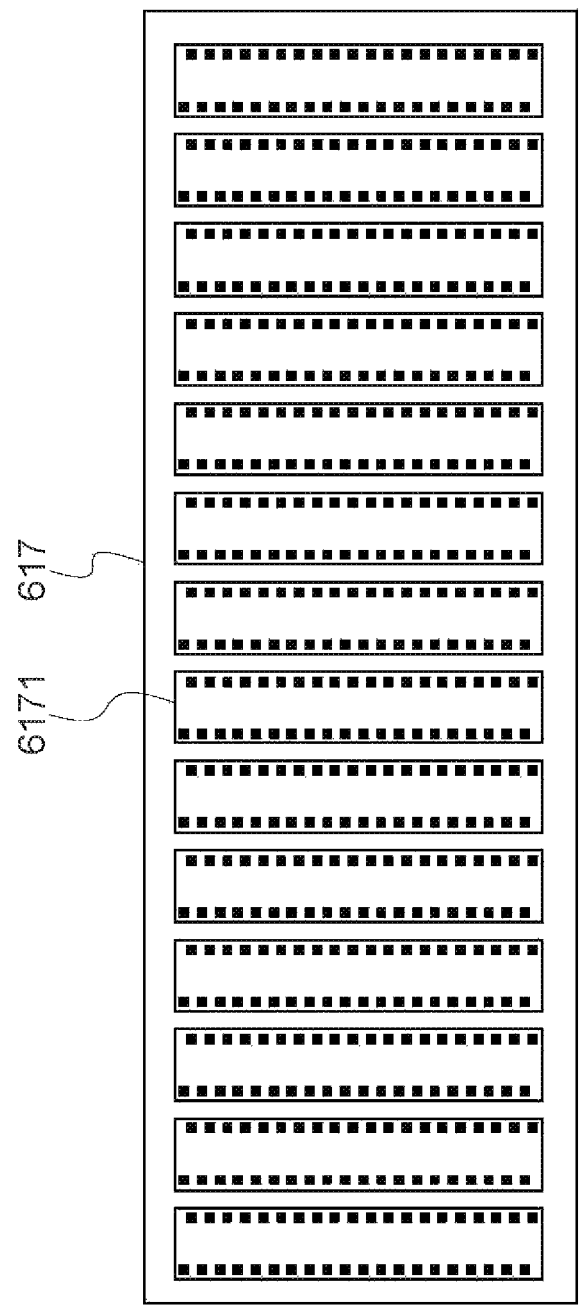
FIG. 64 is a plan view of a gaming currency tray for housing the gaming currency in a sixth embodiment.

FIG. 64 is a plan view of a gaming currency tray for housing the gaming currency. Plural grooves 6171 for stacking and housing the gaming currencies C in its thickness direction are formed on the gaming currency tray 617. The grooves 6171 are formed in a semi-cylindrical shape to house the disc-shaped gaming currencies C. Each groove 6171 can house 40 gaming currencies C, and 14 grooves 6171 are formed on the gaming currency tray 617 in parallel to each other in a vertical direction.

Plural photosensors 6173 are embedded on both of right and left sides of an inner wall of each groove 6171. As not shown in FIG. 64, an antenna of an RF reader is embedded inside each groove 6171. The gaming currency tray 617 is embedded and utilized in front of a dealer position of a game table of a casino.

Figure 65:
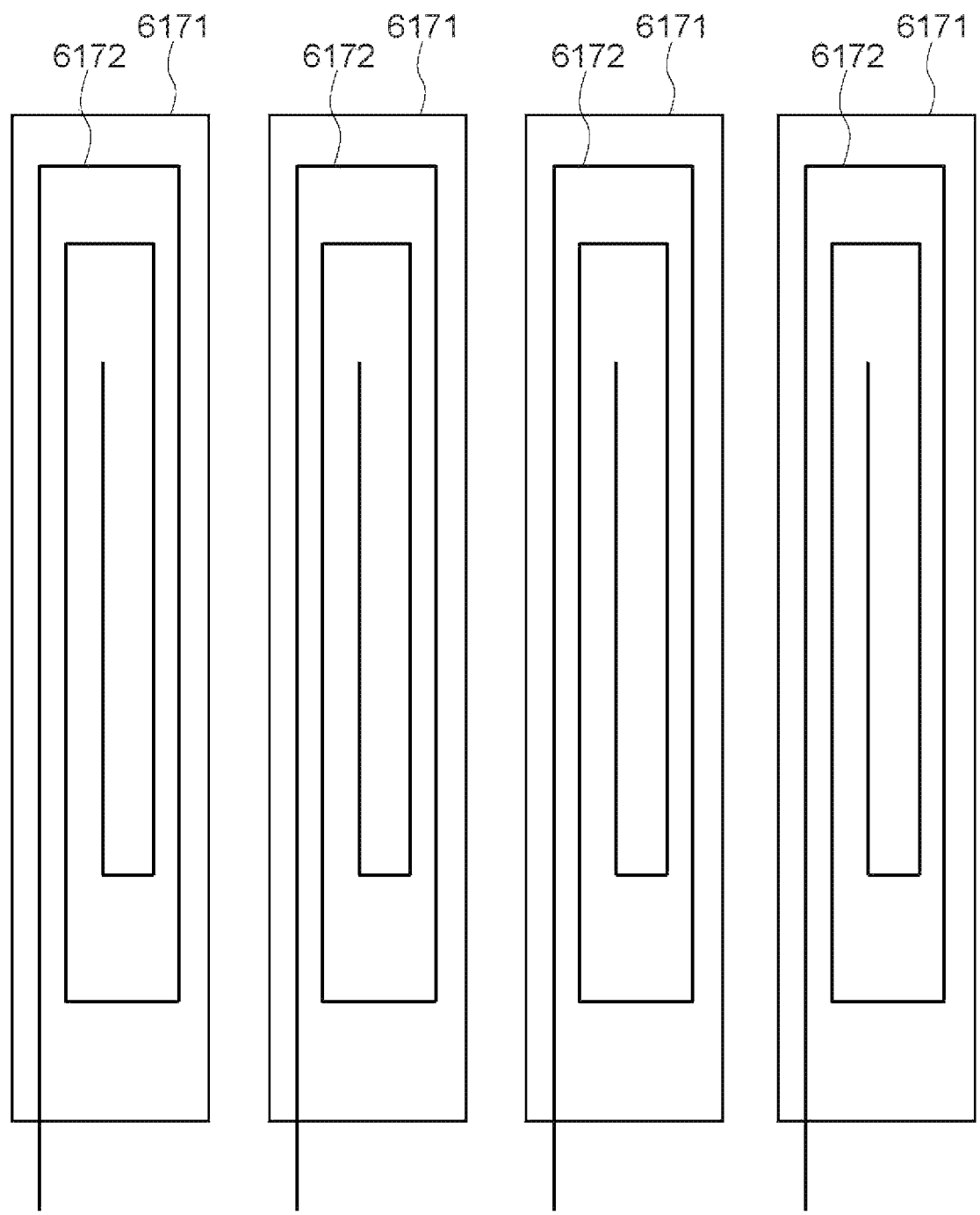
FIG. 65 is a diagram indicating an antenna of an RF reader in the sixth embodiment.

FIG. 65 is a diagram indicating an antenna 6172 of an RF reader (hereinafter referred to as "RF antenna"). The RF antenna 6712 is installed at an inner part or a bottom part of the gaming currency tray 671 corresponding to each groove 6171. Also, FIG. 65 shows only four grooves; however, other grooves 6171 are similar.

In the example of FIG. 65, one RF antenna 6172 is installed to one groove 6171. The RF antenna 6172 is radio-communicated with the RF tag built in the gaming currency C housed in the corresponding groove 6171, and read the RF information from the RF tag. An electric wave shielding wall may be provided between the adjacent grooves 6171, so that each RF antenna 6172 does not read the RF tag of the gaming currency C housed in the next groove 6171.

Figure 66:
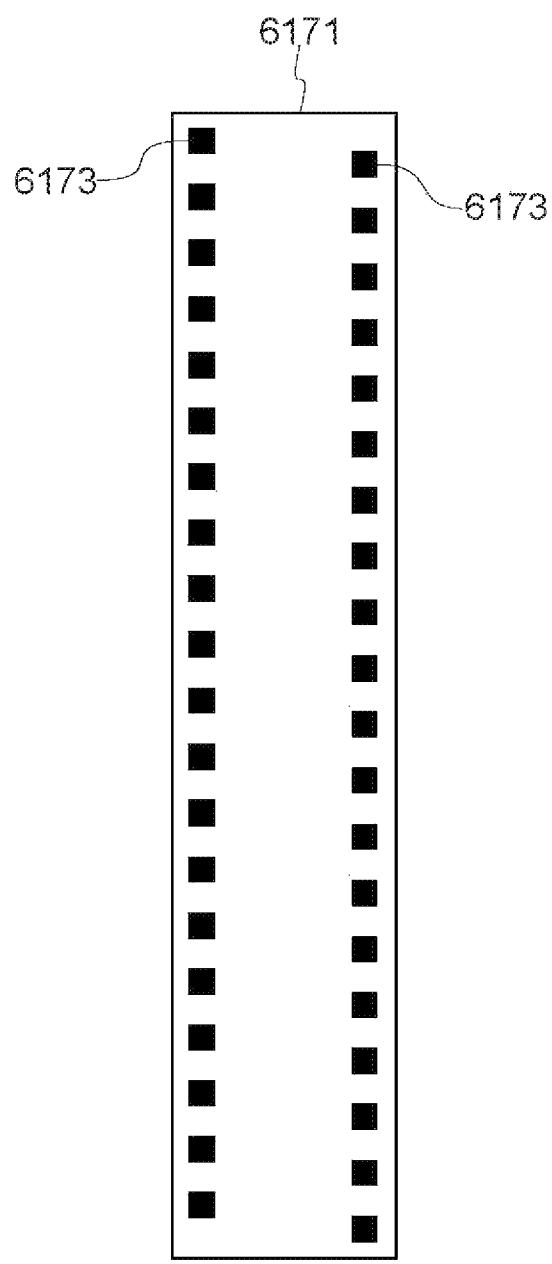
FIG. 66 is an enlarged plan view and a front-direction cross section view of a groove in the sixth embodiment.
Figure 66:
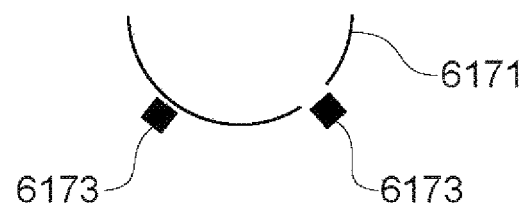

FIG. 66 is an enlarged plane view and a front-direction cross section view of the groove 6171. The gaming currencies C are stacked in a longitudinal direction of the groove 6171 and housed in the groove 6171. In the example of FIG. 66, 40 gaming currencies C can be housed in one groove 6171.

Plural photosensors 6713 are embedded on the right and left sides of an inner wall with a semicircular cross section, so that sensing faces are flush with the inner wall. The photosensors 6713 are reflection-type photosensors, and detect the gaming currencies C when the sensing faces are blocked with the gaming currencies C by housing the gaming currencies C in the groove 6171.

The plural photosensors are aligned on the right and left sides of the inner wall at a pitch of thickness of the 2 gaming currencies C. In this example, as described above, 40 gaming currencies C can be housed in one groove 6171. So, 20 photosensors 6173 are provided on the right side, and 20 photosensors 6173 are provided on the left side.

The line of the plural photosensors 6173 on the right side is displaced from the line of the plural photosensors 6173 on the left side by the thickness of one gaming currency C. Therefore, the plural gaming currencies C stacked and housed in the groove 6171 are detected by the photosensors 6173 arranged in different lines in an order of stacking. Concretely, the gaming currency C housed a lowermost position of the groove 6171 is detected by the photosensor 6173 at a lowermost part on the right side, the second gaming currency C from the bottom is detected by the photosensor at a lowermost part on the left side, the third gaming currency C from the bottom is detected by the second photosensor 6173 from the bottom on the right side, and the fourth gaming currency C from the bottom is detected by the second photosensor 6173 from the bottom on the left side. In this manner, right side photosensors 6183 and left side photosensors 6173 alternately detect the gaming currencies C sequentially from the bottom.

In this manner, the plural photosensors 6173 are alternately arranged in the different lines, so that the plural photosensors 6173 for reading the plural gaming currencies C stacked and housed in the groove 6171 in the thickness direction one by one can be arranged.

Figure 67:
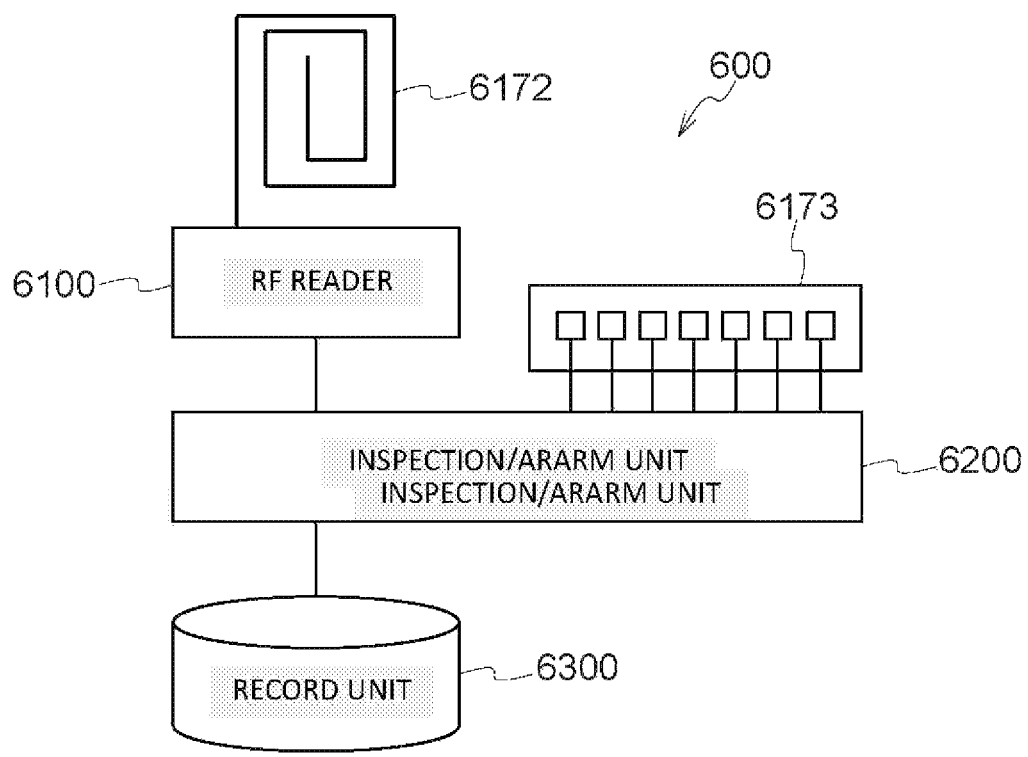
FIG. 67 is a diagram indicating an entire configuration of the inspection system in the sixth embodiment.

FIG. 67 is a diagram indicating an entire configuration of the inspection system. As shown in FIG. 67, an inspection system 600 comprises: an RF reader 6100 having an RF antenna 6172; plural photosensors 6173; an inspection/alarm part 6200 connected to the RF reader 6100 and the plural photosensors 6173; and a storage part 6300 connected to the inspection/alarm part 6200. The inspection/alarm part 6200 is configured by a computer including a processor and a memory, and is realized by processor's executing an inspection/alarm program in the present embodiment.

The RF reader 6100 receives electric waves from the RF tag of the gaming currency C with the RF antenna 6172, and reads information (tag information) stored in the RF tag. The RF reader outputs the read tag information to the inspection/alarm part 6200. As shown in FIG. 65, the inspection system 600 comprises plural RF antennas 6172. The plural RF antennas 6172 may be connected to one RF reader 6100, and the plural RF readers 6100 may be provided corresponding to the plural RF antennas 6172.

The plural photosensors 6173 are respectively connected to the inspection/alarm part 6200, and transmits sensing information to the inspection/alarm part 6200. The sensing information of each photosensor 6173 is information indicating existence of the gaming currency C.

The inspection/alarm part 6200 compares the number of the tag information read by the RF reader 6100 with the number of detection information of the gaming currencies C obtained from the plural photosensors 6173. In this case, the inspection/alarm part 6200 determines whether the tag information is true or false, and may compare only the number of the tag information determined as true with the number of the detection information of the photosensors 6173.

When the true RF tags are built in all of the plural gaming currencies housed in the gaming currency tray 617, the number of the tag information read by the RF reader 6100 must be equal to the number of the gaming currencies C detected by the photosensors 6173. Thus, the inspection/ alarm part 6200 determines whether or not the numbers are equal to each other, and generates alarms when the numbers are not equal to each other.

The generated alarms are outputted in a system that can be sensed by a person with alarm means (not shown). For example, when the alarm means is a loudspeaker, the inspection/alarm part 6200 generates signals for outputting predetermined alarm sounds from the loudspeaker as alarms. When the alarm means is a lamp, the inspection/alarm part 6200 generates signals for lighting the lamp as alarms.

The RF reader 6100 reads the tag information at a predetermined time interval (for example, one-second interval). Also, the photosensor 6173 executes detection at a predetermined time interval (for example, 2-second interval). The RF reader 6100 and the photosensor 6173 may always execute reading and detection.

Also, the RF reader reads the tag information at a predetermined time interval or always, and the inspection/alarm part 6200 determines whether or not there is a change of the plural pieces of the read tag information. When there is a change, detection may be executed by the photosensor 6173 according to the control of the inspection/alarm part 6200. On the other hand, the gaming currencies C are detected by the plural photosensors 6173 at a predetermined time interval or always, and the inspection/alarm part 6200 determines whether or not there is a change of the number of the detected gaming currencies C. When there is a change, the tag information may be read by the RF reader 6100 according to the control of the inspection/alarm part 6200.

When alarms are generated by the inspection/alarm part 6200, the alarm means immediately outputs alarms. Therefore, within a predetermined time from when and immediately after the unfair gaming currency is housed in the gaming currency tray 617, the alarms are outputted. Thus, it can be grasped from which player playing on the table at that time the unfair currency is delivered. Also, the game is once stopped, so that the unfair gaming currency can be prevented from being used furthermore. In some cases, the player who delivers the unfair gaming currency can be specified among players playing on that table.

The inspection/alarm part 6200 records the results of inspection (comparison) and the generated alarms together with the information of date and time, in the record part 6300.

Figure 68:
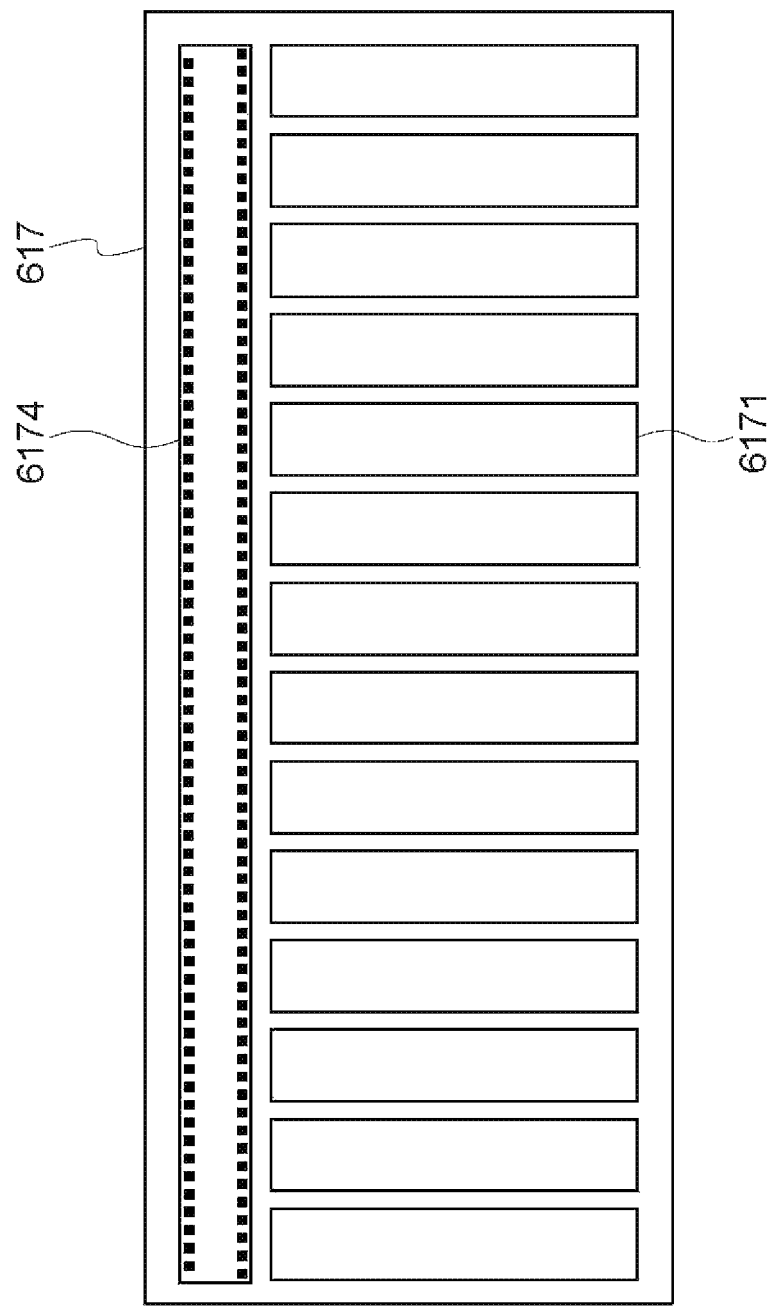
FIG. 68 is a plan view indicating another example of a gaming currency tray in the sixth embodiment.

FIG. 68 is a plane view indicating the other example of the gaming currency tray. In the example of FIG. 68, in addition to plural grooves (stock grooves) 6171 in a vertical direction for housing the gaming currencies C, horizontal grooves (collecting grooves) 6174 used to house the gaming currencies C the dealer collects from the players are provided above them. Also, in the example of FIG. 68, the photosensor 6173 is not provided on a stock groove 6171, the photosensors 6173 are embedded in a collection groove 6174 at an arrangement similar to FIG. 66, and an RF antenna 6172 (not shown) is embedded under the collection groove 6174.

The number of the gaming currencies C housed in the collection groove 6174 is increased or decreased per game. Accordingly, the collection groove 6174 is provided with the photosensor 6173 and the RF antenna 6172, so that an interval of inspection is made sufficiently short. The gaming currencies C immediately after collected from the players can be inspected per game. When the unfair gaming currency is detected, a player holding it can be specified, or a game can be stopped. Also, when the gaming currencies C of not less than a constant number or a housable number are housed in the collection groove 6174, some or all of them may be transferred to the stock groove 6171.

Figure 69:
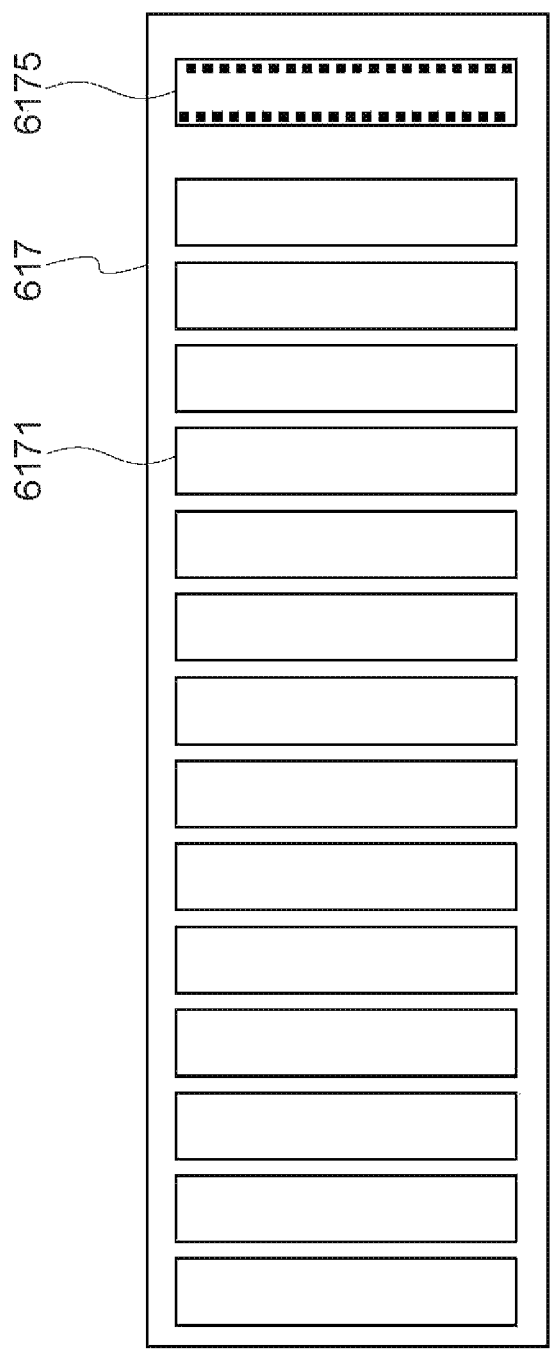
FIG. 69 is a plan view indicating a further example of a gaming currency tray in the sixth embodiment.

FIG. 69 is a plane view indicating the further example of the gaming currency tray. In the example of FIG. 69, the collection groove 6175 is provided at a right end in a vertical direction. Then, the photosensor 6173 and the RF antenna 6172 (not shown) are provided on the collection groove 6175.

Figure 70:
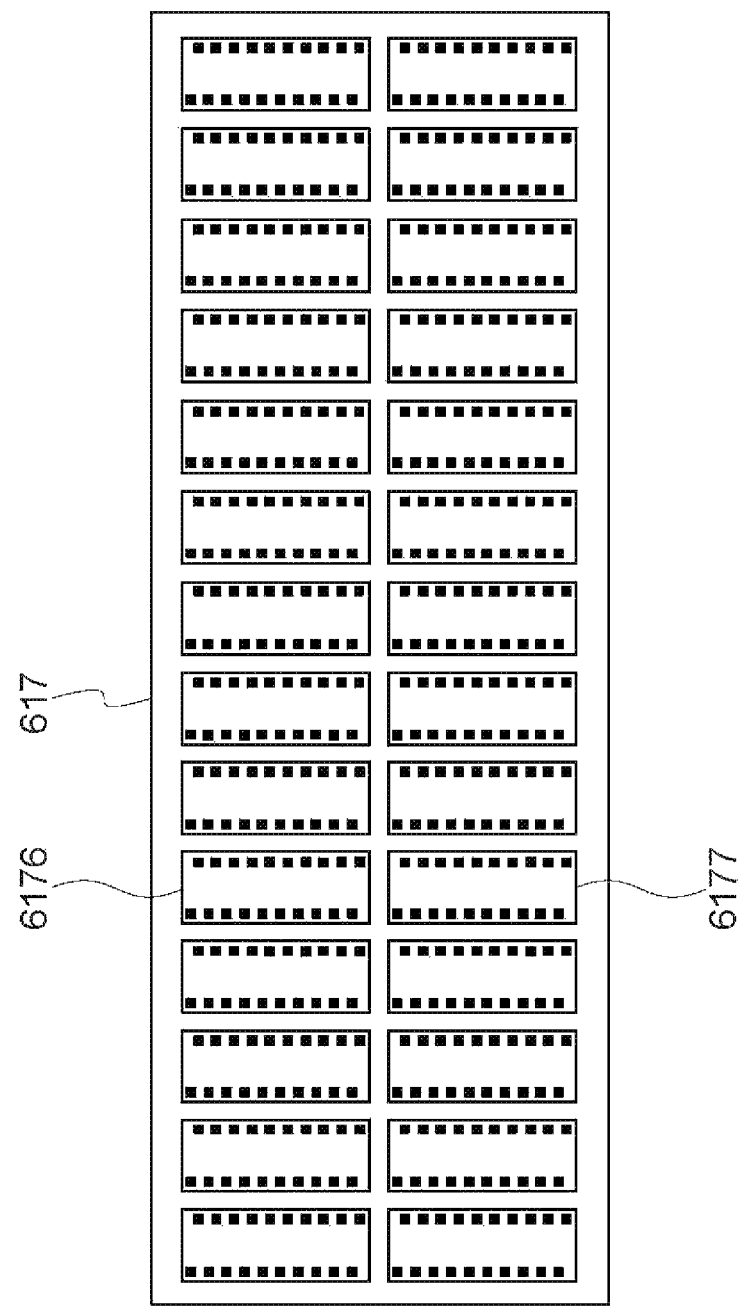
FIG. 70 is a plan view indicating a further example of a gaming currency tray in the sixth embodiment.

FIG. 70 is a plane view indicating the further example of the gaming currency tray. In the example of FIG. 70, grooves in the vertical direction are divided into two stages of upper and lower grooves 6176, 6177 that can respectively house 20 gaming currencies C. Each groove 617 can house 20 gaming currencies C. As is similar to the example of FIG. 64, photosensors 6173 are alternately provided on each groove 617 on both of right and left sides. In the gaming currency tray 617 in this example, the number of the stacked gaming currencies C is small, so that displacement between the stacked and housed gaming currencies C and the photosensor 6173 can be avoided from being large.

In the examples of FIGS. 69 and 70, the photosensor 6173 and the RF antenna 6172 are provided on the collection groove as well, so the gaming currencies C can be inspected immediately after collection.

Figure 71:
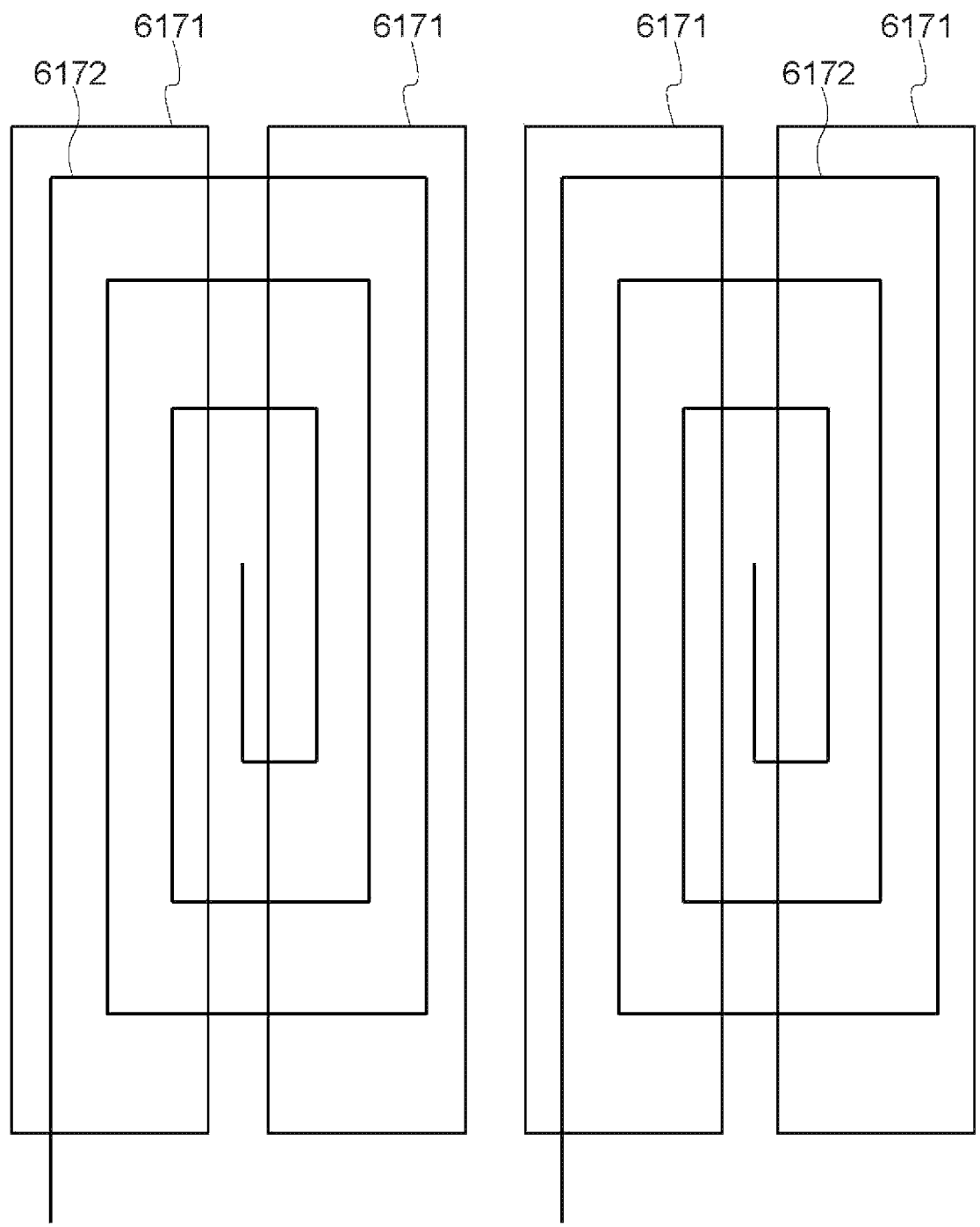
FIG. 71 is a diagram indicating another configuration of an RF antenna in the sixth embodiment.

FIG. 71 is a diagram indicating another configuration of an RF antenna. In the above-mentioned sixth embodiment, one RF antenna is provided on one groove 6171. As shown in FIG. 71, one RF antenna 6172 may be configured and arranged to read the RF tags of the gaming currencies C housed in the plural grooves 6171.

In the above-mentioned sixth embodiment, when inspecting the gaming currencies C, it is determined whether or not the number of the gaming currencies C whose RF tags are read by the RF reader 6100 is equal to the number of the gaming currencies C detected by physical means other than RFID, so as to detect the unfair gaming currency that does not have an RF tag or whose RF tag is broken. Then, the photosensors 6173 for detecting the existence of the gaming currencies one by one is used as means for detecting the number of the gaming currencies C physically with means other than RFID.

However, means for physically detecting the number of the gaming currencies C with means other than RFID is not limited to plural photosensors. Hereinafter, the other example of the detection means will be explained.

Figure 72:
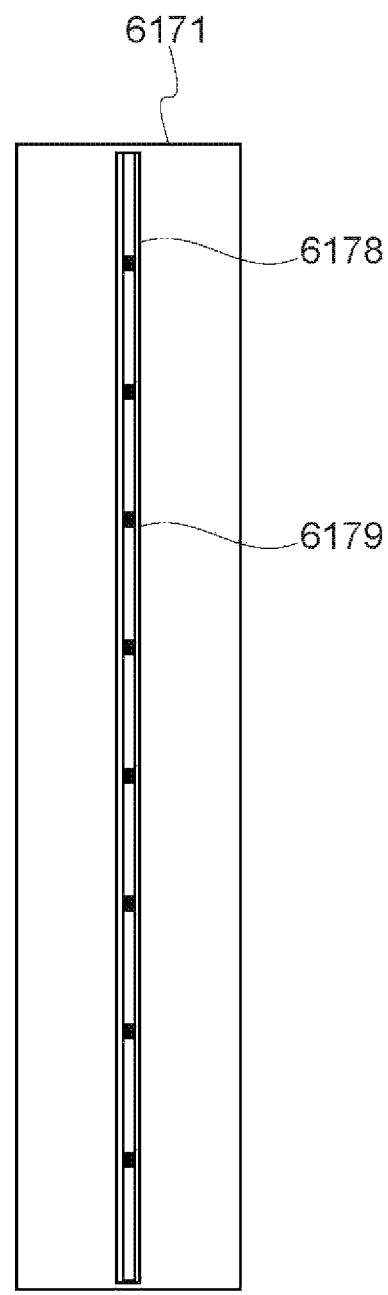
FIG. 72 is a diagram indicating one groove of the gaming currency tray using a line sensor as a detection means in the sixth embodiment.
Figure 72:
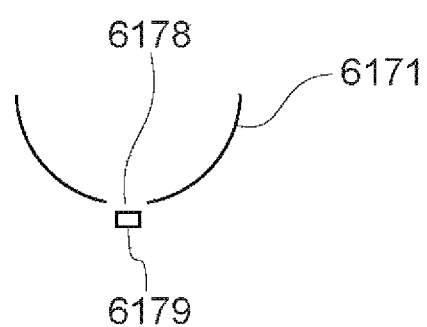

FIG. 72 is a diagram indicating one groove of a gaming currency tray using a line sensor as detection means. As shown in FIG. 72, a slit 6178 extending in a longitudinal direction of the groove 6171 is formed at a bottom of an inner wall of the groove 6171, and a line sensor 6179 is provided along the slit 6178 below the slit 6178. A pixel pitch in the longitudinal direction of the line sensor 6179 is set smaller than the thickness of the gaming currency C (the pixel number in the longitudinal direction of the line sensor 6179 is set sufficiently larger than the housing number of the gaming currencies C of the groove 6171).

Figure 73:
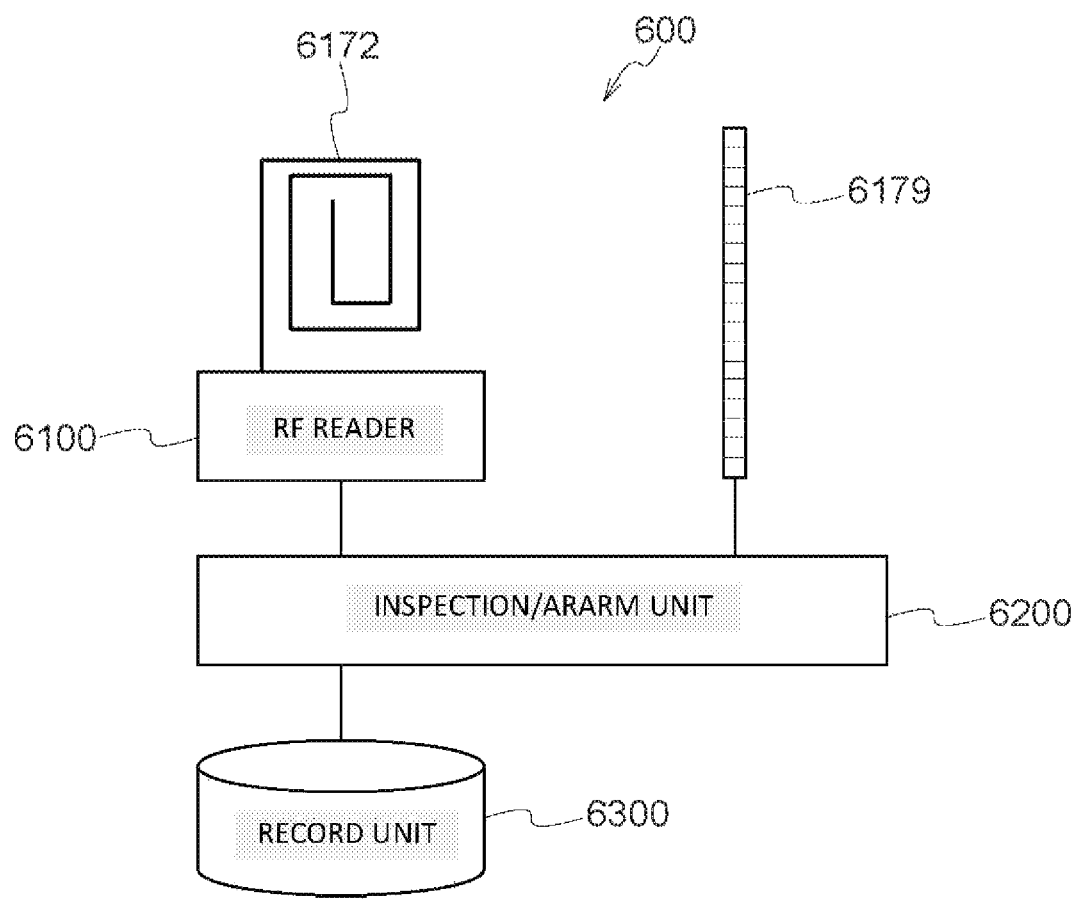
FIG. 73 is a diagram indicating an entire configuration of an inspection system 600 in the example of FIG. 72.

FIG. 73 is a diagram indicating an entire configuration of an inspection system 600 in the example of FIG. 72. The line sensor 6179 is connected to the inspection/alarm part 6200. The line sensor 6179 acquires a line image by picking up an image. The line sensor 6179 outputs the acquired line image to the inspection/alarm part 6200. The inspection/alarm part 6200 detects the number of the gaming currencies C housed in the groove 6171 by determining to where there are gaming currencies C from the bottom, based on the line image.

The RF antenna 6172 and the RF reader 6100 are similar to those in the above-mentioned sixth embodiment. The inspection/alarm part 6200 executes inspection by comparing the number of the tag information read by the RF reader 6100 with the number of the gaming currencies C detected from the line image, and generates alarms when the numbers are not equal to each other. The record part 6300 records the inspection results of the inspection/alarm part 6200 and the generated alarms.

Figure 74:
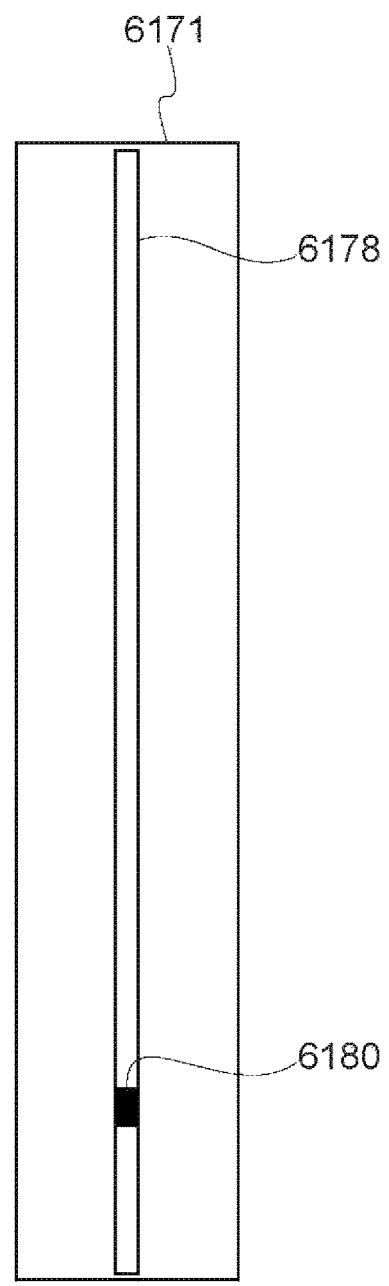
FIG. 74 is a diagram indicating one groove of the gaming currency tray using a scanner as the detection means in the sixth embodiment.
Figure 74:
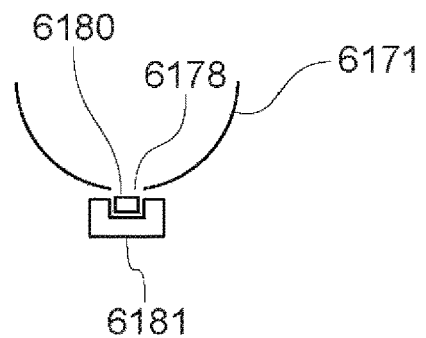

FIG. 74 is a diagram indicating one groove of the gaming currency tray using a scanner as the detection means. As shown in FIG. 74, a slit 6178 extending in a longitudinal direction of the groove 6171 is formed at the bottom of the inner wall of the groove 6171, and a rail 6181 is provided along the slit 6178 under the slit 6178. An imaging element 6180 moves on the rail 6181, so as to constitute a scanner.

Figure 75:
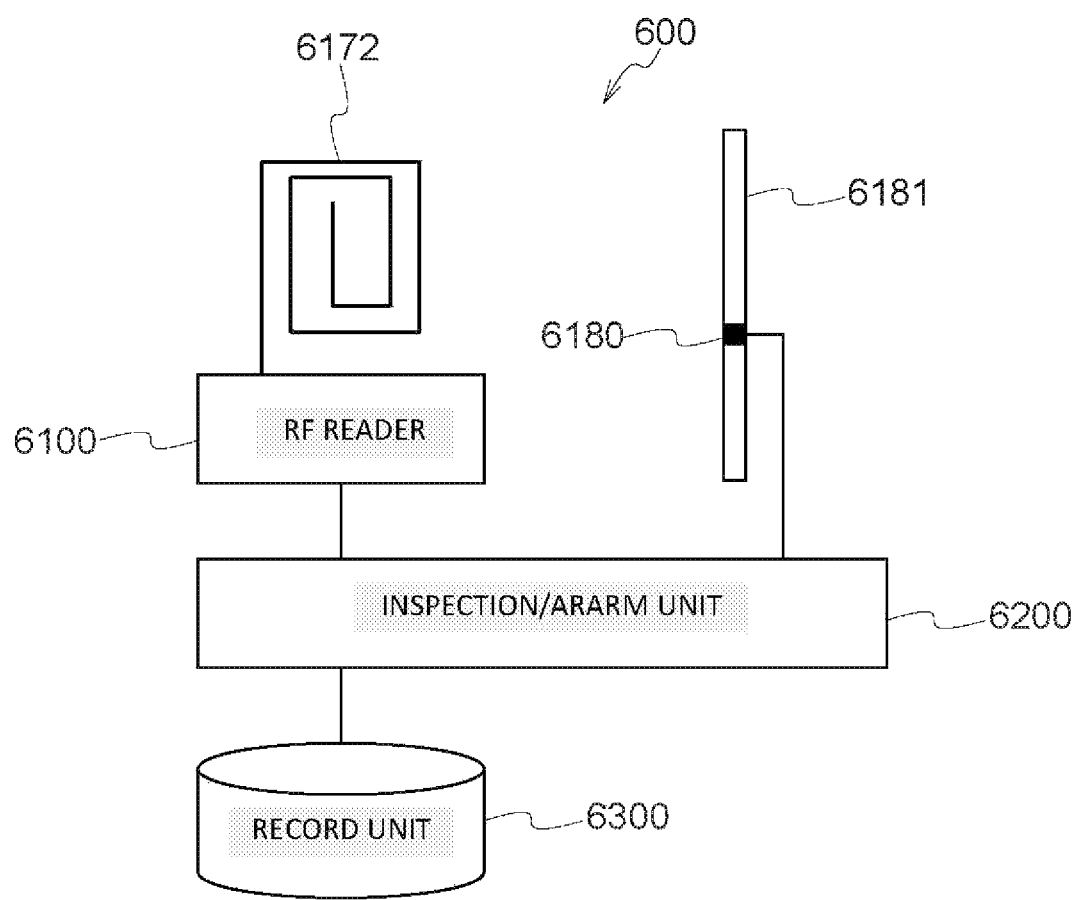
FIG. 75 is a diagram indicating an entire configuration of the inspection system 600 in the example of FIG. 74.

FIG. 75 is a diagram indicating an entire configuration of the inspection system 600 in the example of FIG. 74. The imaging element 6180 is connected to the inspection/alarm part 6200. The imaging element 6180 picks up an image while moving on the rail 6178, and outputs the information of a position on the rail and the picked-up image at that position to the inspection/alarm part 6200. The inspection/alarm part 6200 determines the existence of the gaming currencies C for the plural picked-up images obtained by picking up an image while the imaging element 6180 is moving in one direction from one end to the other end on the rail 6181, so as to detect the number of the gaming currencies C housed in the groove 6171.

Figure 76:
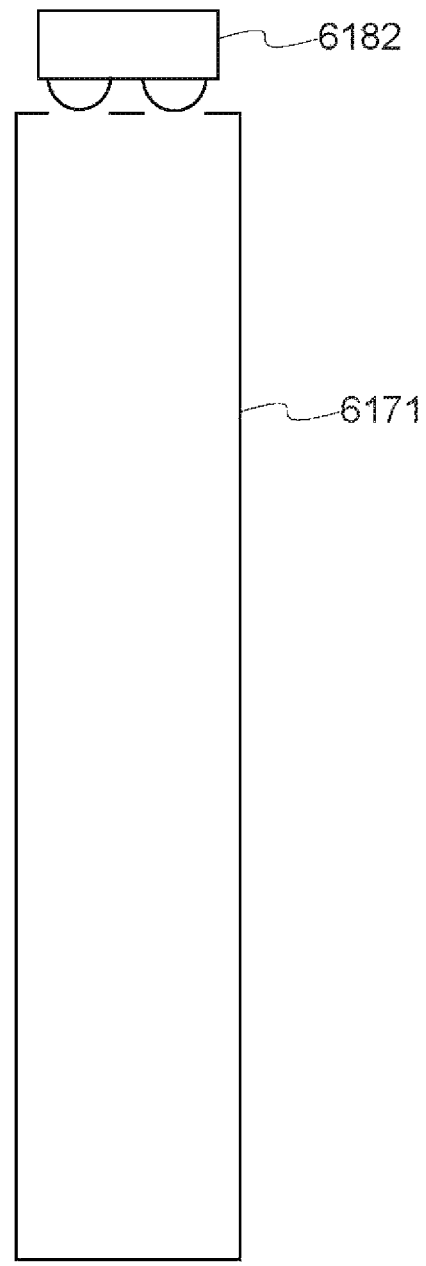
FIG. 76 is a diagram indicating one groove of the gaming currency tray using a laser distance meter as the detection means in the sixth embodiment.
Figure 76:
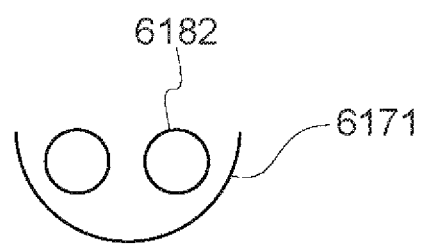

FIG. 76 is a diagram indicating one groove of the gaming currency tray using a laser distance meter as detection means. As shown in FIG. 76, a laser distance meter 6182 is provided at an upper end of the groove 6171. The laser of the laser distance meter 6182 is set parallel to the longitudinal direction of the groove 6171. When the gaming currencies C stacked sequentially from the bottom are housed in the groove 6171, the laser emitted from the laser distance meter 6182 is reflected on the surface of the uppermost gaming currency C, and returned to the laser distance meter 6182. Accordingly, the laser distance meter 6182 measures a distance from an observation position to the gaming currency C furthest away from a reference position (the gaming currency C stacked at the uppermost part), when the upper end of the groove 6171 is an observation groove and the lower end is a reference position.

Figure 77:
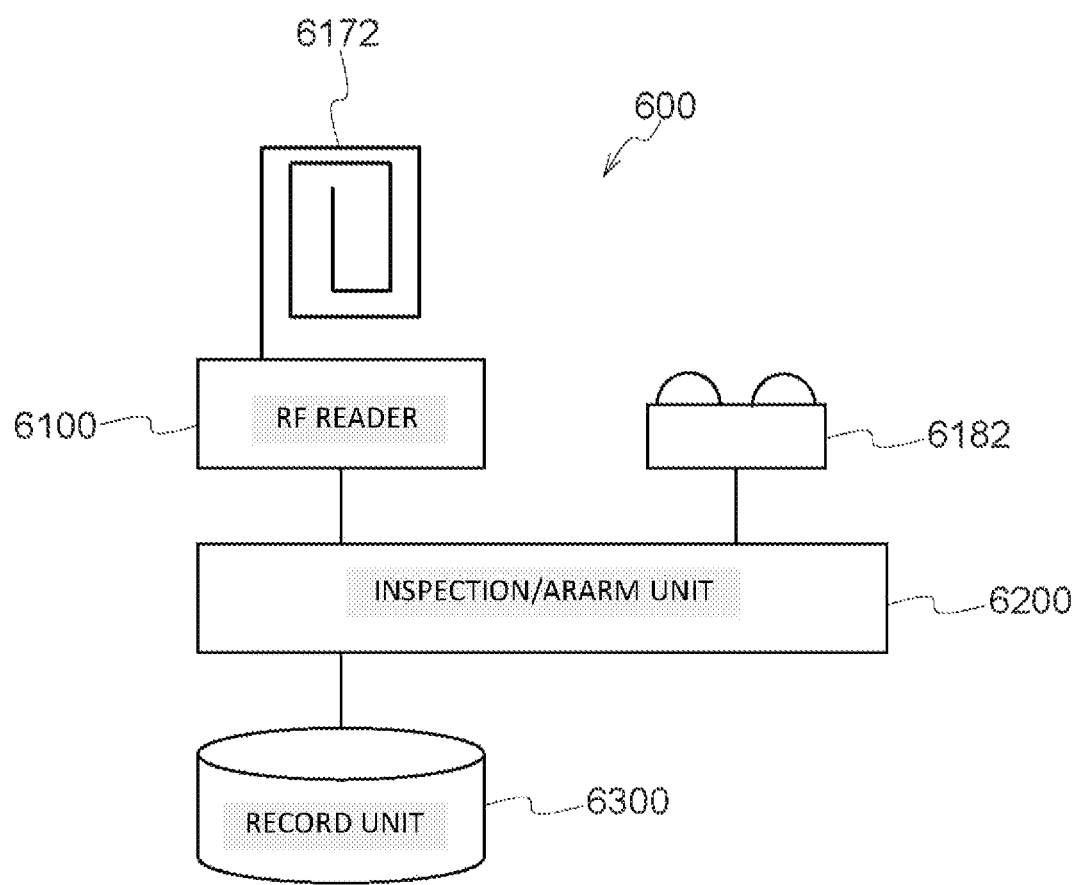
FIG. 77 is a diagram indicating the entire configuration of the inspection system 600 in the example of FIG. 76.

FIG. 77 is a diagram indicating the entire configuration of the inspection system 600 in the example of FIG. 76. The laser distance meter 6182 is connected to the inspection/alarm part 6200, and outputs the measured distance to the inspection/alarm part 6200. The larger the number of the gaming currencies C housed in the groove 6171 gets, the smaller the measured distance gets. Therefore, the inspection/alarm part 6200 detects the number of the gaming currencies C housed in the groove 6171, based on the distance measured by the laser distance meter 6182.

Figure 78:
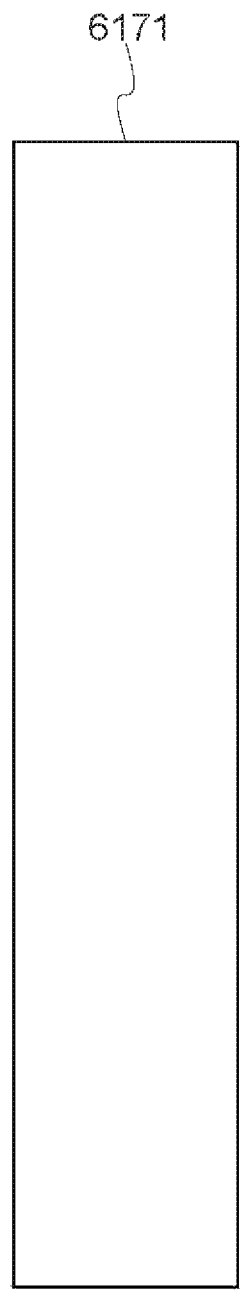
FIG. 78 is a diagram indicating one groove of the gaming currency tray using a weight meter as the detection means in the sixth embodiment.
Figure 78:
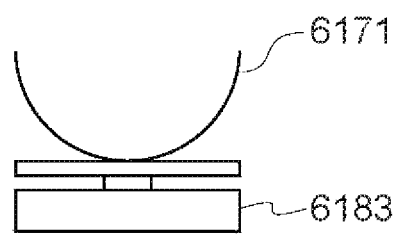

FIG. 78 is a diagram indicating one groove of the gaming currency tray using a weight meter as detection means. As shown in FIG. 78, the groove 6171 is located on a weight meter 6183. When the gaming currency C is housed in the groove 6171, the weight measured by the weight meter 6183 is increased.

Figure 79:
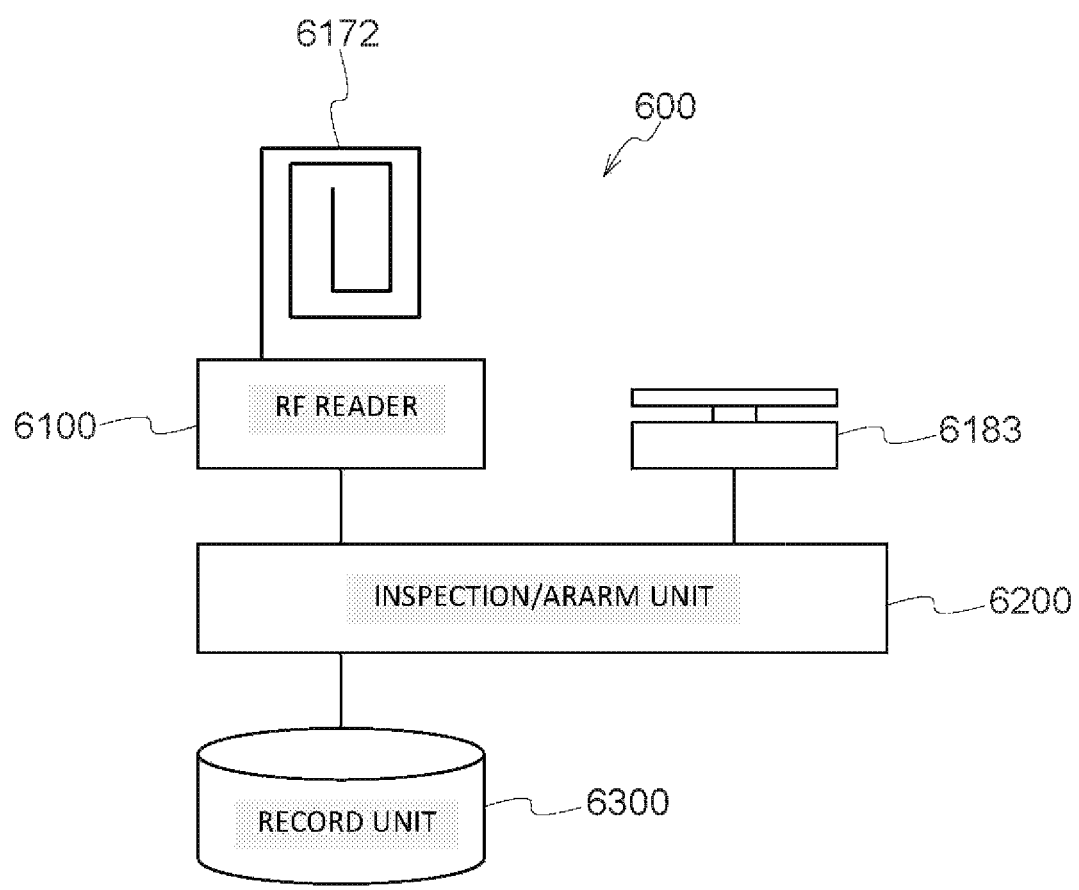
FIG. 79 is a diagram indicating the entire configuration of the inspection system 600 in the example of FIG. 78.

FIG. 79 is a diagram indicating the entire configuration of the inspection system 600 in the example of FIG. 78. The weight meter 6183 is connected to the inspection/alarm part 6200, and outputs the measured weight to the inspection/alarm part 6200. The larger the number of the gaming currencies C housed in the groove 6171 gets, the heavier the measured weight gets. Therefore, the inspection/alarm part 6200 detects the number of the gaming currencies C housed in the groove 6171, based on the weight measured by the weight meter 6183.

In any of the above-mentioned examples, the detection means for detecting the number of the gaming currencies C housed in the groove 6171 by means other than RFID is provided; however, it may not be provided. The maximum number for housing the gaming currencies C in the groove 6171 is decided. So, when the RF tags are read while the maximum number of the gaming currencies C are housed in the groove 6171, the number of the gaming currencies C physically existing at that time is already known as a maximum number.

Accordingly, the inspection/alarm part 6200 can detect the unfair gaming currency that does not have an RF tag or whose RF tag is broken, by comparing the number of the gaming currencies C whose tag information is read by the RF reader with the known maximum number.

However, the maximum number of the gaming currencies C cannot be always housed in the groove 6171 to be inspected. Then, using a spacer as a dummy currency, a vacant portion in the groove 6171 may be filled. The spacer may have the same shape (disc-like shape) as the gaming currency C, and may have the same shape (columnar shape) as the plural stacked gaming currencies C.

Figure 80:
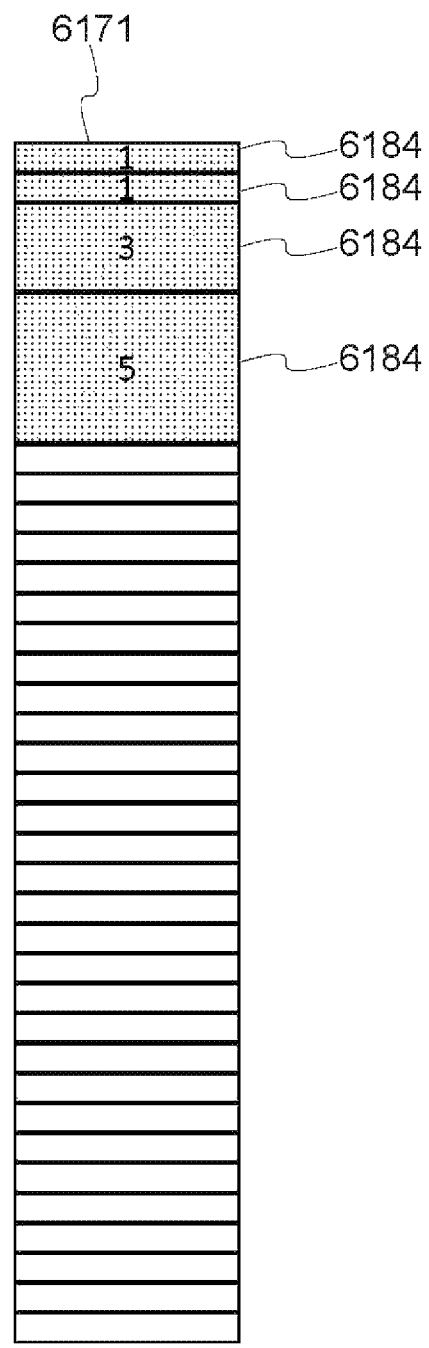
FIG. 80 is a diagram indicating a status that a vacant space of the groove is filled by a spacer in the sixth embodiment.

FIG. 80 is diagram indicating a status that a vacant space of the groove is filled by the spacer. The groove 6171 can house 40 gaming currencies C (the maximum housing number is 40), and 30 gaming currencies C are housed in the groove 6171. To fill a vacant space of 10 gaming currencies, one spacer 6184 for 5 gaming currencies, one spacer 6184 for 3 gaming currencies, and two spacers 6184 for one gaming currency are housed in the groove 6171.

The RF tags of the number of the currencies are built in the spacer 6184. For example, 5 RF tags are built in the spacer 6184 for 5 currencies, 3 RF tags are built in the spacer 6184 for 3 currencies, and one RF tag is built in the spacer 6184 for one currency.

Accordingly, when all of 30 gaming currencies C housed in the groove 6171 are fair, the RF reader 6100 reads 40 pieces of the tag information including the RF tags built in the spacer 6184. The inspection/alarm part 6200 determines that the unfair gaming currencies exists, and generates alarms, when the number of the tag information read by the RF reader 6100 is not equal to a predetermined value, i.e., the housable number of the gaming currencies C in the groove 6171.

Figure 81:
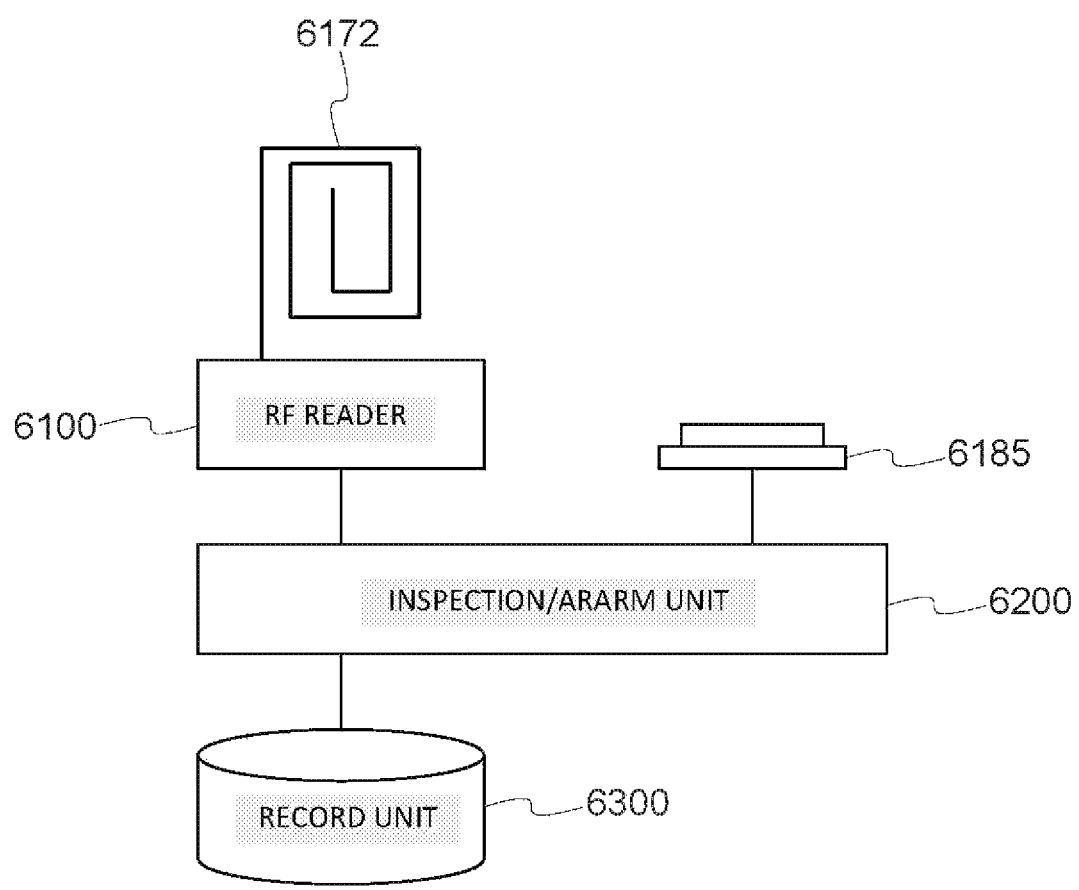
FIG. 81 is a diagram indicating the entire configuration of the inspection system 600 in the example of FIG. 80.

FIG. 81 is a diagram indicating the entire configuration of the inspection system 600 in the example of FIG. 80. As described above, there is no need of detection means in the example of FIG. 80. If inspection is executed at an arbitrary timing, a vacant space is created in the groove 6171, so the RF reader 6100 cannot read a predetermined number of tag information, and may generate alarms. Accordingly, in the example of FIG. 81, a switch 6185 for instructing inspection at the inspection/alarm part 6200 is provided. The switch 6185 is pushed to generate ON signals.

The switch 6185 is connected to the inspection/alarm part 6200, and outputs the ON signals to the inspection/alarm part 6200. The inspection/alarm part 6200 instructs execution of reading to the RF reader 6100, when receiving the ON signals from the switch 6185.

The dealer collects the gaming currencies C from players losing a game, houses them in the groove 6171, houses the spacer 6184 in the vacant spacer, and pushes the switch 6185 after there is no vacant space of the groove 6171. Then, the RF reader 6100 reads the RF tags, and the inspection/alarm part 6200 executes inspection by determining whether the number of the read tag information is equal to a predetermined number.

In the sixth embodiment, a system for inspecting gaming currencies used in a casino game is explained, but an object to be inspected may be a valuable other than a gaming currency C. Also, the RF tag is embedded in the gaming currency, but a unique ID that can be individually identified by the other method may be adhered.

Also, in the sixth embodiment, various means for detecting the number of the gaming currencies C by means other than RFID are explained. The means for detecting the number of the gaming currencies C may be means for detecting the number of the gaming currencies including the unfair gaming currencies as the players and the dealer identify them as the gaming currencies C, for example, may be means for detecting the number of the currencies based on an image by picking up the image of the gaming currencies C housed in the gaming currency tray 617 with a camera, as in the example explained below.

Furthermore, the inspection system may inspect an object other than a valuable.

Figure 82:
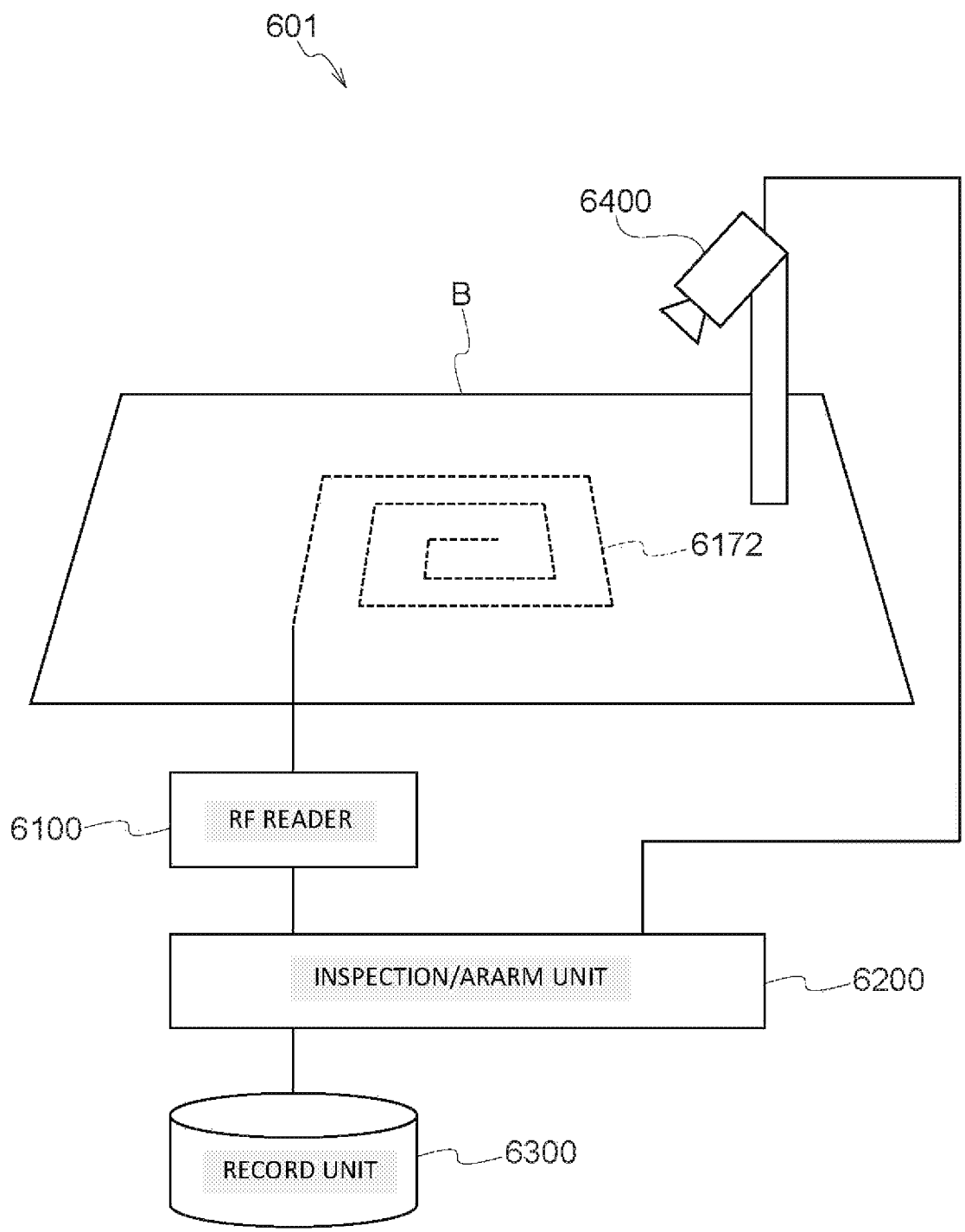
FIG. 82 is a diagram of the entire configuration of the inspection system for inspecting an object, in which an RF tag is built, in the sixth embodiment.

FIG. 82 is a diagram of the entire configuration of the inspection system for inspecting an object, in which the RF tag is built. The inspection system 6001 comprises a table B for locating an object. The object located on the table B is imaged with a camera 6400, and the picked-up image is generated. The camera 6400 is connected to the inspection/alarm part 6200, and the picked-up image is outputted to the inspection/alarm part 6200. The inspection/alarm part 6200 comprises a neural network learnt by deep learning. The number of objects is identified from the picked-up image by the neural network, so as to detect the number of the objects.

Also, an RF antenna 6172 is built in the table B. The RF tag built in the object located on the table B transmits electric waves to the RF antenna 6172, and the RF reader 6100 reads the tag information.

The inspection/alarm part 6200 compares the number of the tag information read by the RF reader 6100 with the number of the objects identified by the neural network, and generates alarms when both of the numbers are not equal to each other. In this manner, the number of the objects whose fairness is not known but that exist is detected by the camera 6400 that is means other than RFID. By reading the RF tags of these objects, and comparing the number of the read tag information with the number detected by the camera 6400, the objects whose RF tag information cannot be read can be detected.

REFERENCE SIGNS LIST

1, Playing card
1s, Plurality of sample playing card
2, Camera device
3, Card distributing device
4, Game table
5, Dealer
6, Guest (game participant/player)
7, Chair
8, Bet area
10, Area
10P, Player area
10B, Banker area
11, Game recording device
12, Image analyzing device
13, Result display lamp
14, Control device
14C, Card distribution detecting device
15, Output (abnormality determination result and the like)
16, Abnormality display lamp
30, Distribution limiting device
33, Slot
34, Lock member
35, Driving unit
36, Lock member
37, Driving unit
40, Distribution limiting device
102, Card housing unit
103, Index
105, Card guiding unit
106, Opening portion
107, Card guide
109, Control unit
112, Side monitor
120, Gaming currency
121, Coloring layer
122, White layer
123, Print
124, Transparent layer (print layer)
125, RFID
126, Side ID
200, Inspection device
201, Inlet
202, Outlet
203, Passage
204, Determination device
205, Mark reading device
206, Print inspecting device
207, Control device
41, Inspection system
4100, 4100', Cases
4101, 4101', top parts
4102, Lower part
4200, Inspection device
4210, Receiving part
4211, Side wall
4212, Bottom part
4213, Deep wall
4220, Main body part
4221, RFID reader
4222, Computer
4223, Display part
4224, RFID antenna
4225, Infrared-ray camera
4226, Visible-light camera
4227, Arm
4228, Barcode reader
4229, Communication part
4230, Identification part
4231, Determination part
4301, Manufacturing device
4302, Manufacture management device
4303, Use management device
4501, Specific coloring layer
4502, Common coloring layer
4503, RFID tag
4504, Transparent layer
4505, 4505', Code information
4506, Printing
4507, Printing
4800, Good/bad results display screen
4801, Total detection number
4802, Number of correct gaming currencies C
4803, Number of unfair gaming currencies C 4804, Currency information display part
4805, Unfair currency information
C, C', C", Gaming currencies
m, m', m", Marks
51, Inspection system
5100, 5100', Cases
5101, 5101', Top parts
5102, Lower part
5200, 5400, Inspection devices
5210, Receiving part
5211, Side wall
5212, Bottom part
5213, Deep wall
5220, Main body part
5221, 5421, Reading devices
5222, 5422, Determination parts
5223, Display part
5224, 5424, Radio tag antennas
5228, Barcode reader
5229, Communication part
5230, Identification part
5231, Identification contents determination part
5301, Manufacturing device
5302, Manufacture management device
5303, Information database
5425, Number control plate
5426, Optical sensor
5427, Inspection TABLE
5501, Specific coloring layer
5502, Common coloring layer
5503, Radio tag
5504, Transparent layer
5505, 5505', Code information
5506, Printing
5507, Printing
5800, Good/bad results display screen
5801, Total detection number
5802, Number of correct gaming currencies C
5803, Number of unfair gaming currencies C
5804, Currency information display part
5805, Unfair currency information
600, 601, Inspection systems
617, Gaming currency tray
6171, Groove
6172, RF antenna
6173, Photosensor
6174, 6175, Collection grooves
6176, Upper stage groove
6177, Lower stage groove
6179, Line sensor
6180, Imaging element
6181, Rail
6182, Laser distance meter
6183, Weight meter
6184, Spacer
6185, Switch
6100, RF reader
6200, Inspection/alarm part
6300, Record part
6400, Camera

The invention claimed is:

1. A system comprising
a table including:
a plurality of chip arrangement areas that are adjacent to each other and in each of which can be stacked chips that (a) are usable by a player to make a bet and (b) include respective radio frequency identification (RFID) tags storing information of the respective chips, the information including a respective value and/or a respective chip identification information;
at least one reading restrictor; and
for each of the plurality of chip arrangement areas a respective RFID reader,
wherein the respective RFID reader is configured to, constantly or at constant intervals, read the RFIDs of the one or more chips placed in the respective chip arrangement area and is prevented by the at least one reading restrictor from reading the RFID tag of any chip in an adjacent one of the chip arrangement areas; and
a management device, wherein the management device is configured to detect, respectively for each of the plurality of chip arrangement areas, whether any of the chips within the respective chip arrangement area includes an abnormality based on the information stored in the RFID tags read by the RFID reader of the respective chip arrangement area.

2. The system according to claim 1, wherein the management device is configured to detect, for each of the chip arrangement areas, one or more types, one or more numbers, or a total amount of the chips that are bet by a losing player and placed in the respective chip arrangement area.

3. The system according to claim 1, wherein the management device is configured to determine from which of a plurality of players respective ones of the chips have been delivered to a casino side.

4. The system according to claim 1, wherein the management device is configured to detect a total of a value and number of chips placed in all of the chip arrangement areas on the table based on the information of the RFID tags of the chips placed in the plurality of chip arrangement areas.

5. The system according to claim 1, wherein the management device is configured to determine whether there is a change in information of the RFID tags read from the chips placed in the chip arrangement areas, and output a signal based on the determination.

6. The system according to claim 5, wherein the management device is configured to determine whether there is the change between information of the RFID tags read from the chips in a first time interval and information of the RFID tags read from the chips in a second time interval.

7. The system according to claim 1, further comprising an information database in which information of all RFID tags included in chips to be used in a gaming house is stored, wherein the management device is configured to detect an abnormality of a chip by comparing information of the RFID tag of the chip as read by one of the RFID readers with the information of the information database.

8. The system according to claim 7, wherein the abnormality is that the information of the RFID tag as read is not present in the information database.

9. The system according to claim 7, wherein the abnormality is that the RFID tags of two or more of the chips have the same information.

10. The system according to claim 1, further comprising an information database in which information of all RFID tags included in chips to be used in a gaming house is stored, wherein the management device is configured to detect an abnormality of not being able to obtain information from an RFID tag of one of the chips by comparing information of the RFID tags of the chips as read by one of the RFID readers with the information of the information database.

11. The system according to claim 1, wherein the management device is configured to identify a person holding a chip for which an abnormality is detected.

12. The system according to claim 1, wherein, for each of the plurality of chip arrangement areas, when a plurality of different types of the chips are placed in the respective chip arrangement area, the respective RFID reader of the respective chip arrangement area is configured to collectively read the RFID tags of all of the chips in the respective chip arrangement area.

13. The system according to claim 1, wherein the at least one reading restrictor includes, for each of one or more of the chip arrangement areas, a respective restrictor provided along the respective chip arrangement area.

14. The system according to claim 1, wherein the at least one reading restrictor is provided along the adjacent other chip arrangement area.

15. The system according to claim 1, wherein the RFID reader includes a detector and an RFID antenna connected to the detector.

16. The system according to claim 15, wherein the RFID antenna includes a single antenna line.

17. The system according to claim 16, wherein the single antenna line winds spirally.

18. The system according to claim 15, wherein the RFID antenna extends spirally.

19. The system according to claim 1, wherein the table includes a chip tray.

* * * * *